US012711259B2

(12) United States Patent
Mystetskyi et al.

(10) Patent No.: US 12,711,259 B2
(45) Date of Patent: Aug. 18, 2026

(54) DIGITAL PROCESSING SYSTEMS AND METHODS FOR FACILITATING THE DEVELOPMENT AND IMPLEMENTATION OF APPLICATIONS IN CONJUNCTION WITH A SERVERLESS ENVIRONMENT

(71) Applicant: MONDAY.COM LTD., Tel Aviv (IL)

(72) Inventors: Vlad Mystetskyi, Petah Tikva (IL); Greg Rashkevitch, Tel Aviv (IL); Dor Shaked, Holon (IL); Shay Elkana, Ramat Gan (IL)

(73) Assignee: Monday.com Ltd., Tel Aviv (IL)

( * ) Notice: Subject to any disclaimer, the term of this patent is extended or adjusted under 35 U.S.C. 154(b) by 0 days.

(21) Appl. No.: 18/399,933

(22) Filed: Dec. 29, 2023

(65) Prior Publication Data

US 2025/0173162 A1 May 29, 2025

Related U.S. Application Data

(63) Continuation of application No. PCT/IB2023/061991, filed on Nov. 28, 2023.

(51) Int. Cl.
*G06F 21/62* (2013.01)
*G06F 8/61* (2018.01)
(Continued)

(52) U.S. Cl.
CPC ............ *G06F 21/6218* (2013.01); *G06F 8/63* (2013.01); *G06F 8/71* (2013.01); *G06F 9/445* (2013.01);
(Continued)

(58) Field of Classification Search
None
See application file for complete search history.

(56) References Cited

U.S. PATENT DOCUMENTS

| | | | |
|---|---|---|---|
| 4,972,314 A | 11/1990 | Getzinger et al. |
| 5,220,657 A | 6/1993 | Bly et al. |

(Continued)

FOREIGN PATENT DOCUMENTS

| | | | |
|---|---|---|---|
| CA | 2828011 A1 | 9/2012 |
| CN | 103064833 A | 4/2013 |

(Continued)

OTHER PUBLICATIONS

International Search Report and Written Opinion in PCT/IB2023/061992, mailed Mar. 19, 2024, 7 pages.

(Continued)

*Primary Examiner* — Insun Kang
(74) *Attorney, Agent, or Firm* — Finnegan, Henderson, Farabow, Garrett & Dunner, LLP

(57) ABSTRACT

Systems, methods, and computer program products are disclosed for running applications in a serverless environment. Running applications in a serverless environment includes configuring a serverless environment by integrating a set of rules into the serverless environment, the set of rules including at least one trigger and at least one trigger-responsive action for use in conjunction with a SaaS platform; obtaining a general address for the serverless environment; using the general address for conveying code to the configured serverless environment, for combination in an immutable manner with configuration information, thereby enabling formation of an immutable image, wherein the configuration information is adapted to invoke the at least one trigger, thereby initiating the at least one trigger-responsive action; and receiving a specific address in the serverless environment for reaching an actuated instance of the immutable image for incorporation with the SaaS platform.

24 Claims, 22 Drawing Sheets

(51) Int. Cl.

| | |
|---|---|
| ***G06F 8/71*** | (2018.01) |
| ***G06F 9/445*** | (2018.01) |
| ***G06F 9/50*** | (2006.01) |
| ***G06F 11/3668*** | (2025.01) |
| ***H04L 9/32*** | (2006.01) |

(52) U.S. Cl.

CPC ........ *G06F 9/44578* (2013.01); *G06F 9/5055* (2013.01); *G06F 11/368* (2013.01); *H04L 9/3213* (2013.01)

(56) References Cited

U.S. PATENT DOCUMENTS

| | | | |
|---|---|---|---|
| 5,479,602 | A | 12/1995 | Baecker et al. |
| 5,517,663 | A | 5/1996 | Kahn |
| 5,632,009 | A | 5/1997 | Rao et al. |
| 5,657,437 | A | 8/1997 | Bishop et al. |
| 5,682,469 | A | 10/1997 | Linnett et al. |
| 5,696,702 | A | 12/1997 | Skinner et al. |
| 5,726,701 | A | 3/1998 | Needham |
| 5,787,411 | A | 7/1998 | Groff et al. |
| 5,880,742 | A | 3/1999 | Rao et al. |
| 5,933,145 | A | 8/1999 | Meek |
| 6,016,438 | A | 1/2000 | Wakayama |
| 6,016,553 | A | 1/2000 | Schneider et al. |
| 6,023,695 | A | 2/2000 | Osborn et al. |
| 6,034,681 | A | 3/2000 | Miller et al. |
| 6,049,622 | A | 4/2000 | Robb et al. |
| 6,088,707 | A | 7/2000 | Bates et al. |
| 6,108,573 | A | 8/2000 | Debbins et al. |
| 6,111,573 | A | 8/2000 | Mccomb et al. |
| 6,157,381 | A | 12/2000 | Bates et al. |
| 6,167,405 | A | 12/2000 | Rosensteel et al. |
| 6,169,534 | B1 | 1/2001 | Raffel et al. |
| 6,182,127 | B1 | 1/2001 | Cronin, III et al. |
| 6,185,582 | B1 | 2/2001 | Zellweger et al. |
| 6,195,794 | B1 | 2/2001 | Buxton |
| 6,252,594 | B1 | 6/2001 | Xia et al. |
| 6,266,067 | B1 | 7/2001 | Owen et al. |
| 6,275,809 | B1 | 8/2001 | Tamaki et al. |
| 6,330,022 | B1 | 12/2001 | Seligmann |
| 6,377,965 | B1 | 4/2002 | Fries et al. |
| 6,385,617 | B1 | 5/2002 | Malik |
| 6,460,043 | B1 | 10/2002 | Tabbara et al. |
| 6,496,832 | B2 | 12/2002 | Chi et al. |
| 6,509,912 | B1 | 1/2003 | Moran et al. |
| 6,510,459 | B2 | 1/2003 | Cronin et al. |
| 6,522,347 | B1 | 2/2003 | Tsuji et al. |
| 6,527,556 | B1 | 3/2003 | Koskinen |
| 6,567,830 | B1 | 5/2003 | Madduri |
| 6,606,740 | B1 | 8/2003 | Lynn et al. |
| 6,626,959 | B1 | 9/2003 | Moise et al. |
| 6,636,242 | B2 | 10/2003 | Bowman-Amuah |
| 6,647,370 | B1 | 11/2003 | Fu et al. |
| 6,661,431 | B1 | 12/2003 | Stuart et al. |
| 6,988,248 | B1 | 1/2006 | Tang et al. |
| 7,027,997 | B1 | 4/2006 | Robinson et al. |
| 7,034,860 | B2 | 4/2006 | Lia et al. |
| 7,043,529 | B1 | 5/2006 | Simonoff |
| 7,054,891 | B2 | 5/2006 | Cole |
| 7,228,492 | B1 | 6/2007 | Graham |
| 7,237,188 | B1 | 6/2007 | Leung |
| 7,249,042 | B1 | 7/2007 | Doerr et al. |
| 7,272,637 | B1 | 9/2007 | Himmelstein |
| 7,274,375 | B1 | 9/2007 | David |
| 7,379,934 | B1 | 5/2008 | Forman et al. |
| 7,380,202 | B1 | 5/2008 | Lindhorst et al. |
| 7,383,320 | B1 | 6/2008 | Silberstein et al. |
| 7,389,473 | B1 | 6/2008 | Sawicki et al. |
| 7,415,664 | B2 | 8/2008 | Aureglia et al. |
| 7,417,644 | B2 | 8/2008 | Cooper et al. |
| 7,461,077 | B1 | 12/2008 | Greenwood |
| 7,489,976 | B2 | 2/2009 | Adra |
| 7,565,270 | B2 | 7/2009 | Bramwell et al. |
| 7,617,443 | B2 | 11/2009 | Mills et al. |
| 7,685,152 | B2 | 3/2010 | Chivukula et al. |
| 7,707,514 | B2 | 4/2010 | Forstall et al. |
| 7,710,290 | B2 | 5/2010 | Johnson |
| 7,747,782 | B2 | 6/2010 | Hunt et al. |
| 7,770,100 | B2 | 8/2010 | Chamberlain et al. |
| 7,827,476 | B1 | 11/2010 | Roberts et al. |
| 7,827,615 | B1 | 11/2010 | Allababidi et al. |
| 7,836,408 | B1 | 11/2010 | Ollmann et al. |
| 7,916,157 | B1 | 3/2011 | Kelley et al. |
| 7,921,360 | B1 | 4/2011 | Sundermeyer et al. |
| 7,933,952 | B2 | 4/2011 | Parker et al. |
| 7,945,622 | B1 | 5/2011 | Pegg |
| 7,954,043 | B2 | 5/2011 | Bera |
| 7,954,064 | B2 | 5/2011 | Forstall et al. |
| 8,046,703 | B2 | 10/2011 | Busch et al. |
| 8,060,518 | B2 | 11/2011 | Timmons |
| 8,078,955 | B1 | 12/2011 | Gupta |
| 8,082,274 | B2 | 12/2011 | Steinglass et al. |
| 8,108,241 | B2 | 1/2012 | Shukoor |
| 8,136,031 | B2 | 3/2012 | Massand |
| 8,151,213 | B2 | 4/2012 | Weitzman et al. |
| 8,223,172 | B1 | 7/2012 | Miller et al. |
| 8,286,072 | B2 | 10/2012 | Chamberlain et al. |
| 8,365,095 | B2 | 1/2013 | Bansal et al. |
| 8,375,327 | B2 | 2/2013 | Lorch et al. |
| 8,386,960 | B1 | 2/2013 | Eismann et al. |
| 8,407,217 | B1 | 3/2013 | Zhang |
| 8,413,261 | B2 | 4/2013 | Nemoy et al. |
| 8,423,909 | B2 | 4/2013 | Zabielski |
| 8,543,566 | B2 | 9/2013 | Weissman et al. |
| 8,548,997 | B1 | 10/2013 | Wu |
| 8,560,942 | B2 | 10/2013 | Fortes et al. |
| 8,566,732 | B2 | 10/2013 | Louch et al. |
| 8,572,173 | B2 | 10/2013 | Briere et al. |
| 8,578,399 | B2 | 11/2013 | Khen et al. |
| 8,601,383 | B2 | 12/2013 | Folting et al. |
| 8,620,703 | B1 | 12/2013 | Kapoor et al. |
| 8,621,652 | B2 | 12/2013 | Slater |
| 8,635,520 | B2 | 1/2014 | Christiansen et al. |
| 8,677,448 | B1 | 3/2014 | Kauffman et al. |
| 8,694,981 | B2 | 4/2014 | Federighi et al. |
| 8,719,071 | B2 | 5/2014 | Macintyre et al. |
| 8,738,414 | B1 | 5/2014 | Nagar et al. |
| 8,812,471 | B2 | 8/2014 | Akita |
| 8,819,042 | B2 | 8/2014 | Samudrala et al. |
| 8,825,758 | B2 | 9/2014 | Bailor et al. |
| 8,838,533 | B2 | 9/2014 | Kwiatkowski et al. |
| 8,862,979 | B2 | 10/2014 | Hawking |
| 8,863,022 | B2 | 10/2014 | Rhodes et al. |
| 8,869,027 | B2 | 10/2014 | Louch et al. |
| 8,937,627 | B1 | 1/2015 | Otero et al. |
| 8,938,465 | B2 | 1/2015 | Messer |
| 8,954,871 | B2 | 2/2015 | Louch et al. |
| 9,007,405 | B1 | 4/2015 | Eldar et al. |
| 9,015,716 | B2 | 4/2015 | Fletcher et al. |
| 9,021,118 | B2 | 4/2015 | John et al. |
| 9,026,897 | B2 | 5/2015 | Zarras |
| 9,043,362 | B2 | 5/2015 | Weissman et al. |
| 9,063,958 | B2 | 6/2015 | Müller et al. |
| 9,129,234 | B2 | 9/2015 | Campbell et al. |
| 9,159,246 | B2 | 10/2015 | Rodriguez et al. |
| 9,172,738 | B1 | 10/2015 | daCosta |
| 9,177,238 | B2 | 11/2015 | Windmueller et al. |
| 9,183,303 | B1 | 11/2015 | Goel et al. |
| 9,223,770 | B1 | 12/2015 | Ledet |
| 9,239,719 | B1 | 1/2016 | Feinstein et al. |
| 9,244,917 | B1 | 1/2016 | Sharma et al. |
| 9,253,130 | B2 | 2/2016 | Zaveri |
| 9,286,246 | B2 | 3/2016 | Saito et al. |
| 9,286,475 | B2 | 3/2016 | Li et al. |
| 9,292,587 | B2 | 3/2016 | Kann et al. |
| 9,336,502 | B2 | 5/2016 | Mohammad et al. |
| 9,342,579 | B2 | 5/2016 | Cao et al. |
| 9,361,287 | B1 | 6/2016 | Simon et al. |
| 9,390,059 | B1 | 7/2016 | Gur et al. |
| 9,424,287 | B2 | 8/2016 | Schroth |
| 9,424,333 | B1 | 8/2016 | Bisignani et al. |
| 9,424,545 | B1 | 8/2016 | Lee |
| 9,430,458 | B2 | 8/2016 | Rhee et al. |

(56) References Cited

U.S. PATENT DOCUMENTS

| | | | |
|---|---|---|---|
| 9,449,031 | B2 | 9/2016 | Barrus et al. |
| 9,495,386 | B2 | 11/2016 | Tapley et al. |
| 9,519,699 | B1 | 12/2016 | Kulkarni et al. |
| 9,558,172 | B2 | 1/2017 | Rampson et al. |
| 9,569,511 | B2 | 2/2017 | Morin |
| 9,613,086 | B1 | 4/2017 | Sherman |
| 9,635,091 | B1 | 4/2017 | Laukkanen et al. |
| 9,659,284 | B1 | 5/2017 | Wilson et al. |
| 9,679,456 | B2 | 6/2017 | East |
| 9,720,602 | B1 | 8/2017 | Chen et al. |
| 9,727,376 | B1 | 8/2017 | Bills et al. |
| 9,760,271 | B2 | 9/2017 | Persaud |
| 9,794,256 | B2 | 10/2017 | Kiang et al. |
| 9,798,829 | B1 | 10/2017 | Baisley |
| 9,811,676 | B1 | 11/2017 | Gauvin |
| 9,866,561 | B2 | 1/2018 | Psenka et al. |
| 9,870,136 | B2 | 1/2018 | Pourshahid |
| 10,001,908 | B2 | 6/2018 | Grieve et al. |
| 10,043,296 | B2 | 8/2018 | Li |
| 10,057,246 | B1 | 8/2018 | Drozd et al. |
| 10,067,928 | B1 | 9/2018 | Krappe |
| 10,078,668 | B1 | 9/2018 | Woodrow et al. |
| 10,169,306 | B2 | 1/2019 | O'Shaughnessy et al. |
| 10,176,154 | B2 | 1/2019 | Ben-Aharon et al. |
| 10,235,441 | B1 | 3/2019 | Makhlin et al. |
| 10,255,609 | B2 | 4/2019 | Kinkead et al. |
| 10,282,405 | B1 | 5/2019 | Silk et al. |
| 10,282,406 | B2 | 5/2019 | Bissantz |
| 10,311,080 | B2 | 6/2019 | Folting et al. |
| 10,318,624 | B1 | 6/2019 | Rosner et al. |
| 10,327,712 | B2 | 6/2019 | Beymer et al. |
| 10,347,017 | B2 | 7/2019 | Ruble et al. |
| 10,372,706 | B2 | 8/2019 | Chavan et al. |
| 10,380,140 | B2 | 8/2019 | Sherman |
| 10,423,758 | B2 | 9/2019 | Kido et al. |
| 10,445,702 | B1 | 10/2019 | Hunt |
| 10,452,360 | B1 | 10/2019 | Burman et al. |
| 10,453,118 | B2 | 10/2019 | Smith et al. |
| 10,474,317 | B2 | 11/2019 | Ramanathan et al. |
| 10,489,391 | B1 | 11/2019 | Tomlin |
| 10,489,462 | B1 | 11/2019 | Rogynskyy et al. |
| 10,496,737 | B1 | 12/2019 | Sayre et al. |
| 10,505,825 | B1 | 12/2019 | Bettaiah et al. |
| 10,528,599 | B1 | 1/2020 | Pandis et al. |
| 10,534,507 | B1 | 1/2020 | Laukkanen et al. |
| 10,540,152 | B1 | 1/2020 | Krishnaswamy et al. |
| 10,540,434 | B2 | 1/2020 | Migeon et al. |
| 10,546,001 | B1 | 1/2020 | Nguyen et al. |
| 10,564,622 | B1 | 2/2020 | Dean et al. |
| 10,573,407 | B2 | 2/2020 | Ginsburg |
| 10,579,724 | B2 | 3/2020 | Campbell et al. |
| 10,581,675 | B1 | 3/2020 | Iyer et al. |
| 10,587,714 | B1 | 3/2020 | Kulkarni et al. |
| 10,628,002 | B1 | 4/2020 | Kang et al. |
| 10,698,594 | B2 | 6/2020 | Sanches et al. |
| 10,706,061 | B2 | 7/2020 | Sherman et al. |
| 10,719,220 | B2 | 7/2020 | Ouellet et al. |
| 10,719,311 | B2 | 7/2020 | Foskett et al. |
| 10,733,256 | B2 | 8/2020 | Fickenscher et al. |
| 10,740,117 | B2 | 8/2020 | Ording et al. |
| 10,747,764 | B1 | 8/2020 | Plenderleith |
| 10,747,950 | B2 | 8/2020 | Dang et al. |
| 10,748,312 | B2 | 8/2020 | Ruble et al. |
| 10,754,688 | B2 | 8/2020 | Powell |
| 10,761,691 | B2 | 9/2020 | Anzures et al. |
| 10,795,555 | B2 | 10/2020 | Burke et al. |
| 10,809,696 | B1 | 10/2020 | Principato |
| 10,817,660 | B2 | 10/2020 | Rampson et al. |
| D910,077 | S | 2/2021 | Naroshevitch et al. |
| 10,963,578 | B2 | 3/2021 | More et al. |
| 11,010,371 | B1 | 5/2021 | Slomka et al. |
| 11,030,259 | B2 | 6/2021 | Mullins et al. |
| 11,042,363 | B1 | 6/2021 | Krishnaswamy et al. |
| 11,042,699 | B1 | 6/2021 | Sayre et al. |
| 11,044,257 | B1 | 6/2021 | Heuts et al. |
| 11,048,499 | B2 | 6/2021 | Foskett et al. |
| 11,048,714 | B2 | 6/2021 | Sherman et al. |
| 11,086,894 | B1 | 8/2021 | Srivastava et al. |
| 11,128,464 | B1 | 9/2021 | Loladia |
| 11,144,854 | B1 | 10/2021 | Mouawad |
| 11,182,218 | B2 | 11/2021 | Sanchez et al. |
| 11,190,516 | B1 | 11/2021 | Loladia |
| 11,222,167 | B2 | 1/2022 | Gehrmann et al. |
| 11,231,862 | B1 | 1/2022 | Vig et al. |
| 11,243,688 | B1 | 2/2022 | Remy et al. |
| 11,356,485 | B2 | 6/2022 | Hegde et al. |
| 11,360,765 | B2 | 6/2022 | Miller et al. |
| 11,405,504 | B1 | 8/2022 | Tripathy et al. |
| 11,429,384 | B1 | 8/2022 | Navert et al. |
| 11,443,390 | B1 | 9/2022 | Caligaris et al. |
| 11,481,228 | B2 | 10/2022 | Rangasamy et al. |
| 11,494,171 | B1 | 11/2022 | Acharya et al. |
| 11,513,772 | B1 * | 11/2022 | Gross ........................ G06F 8/51 |
| 11,570,182 | B1 | 1/2023 | Tran et al. |
| 11,593,477 | B1 | 2/2023 | Thimmegowda et al. |
| 11,620,615 | B2 | 4/2023 | Jiang et al. |
| 11,681,445 | B2 | 6/2023 | Vohra et al. |
| 11,682,091 | B2 | 6/2023 | Sukman et al. |
| 11,720,410 | B2 | 8/2023 | Culp et al. |
| 11,750,475 | B1 * | 9/2023 | Gonzalez ............ H04L 41/5032 |
| 11,799,951 | B1 | 10/2023 | Maloo et al. |
| 11,823,269 | B2 | 11/2023 | Aisen et al. |
| 11,882,117 | B1 | 1/2024 | Kumar |
| 11,922,222 | B1 | 3/2024 | Chawla et al. |
| 12,056,255 | B1 | 8/2024 | Mystetskyi et al. |
| 2001/0008998 | A1 | 7/2001 | Tamaki et al. |
| 2001/0032248 | A1 | 10/2001 | Krafchin |
| 2001/0039551 | A1 | 11/2001 | Saito et al. |
| 2002/0002459 | A1 | 1/2002 | Lewis et al. |
| 2002/0065848 | A1 | 5/2002 | Walker et al. |
| 2002/0065849 | A1 | 5/2002 | Ferguson et al. |
| 2002/0065880 | A1 | 5/2002 | Hasegawa et al. |
| 2002/0069207 | A1 | 6/2002 | Alexander et al. |
| 2002/0075309 | A1 | 6/2002 | Michelman et al. |
| 2002/0082892 | A1 | 6/2002 | Raffel et al. |
| 2002/0099777 | A1 | 7/2002 | Gupta et al. |
| 2002/0138528 | A1 | 9/2002 | Gong et al. |
| 2003/0033196 | A1 | 2/2003 | Tomlin |
| 2003/0041113 | A1 | 2/2003 | Larsen |
| 2003/0051377 | A1 | 3/2003 | Chirafesi |
| 2003/0052912 | A1 | 3/2003 | Bowman et al. |
| 2003/0058277 | A1 | 3/2003 | Bowman-Amuah |
| 2003/0065662 | A1 | 4/2003 | Cosic |
| 2003/0093408 | A1 | 5/2003 | Brown et al. |
| 2003/0101416 | A1 | 5/2003 | McInnes et al. |
| 2003/0135558 | A1 | 7/2003 | Bellotti et al. |
| 2003/0137536 | A1 | 7/2003 | Hugh |
| 2003/0187864 | A1 | 10/2003 | McGoveran |
| 2003/0200215 | A1 | 10/2003 | Chen et al. |
| 2003/0204490 | A1 | 10/2003 | Kasriel |
| 2003/0233224 | A1 | 12/2003 | Marchisio et al. |
| 2004/0032432 | A1 | 2/2004 | Baynger |
| 2004/0078373 | A1 | 4/2004 | Ghoneimy et al. |
| 2004/0098284 | A1 | 5/2004 | Petito et al. |
| 2004/0133441 | A1 | 7/2004 | Brady et al. |
| 2004/0138939 | A1 | 7/2004 | Theiler |
| 2004/0139400 | A1 | 7/2004 | Allam et al. |
| 2004/0162833 | A1 | 8/2004 | Jones et al. |
| 2004/0172592 | A1 | 9/2004 | Collie et al. |
| 2004/0212615 | A1 | 10/2004 | Uthe |
| 2004/0215443 | A1 | 10/2004 | Hatton |
| 2004/0230940 | A1 | 11/2004 | Cooper et al. |
| 2004/0268227 | A1 | 12/2004 | Brid |
| 2005/0034058 | A1 | 2/2005 | Mills et al. |
| 2005/0034064 | A1 | 2/2005 | Meyers et al. |
| 2005/0039001 | A1 | 2/2005 | Hudis et al. |
| 2005/0039033 | A1 | 2/2005 | Meyers et al. |
| 2005/0044486 | A1 | 2/2005 | Kotler et al. |
| 2005/0063615 | A1 | 3/2005 | Siegel et al. |
| 2005/0066306 | A1 | 3/2005 | Diab |
| 2005/0086360 | A1 | 4/2005 | Mamou et al. |
| 2005/0091314 | A1 | 4/2005 | Blagsvedt et al. |
| 2005/0091596 | A1 | 4/2005 | Anthony et al. |
| 2005/0096973 | A1 | 5/2005 | Heyse et al. |

(56) References Cited

U.S. PATENT DOCUMENTS

| | | | |
|---|---|---|---|
| 2005/0114305 | A1 | 5/2005 | Haynes et al. |
| 2005/0125395 | A1 | 6/2005 | Boettiger |
| 2005/0165600 | A1 | 7/2005 | Kasravi et al. |
| 2005/0171881 | A1 | 8/2005 | Ghassemieh et al. |
| 2005/0210371 | A1 | 9/2005 | Pollock et al. |
| 2005/0216830 | A1 | 9/2005 | Turner et al. |
| 2005/0228250 | A1 | 10/2005 | Bitter et al. |
| 2005/0251021 | A1 | 11/2005 | Kaufman et al. |
| 2005/0257204 | A1 | 11/2005 | Bryant et al. |
| 2005/0278297 | A1 | 12/2005 | Nelson |
| 2005/0289170 | A1 | 12/2005 | Brown et al. |
| 2005/0289342 | A1 | 12/2005 | Needham et al. |
| 2005/0289453 | A1 | 12/2005 | Segal et al. |
| 2006/0009960 | A1 | 1/2006 | Valencot et al. |
| 2006/0013462 | A1 | 1/2006 | Sadikali |
| 2006/0015499 | A1 | 1/2006 | Clissold et al. |
| 2006/0015806 | A1 | 1/2006 | Wallace |
| 2006/0031148 | A1 | 2/2006 | O'Dell et al. |
| 2006/0031764 | A1 | 2/2006 | Keyser et al. |
| 2006/0036568 | A1 | 2/2006 | Moore et al. |
| 2006/0047811 | A1 | 3/2006 | Lau et al. |
| 2006/0053096 | A1 | 3/2006 | Subramanian et al. |
| 2006/0053194 | A1 | 3/2006 | Schneider et al. |
| 2006/0069604 | A1 | 3/2006 | Leukart et al. |
| 2006/0069635 | A1 | 3/2006 | Ram et al. |
| 2006/0080594 | A1 | 4/2006 | Chavoustie et al. |
| 2006/0085744 | A1 | 4/2006 | Hays et al. |
| 2006/0090169 | A1 | 4/2006 | Daniels et al. |
| 2006/0101324 | A1 | 5/2006 | Goldberg et al. |
| 2006/0106642 | A1 | 5/2006 | Reicher et al. |
| 2006/0107196 | A1 | 5/2006 | Thanu et al. |
| 2006/0111953 | A1 | 5/2006 | Setya |
| 2006/0129415 | A1 | 6/2006 | Thukral et al. |
| 2006/0129913 | A1 | 6/2006 | Vigesaa et al. |
| 2006/0136828 | A1 | 6/2006 | Asano |
| 2006/0150090 | A1 | 7/2006 | Swamidass |
| 2006/0173908 | A1 | 8/2006 | Browning et al. |
| 2006/0190313 | A1 | 8/2006 | Lu |
| 2006/0212299 | A1 | 9/2006 | Law |
| 2006/0224542 | A1 | 10/2006 | Yalamanchi |
| 2006/0224568 | A1 | 10/2006 | Debrito |
| 2006/0224946 | A1 | 10/2006 | Barrett et al. |
| 2006/0236246 | A1 | 10/2006 | Bono et al. |
| 2006/0250369 | A1 | 11/2006 | Keim |
| 2006/0253205 | A1 | 11/2006 | Gardiner |
| 2006/0271574 | A1 | 11/2006 | Villaron et al. |
| 2006/0287998 | A1 | 12/2006 | Folting et al. |
| 2006/0294451 | A1 | 12/2006 | Kelkar et al. |
| 2007/0027932 | A1 | 2/2007 | Thibeault |
| 2007/0032993 | A1 | 2/2007 | Yamaguchi et al. |
| 2007/0033531 | A1 | 2/2007 | Marsh |
| 2007/0050322 | A1 | 3/2007 | Vigesaa et al. |
| 2007/0050379 | A1 | 3/2007 | Day et al. |
| 2007/0073899 | A1 | 3/2007 | Judge et al. |
| 2007/0092048 | A1 | 4/2007 | Chelstrom et al. |
| 2007/0094607 | A1 | 4/2007 | Morgan et al. |
| 2007/0101291 | A1 | 5/2007 | Forstall et al. |
| 2007/0106754 | A1 | 5/2007 | Moore |
| 2007/0118527 | A1 | 5/2007 | Winje et al. |
| 2007/0118813 | A1 | 5/2007 | Forstall et al. |
| 2007/0143169 | A1 | 6/2007 | Grant et al. |
| 2007/0150389 | A1 | 6/2007 | Aamodt et al. |
| 2007/0168861 | A1 | 7/2007 | Bell et al. |
| 2007/0174228 | A1 | 7/2007 | Folting et al. |
| 2007/0174760 | A1 | 7/2007 | Chamberlain et al. |
| 2007/0186173 | A1 | 8/2007 | Both et al. |
| 2007/0220119 | A1 | 9/2007 | Himmelstein |
| 2007/0233647 | A1 | 10/2007 | Rawat et al. |
| 2007/0239746 | A1 | 10/2007 | Masselle et al. |
| 2007/0256043 | A1 | 11/2007 | Peters et al. |
| 2007/0282522 | A1 | 12/2007 | Geelen |
| 2007/0282627 | A1 | 12/2007 | Greenstein et al. |
| 2007/0283259 | A1 | 12/2007 | Barry et al. |
| 2007/0294235 | A1 | 12/2007 | Millett |
| 2007/0299795 | A1 | 12/2007 | Macbeth et al. |
| 2007/0300174 | A1 | 12/2007 | Macbeth et al. |
| 2007/0300185 | A1 | 12/2007 | Macbeth et al. |
| 2008/0004929 | A9 | 1/2008 | Raffel et al. |
| 2008/0005235 | A1 | 1/2008 | Hegde et al. |
| 2008/0033777 | A1 | 2/2008 | Shukoor |
| 2008/0034307 | A1 | 2/2008 | Cisler et al. |
| 2008/0034314 | A1 | 2/2008 | Louch et al. |
| 2008/0052291 | A1 | 2/2008 | Bender |
| 2008/0059312 | A1 | 3/2008 | Gern et al. |
| 2008/0059539 | A1 | 3/2008 | Chin et al. |
| 2008/0065460 | A1 | 3/2008 | Raynor |
| 2008/0077530 | A1 | 3/2008 | Banas et al. |
| 2008/0097748 | A1 | 4/2008 | Haley et al. |
| 2008/0104091 | A1 | 5/2008 | Chin |
| 2008/0126389 | A1 | 5/2008 | Mush et al. |
| 2008/0133736 | A1 | 6/2008 | Wensley et al. |
| 2008/0148140 | A1 | 6/2008 | Nakano |
| 2008/0155547 | A1 | 6/2008 | Weber et al. |
| 2008/0163075 | A1 | 7/2008 | Beck et al. |
| 2008/0183593 | A1 | 7/2008 | Dierks |
| 2008/0195948 | A1 | 8/2008 | Bauer |
| 2008/0209318 | A1 | 8/2008 | Allsop et al. |
| 2008/0216022 | A1 | 9/2008 | Lorch et al. |
| 2008/0222192 | A1 | 9/2008 | Hughes |
| 2008/0256014 | A1 | 10/2008 | Gould et al. |
| 2008/0256429 | A1 | 10/2008 | Penner et al. |
| 2008/0270597 | A1 | 10/2008 | Tenenti |
| 2008/0282189 | A1 | 11/2008 | Hofmann et al. |
| 2008/0295038 | A1 | 11/2008 | Helfman et al. |
| 2008/0301237 | A1 | 12/2008 | Parsons et al. |
| 2009/0006171 | A1 | 1/2009 | Blatchley et al. |
| 2009/0006283 | A1 | 1/2009 | Labrie et al. |
| 2009/0007157 | A1 | 1/2009 | Ward et al. |
| 2009/0013244 | A1 | 1/2009 | Cudich et al. |
| 2009/0019383 | A1 | 1/2009 | Riley et al. |
| 2009/0024944 | A1 | 1/2009 | Louch et al. |
| 2009/0043814 | A1 | 2/2009 | Faris et al. |
| 2009/0044090 | A1 | 2/2009 | Gur et al. |
| 2009/0048896 | A1 | 2/2009 | Anandan |
| 2009/0049372 | A1 | 2/2009 | Goldberg |
| 2009/0075694 | A1 | 3/2009 | Kim et al. |
| 2009/0077164 | A1 | 3/2009 | Phillips et al. |
| 2009/0077217 | A1 | 3/2009 | McFarland et al. |
| 2009/0083140 | A1 | 3/2009 | Phan |
| 2009/0094514 | A1 | 4/2009 | Dargahi et al. |
| 2009/0113310 | A1 | 4/2009 | Appleyard et al. |
| 2009/0129596 | A1 | 5/2009 | Chavez et al. |
| 2009/0132331 | A1 | 5/2009 | Cartledge et al. |
| 2009/0132470 | A1 | 5/2009 | Vignet |
| 2009/0150813 | A1 | 6/2009 | Chang et al. |
| 2009/0174680 | A1 | 7/2009 | Anzures et al. |
| 2009/0192787 | A1 | 7/2009 | Roon |
| 2009/0198715 | A1 | 8/2009 | Barbarek |
| 2009/0222760 | A1 | 9/2009 | Halverson et al. |
| 2009/0248710 | A1 | 10/2009 | McCormack et al. |
| 2009/0256972 | A1 | 10/2009 | Ramaswamy et al. |
| 2009/0262690 | A1 | 10/2009 | Breuer et al. |
| 2009/0271696 | A1 | 10/2009 | Bailor et al. |
| 2009/0276692 | A1 | 11/2009 | Rosner |
| 2009/0292690 | A1 | 11/2009 | Culbert |
| 2009/0313201 | A1 | 12/2009 | Huelsman et al. |
| 2009/0313537 | A1 | 12/2009 | Fu et al. |
| 2009/0313570 | A1 | 12/2009 | Po |
| 2009/0319623 | A1 | 12/2009 | Srinivasan et al. |
| 2009/0319882 | A1 | 12/2009 | Morrison et al. |
| 2009/0327240 | A1 | 12/2009 | Meehan et al. |
| 2009/0327301 | A1 | 12/2009 | Lees et al. |
| 2009/0327851 | A1 | 12/2009 | Raposo |
| 2009/0327875 | A1 | 12/2009 | Kinkoh |
| 2010/0017699 | A1 | 1/2010 | Farrell et al. |
| 2010/0031135 | A1 | 2/2010 | Naghshin et al. |
| 2010/0070845 | A1 | 3/2010 | Facemire et al. |
| 2010/0070895 | A1 | 3/2010 | Messer |
| 2010/0082705 | A1 | 4/2010 | Ramesh et al. |
| 2010/0083164 | A1 | 4/2010 | Martin et al. |
| 2010/0088636 | A1 | 4/2010 | Yerkes et al. |
| 2010/0095219 | A1 | 4/2010 | Stachowiak et al. |
| 2010/0095298 | A1 | 4/2010 | Seshadrinathan et al. |
| 2010/0100427 | A1 | 4/2010 | McKeown et al. |

(56) References Cited

U.S. PATENT DOCUMENTS

| | | | |
|---|---|---|---|
| 2010/0100463 | A1 | 4/2010 | Molotsi et al. |
| 2010/0114926 | A1 | 5/2010 | Agrawal et al. |
| 2010/0149005 | A1 | 6/2010 | Yoon et al. |
| 2010/0174678 | A1 | 7/2010 | Massand |
| 2010/0205521 | A1 | 8/2010 | Folling |
| 2010/0228752 | A1 | 9/2010 | Folting et al. |
| 2010/0241477 | A1 | 9/2010 | Nylander et al. |
| 2010/0241948 | A1 | 9/2010 | Andeen et al. |
| 2010/0241968 | A1 | 9/2010 | Tarara et al. |
| 2010/0241972 | A1 | 9/2010 | Spataro et al. |
| 2010/0241990 | A1 | 9/2010 | Gabriel et al. |
| 2010/0251090 | A1 | 9/2010 | Chamberlain et al. |
| 2010/0251386 | A1 | 9/2010 | Gilzean et al. |
| 2010/0257015 | A1 | 10/2010 | Molander |
| 2010/0262625 | A1 | 10/2010 | Pittenger |
| 2010/0268705 | A1 | 10/2010 | Douglas et al. |
| 2010/0268773 | A1 | 10/2010 | Hunt et al. |
| 2010/0287163 | A1 | 11/2010 | Sridhar et al. |
| 2010/0287221 | A1 | 11/2010 | Battepati et al. |
| 2010/0313119 | A1 | 12/2010 | Baldwin et al. |
| 2010/0324964 | A1 | 12/2010 | Callanan et al. |
| 2010/0332973 | A1 | 12/2010 | Kloiber et al. |
| 2011/0010340 | A1 | 1/2011 | Hung et al. |
| 2011/0016432 | A1 | 1/2011 | Helfman |
| 2011/0028138 | A1 | 2/2011 | Davies-Moore et al. |
| 2011/0047484 | A1 | 2/2011 | Mount et al. |
| 2011/0055177 | A1 | 3/2011 | Chakra et al. |
| 2011/0066933 | A1 | 3/2011 | Ludwig |
| 2011/0071869 | A1 | 3/2011 | O'Brien et al. |
| 2011/0106636 | A1 | 5/2011 | Spear et al. |
| 2011/0119352 | A1 | 5/2011 | Perov et al. |
| 2011/0154192 | A1 | 6/2011 | Yang et al. |
| 2011/0179371 | A1 | 7/2011 | Kopycinski et al. |
| 2011/0205231 | A1 | 8/2011 | Hartley et al. |
| 2011/0208324 | A1 | 8/2011 | Fukatsu |
| 2011/0208732 | A1 | 8/2011 | Melton et al. |
| 2011/0209150 | A1 | 8/2011 | Hammond et al. |
| 2011/0219321 | A1 | 9/2011 | Gonzalez Veron et al. |
| 2011/0225525 | A1 | 9/2011 | Chasman et al. |
| 2011/0231273 | A1 | 9/2011 | Buchheit |
| 2011/0238716 | A1 | 9/2011 | Amir et al. |
| 2011/0258040 | A1 | 10/2011 | Gnanasambandam |
| 2011/0288900 | A1 | 11/2011 | McQueen et al. |
| 2011/0289397 | A1 | 11/2011 | Eastmond et al. |
| 2011/0289439 | A1 | 11/2011 | Jugel |
| 2011/0298618 | A1 | 12/2011 | Stahl et al. |
| 2011/0302003 | A1 | 12/2011 | Shirish et al. |
| 2012/0029962 | A1 | 2/2012 | Podgumny et al. |
| 2012/0035974 | A1 | 2/2012 | Seybold |
| 2012/0036423 | A1 | 2/2012 | Haynes et al. |
| 2012/0036462 | A1 | 2/2012 | Schwartz et al. |
| 2012/0050802 | A1 | 3/2012 | Masuda |
| 2012/0066587 | A1 | 3/2012 | Zhou et al. |
| 2012/0072821 | A1 | 3/2012 | Bowling |
| 2012/0079408 | A1 | 3/2012 | Rohwer |
| 2012/0081762 | A1 | 4/2012 | Yamada |
| 2012/0084798 | A1 | 4/2012 | Reeves et al. |
| 2012/0086716 | A1 | 4/2012 | Reeves et al. |
| 2012/0086717 | A1 | 4/2012 | Liu |
| 2012/0089610 | A1 | 4/2012 | Agrawal et al. |
| 2012/0089914 | A1 | 4/2012 | Holt et al. |
| 2012/0089992 | A1 | 4/2012 | Reeves et al. |
| 2012/0096389 | A1 | 4/2012 | Flam et al. |
| 2012/0096392 | A1 | 4/2012 | Ording et al. |
| 2012/0102432 | A1 | 4/2012 | Breedvelt-Schouten et al. |
| 2012/0102543 | A1 | 4/2012 | Kohli et al. |
| 2012/0110515 | A1 | 5/2012 | Abramoff et al. |
| 2012/0116834 | A1 | 5/2012 | Pope et al. |
| 2012/0116835 | A1 | 5/2012 | Pope et al. |
| 2012/0124749 | A1 | 5/2012 | Lewman |
| 2012/0130907 | A1 | 5/2012 | Thompson et al. |
| 2012/0131445 | A1 | 5/2012 | Oyarzabal et al. |
| 2012/0151173 | A1 | 6/2012 | Shirley et al. |
| 2012/0158744 | A1 | 6/2012 | Tseng et al. |
| 2012/0192050 | A1 | 7/2012 | Campbell et al. |
| 2012/0198322 | A1 | 8/2012 | Gulwani et al. |
| 2012/0210252 | A1 | 8/2012 | Fedoseyeva et al. |
| 2012/0215574 | A1 | 8/2012 | Driessnack et al. |
| 2012/0215578 | A1 | 8/2012 | Swierz et al. |
| 2012/0229867 | A1 | 9/2012 | Takagi |
| 2012/0233150 | A1 | 9/2012 | Naim et al. |
| 2012/0233533 | A1 | 9/2012 | Yücel et al. |
| 2012/0234907 | A1 | 9/2012 | Clark et al. |
| 2012/0236368 | A1 | 9/2012 | Uchida et al. |
| 2012/0239454 | A1 | 9/2012 | Taix et al. |
| 2012/0244891 | A1 | 9/2012 | Appleton |
| 2012/0246170 | A1 | 9/2012 | Iantorno |
| 2012/0254252 | A1 | 10/2012 | Jin et al. |
| 2012/0254770 | A1 | 10/2012 | Ophir |
| 2012/0260190 | A1 | 10/2012 | Berger et al. |
| 2012/0278117 | A1 | 11/2012 | Nguyen et al. |
| 2012/0284197 | A1 | 11/2012 | Sitrick et al. |
| 2012/0297307 | A1 | 11/2012 | Rider et al. |
| 2012/0300931 | A1 | 11/2012 | Ollikainen et al. |
| 2012/0303262 | A1 | 11/2012 | Alam et al. |
| 2012/0304098 | A1 | 11/2012 | Kuulusa |
| 2012/0311496 | A1 | 12/2012 | Cao et al. |
| 2012/0311672 | A1 | 12/2012 | Connor et al. |
| 2012/0324348 | A1 | 12/2012 | Rounthwaite |
| 2013/0015954 | A1 | 1/2013 | Thorne et al. |
| 2013/0018952 | A1 | 1/2013 | McConnell et al. |
| 2013/0018953 | A1 | 1/2013 | McConnell et al. |
| 2013/0018960 | A1 | 1/2013 | Knysz et al. |
| 2013/0024418 | A1 | 1/2013 | Sitrick et al. |
| 2013/0024760 | A1 | 1/2013 | Vogel et al. |
| 2013/0036369 | A1 | 2/2013 | Mitchell et al. |
| 2013/0041958 | A1 | 2/2013 | Post et al. |
| 2013/0054514 | A1 | 2/2013 | Barrett-Kahn et al. |
| 2013/0055113 | A1 | 2/2013 | Chazin et al. |
| 2013/0059598 | A1 | 3/2013 | Miyagi et al. |
| 2013/0063490 | A1 | 3/2013 | Zaman et al. |
| 2013/0086460 | A1 | 4/2013 | Folting et al. |
| 2013/0090969 | A1 | 4/2013 | Rivere |
| 2013/0097490 | A1 | 4/2013 | Kotler et al. |
| 2013/0103417 | A1 | 4/2013 | Seto et al. |
| 2013/0104035 | A1 | 4/2013 | Wagner et al. |
| 2013/0111320 | A1 | 5/2013 | Campbell et al. |
| 2013/0117268 | A1 | 5/2013 | Smith et al. |
| 2013/0159832 | A1 | 6/2013 | Ingargiola et al. |
| 2013/0159907 | A1 | 6/2013 | Brosche et al. |
| 2013/0179209 | A1 | 7/2013 | Milosevich |
| 2013/0211866 | A1 | 8/2013 | Gordon et al. |
| 2013/0212197 | A1 | 8/2013 | Karlson |
| 2013/0212234 | A1 | 8/2013 | Bartlett et al. |
| 2013/0215475 | A1 | 8/2013 | Noguchi |
| 2013/0238363 | A1 | 9/2013 | Ohta et al. |
| 2013/0238968 | A1 | 9/2013 | Barrus |
| 2013/0246384 | A1 | 9/2013 | Mctor |
| 2013/0262527 | A1 | 10/2013 | Hunter et al. |
| 2013/0268331 | A1 | 10/2013 | Bitz et al. |
| 2013/0297468 | A1 | 11/2013 | Hirsch et al. |
| 2013/0307997 | A1 | 11/2013 | O'Keefe et al. |
| 2013/0318424 | A1 | 11/2013 | Boyd |
| 2013/0339051 | A1 | 12/2013 | Dobrean |
| 2014/0002863 | A1 | 1/2014 | Hasegawa et al. |
| 2014/0006326 | A1 | 1/2014 | Bazanov |
| 2014/0012616 | A1 | 1/2014 | Moshenek |
| 2014/0019842 | A1 | 1/2014 | Montagna et al. |
| 2014/0033307 | A1 | 1/2014 | Schmidtler |
| 2014/0043331 | A1 | 2/2014 | Makinen et al. |
| 2014/0046638 | A1 | 2/2014 | Peloski |
| 2014/0052749 | A1 | 2/2014 | Rissanen |
| 2014/0058801 | A1 | 2/2014 | Deodhar et al. |
| 2014/0059017 | A1 | 2/2014 | Chaney et al. |
| 2014/0068403 | A1 | 3/2014 | Bhargav et al. |
| 2014/0074545 | A1 | 3/2014 | Minder et al. |
| 2014/0075301 | A1 | 3/2014 | Mihara |
| 2014/0078557 | A1 | 3/2014 | Hasegawa et al. |
| 2014/0082525 | A1 | 3/2014 | Kass et al. |
| 2014/0095237 | A1 | 4/2014 | Ehrler et al. |
| 2014/0101527 | A1 | 4/2014 | Suciu |
| 2014/0108985 | A1 | 4/2014 | Scott et al. |
| 2014/0109012 | A1 | 4/2014 | Choudhary et al. |
| 2014/0111516 | A1 | 4/2014 | Hall et al. |

(56) References Cited

U.S. PATENT DOCUMENTS

| | | | |
|---|---|---|---|
| 2014/0115515 | A1 | 4/2014 | Adams et al. |
| 2014/0115518 | A1 | 4/2014 | Abdukalykov et al. |
| 2014/0129960 | A1 | 5/2014 | Wang et al. |
| 2014/0136972 | A1 | 5/2014 | Rodgers et al. |
| 2014/0137003 | A1 | 5/2014 | Peters et al. |
| 2014/0137144 | A1 | 5/2014 | Järvenpää et al. |
| 2014/0172475 | A1 | 6/2014 | Oliphant et al. |
| 2014/0173401 | A1 | 6/2014 | Oshlag et al. |
| 2014/0181155 | A1 | 6/2014 | Homsany |
| 2014/0188748 | A1 | 7/2014 | Cavoue et al. |
| 2014/0195933 | A1 | 7/2014 | Rao Dv |
| 2014/0214404 | A1 | 7/2014 | Kalia et al. |
| 2014/0215303 | A1 | 7/2014 | Grigorovitch et al. |
| 2014/0229816 | A1 | 8/2014 | Yakub |
| 2014/0240735 | A1 | 8/2014 | Salgado |
| 2014/0249877 | A1 | 9/2014 | Hull et al. |
| 2014/0257568 | A1 | 9/2014 | Czaja et al. |
| 2014/0278638 | A1 | 9/2014 | Kreuzkamp et al. |
| 2014/0278720 | A1 | 9/2014 | Taguchi |
| 2014/0280287 | A1 | 9/2014 | Ganti et al. |
| 2014/0280377 | A1 | 9/2014 | Frew |
| 2014/0281868 | A1 | 9/2014 | Vogel et al. |
| 2014/0281869 | A1 | 9/2014 | Yob |
| 2014/0289223 | A1 | 9/2014 | Colwell et al. |
| 2014/0304174 | A1 | 10/2014 | Scott et al. |
| 2014/0306837 | A1 | 10/2014 | Hauck |
| 2014/0310345 | A1 | 10/2014 | Megiddo et al. |
| 2014/0324497 | A1 | 10/2014 | Verma et al. |
| 2014/0324501 | A1 | 10/2014 | Davidow et al. |
| 2014/0325552 | A1 | 10/2014 | Evans et al. |
| 2014/0365938 | A1 | 12/2014 | Black et al. |
| 2014/0372856 | A1 | 12/2014 | Radakovitz et al. |
| 2014/0372932 | A1 | 12/2014 | Rutherford et al. |
| 2015/0032686 | A1 | 1/2015 | Kuchoor |
| 2015/0033131 | A1 | 1/2015 | Peev et al. |
| 2015/0033149 | A1 | 1/2015 | Kuchoor |
| 2015/0035918 | A1 | 2/2015 | Matsumoto et al. |
| 2015/0039387 | A1 | 2/2015 | Akahoshi et al. |
| 2015/0046209 | A1 | 2/2015 | Choe |
| 2015/0058619 | A1* | 2/2015 | Sweet .................... G06F 21/56 713/155 |
| 2015/0067556 | A1 | 3/2015 | Tibrewal et al. |
| 2015/0074721 | A1 | 3/2015 | Fishman et al. |
| 2015/0074728 | A1 | 3/2015 | Chai et al. |
| 2015/0088822 | A1 | 3/2015 | Raja et al. |
| 2015/0095752 | A1 | 4/2015 | Studer et al. |
| 2015/0106736 | A1 | 4/2015 | Torman et al. |
| 2015/0125834 | A1 | 5/2015 | Mendoza Tascon |
| 2015/0142676 | A1 | 5/2015 | McGinnis et al. |
| 2015/0142829 | A1 | 5/2015 | Lee et al. |
| 2015/0153943 | A1 | 6/2015 | Wang |
| 2015/0154660 | A1 | 6/2015 | Weald et al. |
| 2015/0169514 | A1 | 6/2015 | Sah et al. |
| 2015/0169531 | A1 | 6/2015 | Campbell et al. |
| 2015/0178657 | A1 | 6/2015 | Kleehammer et al. |
| 2015/0188964 | A1 | 7/2015 | Sharma et al. |
| 2015/0205830 | A1 | 7/2015 | Bastide et al. |
| 2015/0212717 | A1 | 7/2015 | Nair et al. |
| 2015/0220491 | A1 | 8/2015 | Cochrane et al. |
| 2015/0234887 | A1 | 8/2015 | Greene et al. |
| 2015/0242091 | A1 | 8/2015 | Lu et al. |
| 2015/0249864 | A1 | 9/2015 | Tang et al. |
| 2015/0261796 | A1 | 9/2015 | Gould et al. |
| 2015/0262121 | A1 | 9/2015 | Riel-Dalpe et al. |
| 2015/0278699 | A1 | 10/2015 | Danielsson |
| 2015/0281292 | A1 | 10/2015 | Murayama et al. |
| 2015/0295877 | A1 | 10/2015 | Roman |
| 2015/0310126 | A1 | 10/2015 | Steiner et al. |
| 2015/0317590 | A1 | 11/2015 | Karlson |
| 2015/0324453 | A1 | 11/2015 | Werner |
| 2015/0331846 | A1 | 11/2015 | Guggilla et al. |
| 2015/0363478 | A1 | 12/2015 | Haynes |
| 2015/0370540 | A1 | 12/2015 | Coslovi et al. |
| 2015/0370776 | A1 | 12/2015 | New |
| 2015/0370904 | A1 | 12/2015 | Joshi et al. |
| 2015/0378542 | A1 | 12/2015 | Saito et al. |
| 2015/0378711 | A1 | 12/2015 | Cameron et al. |
| 2015/0378979 | A1 | 12/2015 | Hirzel et al. |
| 2015/0379472 | A1 | 12/2015 | Gilmour et al. |
| 2016/0012111 | A1 | 1/2016 | Pattabhiraman et al. |
| 2016/0018962 | A1 | 1/2016 | Low et al. |
| 2016/0026939 | A1 | 1/2016 | Schiffer et al. |
| 2016/0027076 | A1 | 1/2016 | Jackson et al. |
| 2016/0035546 | A1 | 2/2016 | Platt et al. |
| 2016/0055134 | A1 | 2/2016 | Sathish et al. |
| 2016/0055374 | A1 | 2/2016 | Zhang et al. |
| 2016/0063435 | A1 | 3/2016 | Shah et al. |
| 2016/0068960 | A1 | 3/2016 | Jung et al. |
| 2016/0078368 | A1 | 3/2016 | Kakhandiki et al. |
| 2016/0088480 | A1 | 3/2016 | Chen et al. |
| 2016/0092557 | A1 | 3/2016 | Stojanovic et al. |
| 2016/0098574 | A1 | 4/2016 | Bargagni |
| 2016/0117308 | A1 | 4/2016 | Haider et al. |
| 2016/0170586 | A1 | 6/2016 | Gallo |
| 2016/0173122 | A1 | 6/2016 | Akitomi et al. |
| 2016/0196310 | A1 | 7/2016 | Dutta |
| 2016/0210572 | A1 | 7/2016 | Shaaban et al. |
| 2016/0216948 | A1 | 7/2016 | Mcpherson et al. |
| 2016/0224532 | A1 | 8/2016 | Miller et al. |
| 2016/0224676 | A1 | 8/2016 | Miller et al. |
| 2016/0224939 | A1 | 8/2016 | Chen et al. |
| 2016/0231915 | A1 | 8/2016 | Nhan et al. |
| 2016/0232489 | A1 | 8/2016 | Skaaksrud |
| 2016/0246490 | A1 | 8/2016 | Cabral |
| 2016/0253982 | A1 | 9/2016 | Cheung et al. |
| 2016/0259856 | A1 | 9/2016 | Ananthapur Bache et al. |
| 2016/0275150 | A1 | 9/2016 | Bournonnais et al. |
| 2016/0292206 | A1 | 10/2016 | Ruiz Velazquez et al. |
| 2016/0299655 | A1 | 10/2016 | Migos et al. |
| 2016/0308963 | A1 | 10/2016 | Kung |
| 2016/0321235 | A1 | 11/2016 | He et al. |
| 2016/0321604 | A1 | 11/2016 | Imaeda et al. |
| 2016/0335302 | A1 | 11/2016 | Teodorescu et al. |
| 2016/0335303 | A1 | 11/2016 | Madhalam et al. |
| 2016/0335604 | A1 | 11/2016 | Reminick et al. |
| 2016/0335731 | A1 | 11/2016 | Hall |
| 2016/0335903 | A1 | 11/2016 | Mendoza Tascon |
| 2016/0344828 | A1 | 11/2016 | Häusler et al. |
| 2016/0350950 | A1 | 12/2016 | Ritchie et al. |
| 2016/0381099 | A1 | 12/2016 | Keslin et al. |
| 2017/0017779 | A1 | 1/2017 | Huang et al. |
| 2017/0031967 | A1 | 2/2017 | Chavan et al. |
| 2017/0041296 | A1 | 2/2017 | Ford et al. |
| 2017/0052937 | A1 | 2/2017 | Sirven et al. |
| 2017/0061342 | A1 | 3/2017 | Lore et al. |
| 2017/0061360 | A1 | 3/2017 | Rucker et al. |
| 2017/0061820 | A1 | 3/2017 | Firoozbakhsh |
| 2017/0063722 | A1 | 3/2017 | Cropper et al. |
| 2017/0075557 | A1 | 3/2017 | Noble et al. |
| 2017/0076101 | A1 | 3/2017 | Kochhar et al. |
| 2017/0090734 | A1 | 3/2017 | Fitzpatrick |
| 2017/0090736 | A1 | 3/2017 | King et al. |
| 2017/0091337 | A1 | 3/2017 | Patterson |
| 2017/0093876 | A1 | 3/2017 | Feng et al. |
| 2017/0109499 | A1 | 4/2017 | Doshi et al. |
| 2017/0111327 | A1 | 4/2017 | Wu |
| 2017/0116552 | A1 | 4/2017 | Deodhar et al. |
| 2017/0124042 | A1 | 5/2017 | Campbell et al. |
| 2017/0124048 | A1 | 5/2017 | Campbell et al. |
| 2017/0124055 | A1 | 5/2017 | Radakovitz et al. |
| 2017/0124740 | A1 | 5/2017 | Campbell et al. |
| 2017/0126772 | A1 | 5/2017 | Campbell et al. |
| 2017/0132296 | A1 | 5/2017 | Ding |
| 2017/0132652 | A1 | 5/2017 | Kedzlie et al. |
| 2017/0139874 | A1 | 5/2017 | Chin |
| 2017/0139884 | A1 | 5/2017 | Bendig et al. |
| 2017/0139891 | A1 | 5/2017 | Ah-Soon et al. |
| 2017/0139992 | A1 | 5/2017 | Morin |
| 2017/0140047 | A1 | 5/2017 | Bendig et al. |
| 2017/0140219 | A1 | 5/2017 | King et al. |
| 2017/0153771 | A1 | 6/2017 | Chu |
| 2017/0161246 | A1 | 6/2017 | Klima |
| 2017/0177556 | A1 | 6/2017 | Fay et al. |
| 2017/0177888 | A1 | 6/2017 | Arora et al. |

(56) References Cited

U.S. PATENT DOCUMENTS

2017/0185575 A1 6/2017 Sood et al.
2017/0185668 A1 6/2017 Convertino et al.
2017/0200122 A1 7/2017 Edson et al.
2017/0206366 A1 7/2017 Fay et al.
2017/0212924 A1 7/2017 Semlani et al.
2017/0220813 A1 8/2017 Mullins et al.
2017/0221072 A1 8/2017 Athulurutlrumala et al.
2017/0228421 A1 8/2017 Sharma et al.
2017/0228445 A1 8/2017 Chiu et al.
2017/0228460 A1 8/2017 Amel et al.
2017/0229152 A1 8/2017 Loganathan et al.
2017/0236081 A1 8/2017 Grady Smith et al.
2017/0242921 A1 8/2017 Rota
2017/0257517 A1 9/2017 Panda
2017/0262786 A1 9/2017 Khasis
2017/0270970 A1 9/2017 Ho et al.
2017/0272316 A1 9/2017 Johnson et al.
2017/0272331 A1 9/2017 Lissack
2017/0277620 A1 9/2017 Kadioglu
2017/0277669 A1 9/2017 Sekharan
2017/0285879 A1 10/2017 Pilkington et al.
2017/0285890 A1 10/2017 Dolman
2017/0289619 A1 10/2017 Xu et al.
2017/0301039 A1 10/2017 Dyer et al.
2017/0315683 A1 11/2017 Boucher et al.
2017/0315974 A1 11/2017 Kong et al.
2017/0315979 A1 11/2017 Boucher et al.
2017/0322963 A1 11/2017 Ramamurthi et al.
2017/0324692 A1 11/2017 Zhou
2017/0329479 A1 11/2017 Rauschenbach et al.
2017/0351252 A1 12/2017 Kleifges et al.
2017/0372442 A1 12/2017 Mejias
2017/0374205 A1 12/2017 Panda
2018/0011827 A1 1/2018 Avery et al.
2018/0025084 A1 1/2018 Conlan et al.
2018/0026954 A1 1/2018 Toepke et al.
2018/0032492 A1 2/2018 Altshuller et al.
2018/0032570 A1 2/2018 Miller et al.
2018/0039651 A1 2/2018 Tobin et al.
2018/0055434 A1 3/2018 Cheung et al.
2018/0075104 A1 3/2018 Oberbreckling et al.
2018/0075115 A1 3/2018 Murray et al.
2018/0075413 A1 3/2018 Culver et al.
2018/0075560 A1 3/2018 Thukral et al.
2018/0077143 A1 3/2018 Sridharan et al.
2018/0081505 A1 3/2018 Ron et al.
2018/0081863 A1 3/2018 Bathla
2018/0081868 A1 3/2018 Willcock et al.
2018/0082072 A1 3/2018 Hosie et al.
2018/0088753 A1 3/2018 Viégas et al.
2018/0088989 A1 3/2018 Nield et al.
2018/0089299 A1 3/2018 Collins et al.
2018/0095938 A1 4/2018 Monte
2018/0096417 A1 4/2018 Cook et al.
2018/0109760 A1 4/2018 Metter et al.
2018/0121028 A1 5/2018 Kuscher et al.
2018/0121994 A1 5/2018 Matsunaga et al.
2018/0128636 A1 5/2018 Zhou
2018/0129651 A1 5/2018 Latvala et al.
2018/0157455 A1 6/2018 Troy et al.
2018/0157467 A1 6/2018 Stachura
2018/0157468 A1 6/2018 Stachura
2018/0157633 A1 6/2018 He et al.
2018/0173715 A1 6/2018 Dunne
2018/0181650 A1 6/2018 Komatsuda et al.
2018/0181716 A1 6/2018 Mander et al.
2018/0189734 A1 7/2018 Newhouse et al.
2018/0210936 A1 7/2018 Reynolds et al.
2018/0225270 A1 8/2018 Bhide et al.
2018/0260371 A1 9/2018 Theodore et al.
2018/0260435 A1 9/2018 Xu
2018/0262705 A1 9/2018 Park et al.
2018/0276417 A1 9/2018 Cerezo Sanchez
2018/0285918 A1 10/2018 Staggs
2018/0293217 A1 10/2018 Callaghan
2018/0293587 A1 10/2018 Oda
2018/0293669 A1 10/2018 Jackson et al.
2018/0329930 A1 11/2018 Eberlein et al.
2018/0330320 A1 11/2018 Kohli
2018/0357047 A1 12/2018 Brown et al.
2018/0357305 A1 12/2018 Kinast et al.
2018/0365429 A1 12/2018 Segal
2018/0367484 A1 12/2018 Rodriguez et al.
2018/0373434 A1 12/2018 Switzer et al.
2018/0373757 A1 12/2018 Schukovets et al.
2019/0005094 A1 1/2019 Yi et al.
2019/0011310 A1 1/2019 Turnbull et al.
2019/0012342 A1 1/2019 Cohn
2019/0028360 A1 1/2019 Douglas et al.
2019/0034395 A1 1/2019 Curry et al.
2019/0036989 A1 1/2019 Eirinberg et al.
2019/0042628 A1 2/2019 Rajpara
2019/0050445 A1 2/2019 Griffith et al.
2019/0050466 A1 2/2019 Kim et al.
2019/0050812 A1 2/2019 Boileau
2019/0056856 A1 2/2019 Simmons et al.
2019/0065545 A1 2/2019 Hazel et al.
2019/0068703 A1 2/2019 Vora et al.
2019/0073350 A1 3/2019 Shiotani
2019/0079751 A1 3/2019 Foskett et al.
2019/0095413 A1 3/2019 Davis et al.
2019/0097909 A1 3/2019 Puri et al.
2019/0108046 A1 4/2019 Spencer-Harper et al.
2019/0113935 A1 4/2019 Kuo et al.
2019/0114308 A1 4/2019 Hancock
2019/0114589 A1 4/2019 Voss et al.
2019/0123924 A1 4/2019 Embiricos et al.
2019/0130611 A1 5/2019 Black et al.
2019/0138583 A1 5/2019 Silk et al.
2019/0138588 A1 5/2019 Silk et al.
2019/0138653 A1 5/2019 Roller et al.
2019/0147030 A1 5/2019 Stein et al.
2019/0155821 A1 5/2019 Dirisala
2019/0179501 A1 6/2019 Seeley et al.
2019/0199823 A1 6/2019 Underwood et al.
2019/0208058 A1 7/2019 Dvorkin et al.
2019/0213557 A1 7/2019 Dotan-Cohen et al.
2019/0220161 A1 7/2019 Loftus et al.
2019/0236188 A1 8/2019 McKenna
2019/0243879 A1 8/2019 Harley et al.
2019/0251884 A1 8/2019 Burns et al.
2019/0258461 A1 8/2019 Li et al.
2019/0258706 A1 8/2019 Li et al.
2019/0286839 A1 9/2019 Mutha et al.
2019/0306009 A1 10/2019 Makovsky et al.
2019/0312899 A1 10/2019 Shulman et al.
2019/0324840 A1 10/2019 Malamut et al.
2019/0325012 A1 10/2019 Delaney et al.
2019/0327294 A1 10/2019 Subramani Nadar et al.
2019/0340550 A1 11/2019 Denger et al.
2019/0347077 A1 11/2019 Huebra
2019/0349447 A1 11/2019 Adams et al.
2019/0361879 A1 11/2019 Rogynskyy et al.
2019/0361971 A1 11/2019 Zenger et al.
2019/0364009 A1 11/2019 Joseph et al.
2019/0371442 A1 12/2019 Schoenberg
2019/0377791 A1 12/2019 Abou Mahmoud et al.
2019/0391707 A1 12/2019 Ristow et al.
2020/0005248 A1 1/2020 Gerzi et al.
2020/0005295 A1 1/2020 Murphy
2020/0012629 A1 1/2020 Lereya et al.
2020/0019548 A1 1/2020 Agnew et al.
2020/0019595 A1 1/2020 Azua Garcia
2020/0026352 A1 1/2020 Wang et al.
2020/0026397 A1 1/2020 Wohlstadter et al.
2020/0042648 A1 2/2020 Rao
2020/0050696 A1 2/2020 Mowatt et al.
2020/0053176 A1 2/2020 Jimenez Salgado et al.
2020/0125574 A1 4/2020 Ghoshal et al.
2020/0134002 A1 4/2020 Tung et al.
2020/0142546 A1 5/2020 Breedvelt-Schouten et al.
2020/0151630 A1 5/2020 Shakhnovich
2020/0159558 A1 5/2020 Bak et al.
2020/0175094 A1 6/2020 Palmer

(56) References Cited

U.S. PATENT DOCUMENTS

| | | | |
|---|---|---|---|
| 2020/0176089 | A1 | 6/2020 | Jones et al. |
| 2020/0192646 | A1 | 6/2020 | Yerramreddy et al. |
| 2020/0192785 | A1 | 6/2020 | Chen |
| 2020/0193388 | A1 | 6/2020 | Tran-Kiem et al. |
| 2020/0236110 | A1 | 7/2020 | Metzler et al. |
| 2020/0247661 | A1 | 8/2020 | Rao et al. |
| 2020/0265112 | A1 | 8/2020 | Fox et al. |
| 2020/0279315 | A1 | 9/2020 | Manggala |
| 2020/0293337 | A1 | 9/2020 | Rangasamy et al. |
| 2020/0293616 | A1 | 9/2020 | Nelson et al. |
| 2020/0301678 | A1 | 9/2020 | Burman et al. |
| 2020/0301902 | A1 | 9/2020 | Maloy et al. |
| 2020/0310835 | A1 | 10/2020 | Momchilov |
| 2020/0326824 | A1 | 10/2020 | Alonso et al. |
| 2020/0327244 | A1 | 10/2020 | Blass et al. |
| 2020/0334019 | A1 | 10/2020 | Bosworth et al. |
| 2020/0348809 | A1 | 11/2020 | Drescher |
| 2020/0349320 | A1 | 11/2020 | Owens |
| 2020/0356740 | A1 | 11/2020 | Principato |
| 2020/0356873 | A1 | 11/2020 | Nawrocke et al. |
| 2020/0374146 | A1 | 11/2020 | Chhabra et al. |
| 2020/0380212 | A1 | 12/2020 | Butler et al. |
| 2020/0380449 | A1 | 12/2020 | Choi |
| 2020/0387664 | A1 | 12/2020 | Kusumura et al. |
| 2020/0401581 | A1 | 12/2020 | Eubank et al. |
| 2020/0409949 | A1 | 12/2020 | Saxena et al. |
| 2020/0410395 | A1 | 12/2020 | Ray et al. |
| 2021/0014136 | A1 | 1/2021 | Rath |
| 2021/0019287 | A1 | 1/2021 | Prasad et al. |
| 2021/0021603 | A1 | 1/2021 | Gibbons |
| 2021/0034058 | A1 | 2/2021 | Subramanian et al. |
| 2021/0035069 | A1 | 2/2021 | Parikh |
| 2021/0042796 | A1 | 2/2021 | Khoury et al. |
| 2021/0049524 | A1 | 2/2021 | Nachum et al. |
| 2021/0049555 | A1 | 2/2021 | Shor |
| 2021/0055955 | A1 | 2/2021 | Yankelevich et al. |
| 2021/0056509 | A1 | 2/2021 | Lindy |
| 2021/0065203 | A1 | 3/2021 | Billigmeier et al. |
| 2021/0072883 | A1 | 3/2021 | Migunova et al. |
| 2021/0073526 | A1 | 3/2021 | Zeng et al. |
| 2021/0075870 | A1 | 3/2021 | Kempf et al. |
| 2021/0081404 | A1 | 3/2021 | Kempf et al. |
| 2021/0084120 | A1 | 3/2021 | Fisher et al. |
| 2021/0124749 | A1 | 4/2021 | Suzuki et al. |
| 2021/0124872 | A1 | 4/2021 | Lereya |
| 2021/0136027 | A1 | 5/2021 | Barbitta et al. |
| 2021/0141923 | A1 | 5/2021 | Wu et al. |
| 2021/0149553 | A1 | 5/2021 | Lereya et al. |
| 2021/0149688 | A1 | 5/2021 | Newell et al. |
| 2021/0149925 | A1 | 5/2021 | Mann et al. |
| 2021/0150489 | A1 | 5/2021 | Haramati et al. |
| 2021/0165782 | A1 | 6/2021 | Deshpande et al. |
| 2021/0166196 | A1 | 6/2021 | Lereya et al. |
| 2021/0166339 | A1 | 6/2021 | Mann et al. |
| 2021/0173682 | A1 | 6/2021 | Chakraborti et al. |
| 2021/0174006 | A1 | 6/2021 | Stokes |
| 2021/0192126 | A1 | 6/2021 | Gehrmann et al. |
| 2021/0203549 | A1 | 7/2021 | Snehashis et al. |
| 2021/0232484 | A1 | 7/2021 | Keneally et al. |
| 2021/0248311 | A1 | 8/2021 | Helft et al. |
| 2021/0257065 | A1 | 8/2021 | Mander et al. |
| 2021/0264220 | A1 | 8/2021 | Wei et al. |
| 2021/0273957 | A1 | 9/2021 | Boyer et al. |
| 2021/0281428 | A1 | 9/2021 | Kempf et al. |
| 2021/0326519 | A1 | 10/2021 | Lin et al. |
| 2021/0328888 | A1 | 10/2021 | Rath |
| 2021/0342145 | A1* | 11/2021 | Miller ........................ G06F 8/60 |
| 2021/0342785 | A1 | 11/2021 | Mann et al. |
| 2021/0365446 | A1 | 11/2021 | Srivastava et al. |
| 2021/0374197 | A1 | 12/2021 | Chauhan |
| 2021/0397585 | A1 | 12/2021 | Seward |
| 2022/0066847 | A1* | 3/2022 | Liu ......................... G06F 9/541 |
| 2022/0099454 | A1 | 3/2022 | Decrop et al. |
| 2022/0121325 | A1 | 4/2022 | Roberts et al. |
| 2022/0121478 | A1 | 4/2022 | Chivukula et al. |
| 2022/0138004 | A1 | 5/2022 | Nandakumar et al. |
| 2022/0206864 | A1 | 6/2022 | Nadathur et al. |
| 2022/0221591 | A1 | 7/2022 | Smith et al. |
| 2022/0222242 | A1 | 7/2022 | Spranger et al. |
| 2022/0229928 | A1 | 7/2022 | Shachar et al. |
| 2022/0253347 | A1 | 8/2022 | Jones et al. |
| 2022/0291666 | A1 | 9/2022 | Cella et al. |
| 2022/0292180 | A1 | 9/2022 | Chauhan |
| 2022/0343010 | A1 | 10/2022 | Ghafoor et al. |
| 2022/0357905 | A1 | 11/2022 | Dohmae |
| 2022/0382522 | A1 | 12/2022 | Heynemann Nascentes da Silva et al. |
| 2022/0413846 | A1 | 12/2022 | Clarke et al. |
| 2023/0014233 | A1* | 1/2023 | Xiang ................. G06F 11/1446 |
| 2023/0016946 | A1 | 1/2023 | Wouhaybi et al. |
| 2023/0035600 | A1 | 2/2023 | Holzman et al. |
| 2023/0036114 | A1 | 2/2023 | Whitehill et al. |
| 2023/0075183 | A1 | 3/2023 | Copty et al. |
| 2023/0093470 | A1 | 3/2023 | Dvornik et al. |
| 2023/0153651 | A1 | 5/2023 | Bi et al. |
| 2023/0171241 | A1 | 6/2023 | Amichay et al. |
| 2023/0188516 | A1* | 6/2023 | Danilov ................ G06F 9/5072 726/7 |
| 2023/0259390 | A1 | 8/2023 | Howley et al. |
| 2023/0316382 | A1 | 10/2023 | Faricy et al. |
| 2023/0385042 | A1 | 11/2023 | Obando Chacon et al. |
| 2023/0385814 | A1 | 11/2023 | Gauthier et al. |
| 2023/0393832 | A1 | 12/2023 | Touati et al. |
| 2023/0419161 | A1 | 12/2023 | Dines |
| 2024/0046142 | A1 | 2/2024 | Marks et al. |
| 2024/0053727 | A1 | 2/2024 | Timisescu et al. |
| 2024/0054526 | A1 | 2/2024 | Horwitz et al. |
| 2024/0154967 | A1 | 5/2024 | Mcguinness et al. |
| 2024/0202405 | A1 | 6/2024 | Lang et al. |
| 2024/0250977 | A1 | 7/2024 | Shulman et al. |
| 2024/0265408 | A1 | 8/2024 | Singh et al. |
| 2024/0333705 | A1 | 10/2024 | Sanchala et al. |
| 2024/0419423 | A1 | 12/2024 | Chen et al. |
| 2025/0094884 | A1 | 3/2025 | Sigwart et al. |
| 2025/0148115 | A1 | 5/2025 | Ghafoor et al. |
| 2025/0173162 | A1 | 5/2025 | Mystetskyi et al. |
| 2025/0173450 | A1 | 5/2025 | Mystetskyi et al. |
| 2026/0024037 | A1 | 1/2026 | Mystetskyi et al. |

FOREIGN PATENT DOCUMENTS

| | | | |
|---|---|---|---|
| CN | 107123424 | A | 9/2017 |
| CN | 107422666 | A | 12/2017 |
| CN | 107623596 | A | 1/2018 |
| CN | 107885656 | A | 4/2018 |
| CN | 108717428 | A | 10/2018 |
| CN | 112929172 | A | 6/2021 |
| EP | 3443466 | B1 | 12/2021 |
| KR | 20150100760 | A | 9/2015 |
| KR | 20220016276 | A | 2/2022 |
| WO | 2004100015 | A2 | 11/2004 |
| WO | 2006116580 | A2 | 11/2006 |
| WO | 2008109541 | A1 | 9/2008 |
| WO | 2014088393 | A1 | 6/2014 |
| WO | 2017202159 | A1 | 11/2017 |
| WO | 2018023798 | A1 | 2/2018 |
| WO | 2018042424 | A1 | 3/2018 |
| WO | 2020139865 | A1 | 7/2020 |
| WO | 2020187408 | A1 | 9/2020 |
| WO | 2021096944 | A1 | 5/2021 |
| WO | 2021144656 | A1 | 7/2021 |
| WO | 2021161104 | A1 | 8/2021 |
| WO | 2021220058 | A1 | 11/2021 |
| WO | 2022153122 | A1 | 7/2022 |

OTHER PUBLICATIONS

Abor Jr, C., "Low-Code and No-Code AI: New AI Development—What is code anymore ?!?! " (as retrieved from https://www.linkedin.com/pulse/ low-code-no-code-ai-new-development-what-code- any-more-c-I-abor-jr); Jul. 15, 2023 (Year: 2023).

Anupam et al., "Personalizing the Web Using Site Descriptions",

(56) References Cited

OTHER PUBLICATIONS

Proceedings of the Tenth International Workshop on Database and Expert Systems Applications, ISBN: 0-7695-0281-4, DOI:10.1109/DEXA.1999.795275, Jan. 1, 1999, pp. 732-738. (Year: 1999).
Aylward, Grant, "Drag-and-Drop AI Enables Digital Workforce Deployment at Scale Share" (as retrieved from https://www.blueprism.com/resources/ blog/drag-and-drop-ai-enables-digital-workforce-deployment-at-scale/); Mar. 19 202 (Year: 2020).
Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).
Bahrebar et al., "A Novel Type-2 Fuzzy Logic for Improved Risk Analysis of Proton Exchange Membrane Fuel Cells in Marine Power Systems Application", Energies, 11, 721, pp. 1-16, Mar. 22, 2018 (Year: 2018).
Barai et al., "Image Annotation System Using Visual and Textual Features," In: Proceedings of the 16th International Conference on Distributed Multi-media Systems, pp. 289-296 (2010).
Breitgand et al., "Serverless Data Analytics Platform," CloudButton, Feb. 13, 2022, retrieved on [Jan. 14, 2024]. Retrieved from the internet <URL: https://cloudbutton.eu/docs/deliverables/CloudButton_D3.1_Public.pdf> (Year: 2022).
Chen et al., "Artificial Intelligence in Education: A Review," IEEEAccess vol. 8, pp. 75264-75278 (Year: 2020).
D'ALESSIO et al., Monday.com Walkthrough 2018\All Features, Platforms & Thoughts, Mar. 1, 2018, pp. 1-55 (Year: 2018).
Dapulse.com "features," extracted from web.archive.org/web/2014091818421/https://dapulse.com/features; Sep. 2014 (Year: 2014).
Dapulse.com, "High Level Overview", Extracted from https://web.archive.org/web/20161104170936/https://dapulse.com (Year: 2016).
"demonstracion en espanol de Monday.com," published Feb. 20, 2019. https://www.youtube.com/watch?v=zOqydTgof1A (Year: 2019).
Desmedt et al., "Function-Based Access Control (FBAC) From Access Control Matrix to Access Control Tensor." In Proceedings of the 8th Acm Ccs International Workshop on Managing Insider Security Threats, pp. 89-92 (2016).
Donath, "Interfaces Make Meaning" chapter from The Social Machine: Designs for Living Online, pp. 41-76, copyright 2014. (Year: 2014).
Dorn et al., "Efficient Full-Field Vibration Measurements and Operational Modal Analysis Using Neuromorphic Event-Based Imaging," Journal of Engineering Mechanics, vol. 144, No. 7, Jul. 1, 2018 (Year: 2018).
Freund, K., "SiMa.ai Creates Drag-And-Drop Platform For Building Al Workflows" (as retrieved from https://www.forbes.com/sites/karlfreund/2023/09/12/simaai-creates-drag-and-drop-platform-for-building-ai-workflows/?sh=789de8466046); Sep. 12, 2023 (Year: 2023).
Gutwin et al., "Supporting Informal Collaboration in Shared-Workspace Groupware", J. Univers. Comput. Sci., 14(9), 1411-1434 (2008).
Hupfer et al., "Introducing collaboration into an application development environment." In Proceedings of the 2004 ACM conference on Computer supported cooperative work (CSCW '04). Association for Computing Machinery, New York, Ny, USA, pp. 21-24 (Year: 2004).
International Search Report and Written Opinion of the International Search Authority in PCT/IB2020/000024, mailed May 3, 2021 (13 pages).
International Search Report and Written Opinion of the International Search Authority in PCT/IB2020/000658, mailed Nov. 11, 2020 (12 pages).
International Search Report and Written Opinion of the International Search Authority in PCT/IB2020/000974, mailed May 3, 2021 (19 pages).
International Search Report and Written Opinion of the International Search Authority in PCT/IB2021/000090 dated Jul. 27, 2021.
International Search Report and Written Opinion of the International Search Authority in PCT/IB2021/000297, mailed Oct. 12, 2021 (20 pages).
International Search Report and Written Opinion of the International Search Authority in PCT/IB2023/061991, mailed Feb. 26, 2024 (6 pages).
Ionescu et al., "A chat-centric collaborative environment for web-based real-time collaboration," 2015 IEEE 10th Jubilee International Symposium on Applied Computational Intelligence and Informatics, Timisoara, Romania, 2015, pp. 105-110 (Year: 2015).
Kantorovitz, I., "Lexical Analysis Tool," May 2004, [Retrieved on 2021-11-19], Retrieved from the internet: < URL: https://dl.acm.org/doi/pdf/10.1145/997140.997147> pp. 66-74 (Year: 2004).
Kollmann, F., "Realizing Fine-Granular Read and Write Rights on Tree Structured Documents." in The Second International Conference on Availability, Reliability and Security (ARES'07), pp. 517-523. IEEE, 2007. (Year: 2007).
Larson et al., "Introducing Data Mining Concepts Using Microsoft Excel's Table Analysis Tools," Oct. 2015, [Retrieved on 2021-11-19], Retrieved from the internet: < URL: https://dl.acm.org/doi/pdf/10.5555/2831373.2831394> 3 Pages (127-129) (Year: 2015).
List, B., "An Evaluation of Conceptual Business Process Modelling Languages", SAC'06, Apr. 23-27, 2006, pp. 1532-1539 (Year: 2006).
Monday.Com et al., "Basic Walkthrough", https://www.youtube.com/watch?v=VpbgWyPf74g; Aug. 9, 2019. (Year: 2019).
Pedersen et al., "Tivoli: an electronic whiteboard for informal workgroup meetings," Conference on Human Factors in Computing Systems: Proceedings of the INTERACT '93 and CHI '93 conference on Human factors in computing systems; Apr. 24-29, 1993, pp. 391-398 (Year 1993).
Peltier, J., "Clustered and Stacked col. and Bar Charts", Aug. 2011, Peltier Technical Services, Inc., pp. 1-128; (Year: 2011).
"Pivot table" - Wikipedia; URL: https://en.wikepedia .org/w/index.php?title=Pivot table&oldid=857163289, originally retrieve on Oct. 23, 2019; retrieved on Jul. 16, 2021.
Rodrigo, A., Project Management with Monday.com: a 101 Introduction; Jul. 22, 2019, pp. 1-21, 2019.
Showmypc, "Switch Presenter While Using ShowMyPC"; web archive.org; Aug. 20, 2016.
Singh, V., "A Theoretical Framework of a BIM-based Multi-Disciplinary Collaboration Platform", Nov. 5, 2020, Automation in Construction, 20 (2011), pp. 134-144 (Year: 2011).
Sreenath et al., "Agent-based service selection," Journal of Web Semantics 1.3, pp. 261-279 (Year: 2004).
Stancu et al., "SecCollab-Improving Confidentiality for Existing Cloud-Based Collaborative Editors." In 2017 21st International Conferences on Control Systems and Computer Scient (CSCS), pp. 324-331. IEEE,2017. (Year: 2017).
Stohr, E., Workflow Automation: Overview and Research Issues, 2001, Information Systems Frontiers 3:3, pp. 281-296 (Year: 2001).
"Using Filters in Overview," published Mar. 7. 2017. https://www.youtube.com/watch?v=hycANhz7gww (Year: 2017).
Wilson et al., "Beyond Social Graphs: User Interactions in Online Social Networks and their Implications," ACM Transactions on the Web, vol. 6, No. 4, Article 17, Nov. 2012 (Year: 2012).
Zhang et al., "Integrating semantic NLP and logic reasoning into a unified system for fully-automated code checking," Automation in Construction, vol. 73, 2017, pp. 45-57, ISSN 0926-5805, https://doi.org/10.1016/j.autcon.2016.08.027.
Zhenjiang et al., "Asynchronous Event-Based Visual Shape Tracking for Stable Haptic Feedback in Microrobotics," IEEE Transactions on Robotics, IEEE Service Center, Piscataway, NJ, vol. 28, No. 5, Oct. 1, 2012, pp. 1081-1089 (Year: 2012).
Ziheng, G., "Advanced Cyberinfrastructure for Managing Hybrid Geoscientific Al Workflows" (Year: 2019).

* cited by examiner

DIGITAL PROCESSING SYSTEMS AND METHODS FOR FACILITATING THE DEVELOPMENT AND IMPLEMENTATION OF APPLICATIONS IN CONJUNCTION WITH A SERVERLESS ENVIRONMENT

PRIORITY CLAIM

This application is a continuation of International Application No PCT/IB2023/061991, filed on Nov. 28, 2023, which is incorporated herein in its entirety.

TECHNICAL FIELD

The present disclosure relates generally to methods and digital systems for facilitating the development and implementation of applications in conjunction with a serverless environment. Consistent with the disclosed embodiments, non-transitory computer-readable storage media may store program instructions, which may be executable by at least one processing device and perform any of the steps and/or methods described herein.

BACKGROUND

Operation of modern enterprises (e.g., companies) can be complicated and time-consuming. In many cases, managing the operation of a single project requires integration of several employees, departments, and other resources of the entity. To manage the challenging operation, project management platforms may be used. Such platforms allow a user to organize, plan, and manage resources in collaboration with other users by providing a collaborative platform in which users share project-related information in order to optimize the time and resources spent on each project.

In parallel, companies are increasingly recognizing the need to create private applications that are specifically tailored to their unique business demands. These applications offer significant advantages by streamlining workflows, automating repetitive tasks, and enhancing overall productivity. They empower organizations to develop custom dashboards, analytics, and reporting tools, enabling valuable insights into project performance, and facilitating data-driven decision-making.

However, companies face several obstacles when attempting to develop and deploy new applications to meet their current requirements. The process of building an application infrastructure, including developing source code and maintaining a secure code repository, can be time-consuming. Additionally, utilizing third-party application providers requires thorough evaluation to ensure compliance with privacy and security policies. Furthermore, integrating newly developed applications with existing ones can be complex and susceptible to security vulnerabilities. To address these challenges and improve existing solutions, it is valuable to provide companies with tools that allow them to develop, host, and run applications without the burden of managing their own servers. These tools should enable the creation of enterprise-level, secure, server-side code. Moreover, companies are inclined to configure these private applications to seamlessly integrate with their current project management platforms. This alignment ensures that the platform is customized to their specific business processes and requirements, resulting in a more efficient and tailored solution. The present disclosure presents solutions aimed at overcoming the aforementioned challenges and addressing other limitations of existing solutions in this context.

SUMMARY

Embodiments consistent with the present disclosure provide digital systems and methods facilitating the development and implementation of applications in conjunction with a serverless environment. The disclosed embodiments may be implemented using a combination of conventional hardware and software as well as specialized hardware and software.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
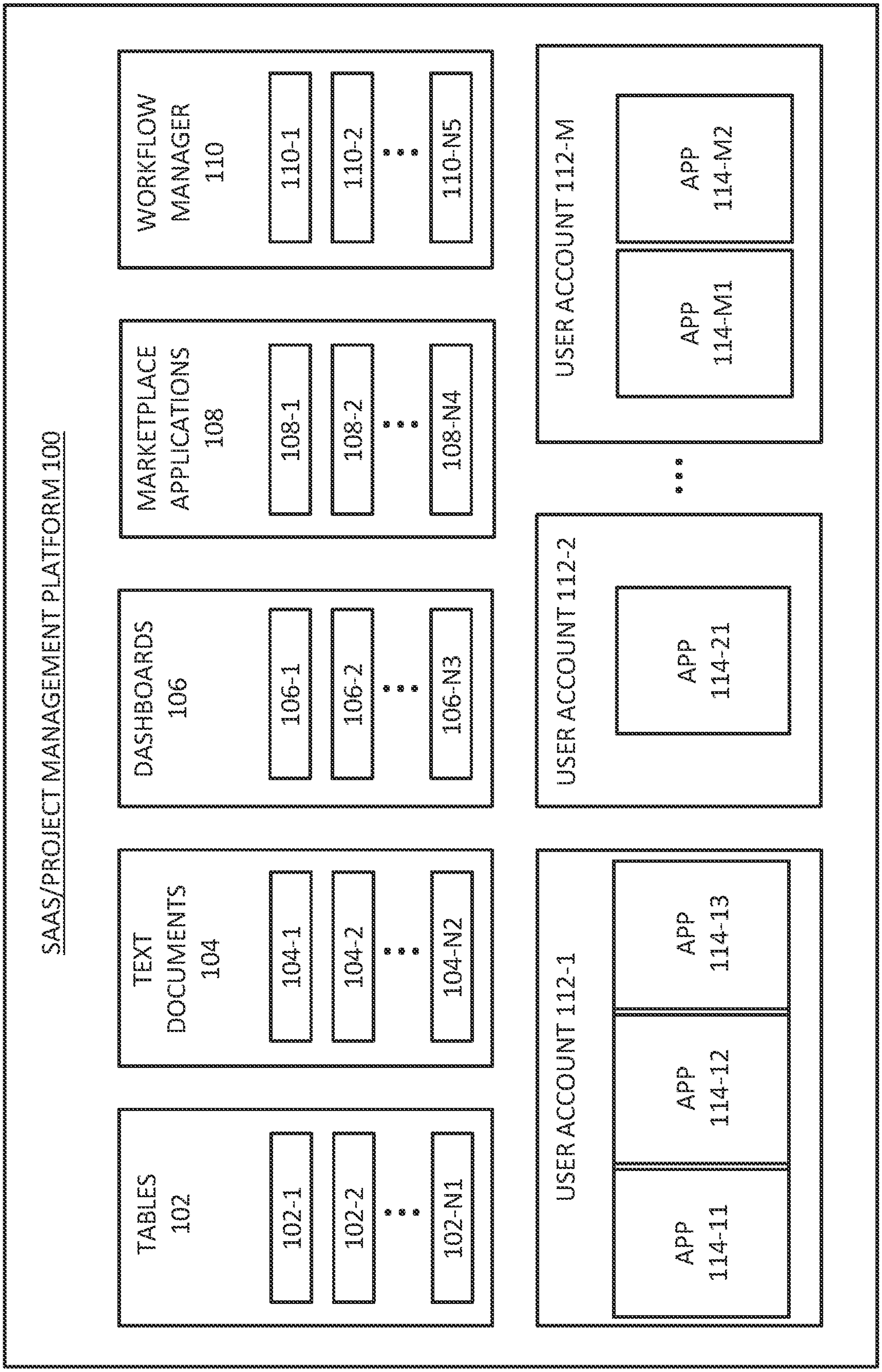
FIG. 1 is a diagram of an exemplary SaaS/project management platform, consistent with some disclosed embodiments.

Disclosed embodiments provide new and improved techniques for workflow implementing and managing artificial intelligence functionalities in applications.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspects of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience and form the word "embodiment" as used herein is intended to refer to a single embodiment or multiple embodiments of the disclosure.

Certain embodiments disclosed herein include devices, systems, and methods for collaborative work systems that may allow one or more users to interact with information in real-time. To avoid repetition, the functionality of some embodiments is described herein solely in connection with a processor or at least one processor. It is to be understood that such exemplary descriptions of functionality apply equally to methods and computer-readable media and constitute a written description of systems, methods, and computer-readable media. The underlying platform may allow a user to structure systems, methods, or computer-readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond what is displayed in a table. For example, a board may further contain cell comments, hidden rows and columns, formulas, data validation rules, filters, specific formatting, audits logs, version history, cross-referencing with different boards, external linking with data sources, permissions of access or a combination thereof. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining one or more associated data types and may further include metadata (e.g., definitions, validation rules, ranges, hyperlinks, macros . . . ). When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure but rather may be practiced in conjunction with any desired organizational arrangement. In addition, tablature may include any type of information, depending on intended use. As an example, when used in conjunction with a project/task management application, the tablature may include any information associated with one or more tasks, such as one or more status values, projects, time-frames/deadlines countries, persons, teams, progress statuses, a combination thereof, or any other information related to a task. In some cases, a hierarchy may be established between different items/cells in a same row. For example, a unique identifier (UID) may be assigned to an item and the other cell of the same row may then be associated with the item or the assigned UID.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. In alternative scenarios, permission may not only be provided at the board level, but also at a more granular-level such as rows, columns and even individual cells, allowing for fine-grained control over who may access, view, edit, or interact with the data included in the board, particularly useful when dealing with collaborative boards. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners. In some embodiments, permissions may be assigned and/or configured in portions of a board such as rows, columns, and/or cells of a board consistent with techniques disclosed in U.S. patent application Ser. No. 17/143,603, issued as U.S. Pat. No. 11,727,323, incorporated herein in its entirety.

Boards and widgets may be part of a platform that may enable users to interact with information in real-time in collaborative work systems involving electronic collaborative word-processing documents. Electronic collaborative word processing documents (and other variations of the term) as used herein are not limited to only digital files for word processing but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information and may be linked to other sources of data for dynamic updates. Blocks may be automatically organized by the system or may be manually selected by a user according to preference. In one embodiment, a user may select a segment of any information in an electronic word-processing document and assign it as a particular block for input, editing, formatting, or any other further configuration.

An electronic collaborative word-processing document may be stored in one or more repositories connected to a network accessible by one or more users through their computing devices. In one embodiment, one or more users may simultaneously edit an electronic collaborative word-processing document. The one or more users may access the electronic collaborative word-processing document through one or more user devices connected to a network. User access to an electronic collaborative word processing document may be managed through permission settings set by an author of the electronic collaborative word processing document. Alternatively, permissions to specific portions of the electronic collaborative word processing document may be provided in order to control access, facilitate collaboration, and ensure that different users have appropriate levels of involvement and authority over different parts of the content. An electronic collaborative word-processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as temporary storage. Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuits (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated into a single circuit. When more than one processor is used, the processors may be configured to operate independently or collaboratively and may be co-located or located remotely from each other. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the foregoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or an unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near-field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column-oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), or virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multi-dimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data with different level of granularity (e.g., a specific board, a plurality of boards . . . ) or across an entirety of an account or entity (e.g., multiple boards, workspaces, or projects within the account). An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more automations, logical rules, logical sentence structures and logical (sentence structure) templates. While these terms are described herein in differing contexts, in the broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that responds to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyperparameters, where the hyperparameters are set manually by a person or automatically by a process external to the machine learning algorithm (such as a hyperparameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

Project management platforms are digital tools or software designed to streamline and automate various processes within an organization. They help to coordinate and manage tasks, activities, and information flow among several team members or different departments, ensuring efficient collaboration and productivity. These platforms typically provide features such as task assignment, progress tracking, notifications, and document management. In some cases, these platforms may correspond to a Software-as-a-Service (SaaS) platform. Within the context of this disclosure, a SaaS platform may refer to any kind of cloud-based software delivery model where service providers host software applications and make them accessible to users over the Internet. Instead of installing, managing, and maintaining the software locally, users access and utilize it through a web browser or thin client interface.

SaaS platforms offer a wide range of applications and services to meet various business needs such as customer relationship management (CRM), human resources management (HRM), project management, accounting, marketing automation, and more. In most scenarios, these platforms operate on a subscription basis, with customers paying recurring fees for software access and usage. SaaS platforms may provide several advantages including:

- Accessibility: Users may conveniently and securely access software and data from any device with an internet connection.
- Scalability: SaaS platforms may easily scale up or down to accommodate changing business requirements, providing flexibility and cost-effectiveness.
- Cost-effectiveness: By eliminating upfront investments in hardware and software, SaaS reduces initial costs. Customers may pay subscription fees based on their usage.
- Maintenance and Updates: Service providers handle software maintenance, updates, and security patches, relieving customers of these responsibilities.
- Collaboration: SaaS platforms often offer collaboration features, enabling multiple users to work together, share data, and communicate within the platform.
- Customization: SaaS platforms offer a high level of customization, allowing businesses to tailor the software to their specific needs. These applications can be seamlessly integrated with other business applications, particularly those offered by the same software provider. This integration enables smooth data flow and collaboration between different software systems, enhancing overall productivity and efficiency.

Some examples of SaaS platforms include Monday.com™ for project management, Salesforce™ for CRM, Slack™ for team collaboration, Dropbox™ for file hosting and sharing, Microsoft 365™ for productivity tools, Google Workspace™ apps for productivity and collaboration tools, Zendesk™ for customer support, HubSpot™ for marketing, and Shopify™ for e-commerce.

SaaS may include a plurality of SaaS Platform elements which may correspond to key components or building blocks of the platform that work together to deliver software applications and services over the Internet. Examples of such elements may include application software, infrastructure, or user interface. For example, a platform may offer project management capabilities to its users via dashboards, tables, text documents, a workflow manager or diverse applications offered on a marketplace, all of which constitute building blocks and therefore elements of the platform. Applications offered on the marketplace may be provided by developers external to the SaaS platform, accordingly they may utilize a user interface different from a generic user interface provided by the SaaS platform. In addition, each SaaS platform element may include a plurality of SaaS platform sub-elements which may refer to smaller components or features that are part of a larger element within a SaaS platform. These sub-elements may be designed to perform specific tasks or provide specialized functionality. The collaboration of multiple sub-elements aims to create a comprehensive and integrated SaaS solution. Examples of SaaS platform sub-element may include a widget associated with a dashboard, a column or a cell associated with a table, or a workflow block associated with a workflow manager.

FIG. 1 is a flowchart representing the organization of an exemplary SaaS/Project management platform 100. As illustrated, SaaS platform 100 includes a plurality of SaaS platform elements, namely Tables 102, Text documents 104, Dashboards 106, Marketplace 108 and a Workflow manager 110. Each of these SaaS platform elements includes a plurality of SaaS platform sub-elements respectively 102-1 through 102-N1 for Tables 102, 104-1 through 104-N2 for Text documents 104, 106-1 through 106-N3 for Dashboards 106, APP 108-1 through APP 108-N4 for Marketplace 108 and elements 110-1 through 101-N5 for Workflow Manager 110, wherein N1, N2, N3, N4 and N5 represent natural numbers.

Several entity or organizations accounts 112 (112-1 to 112-M, M being a natural number) may be affiliated with SaaS platform 100 and managed via a user manager. Each of these entity accounts may include at least one user account. For example, entity account 112-1 includes two user accounts 112-11, 112-12, entity account 112-2 three user accounts 112-21, 112-22, and 112-23, and entity account 112-M one user account 112-M1. Within the context of this disclosure, an entity account may refer to the central account managing the overall SaaS platform subscription, billing, and settings. Within this entity account, multiple user accounts may be created for different individuals within the entity/organization. User accounts may have their own login credentials, access privileges, and settings. The entity account owner or administrators may have control over access, permissions, and data segregation. User accounts may collaborate and share resources within the entity account while maintaining a personalized experience. Each of the user accounts 112 may include different permutations of SaaS platform elements such as a plurality of tables, text documents, dashboards, marketplace applications or workflows (not shown in FIG. 1) in association with the above-mentioned SaaS platform elements 102, 104, 106, 108, and 110. Accordingly, various SaaS platform elements or sub-elements may include metadata associated with users. Metadata associated with users may provide additional information and context about the users themselves, their profiles, roles, preferences, and interactions within the SaaS platform. Examples of metadata may include user profiles, roles and permissions, activity logs, usage indications, preferences and settings, user associations/relationships, user history or a combination thereof.

In addition, each of these user accounts may include one or more private applications (apps), that have been specifically designed and tailored to suit the needs of a user and that employ functionalities offered by or in association with SaaS platform 100 (via SaaS platform elements 102, 104, 106, 108, and 110 or their associated sub-elements). Private apps are exclusively accessible to users who are affiliated with an entity owning that app. These applications are not publicly available (i.e., not on the market) and may only be accessed by individuals who have specific authorization or are part of the designated user group. The privacy settings associated with these apps restrict access to ensure that only authorized users can use and interact with them. This level of privacy and restricted access helps maintain confidentiality, control, and security over the app's functionalities and data, limiting usage to approved individuals within the user account. Centralization of user access and authorization management is performed by a permission manager 114 enabling administrators to control and regulate user privileges, ensuring that users have appropriate levels of access to data, features, and resources based on their roles and responsibilities. Permissions Manager 114 may offer granular control, and role-based access, facilitating efficient user management, collaboration, and compliance monitoring. Its objective is to enhance data security, streamline user administration, and maintain proper governance within the SaaS platform.

Companies and organizations may seek to create private applications for use with a Project Management or a Software-as-a-Service (SaaS) platform for various reasons. Firstly, private application development allows businesses to meticulously tailor the functionality and user experience of the SaaS platform, aligning it precisely to their distinct needs. This involves the ability to augment, modify or extend the functionality and interfaces of the SaaS platform, shaping a bespoke solution that aligns with their unique business processes and requirements. This stems from the fact that businesses often have specific requirements that go beyond the capabilities offered by the SaaS platform's standard functionalities. Secondly, the creation of private applications facilitates smooth integration between the SaaS platform and other internal systems or third-party applications used by the business. This integration results in the seamless exchange of data and a high level of overall operational efficiency by harmonizing various tools and services in a cohesive ecosystem. In addition, stringent data security and compliance requirements are prompting companies to embark on the development of private applications. This route gives companies greater control over their data and allows them to implement additional security measures tailored to their specific needs. By adhering to internal policies and sector-specific regulations, companies can ensure that sensitive information is handled and stored appropriately. Creating private applications also gives companies a competitive edge. It gives them the opportunity to design unique features or functionality that are not available in off-the-shelf solutions, giving them a distinct advantage over their competitors. In addition, private applications have the ability to improve internal workflows, leading to increased productivity and customer satisfaction. adaptability required to meet a company's changing needs over time. As businesses grow and evolve, these applications can be appropriately modified and extended to meet increased demand, integrate additional users, and respond to changing requirements.

However, companies encounter various challenges when they endeavor to develop and deploy new applications to meet their current requirements. One significant hurdle is the time-consuming nature of building an application infrastructure. This encompasses tasks such as developing source code and establishing a secure code repository. These processes require substantial time, effort, and expertise to ensure the application's robustness and reliability. Moreover, companies need to address the complexities associated with utilizing a third-party application provider. They must diligently evaluate whether the application aligns with their privacy and security policies. This entails verifying that the provider complies with stringent standards and regulations to safeguard sensitive data. Additionally, integrating newly developed applications with existing systems poses a significant challenge. This process can be intricate and prone to potential security breaches if not executed properly. Companies must ensure seamless data flow and connectivity while mitigating risks associated with unauthorized access or data leaks.

Figure 2:
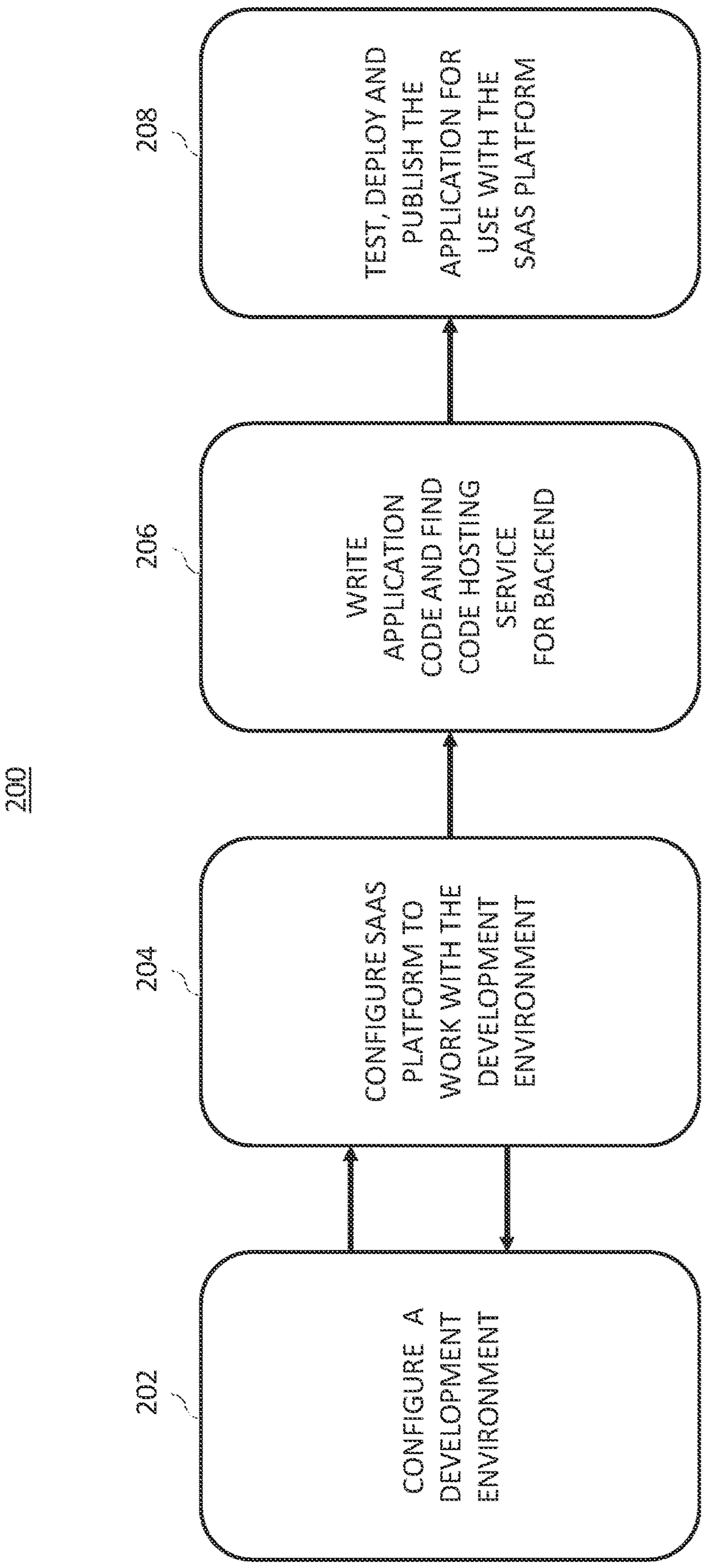
FIG. 2, is a flowchart of a conventional process for developing an application for use with a SaaS platform.

FIG. 2. illustrates a conventional process 200 that may be followed by a developer working for a company to develop a private application for use with a SaaS platform such as SaaS platform 100 illustrated in FIG. 1. The process consists of four main steps. At step 202 the developer sets up the development environment necessary to start creating and building the private application. This may involve installing the required software tools, frameworks, and libraries. At step 204 the developer configures the selected SaaS platform, such as SaaS platform 100, to ensure compatibility with the development environment. This step involves making the necessary configurations and settings to integrate the development environment with the SaaS platform. Achieving compatibility between the development environment and the SaaS platform may require iterative communication and collaboration between the developer and the SaaS platform provider and may be a time-consuming process. For example, compatibility may be achieved by following public documentation provided by the SaaS platform, installing a software development kit (SDK) provided by the platform or a combination thereof. Step 206 corresponds to the core phase of application development. The developer starts creating the private application by writing the application code and implementing the desired functionality, user interfaces, and other components required for the application. Additionally, in step 206, the developer also needs to find a code hosting service, i.e., a provider of computing resources that allows developers to store and manage their application code, enabling version control and collaboration. Alternatively, the developer may decide to store and manage the application by its own means, i.e., privately. This solution may generate significant costs and add complexity to the overall process, as the developer will have to set-up their own infrastructure to handle the computing resources (e.g., servers, storage devices, networking equipment or other hardware components). Finally, at step 208, the developer tests the private application to identify and fix any issues or bugs. Once the application is stable and functional, it is capable of being deployed and published for use with the SaaS platform (with or without a review by the SaaS platform). This may involve uploading the application code to a hosting service (server or serverless environment) or directly deploying it on the SaaS platform. It is to be appreciated that the provided process 200 is just an example, and additional steps may be required based on the specific requirements of the private application and the SaaS platform. These additional steps could include security testing, performance optimization, user acceptance testing, and other quality assurance measures to ensure the successful development and implementation of the private application. Portions of process 200 may need to be repeated every time an updated version of the private application is necessary.

As mentioned above, in some cases, the code hosting service may be provided by the company itself deploying servers capable of hosting and running the applications. However, this option is not available to every company and requires a certain amount of expertise and a relatively large budget. In alternative scenarios, the code hosting services may take the form of a serverless environment. Within the context of this disclosure, a serverless environment may refer to any kind of cloud computing model in which a cloud provider dynamically manages and allocates computing resources for running applications, without a user needing to provision (set up and make available for use) or manage servers directly. In a serverless environment, developers may concentrate solely on writing and deploying code, without worrying about managing servers, scaling the infrastructure or allocating resources.

In this model, the cloud provider provisions and scales the resources needed to process incoming requests and execute application code. The provision may be made automatically in accordance with the demand for such resources, manually in accordance with predetermined requirements from the provider of the code, or a combination of both (automatic scale of predefined resources in accordance with demand—for example—opening a new instance once the last one had 100 concurrent users). The application code may be broken down into small individual functions, commonly known as serverless functions, tied together. These functions may be event-driven and triggered by specific events, such as HTTP requests, database changes or scheduled tasks. Examples of serverless environments include AWS Lambda™, Microsoft Azure™, or Google Cloud Functions™.

While the utilization of a serverless environment may appear relatively straightforward, it gives rise to privacy concerns that necessitate thorough privacy checks. These checks aim to ensure that the servers within the external serverless environment adhere to the privacy and security policies set forth by the company, to verify how the data is handled and used within the serverless environment, and to ascertain that the servers themselves remain uncompromised. When adopting a serverless environment, companies rely on external providers to manage and maintain the underlying infrastructure. While this offers benefits such as scalability and reduced operational overhead, it introduces potential privacy risks. Moreover, privacy issues may arise when the policies of a serverless environment change over time. A selected serverless environment that initially aligned with a company's privacy and security policies may no longer be suitable or in compliance with those policies as the environment evolves. Serverless environments are managed by external providers, and they have control over the infrastructure and its policies. As these providers update their systems, introduce new features, or modify their policies, it is possible that the privacy and security standards may change, potentially conflicting with a company's requirements. To overcome this problem, companies need to maintain an ongoing monitoring and evaluation process for the serverless environment they rely on, which may take time and effort and may not ultimately be a viable solution if the two sets of policies become incompatible and other options need to be explored.

Given these obstacles, there is an increasing demand for tools that provide companies with the ability to develop, host, and run applications without relying on their own servers or external serverless environments. These tools should offer efficient mechanisms for writing secure, enterprise-level, server-side code, enabling companies to maintain control over their applications and data. Integration between a private application and a SaaS platform, as represented by steps 202 and 204, can be a complex and daunting process. Ensuring compatibility between the private application and the SaaS platform requires careful consideration and attention to detail. Companies must assess the compatibility of their private application with the APIs, data structures, and functionality provided by the SaaS platform. This involves understanding the integration points and requirements specified by the SaaS platform and ensuring that the private application meets those standards. Furthermore, as a SaaS platform involves the processing of personal data on behalf of its users, it acts as a data processor under some regulations and laws such as the General Data Protection Regulation (GDPR). GDPR refers to a comprehensive data protection and privacy law that was implemented by the European Union (EU) in 2018. It imposes specific obligations on data processors to ensure the privacy and security of the processed data. This includes implementing appropriate technical and organizational measures to protect personal data, ensuring lawful and transparent processing, and complying with data subject rights. when integrating a private application with a SaaS platform. When integrating a private application with a SaaS platform, the developer should consider that the application conform to the same or similar standards of data protection and privacy requirements as the SaaS platform, in order to ensure that the privacy of the processed data is maintained. The solutions described in the present disclosure aim to overcome the above-mentioned issues.

Figure 3:
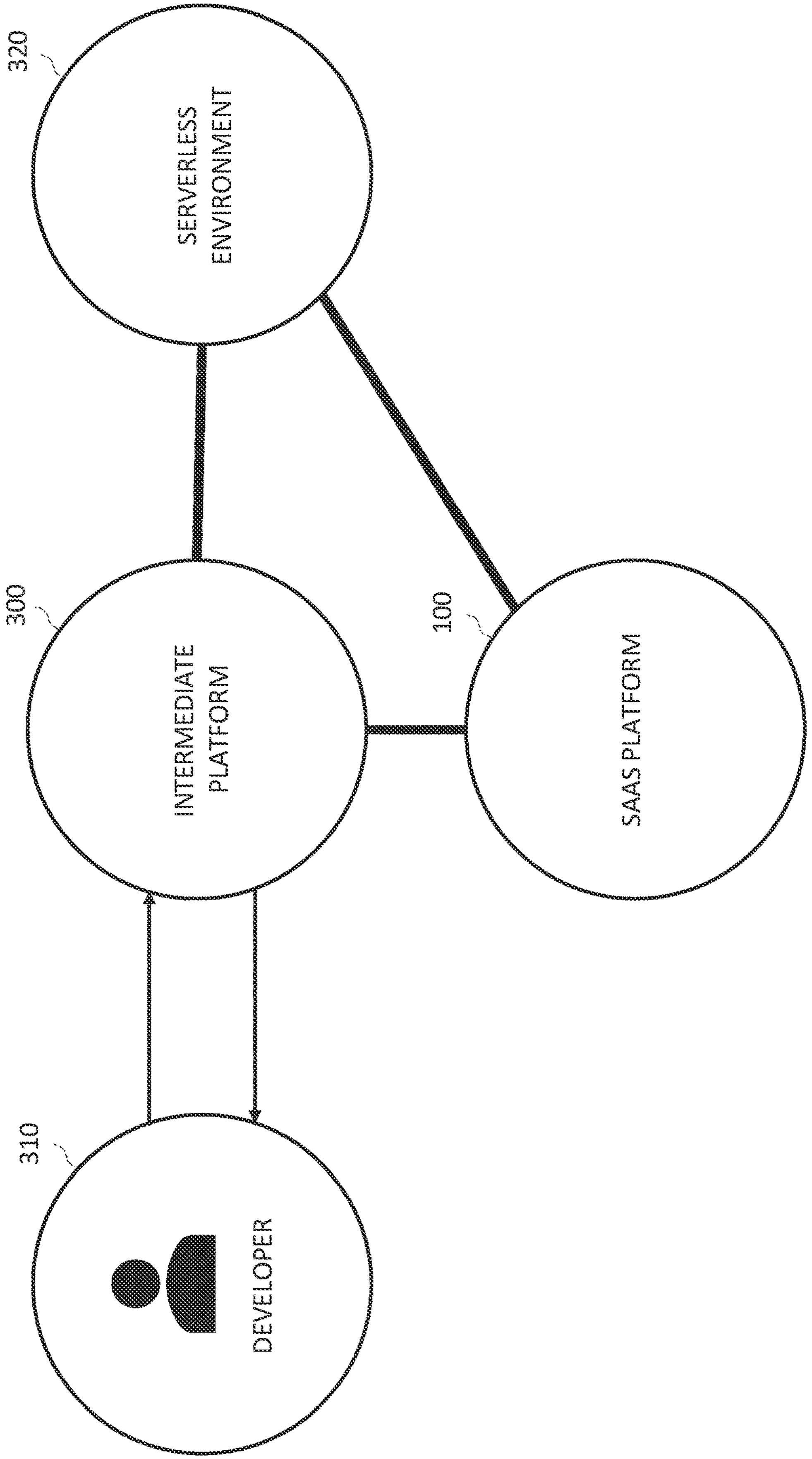
FIG. 3 is an organigram presenting the relationship between an intermediate platform, a SaaS platform, a serverless environment and a developer, consistent with the disclosed embodiments.

In accordance with the disclosed embodiments, an intermediate platform associated to the SaaS platform serves as a mediator, facilitating communication between a developer, the SaaS platform, and a serverless environment. This intermediate platform streamlines the process of developing and implementing private applications. In this configuration, it is to be appreciated that the serverless environment operates as an external entity separate from the SaaS platform. Despite its independence, the serverless environment has the capability to exchange data and communicate with the SaaS platform as necessary and maintains a cooperative relationship with the SaaS platform. This interaction allows for seamless integration and collaboration between the serverless environment and the SaaS platform, enabling the flow of data and facilitating any required functionalities or services. FIG. 3 is a flowchart illustrating the different above-mentioned parties involved in the development of a private application. Intermediate platform 300 acts as a bridge, connecting the developer 310 with the SaaS platform 100 and the serverless environment 320. It provides a unified interface and set of tools that enable developer 310 to seamlessly interact with both SaaS platform 100 and serverless environment 320 during the development and implementation phases of a private application. In some instances, a developer may not need to know that the SaaS platform is not the owner of the Serverless environment (e.g., the SaaS platform and the Serverless environment may be managed and/or administrated independently). A developer may write a code and specify one or more associated requirements without having to worry about where and how these requirements may be provided. Serverless environment 320, being external to SaaS platform 100, may operate in a way that developer 310 is not directly aware of its presence or collaboration with SaaS platform 100. From the perspective of developer 310, it may appear as if the application code is hosted and executed directly by SaaS platform 100 itself. Developer 310 primarily interacts with SaaS platform 100 and intermediate platform 300, while the presence of serverless environment 320 and intricate details of how serverless environment 320 integrates and operates behind the scenes remain unknown.

It is to be appreciated that the collaboration between SaaS platform 100, intermediate platform 300, and serverless environment 320 may involve only a specific portion of serverless environment's 320 servers. Not all servers within serverless environment 320 are necessarily dedicated to this collaboration. Instead, a subset of servers within serverless environment 320 is allocated and utilized for the specific purposes of the collaboration with SaaS platform 100 and intermediate platform 300. Additionally, it is worth noting that whilst a single body representing serverless environment 320 is presented in FIG. 3, serverless environment 320 may consist of a plurality of distinct cloud providers or a plurality of portions of distinct cloud providers. This means that serverless environment 320 may be composed of multiple cloud providers, each contributing a portion of the overall resources. This approach allows for leveraging the strengths and capabilities of different cloud providers while benefiting from their respective offerings, such as geographic availability, pricing models, or specific services. By utilizing multiple cloud providers within serverless environment 320, the collaboration between SaaS platform 100, the intermediate platform 300, and serverless environment 320 may take advantage of a diverse and distributed infrastructure to meet various requirements and enhance overall performance and scalability.

Serverless environment 320 or more specifically the portion of servers of serverless environment 320 dedicated to the collaboration with SaaS platform 100, may adhere to the same privacy and security policies as SaaS platform 100 (serverless environment 320 infrastructure maintains the same level of privacy and security as SaaS platform 100 itself). This association helps mitigate potential privacy issues that may arise. By aligning the privacy and security policies of serverless environment 320 with those of SaaS platform 100, companies may ensure consistency in their data handling and protection practices. This minimizes the risk of privacy breaches or unauthorized access to sensitive information and eliminates the need for additional privacy checks specifically related to the serverless environment. Furthermore, by adhering to the same policies, serverless environment 320 may be considered an extension of the security framework of SaaS platform 100. This cohesive approach enhances data protection and reinforces privacy measures throughout the entire ecosystem. It is to be appreciated that when a company or a developer associated with the company intends to update their privacy and security policies through settings related to SaaS platform 100, these updates may be automatically propagated to serverless environment 320. By establishing a synchronized relationship between the privacy and security settings of the SaaS platform and the serverless environment, any changes made to the policies within the SaaS platform are automatically reflected and replicated within the serverless environment.

By leveraging the capabilities of intermediate platform 300, developer 310 may access the necessary resources and functionalities of SaaS platform 100 and serverless environment 320 without having to manage the intricacies of the underlying integration themselves. This simplifies the development process and allows developers to focus on creating private applications that meet the specific requirements of the company. Referring to FIG. 2, process 200 is therefore simplified, steps 202 through 206 are combined into a single task for the developer, namely writing application code, and step 208 is minimized as validation procedures to ensure the compatibility and reliability of the integration between the private application and SaaS platform 100 are no longer required.

Intermediate platform 300 may assist in coordinating and managing the communication flow between developer 310, SaaS platform 100, and serverless environment 320. It handles tasks such as authentication (via a user account of the SaaS platform—single authentication mechanism), data synchronization, and error handling, ensuring smooth and reliable interactions between the different components involved. Moreover, in some embodiments intermediate platform 300 may provide additional features and services to further enhance the development and implementation of private applications. These may include pre-built templates, code libraries, and developer application framework frameworks that expedite the creation of private applications. One notable advantage of these features is the expanded audience they bring to the application development process. By providing pre-built templates and code libraries, the intermediate platform enables developers to leverage existing resources and functionalities, reducing the need for writing extensive code from scratch. This transition from high code to low code development allows for a broader range of individuals, including citizen developers, to actively participate and contribute to the application creation process. With the availability of these tools, less technical users can more easily engage in application development, as they can utilize the pre-existing components and frameworks provided by the intermediate platform. This participation from non-technical individuals promotes collaboration and encourages a diverse range of perspectives in the creation of applications. Furthermore, intermediate platform 300 may also offer monitoring and analytics capabilities to track the performance and usage of private applications.

Processes outlined in this section regarding the development and implementation of a private application for use with SaaS platform 100 are equally applicable to the development and implementation of a public application for use with the same platform. In this scenario, the application is not tailored to meet the specific needs of a particular company but rather aims to provide additional functionalities beyond those already available in SaaS platform 100. A developer creating a public application for SaaS platform 100 focuses on enhancing the platform's capabilities and expanding its features to cater to a broader user base. This public application may offer new functionalities, improved user experiences, specialized tools, or integrations with other systems that complement the existing offerings of the SaaS platform. Once the public application is developed, the developer may choose to publish it in marketplace 108 associated with the SaaS platform 100. From that centralized node, the public application may be distributed to the user community of SaaS platform 100. The subsequent sections delve into additional aspects associated with the aforementioned solution. It focuses on digital systems and methods pertaining to an intermediate platform that facilitates the development and implementation of applications, encompassing both private and public, for use with a SaaS platform in conjunction with a serverless environment external to the SaaS platform.

Developing dedicated applications for incorporation in conjunction with additional applications in a SaaS platform (e.g., through a marketplace feature), may present one or more hurdles for software developers. For example, releasing updated versions of a software application may require performing repeated compliance checks for privacy, security, and/or performance. As another example, finding and/or maintaining a secure repository for storing code of a software application may be time consuming and/or may lack security compliance. As a further example, different software applications may require distinct verification and/or authentication protocols, posing complications when attempting to interconnect different software applications, such as exposing security violations. Disclosed embodiments may alleviate such hurdles by providing developers with preconfigured serverless environment adapted for use with the SaaS platform. In some embodiments, an intermediate platform may be provided to mediate between a software developer and a serverless environment and adapt the serverless environment to meet one or more requirements to ensure proper code execution. Instead of uploading a code for a software application directly to a serverless environment, the developer may send the code to the intermediate platform. The intermediate platform may adapt the serverless environment to incorporate the software application in the SaaS platform based on configuration information describing how the code should operate. In some embodiments, the intermediate platform may use default configuration information (e.g., provided by the intermediate platform and unrelated to the developer). In some embodiments, intermediate platform may use configuration information received from the developer. In some embodiments, the intermediate platform may use a combination of default configuration information configuration information received from the developer. The intermediate platform may use the configuration information to configure the serverless environment for executing the code (e.g. based on a first set of rules), and to actuate triggers and corresponding actions during code execution in the configured serverless environment (e.g., based on a second set of rules), to thereby transform the application code into a functional immutable image.

Some embodiments involve running applications in a serverless environment. An application (e.g., a software application) may refer to a computer program or portion thereof (e.g., executable computer code instructions) designed to perform one or more tasks for providing functionality to users. A software application may be configured for a variety of electronic devices, such as mobile and/or handheld devices, wearable devices, Internet-of-Things (IOT) devices, desktop computers, tablets, embedded and/or distributed systems, and/or any other electronic computing device. A software application may be a standalone program, or a part of a broader software ecosystem configured to interact with other software applications, databases, and/or online services. A software application may include a user-interface enabling users to interact with and access features and functionalities of the software application (e.g., by providing inputs and receiving outputs). Some examples of software applications may include word processors, spreadsheets, media players, accounting software, photo editing packages, and social media applications, scheduling and workflow management software, and/or any other computerized functionality. In some cases, a software application (e.g., a child application) may be configured to be incorporated within a different application (e.g., a parent application), for example, to provide additional features, functionalities (resources) and user-interfaces (design) for the parent application. Some examples of incorporated applications may include spell checkers within word processors, graph maker within spreadsheets, an audio editor within media players, a personalized tax calculation feature within accounting software, AI capabilities within a photo editing package. An incorporated (e.g., child) application may be developed by a developer other than a developer of the (e.g., parent) application to which it is incorporated into (e.g., the spell checker may be developed by a first developer and the word processor into which the spell checker is incorporated may be developed by a second developer).

Running an application refers to launching computer code (e.g., from a file containing software instructions). The code may be launched on computer hardware including at least one processor and a memory, and/or accessing a file containing software instructions via a portable memory (e.g., a USB drive and/or flash memory). Running an application may also involve the at least one processor executing the software instructions via an operating system that manages system resources, such as memory management, processing capacity (e.g., CPU time), and file access. In some embodiments, running an application refer to running an application as an image (e.g., an immutable image) inside a container. A serverless environment (as described and exemplified elsewhere in this disclosure) is a cloud computing model where developers can build and run applications without the need to manage or provision the underlying infrastructure, servers, or hardware resources directly. In a serverless environment, the cloud provider takes care of the server management and resource allocation, allowing developers to focus on writing and deploying their application code. A serverless environment may, for example, include a plurality of connected computing devices (e.g., each including at least one processor) and one or more memories accessible via a communications network for providing a plurality of users with cloud computing resources. The plurality of connected computing devices may be configured to execute software to manage cloud infrastructure for running a software application. Such a software application may be deployed inside a container, causing the plurality of connected computing devices to automatically allocate cloud resources for launching a plurality of instances of the software application on demand. For example, the plurality of connected computing devices of a serverless environment may execute software to manage operating systems, file systems, security patches, load balancing, capacity management, scaling, logging, monitoring, and/or any other task necessary or providing a serverless environment. Running an application in a serverless environment may involve the launching of computer code in a serverless environment, as described above. In some embodiments, running an application in a serverless environment involves using a container orchestration system provided by a cloud platform and configured to automatically deploy, scale, update, and/or manage containerized applications (e.g., Kubernetes® available on Google Cloud Platform®). A code may be launched, for example, by at least one processor performing one or more of the operations described herein.

Some embodiments involve configuring a serverless environment by integrating a set of rules into the serverless environment, the set of rules including at least one trigger and at least one trigger-responsive action for use in conjunction with a SaaS platform. Configuring a serverless environment (e.g., by at least one processor of an intermediate environment, either directly or indirectly) may involve one or more of: defining one or more hardware and/or software parameter settings (e.g., I/O port identifiers, memory locations, communication, security, privacy, networking protocols, and/or processing priorities); installing and/or invoking one or more software applications (e.g., operating systems) on a processing device; establishing one or more connections (e.g., networked connections) with one or more peripheral and/or remote devices, and/or performing any other action necessary to enable at least one processor to perform operations in a serverless environment. Configuring a serverless environment may additionally or alternatively include defining one or more resources and/or services (e.g., specific functions, application programming interfaces or APIs, databases, storage devices, and/or event triggers), deployment parameters (e.g., a specific deployment package and/or runtime options), and/or scaling parameters (e.g., limits on a number of instances of functions and/or services that may be provisioned, and/or expected usage and/or traffic). Configuring a serverless environment may additionally or alternatively include setting permissions, security, and/or access controls, e.g., by defining roles and/or policies for functions and services, and permissible interactions with additional resources. Configuring a serverless environment may additionally or alternatively include defining one or more events and/or triggers (e.g., in association with one or more rules) for invoking one or more functions and/or services. Such events and/or triggers may include, for example, HTTP requests, message queue events, database changes, file uploads, scheduled events, and/or custom (e.g., bespoke) events. Configuring a serverless environment may additionally or alternatively include defining one or more environment variables (e.g., how a process may behave on a specific computing device). Configuring a serverless environment may additionally or alternatively include establishing monitoring and/or logging streams for surveillance of usage patterns, and alerts for metrics (e.g., relating to function invocations, execution duration, error rates, and resource utilization). Configuring a serverless environment may additionally or alternatively include integration with additional resources external to a serverless environment, (e.g., databases, message queues, storage services, and/or third-party APIs) to enable communication there between. Configuring a serverless environment may additionally or alternatively include defining settings associated with continuous integration and/or deployment of a software application, e.g., automated deployment and/or updates, performance optimization (e.g., based on analyzing resource usage, and/or best practices). At least one processor may group these and any other parameters and/or settings associated with tailoring a serverless environment for one or more software applications and/or hardware devices under a set of rules and store the set of rules in at least one memory, e.g., for subsequent access and/or reference and/or activation by a configuration information. Some examples of software tools that may be used to configure a serverless environment may include Pulumi® or Terraform®.

A set of rules refers to a collection or system of guidelines, principles, or instructions that govern or regulate specific actions, behaviors, procedures, or interactions. For example, a set of rules may include a set of logical principles and/or inferences to guide logical reasoning and/or deduction, and may define patterns of reasoning for drawing logical conclusions based on information and/or known premises. A set of rules may conform with formal logic (e.g., Boolean logic), fuzzy logic (e.g., by adding a degree of uncertainty to formal logic), propositional logic and/or informal logic (e.g., used in artificial intelligence systems), and/or any other logical system. A software application may define a set of rules via program code instructions executable via at least one processor.

In some embodiments, a set of rules may be associated with an intermediate platform configured to mediate between a developer of a software application and a serverless environment configured to host the software application. The configuration information (e.g. provided by the developer) may indicate to the intermediate platform which rules to enforce and under what circumstances. In some embodiments, the set of rules may include two types of rules. A first type of rules may be associated with a structure and/or an operating system of a serverless environment (e.g., for handling storage management, compartmentalization, resource management, and/or tracking and logging services). The first type of rules may be enforced continually (e.g., repeatedly) throughout a code execution, for example to handle triggers during a code execution by invoking corresponding trigger-responsive actions.

A second type of rules (e.g., single activation rule) may be triggered upon receiving a code (e.g. and optionally configuration information) and may be used to form an immutable image from the received code. For instance, the second type of rules may use the configuration information to select which of the first type of rules may be enforced during subsequent code execution such that actuated instances of the immutable image execute as designed by the developer. As an example, a rule of the second type may establish a connection to a firewall such that subsequent communications to and from actuated instances of a code are channeled through the firewall. As another example, a rule of the second type may designate a whitelist and/or blacklist for referencing by actuated instances of the immutable image, allowing to update the whitelist and/or blacklist without requiring changes to the immutable image. As a further example, rules of the second type may indicate which program may be activated to build an immutable image for a code, and which programs to connect thereto.

For example, the at least one processor may invoke one or more rules (e.g., of the first type) to permit and/or restrict access to one or more resources and/or services, maintain compatibility with additional cloud resources and/or services, and/or designate specific network, security, and/or privacy protocols in response to an access request. As another example, the at least one processor may invoke a rule to install updates, backups, and/or malware scans based on a scheduled time and/or date. As a further example, the at least one processor may invoke one or more rules for managing computing resources in response to traffic and/or load level notifications. In some embodiments, one or more rules may indicate one or more functions, applications, processes, and/or services that may be activated when forming an image from a code and/or connected to the formed image. A rule may occur once or may be maintained upon its activation.

In some cases, similar rules may be used concurrently. For example, a small application (e.g., requiring an allocation of resources below a threshold level) may trigger a single resource allocation rule and a second larger application (e.g., requiring an allocation of resources above a threshold level) may trigger two or more resource allocation rules). In some cases, a rule may be used multiple times by the same application. For instance, a small application may trigger a particular resource allocation rule once, and a second larger application may trigger the (e.g., same) particular resource allocation rule twice or more. In some cases, rules may be triggered only once per application. For example, one or more rules may be activated (e.g., once) to form an image from the code. In some cases, the infrastructure associated rules may be applied without receipt of information from the app developer (e.g., automatically). In such cases, the set of rules may include a rule for assessing required infrastructure resources, either by performing a single check and/or by monitoring (e.g. polling) the app periodically. In response to the assessment, at least one processor may modify, e.g., by increasing or decreasing, the resources allocated for the app.

Integrating a set of rules into the serverless environment may involve defining a set of rules as program code instructions, storing the program code instructions inside an electronic file on a memory of a serverless environment, and/or causing at least one processor associated with the serverless environment to access the electronic file and execute the program code instructions to thereby enforce the set of rules in a serverless environment. Integrating a set of rules into a serverless environment may additionally or alternatively involve checking for, and/or maintaining compatibility and/ or consistency with one or more additional sets of rules associated with a serverless environment.

A trigger refers to a specific event or condition that causes an action, set of actions, and/or a workflow of actions to occur (e.g., according to one or more rules). A workflow of actions may be associated with a schedule coordinating multiple (e.g., complex) conditions, one or more intermediate triggers, delays, and/or waiting phases that may be scheduled so that some actions may be completed before other actions may be initiated. As another example, a trigger may include an input of a data item, occurrence of an event, and/or occurrence of a condition (e.g., a change of state) that may cause the at least one processor to execute one or more actions according to a rule and/or a set of rules. Data items that may trigger the at least one processor to execute an action may include a user input, and/or an input from another computing device, process, and/or a software application. Some exemplary events that may trigger the at least one processor to execute an action may include input/output (I/O) events, synchronous and/or asynchronous events, hardware and/or software events, user events, system events, time-based events, network events, file system events, and/or application-specific events. An event may cause a change of state of a computer system (e.g., defined via a finite-state machine), which may cause the at least one processor to perform an action in compliance with a rule or set of rules. In some embodiments, an operating system configured with a computing device may include a handler (e.g., an event handler) for processing triggers and invoking corresponding actions. In some instances, a trigger may be actuated in response to performance of an action (or a preparation to perform an action), an execution of an application, receipt of a code (e.g., for a new or an updated application), and/or receipt of (e.g., new or updated) configuration information for using with a running instance of an application.

A set of rules including at least one trigger refers to a trigger being part of a set of rules. For example, at least one trigger definition may be part of a set of rules, allowing the at least one processor to identify the at least one trigger upon occurrence of the at least one trigger. For example, a definition for a trigger may include one or more identifiers indicating a source of the trigger, associated hardware components (e.g., memory buffers, memory locations, processes, queues, stacks, ports, auxiliary and/or peripheral devices) and/or software applications affected by the trigger and/or a response thereto, a trigger type, a priority (e.g., indicating an order for responding to a particular trigger), a time-frame for responding to a trigger, a responsive action corresponding to a trigger, and/or any other information associated with a trigger.

A trigger-responsive action refers to an operation or a task that is activated or initiated in response to a trigger event or condition. A trigger-responsive action may be defined by or included in one or more program code instructions that may be executed by the at least one processor upon detection of a specific trigger in compliance with an associated rule or set of rules. Some non-limiting examples of trigger-responsive actions may include short-term actions such as retrieval and/or transmission of data, a single invocation of a software application (e.g., to install a software update and/or to check for malware), and/or turning on/off an electronic device. Some additional non-limiting examples of, trigger-responsive actions may include longer-term actions, such as maintaining a synchronization of a software application over time with another software application, continual monitoring of resources, communication, and/or log records. The set of rules may be configured or provided for use in conjunction with a SaaS platform. A SaaS platform refers to a cloud-based software delivery model where software applications are provided over the internet as a service. In a SaaS platform, the software application may be hosted and managed by a service provider, and users access the platform through web browsers or dedicated client applications.

By way of a non-limiting example, in FIG. 3, the at least one processor (e.g., processing circuitry 2310 of FIG. 23) may configure serverless environment 320 by integrating a set of rules into serverless environment 320. The set of rules may include at least one trigger and at least one trigger-responsive action for use in conjunction with SaaS platform 100. For instance, the set of rules may define a request to access repository 2430-1 via DBMS 2435-1 (see FIG. 24) as a trigger, and invocation of a security protocol prior to granting access to repository 2430-1 via DBMS 2435-1 as a trigger-responsive action for use in conjunction with SaaS platform 100. The at least one processor 2310 may store the set of rules in memory 2320 and/or in storage 2330 of serverless environment 320. Upon detecting a request to access repository 2430-1 via DBMS 2435-1, the at least one processor 2310 may invoke the security protocol and condition access on presentation of a valid credential (e.g., a time-based one-time password or TOTP) according to the set of rules.

In some disclosed embodiments, the set of rules includes configuring a predetermined infrastructure using the serverless environment computing resources. A predetermined infrastructure refers to a pre-defined set of hardware, software, and/or networking components that are established and provisioned in advance. A predetermined infrastructure may include, for example, computing power, network resources, storage resources, virtualization resources, user interface settings, backup and synchronization settings, settings and/or resources for integration with other applications and/or processes in a serverless infrastructure, resources associated with implementing privacy, and/or security policies, and/or any other hardware and/or software resource required for running applications in a serverless environment. Configuring a predetermined infrastructure using the serverless computing resources may include designating (e.g., in advance, prior to deployment of a software application) one or more hardware and/or software computing resources, architectures and/or models, and/or scaling of serverless infrastructure for running an application in a serverless environment. For example, enforcement of the set of rules may cause at least one processor to impose one or more restrictions and/or permissions associated with accessing and/or utilizing one or more serverless environment computing resources. As another example, enforcement of the set of rules may cause at least one processor to scale up or scale down use of the computing resources (e.g., number of processors, amount of memory, bandwidth allocated for transferring data or information) according to one or more constraints.

In some disclosed embodiments, the set of rules includes providing a remote server with indications on the usage of the serverless environment for billing processes. A remote server refers to a computer system or other device, and/or a dedicated running application in a serverless environment that handle tasks and/or store data in a different physical location or network than the user's local machine. Billing processes refers to operations that assess or account for amounts of money owed. For example, a billing process may refer to operations performed to assess an amount of money owed by or to a customer in connection with the customer's use of services and/or resources provided by a serverless environment. Such operations may include, for example, receiving information associated with resource usage in a serverless environment and associated billing rates, computing an associated cost, generating an invoice, and sending the invoice to a customer. Such operations may additionally or alternatively include, for example, computing an amount of a refund or credit due to the customer and providing the refund or credit to the customer. Indications may include one or more data items showing, demonstrating, and/or otherwise associated with one or more phenomena. Indications on the usage of a serverless environment for billing processes may include signs, signals, or pieces of information that provides evidence, guidance, or insight into usage of the serverless environment. For example, an indication may reflect a quantity of one or more utilized serverless environment computing resources during a billing time period, a timestamp associated with each resource usage, a state of a serverless environment during each resource usage (e.g., traffic and/or available capacity), a billing rate for each resource usage, a specific address and/or customer identity, and/or any other information that may affect billing in a serverless environment. For example, a billing rate may be affected by a type of computing resource (e.g., CPU, memory, and/or network usage), a usage time, a network traffic level, a resource capacity level, a specific address and/or customer identifier (e.g., associated with a discount/premium billing rate). At least one processor may record indications on the usage of a serverless environment for billing processes in one or more logs (e.g., data access, communication, system, and/or network logs). Enforcement of the set of rules may cause at least one processor to transmit the one or more logs to a remote server (e.g., external to the serverless environment) via a communications network. In some embodiments, an artificial intelligence engine may be used to perform billing processes. For instance, an artificial intelligence engine may include a neural network to perform classification of differing types of resource utilization, user accounts, and/or billing rates. As another example, an artificial intelligence engine may allow for predicting future patterns of resource consumption based on a history.

In some disclosed embodiments, the indications of usage of the serverless environment include indications of time and number of instances operating concurrently on the serverless environment. An indications of time refers to one or more signals, cues, or measurements that help us understand or track the passage of time. An indication of time may include one or more time stamps (e.g., including a time of day and date), and/or a duration (e.g., timespan between two instances in time). A number of instances operating concurrently on a serverless environment may refer to a quantity of simultaneous (e.g., parallel) invocations and/or instantiations of a software application and/or portions of a software application on a serverless environment. For example, the concurrent instances may reflect a demand for an aggregate amount of computing resources. For example, a plurality of users may utilize a software application during overlapping time periods, causing a plurality of instances of the software application to operate concurrently in a serverless environment. As another example, the same user may open more than one instance of a software application during overlapping time periods, causing a plurality of instances of the software application to operate concurrently in the serverless environment. The plurality of instances may require allocation and usage of a proportional amount of CPU time, memory space, and network capacity. The indications may provide information regarding an amount of time, an instance of time, and/or a total number of different instances of one or more software applications that may be executed during that amount of time and/or at that instance of time.

Figure 24:
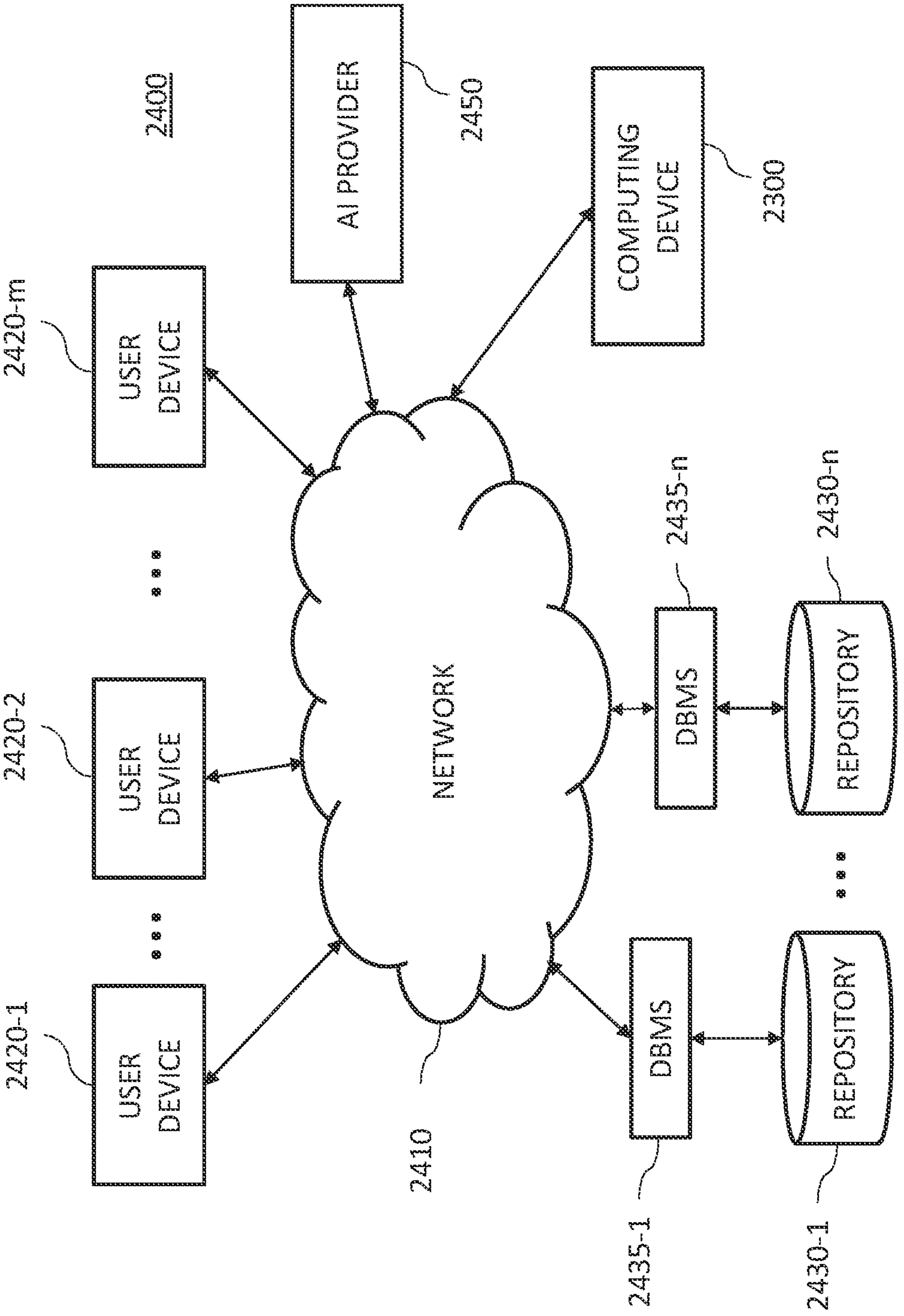
FIG. 24 is a block diagram of an exemplary computing architecture for collaborative work systems, consistent with some embodiments of the present disclosure.

By way of a non-limiting example, in FIG. 24, the set of rules may include providing a remote server (e.g., AI agent provider 2450) with indications on usage of serverless environment 320 (see FIG. 3) for billing processes via network 2410. For instance, AI agent provider 2450 may use the indications of usage to generate billing invoices to send to a customer of serverless environment 320, such as developer 310 and/or user devices 2420-1 to 2420-*m*. In some embodiments, the indications of usage of serverless environment 320 include indications of time and number of instances operating concurrently on the serverless environment. For instance, each of user devices 2420-1 to 2420-*m* may be associated with a different concurrently actuated instance of a software application operating on serverless environment 320, each instance associated with a differing consumption level of computing resources for a differing time duration. The at least one processor may provide indications for the number of actuated instances, the associated consumption levels and time durations for each of user devices 2420-1 to 2420-*m* to AI agent provider 2450. AI agent provider 2450 may use the indications to generate billing invoices for each actuated instance of the software application.

In some disclosed embodiments, the set of rules includes a plurality of similar rules that provide increasing levels of computing resources. Similar rules may refer to comparable and/or related rules, which may be imposed under comparable and/or related circumstances and may cause comparable and/or related actions. The differences between the similar rules may be that they provide increasing levels of computing resources, meaning that they designate, request, or allocate additional CPU usage, memory, cloud computing services, processing power, middleware, virtualization technology, and/or any other allocation associated with accomplishing a task, running an application, and/or otherwise processing information. For example, increasing levels of computing resources may permit scaling a deployment of a software application dynamically in proportion to demand. In some embodiments, the increasing levels of computing resources may be provided in proportion to increasing levels of actuated instances of a software application. For example, a first rule may cause at least one processor to allocate a first amount of CPU time and memory space in response to a first group of actuated instances of a software application, and a second rule, similar to the first rule, may cause the at least one processor to ramp up the allocation of resources to a second amount of CPU time and memory space in response to an additional group of concurrent actuated instance of the software application. As another example, a third rule, similar to the first and/or second rule, may cause the at least one processor to ramp down the allocation of resources to a third amount of CPU time and memory space in response to a reduction in the number of concurrent actuated instance of the software application. As a further example, a first rule may be distinct from a second, similar rule. For instance, a first rule may cause a below-threshold level allocation of resources upon creation of a small application (as described earlier) and a second rule may cause an above-threshold allocation of resources upon creation of a large application. Creation of a small application may trigger the first rule, resulting in an image having a below-threshold level allocation of resources. Creation of a large application may trigger the second rule, resulting in an image having an above-threshold level allocation of resources.

In some disclosed embodiments, a relevant rule from the plurality of similar rules is determined by a variable associated with a third-party originator of the code. A relevant rule from a plurality of similar rules may refer to an applicable and/or suitable rule from a plurality of similar rules. For example, a generic configuration for a serverless environment may be associated with a plurality of similar rules for scaling up or scaling down resources in response to increases in demand or decreases in demand, respectively, e.g., each rule offering differing options for balancing budgetary constraints with performance targets. For instance, a serverless environment may offer three different resource allocation plans (e.g., budget, regular, and premium), each plan associated with a differing rule for allocating differing levels of resources under differing budgetary constraints. A relevant rule may indicate a particular rule from the plurality of rules, allowing a developer to select a specific scaling up of resources, e.g., to accommodate specific constraints while meeting specific performance criteria. For instance, a developer may select a premium plan (e.g., according to a first relevant rule) for a higher-priority application, and a budget plan (e.g., according to a second relevant rule) for a lower-priority application. A third-party originator of a code may refer to a developer of a software application (or an entity associated therewith), uninvolved and/or removed from management of a serverless environment. A variable may refer to a place holder for data that may be filled with a specific data item or value, e.g., for a specific application, invocation, and/or instantiation, such that different instances of the same variable may be associated with differing data items or values. A relevant rule from the plurality of similar rules determined by a variable associated with a third-party originator of a code may refer to a particular rule that may be established and/or deduced based on a data item provided by a developer, for example, in the configuration information provided with the code, or separately therefrom. For example, a serverless environment may provide a generic interface (e.g., an API) to differing developers, allowing each developer to customize a scaling up of resources for a specific deployment of a software application by setting a variable indicating one of multiple possible resource allocation plans (e.g., budget, regular, and premium). A first developer may set the variable to "budget" (e.g., associated with a first rule) when deploying a first software application and a second developer may set the variable to "regular" (e.g., associated with a second rule) when deploying a second software application. In response, at least one processor may enforce the first rule to allocate resources demanded by actuated instances of the first software application according to the "budget" plan, and enforce the second rule for allocating resources demanded by actuated instances of the second software application according to the "regular" plan. As another example, a first rule may cause at least one processor to increase an allocation of resources according to a linear function, e.g., by allocating a fixed amount of resources for each added actuated instance of a software application, and a second rule may cause at least one processor to increase an allocation of resources non-linearly (e.g., according to a polynomial function), by allocating increasing or decreasing levels of resources for each added actuated instance of a software application.

By way of a non-limiting example, in FIG. 24, the set of rules may include a plurality of similar rules that provide increasing levels of computing resources. For instance, a first rule may cause at least one processor (e.g., processing circuitry 2310 of FIG. 23) to allocate memory in repository 2430-1 in response to a first level of demand for resources by user devices 2420-1 to **2420-*m* (e.g., associate with a first set of actuated instances of a first software application), and a second rule may cause the at least one processor to allocate additional memory in repository 2430-*n* in response to an additional level of demand for resources by user devices 2420-1 to 2420-*m* (e.g., associate with a second set of actuated instances of a second software application). In some embodiments, a relevant rule from a plurality of similar rules may be determined by a variable associated with a third-party originator (e.g., developer 310) of the code. For example, when deploying a first software application, developer 310 may transmit to serverless environment 320 a parameter associated with a first resource allocation plan (e.g., "budget") as a variable of an API for actuated instances of the first software application. When deploying a second software application, developer 310 may transmit to serverless environment 320** a parameter associated with a second resource allocation plan (e.g., "premium") as a variable of the API for actuated instances of the second software application.

Some disclosed embodiments involve at least one soft trigger, the corresponding action of which is to signal a violation of a rule, and at least one hard trigger, the corresponding action of which is to terminate an actuated instance. A corresponding action (e.g., to a trigger) may include a function that may be called in response to an occurrence and/or a detection of a trigger. A soft trigger may refer to a trigger for which a corresponding action may avoid (e.g., directly) affecting an execution of an actuated instance of a code. Signaling a violation of a rule may involve presenting a warning indicating lack of compliance with a rule (e.g., by presenting a warning and/or recommendation as responsive action for a violation of a rule). Signaling a violation of a rule may additionally involve providing a signal and/or notification informing at least one entity about an actuation of a soft trigger. Such an entity may include one or more of a violation counter, a user of the software application, a developer of the software application, and/or an administrator of the SaaS platform. A hard trigger may refer to a trigger for which a corresponding action may directly affect an execution of an actuated instance of a code. In some embodiments, multiple repetitions of a soft trigger (e.g., above a trigger-threshold value) may actuate a hard trigger. Terminating may include halting, ceasing, and/or ending, e.g., an actuated instance of a software application. Terminating an actuated instance (e.g., of a software application) may involve removing one or more tasks from a schedule for execution, freeing previously allocated memory (e.g., in one more queues, buffers, stacks, RAM, terminating any computation or process being performed by one or more processors, terminating a virtual machine provisioned for the instance, terminating a billing process for the instance, and/or performing any other action associated with terminating (e.g., ending) an actuated instance of a software application. In some instances, a trigger-threshold for one or more soft and/or hard triggers may be dependent on a tier of a developer.

By way of a non-limiting example, in FIG. 24, at least one processor (e.g., processing circuitry 2310 of FIG. 23) may detect a soft trigger associated with user device 2420-1. For example, the soft trigger may include a request to access a restricted area in repository 2430-1. In response to the soft trigger, the at least one processor may signal a violation of a rule by displaying a warning that access is denied. As another example, the at least one processor may detect a hard trigger associated with user device **2420-*m*. For example, the hard trigger may include a notification that a software application has been uninstalled from user device 2420**-*m*. In response to the hard trigger, the at least one processor may terminate an actuated instance of the software application on serverless environment 320, e.g., by removing associated tasks from a task schedule and by freeing memory in memory 2320 associated with the actuated instance.

Some disclosed embodiments involve obtaining a general address for the serverless environment. An address for a serverless environment may refer to any type of identifier or endpoint allowing one or more external devices or users to communicate with a serverless environment over a network. Examples of addresses may include a network address such as an IP address, a domain name or a URL, a physical address, a logical address, a port address, and/or an application-specific address. Addresses in a serverless environment may vary depending on a location of one or more associated servers, network configurations, and/or how a server may be accessed. In some instances, a serverless environment may be associated with multiple addresses (e.g., for multiple network interfaces and/or for access via differing protocols or ports). A serverless environment may be associated with a plurality of specific addresses, each specific address enabling access to one or more associated individual functions within the serverless environment. A general address for a serverless environment may refer to a generic (e.g., common) identifier or endpoint as a unified entry point for a serverless environment, enabling one or more users to manage and configure cloud resources, as well as set up new functions or applications (to give access to a management console or dashboard provided by the cloud provider), e.g., while omitting a requirement to indicate a specific addresses in an access request. A general address in a serverless environment may be associated with an event-driven architecture and serverless function-as-a-service (FaaS) platform, providing a unified entry point for invoking one or more functions and/or services based on specific event triggers (e.g., database events, file uploads, and/or HTTP requests), instead of addressing individual functions and/or services directly using specific addresses. A FaaS platform may refer to a cloud-computing service allowing clients to execute code in response to events, without requiring client-side management of infrastructure associated with building and/or launching applications.

A general address may be implemented using event sources and/or triggers configured to invoke associated functions and/or services based on an event type and/or one or more (e.g., rule-based) conditions, allowing to decouple an invocation for a software application from specific implementation details for increased flexibility and scalability in the serverless environment. For example, in AWS Lambda®, an Amazon® API Gateway may serve as a general address to route HTTP requests to different Lambda functions based on path patterns and/or request parameters. A general address may include a publicly available URL that may be discovered and called as an HTTP call to deploy code for a software application, removing a need for developers to develop and/or host backend support for the software application (e.g., interacting with a database, creating libraries, managing resource allocation and deallocation). In such a case, a general address may be an address for the API Gateway endpoint, and the routing rules defined within the API Gateway configuration may determine which specific Lambda function should be triggered based on the request. A general address may provide a software application with a simplified and centralized mechanism for triggering serverless functions and/or services, for adding, removing, and/or modifying functions and/or services via a dynamically adaptable architecture, while omitting requirements to specify particular endpoints for specific invocations and/or instantiations. A serverless application for image processing may be associated with a general address to provide flexibility and/or code reusability via a single function and/or endpoint handle multiple related tasks.

For instance, the general address "/image-processing" may be configured to handle a plurality of image processing operations such as resizing, cropping, or applying filters. At least one processor may designate a specific operation using a general address by passing one or more parameters designating the specific operation in a request payload and/or event data. Conversely, a specific address may be used to assign a unique function and/or endpoint to handle a specific task, and/or event trigger. For instance, an image processing application may be associated with specific addresses, such as "/resize-image," "/crop-image," or "/apply-filter", each specific address corresponding to a separate function or endpoint dedicated to performing that specific image processing operation.

Obtaining a general address for the serverless environment may involve at least one processor receiving, retrieving, and/or otherwise gaining access to a general address for a serverless environment (e.g., by calling an associated API), allowing the at least one processor to access resources, functionality, and/or applications of a serverless environment via a communications network.

Byway of a non-limiting example, in FIG. 3, at least one processor (e.g., processing circuitry 2310 of FIG. 23) associated with developer 310 may receive a general address for serverless environment 320 via network 2410 (see FIG. 24) in response to a request submitted using an API.

Some disclosed embodiments involve using the general address for conveying code to the configured serverless environment, for combination in an immutable manner with configuration information, thereby enabling formation of an immutable image. A configured serverless environment may refer to a serverless environment for which a configuration has been defined, e.g., based on parameters and/or settings grouped as configuration information (as described and exemplified earlier). Conveying code to a configured serverless environment may involve transmitting one or more electronic files or data packets to the serverless environment. For example, the code may be conveyed according to one or more communication, security, privacy, and/or networking protocols defined during configuration of the serverless environment. For example, at least one processor may transmit a code according to a streaming protocol (e.g., Transmission Control Protocol/Internet Protocol, or TCP/IP) and/or a packet-oriented protocol (e.g., User Datagram Protocol or UDP), in response to a PUSH or PULL API request. An immutable manner refers to unchanging, invariable, fixed and/or enduring state or characteristic. Thus, a combination in an immutable manner with configuration information refers to the fact that when combined with the configuration information, the combination does not change. In some embodiments, a first portion of the configuration information (e.g., received from a developer) may be directly related to a code for an application and may not be changed, and a second portion of the configuration information may be subsequently changed (e.g., to update a whitelist or blacklist), as defined by the developer of a code. In some embodiments, configuration information may be part of the code. In some embodiments, a developer may provide configuration information separately from a code. In some embodiments, configuration information may be updated (e.g., regularly) without requiring updates to the code. In some embodiments, an intermediate platform may provide (e.g., default) configuration information, for example, in cases when a developer fails to provide configuration information.

By way of non-limiting example, a code may be incorporated with configuration information such that a plurality of subsequent executions and/or instantiations of the code comply with, or may be decided by variables in the configuration information, without requiring modifications to refer to any of the parameters or settings associated with the configuration of the serverless environment. For example, the configuration information may include a list of triggers for actuating the set of rules. A first subset of the triggers may cause generation of an immutable image from a received code (e.g., using the second type of rules, or single-activation rules), a second subset of the trigger may relate to establishing infrastructure for executing a code (e.g., using the first type of rules, or repeatedly activated rules), and a third subset of triggers may relate to external software that was preconfigured in the serverless environment and which may operate with the immutable image or running instances thereof.

An image (e.g., in this context) may include a digital representation of a state or a file containing data. An image may refer to a container image, which may include a lightweight, standalone, executable software package that contains (e.g., substantially) everything needed to run a software program and/or application, including code, runtime environment, libraries and/or dependencies. For example, a container image may correspond to a combination of a code and a set of instructions for running the code in an isolated area of a serverless environment. An immutable image may refer to any of the above that do not change, are fixed, or are enduring. In the context of a software container for a software application an immutable image may include any information (e.g., dependencies, libraries, and/or configurations) required to run serverless functions and/or services, and that may remain unmodified during a lifecycle, avoiding changes due to, e.g., updates, patches, and/or configuration changes. An immutable image may encapsulate a runtime environment to ensure consistency and reproducible runtime environment for serverless functions, allowing for reuse and redeployment of the same immutable image for a plurality of function executions, where each reuse (e.g., instantiation and/or execution) of the immutable image may be associated with differing dependencies and/or configurations. An immutable image may facilitate horizontal scaling to handle varying workloads by instantiating additional containers with the same image, providing rapid and consistent scalability. Using the general address for conveying code to a configured serverless environment for combination in an immutable manner with configuration information may involve associating a general address of a serverless environment with the code, to achieve the immutable combination, as discussed earlier.

For instance, a developer may upload a code to a serverless environment together with configuration information required to execute the code. The serverless environment may use the configuration information to implement changes to the code, and/or to provide additional components (either internal or external) to the code to form an immutable image. Subsequent changes to the code (e.g., for updates and/or revisions) may require formation of a new immutable image to replace the (original) immutable image. As an example, the association may involve one or more electronic files containing software instructions (e.g., a code) and/or associated data (e.g., configuration information), formulating a request to store code in a serverless environment in association with a general address (e.g., by inserting a general address to an API configured to upload a code to a serverless environment), and/or transmitting one or more electronic files containing a code and/or associated data to a serverless environment for storage in association with a general address (e.g., instead of a specific address). For example, a general address may provide a unified entry point for a plurality of subsequent instantiations of the code in a serverless environment, each subsequent instantiation associated with a differing specific address. In some embodiments, conveying code to a serverless environment for combining in an immutable manner with configuration information may involve managing services and/or software deployments in a serverless environment by replacing (e.g., entire) components rather than implementing changes to a component, e.g., by redeploying an application or service each time a change occurs.

Enabling formation of an immutable image refers to providing data to a serverless environment in a manner such that the immutable image can be formed. For example, code, associated data, and/or configuration information may be provided enabling at least one processor to create a container including an executable software package for the code that may remain unchanged for a plurality of actuated instances. As discussed above, the immutable image may include code, associated data (e.g., metadata), libraries, and/or configuration information for a serverless environment (e.g., combined with configuration information for a previously configured serverless environment). This immutable image may remain unchanged for a plurality of actuated instances of the immutable image.

In some disclosed embodiments, the configuration information is adapted to invoke the at least one trigger, thereby initiating the at least one trigger-responsive action. Configuration information adapted to invoke at least one trigger refers the configuration information being constructed or adapted to cause the at least one trigger (as discussed earlier) to be activated or initiated. The adapted configuration information may include one or more parameter settings, definitions, and/or rules integrated into a serverless environment (e.g., with an immutable image) that may be used by at least one processor to identify a particular trigger (e.g., based on notifications received upon an occurrence of an associated event), and/or associate at least one trigger with one or more trigger-responsive actions. Initiating a trigger-responsive action may involve activating or starting a trigger-responsive action. For example, the action may be associated with a particular trigger, and may cause an execution of the identified trigger-responsive action. For instance, at least one processor may call one or more functions, alert one or more processes, allocate resources, set priorities, schedule one or more tasks, provide parameter values, interconnect different apps for enabling required operations, and/or perform any other operation for initiating execution of a trigger-responsive action.

Byway of a non-limiting example, in FIG. 3, at least one processor, (e.g., a first instance of processing circuitry 2310 of FIG. 23 associated with developer 310) may use a general address to convey code from developer 310 to serverless environment 320 via network 2410 (see FIG. 24). The at least one processor may convey the code for combining in an immutable manner with configuration information for serverless environment 320. This may enable at least one processor (e.g., a second instance of processing circuitry 2310 of FIG. 23 associated with serverless environment 320) to form an immutable image for the code (e.g., consistent with the configuration information) and store the immutable image in serverless environment 320. The configuration information may be adapted to invoke at least one trigger (e.g., detection of an access request for repository 2430-1 via DBMS 2435-1), thereby initiating the at least one trigger-responsive action (e.g., invocation of a security protocol requiring presentation of a valid credential as a condition for granting access).

In some disclosed embodiments, the configuration information includes a metadata portion A metadata portion refers to a section of configuration information containing descriptive information or data that provides context, attributes, or characteristics about other data or resources. The metadata portion may, for example, contain descriptive information about data, other than the data content. For example, metadata may include descriptive information about a resource, information relating to data structures and containers, information facilitating administration of resources (e.g., resource types, permissions, and date of creation), statistical information (e.g., analytics), information about a data owner and/or a data controller, and/or any other descriptive information associated with data. As another example, metadata may include a list of required infrastructure resources for an application to operate, a list of capabilities an application may require from the serverless environment, and/or privacy and security definitions to operate the application.

In some embodiments, the configuration information may only include metadata information, and the serverless environment may include an agent (e.g., an artificial intelligence, or AI agent) configured to assess a code and the metadata information received from a developer, and generate an image construction file based on the assessment. For instance, an AI agent may use a default image construction file as a basis to provide a custom-tailored image construction file for each code, e.g., to isolate the image construction and prevent (e.g., unintended) communication with external resources.

In some disclosed embodiments, the metadata portion includes instructions for other services monitoring access to and from the serverless environment via the specific address. Other services may include additional applications and serverless infrastructure resources, disassociated with deploying an application code in a serverless environment. For example, a metadata portion of configuration information may include instructions for a cloud provider monitoring service (e.g., Amazon CloudWatch Logs®, Google Cloud Logging®, and/or Azure Monitor®), an application-level logging service, application performance monitoring (APM) tool, a Security Information and Event Management (e.g., SIEM) tool, an Intrusion Detection and Prevention System (IDPS), and/or an EndPoint Protection Platform (e.g., EPP, and/or web application firewalls (WAF). Instructions for other services may refer to program code instructions formatted as text, and which may be extracted from the configuration information and executed by at least one processor in association with additional services of a serverless environment. Monitoring access to and from the serverless environment via the specific address may include tracking and/or examining requests for admittance to an actuated instance of a software application in a serverless environment in association with a specific address by tracking, for example a source IP address, a request method, a response status code, and/or request payload associated with a specific address, and/or responses thereto. A cloud provider monitoring service may provide logs, metrics, and/or alarms to monitor access to serverless functions. An application-level logging service may generate logs capturing access related information (e.g., function invocations, API requests, and/or authentication events). A SIEM tool may monitor and analyze security events. An IDPS may monitor for potential security threats and unauthorized access attempts. An EPP may monitor API endpoints from malicious activities. In some instances, monitoring may include tracking and/or examining requests for external communication originating from the actuated instance.

Figure 4:
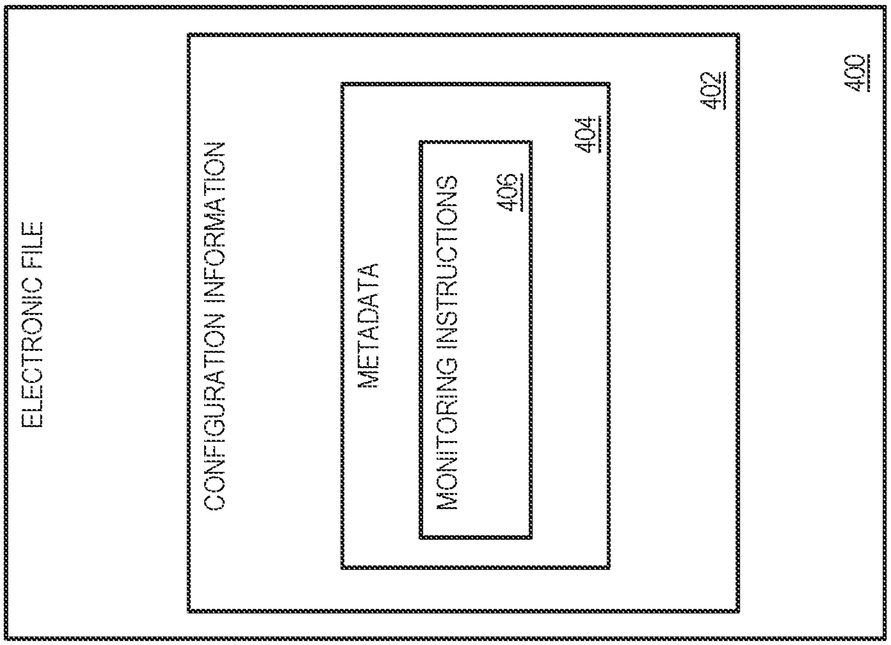
FIG. 4 illustrates an exemplary electronic file storing configuration information for a serverless environment, consistent with some disclosed embodiments.

Byway of a non-limiting example, reference is made to FIG. 4 illustrating an exemplary electronic file 400 storing configuration information 402 for serverless environment 320, consistent with some disclosed embodiments. Configuration information 402 may only include a metadata portion 404. Metadata portion 404 may include monitoring instructions 406 for other services monitoring access to serverless environment 320 via the specific address (e.g., a cloud provider monitoring service and/or a STEM tool). The at least one processor (e.g., processing circuitry 2310 of FIG. 23) of intermediate platform 300 may receive electronic file 400 with configuration information 402 from developer over network 2410, and/or may generate configuration information 402 (e.g., to use as default configuration information).

In some embodiments, the configuration information includes an image construction portion. An image construction portion refers to a section of configuration information containing instructions and/or data required for creating an image (e.g., an immutable image) from a code. Such information may include, for example, dependencies and/or links to libraries required by a code, a specific version of a runtime environment, an execution context, resource limits, permissions, triggers, and/or environment variables. Some examples of metadata for including in a metadata portion of configuration information may include environment variables for storing configuration settings and/or sensitive information (e.g., for passing API keys, database connections, and/or feature flags to serverless functions or endpoints), a timeout value indicating a time limit that a serverless function and/or endpoint may be allowed to run before termination, an amount of memory allocated to a serverless function during execution, and/or triggers and/or events (e.g., types of triggers, sources, priorities, associated parameters, and/or responsive actions).

In some disclosed embodiments, the metadata portion includes a predetermined list of entities authorized to access the specific address. A predetermined list of entities authorized to access a specific address may include a plurality of identifiers (e.g., each associated with a differing entity) permitted and/or authorized in advance to access a specific address, e.g., in accordance with one or more rules. For example, a metadata portion of configuration information may include a predefined list of identifiers associated with one or more users, devices, accounts, processes, and/or any other entity capable of accessing a specific address. For example, a predetermined list may include a first group of users to authorized to access a first subset of image processing functions (e.g., "/resize-image," "/crop-image,") and authorize a second group of users to authorized to access a second subset of image processing functions (e.g., "/resize-image," "/crop-image," "/apply-filter," and/or "/edit-image").

In some embodiments, the configuration information may include a metadata portion, and an image construction portion. In some embodiments, the metadata portion may include monitoring instructions, a list of authorized entities (e.g., a whitelist), and/or a list of denied entities (e.g., a blacklist).

Figure 5:
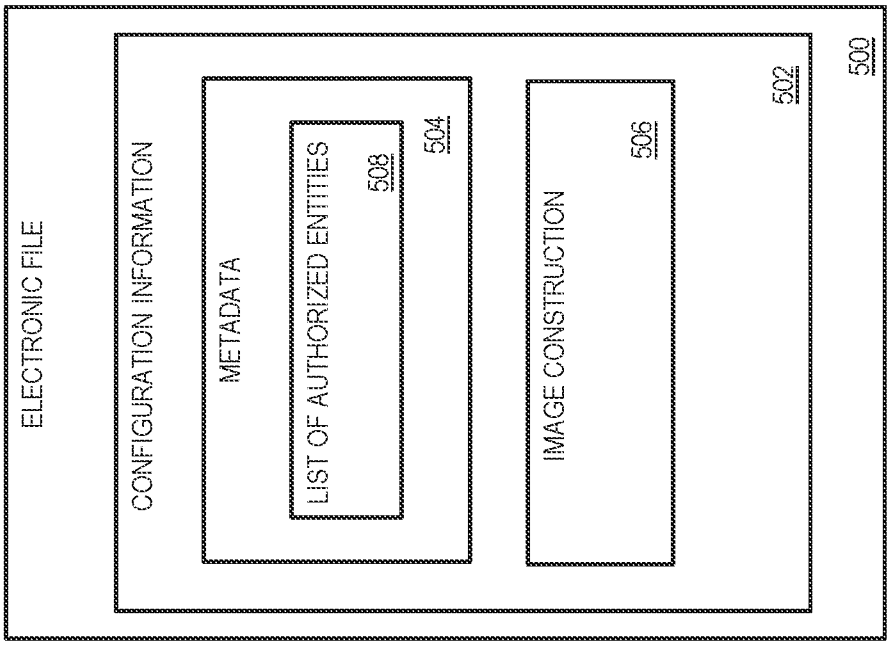
FIG. 5 illustrates another exemplary electronic file storing configuration information for a serverless environment, consistent with some disclosed embodiments.

By way of another non-limiting example, reference is made to FIG. 5 illustrating an exemplary electronic file 500 storing configuration information 502 for serverless environment 320, consistent with some disclosed embodiments. Configuration information 502 includes a metadata portion 504 and an image construction portion 506. Metadata portion 504 may include a predetermined list of entities 508 that may be authorized to access the specific address (e.g., a list of user accounts and associated identifiers allowed to access a specific address in serverless environment 320). At least one processor (e.g., processing circuitry 2310 of FIG. 23) may use image construction portion 506 to construct an immutable image for a software application deployed by developer 310.

Some disclosed embodiments involve receiving a specific address in the serverless environment for reaching an actuated instance of the immutable image for incorporation with the SaaS platform. An actuated instance of an immutable image refers to an immutable image (as described earlier) that is created, instantiated, and/or executed. After deploying an immutable image for a software application to a serverless environment, at least one processor may manage infrastructure and resources necessary to execute the software application. Upon receiving a request to instantiate the immutable image, the at least one processor may create an instance of the immutable image to handle the request. For example, the instance may be an implementation of the image file. The serverless environment may provision resources (e.g., CPU time, memory, networking resources) necessary for executing the code of the instance, including for example, a specific address associated with the instance of the immutable image. The specific address may be used to store data (e.g., in queues, stacks, and/or buffers) necessary for executing the actuating instance of the immutable image. In some embodiments, the specific address may direct a user to a specific running instance of a plurality of running instances of the immutable image For example, a container may store 17 instances, and the specific address may connect a user to instance 13 of 17. Receiving a specific address in the serverless environment for reaching an actuated instance of the immutable image refers to accepting, acquiring, obtaining, or accessing a location of the actuated immutable image. For example, receiving may include obtaining the specific address allocated by a serverless environment during instantiation of an immutable image in response to a trigger, allowing at least one processor to access (e.g., for reading from and/or writing data to) the actuated instance via the specific address. Incorporation with the SaaS platform refers to integrating, adding a feature, adding functionality, or adding a service into an existing SaaS platform. It may involve, for example, integrating and/or merging an actuated instance of an immutable image with a SaaS platform (as described and exemplified elsewhere herein). For example, upon receiving a first request from a first user to invoke a software application, at least one processor of a serverless environment may create a first instantiation of the software application and store data required to execute the first instantiation in the serverless environment to which a first specific address directs in the serverless environment. Upon receiving a second request from a second user to invoke the (e.g., same) software application, the at least one processor may create a second instantiation of the software application (for example, if the first instance has reached its maximum capacity) and store data required to execute the second instantiation in the serverless environment to which a second specific address directs in the serverless environment. For example, each specific address may lead to a container for managing the one or more associated instances and may direct traffic, create, and/or remove instances according to the traffic. The first user may obtain the first specific address, allowing the first user to reach the first actuated instance of the immutable image incorporated with the SaaS platform, and the second user may obtain the second specific address, allowing the second user to reach the second actuated instance of the immutable image incorporated with the SaaS platform.

Byway of a non-limiting example, in FIG. 24, user device 2420-1 may receive a specific address (e.g., in storage 2330 of FIG. 23) in serverless environment 320 via network 2410. User device 2420-1 may use the specific address for reaching an actuated instance of an immutable image for incorporation with SaaS platform 100.

Some disclosed embodiments involve receiving the code from a third-party originator of the code, and the code is received in a mutable form. A mutable form (e.g., for a code) refers to code that may be changed. For example, a mutable form may include a write-enabled electronic file storing a program code, data, libraries, and/or associated references, allowing at least one processor to modify, alter, or change the electronic file. Receiving the code from a third-party originator of the code (as described elsewhere herein), and the code is received in a mutable form may involve, for example, obtaining a write-enabled electronic file associated with a code from a code developer, such that at least one processor may make changes to the code and/or to an execution of the code.

Figure 6:
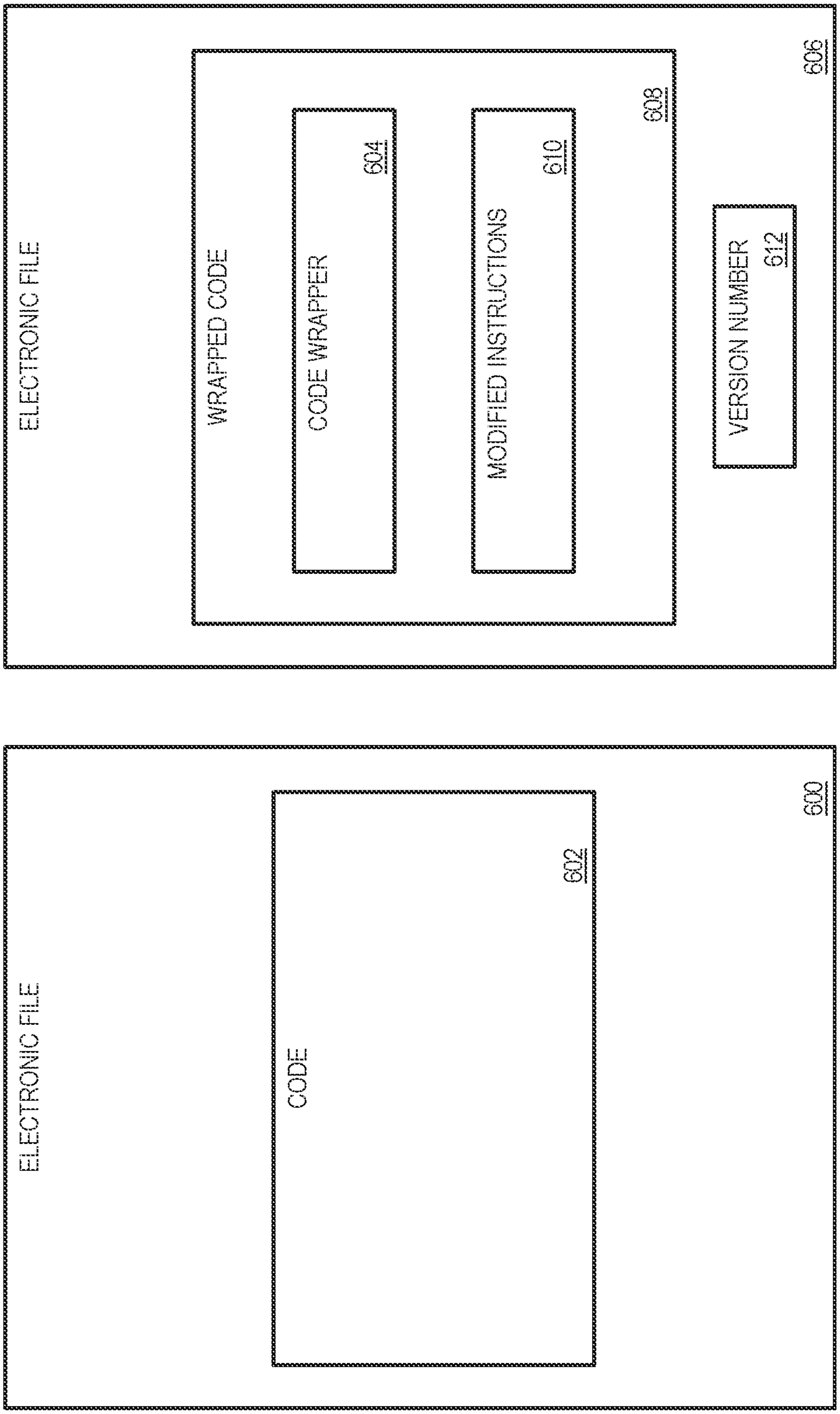
FIG. 6 illustrates an exemplary first electronic file and a second electronic file containing code for a software application, consistent with some disclosed embodiments.

Byway of a non-limiting example, reference is made to FIG. 6, illustrating an exemplary first electronic file 600 and second electronic file 606, containing code for a software application, consistent with some disclosed embodiments. In some embodiments, first electronic file 600 and/or second electronic file 606 may include configuration information 402 of FIG. 4 and/or configuration information 502 of FIG. 5.

Byway of another non-limiting example, in FIG. 24, at least one processor (e.g., processing circuitry 2310 of FIG. 23) associated with serverless environment 320 may receive first electronic file 600 containing code 602 from a third-party originator of the code (e.g., developer 310) via network 2410. The at least one processor associated with serverless environment 320 may receive the code in a mutable form. For example, first electronic file 600 may be write-enabled.

In some disclosed embodiments, conveying the code to the configured serverless environment includes transferring the code to an intermediate platform for wrapping the code and sending the wrapped code from the intermediate platform to the serverless environment. An intermediate platform may refer to an intervening computer system, or proxy server interrupting a direct flow of communication between two communicating entities. Wrapping a code may include adding one or more program code instructions (e.g., a code layer) to a code such that the added code layer (e.g., a wrapper) may be executed prior to executing the (e.g., original) code. In some embodiments, wrapping a code may change an interface for invoking a code, e.g., by adding, removing, and/or changing one or more parameters for invoking the code. Transferring a code to an intermediate platform for wrapping the code refers to sending or conveying the code to the intermediate platform for wrapping. It may involve, for example, at least one processor establishing a communications link with an intermediate platform, and/or sending a write-enabled electronic file containing a code to the intermediate platform via the communications link (e.g., instead of sending the code directly to the serverless environment), thereby allowing the intermediate platform to add a wrapper to the code. Sending a wrapped code from an intermediate platform to a serverless environment refers to transferring or conveying the wrapped code to the serverless environment. It may involve at least one processor associated with an intermediate platform establishing a communications link with a serverless environment, and transmitting a wrapped code to at least one processor of a serverless environment using the established communications link.

In some disclosed embodiments, conveying the code to the configured serverless environment includes sending the code directly to the serverless environment in an absence of an intermediate alteration to the code. Sending the code directly to the serverless environment may involve at least one processor establishing an uninterrupted communications channel with a serverless environment (e.g., absent an intermediate platform, or proxy) and transmitting an electronic file containing a code to the serverless environment via the uninterrupted communications channel. In absence of an intermediate alteration to a code may refer to transmitting an original (e.g., unaltered or unchanged) version of a code to a serverless environment. In some embodiments, a sender of the code may include a credential (e.g., a hash) of a code to enable the serverless environment to validate that the code lacks any intermediate alterations.

Byway of a non-limiting example, in FIG. 3, at least one processor (e.g., processing circuitry 2310 of FIG. 23) associated with developer 310 may transfer first electronic file 600 including code 602 (see FIG. 6) to intermediate platform 300 via network 2410 (see FIG. 24). Intermediate platform 300 may wrap code 602 by adding one or more program code instructions as a wrapper 604 (e.g., a layer of code) to generate a wrapped code 608, and store wrapped code 608 in second electronic file 606. In some cases, the wrapped code 608 is saved in the first electronic file 600. In some instances, the at least one processor may insert wrapper 604 at the beginning of a code portion of second electronic file 606 such that wrapper 604 may be executed prior to other instructions of (e.g., original) code 602. The at least one processor may send second electronic file 606 containing wrapped code 608 from intermediate platform 300 to serverless environment 320 via network 2410. Alternatively, in some embodiments, developer 310 may send first electronic file 600 containing (e.g., unwrapped) code 602 directly to serverless environment 320 via network 2410, in an absence of any intermediate alterations to code 602 by intermediate platform 300.

In some disclosed embodiments, the intermediate platform is configured to modify the code. Modifying a code may involve changing a code and/or changing data and/or references accessed by a code, and/or causing an execution of a code to be altered. For example, at least one processor associated with the intermediate platform may optimize and/or validate the code for running on the serverless environment, add one or more procedures to the code (e.g., to enforce one or more privacy, security, and/or performance guidelines), and/or perform any other recommended code modification. As another example, at least one processor associated with the intermediate platform may subtract one or more procedures to the code or suppress execution of one or more procedures in the code, and/or perform any other recommended code modification.

In some disclosed embodiments, the intermediate platform is configured to analyze the code to determine compatibility of the code with the serverless environment. Compatibility of a code with a serverless environment refers to compliance and/or operability of a code within a serverless environment. For example, such operability may permit execution of the code without violating one or more rules associated with the serverless environment. Analyzing a code to determine compatibility of the code with a serverless environment may include examining, cross-referencing, testing, emulating, and/or simulating a code (or a portion thereof) to verify the code, and/or identify any errors, warnings, and/or potential failures associated with executing the code in the serverless environment. For example, at least one processor associated with an intermediate platform may simulate a code (e.g., in a sandbox) to identify requests for resources, and check the requests against one or more rules included in a configuration for a serverless environment. As another example, at least one processor may check references in the code for resources and/or services to verify that the referenced resources and/or services correspond to latest versions, patches, and/or updates for such resources and/or services.

In some disclosed embodiments, the intermediate platform is configured to validate code modifications. Code modifications may include updates and/or patches for a code (e.g., associated with performance, security, privacy, compatibility, and/or any other interest for changing a code), added and/or removed features, changes (e.g., improvements) to a user interface, and/or any other change and/or revision made to a code. For example, code modifications may include code changes that were performed during the wrapping thereof by the intermediate platform. Validating code modifications may include examining, testing, emulating, and/or simulating an altered code (or a portion thereof) to confirm and/or verify that changes made to the code avoid violating one or more rules included in a configuration for a serverless environment.

In some disclosed embodiments, the intermediate platform is configured to estimate computational resources necessary to run the code. Estimate computational resources necessary to run a code may include calculating, predicting, simulating, and/or otherwise determining an amount of resources expected to be demanded by a code during execution, e.g., using a tool provided by a serverless environment. Such resources may include, for example, processing capacity, memory usage, temporary storage, network bandwidth, additional processes, and/or any other resource needed to run a software application in a serverless environment.

For example, at least one processor may base an estimation of necessary computational resources on one or more performance goals (e.g., to achieve a desired throughput for a typical workload) and/or to operate with additional processes associated with timeout limitations. The at least one processor may account for proportional increases and/or decreases in resource usage by scaling up allocated resources during periods of peak demand, and/or low scaling down allocated resources during low demand periods. Additionally or alternative, the at least one processor may account for (e.g., unpredictable) spikes in demand when determining the estimation. In some embodiments, such estimations may require at least one processor to test an execution of a code over a period of time (e.g., a day, a week, a month, and/or any other time duration).

Byway of a non-limiting example, at least one processor (e.g., processing circuitry 2310 of FIG. 23) associated with intermediate platform 300 may modify code 602 (FIG. 6).

For example, intermediate platform 300 may add, delete, and/or replace at least some instructions of code 602 with modified instructions 610, and store the modified code in second electronic file 306. In some embodiments, at least one processor associated with intermediate platform 300 may analyze code 602, wrapped code 608, and/or modified instructions 610 to determine compatibility of code 602, wrapped code 608, and/or modified instructions 610 with serverless environment 320. In some embodiments, the at least one processor may validate modifications made to wrapped code 608, e.g., by validating modified instructions 610. In some embodiments, the at least one processor may estimate computational resources necessary to run code 602 and/or wrapped code 608, e.g., by simulating and/or emulating an execution of code 602 or wrapped code 608, and/or by invoking one or more software tools.

In some disclosed embodiments, the set of rules includes monitoring received and sent communications from the actuated instance of the immutable image in the serverless environment. Monitoring may include tracking, recording, and/or logging (e.g., data). Received and sent communication from an actuated instance of the immutable image in the serverless environment may refer to any messages and/or notifications exchanged between the actuated instance of the immutable image in the serverless environment and at least one entity during a bidirectional communications session. For example, enforcement of the set of rules may cause at least one processor to store any notifications exchanged with the actuated instance of the immutable image in association with a timestamp, current state and/or status (e.g., using ELK Stack® to collect, store, and/or analyze communication logs), allowing at least one processor to subsequently trace an execution associated with the specific address, e.g., for performance monitoring. As another example, enforcement of the set of rules may activate a communication monitoring software residing on the serverless environment, causing all incoming communication to and from the actuated instance of the immutable image to pass there through for monitoring purposes. In such a case, the communication monitoring software may check any communication against a whitelist and/or blacklist in order to allow receipt and/or sending of the communication.

Byway of a non-limiting example, in FIG. 24, the set of rules may include configuring a predetermined infrastructure using computing resources of serverless environment 320 (see FIG. 3). For instance, the set of rules may define a data structure, organized according to a predefined database schema, to manage data in repository 2430-1 via DBMS 2435-1 for actuated instances of a software application. At least one processor (e.g., processing circuitry 2310 of FIG. 23) may receive a database schema from developer 310, store the database schema in memory 2320, and use the stored database schema to create a data structure in repository 2430-1 via DBMS 2435-1. The at least one processor may use the data structure to store and retrieve data for one or more subsequently actuated instances of the software application. In some embodiments, the set of rules may include monitoring received and sent communications over network 2410 from a specific address in the serverless environment 320 and any of user devices 2420-1 to **2420-*m***. For instance, the at least one processor may monitor received and sent communication to determine to allocate additional computing resources under increasing network traffic conditions and/or increase load demands, and free previously allocated resources under decreasing network traffic conditions and/or decreased load demands.

Some disclosed embodiments involve conveying a new version of the code to the configured serverless environment while maintaining the specific address in the serverless environment and monitoring a version number of the new version of the code by another element in a serverless code. A new version of a code may refer to an updated, patched, or otherwise modified edition or release of a code. For example, a developer may add features to a code and/or patch a vulnerability, and release a new version of the code to a serverless environment for use by existing and/or new clients. A version number may refer to an identifier indicating a specific release of a code, allowing for tracking of multiple differing versions of a code. In some embodiments, a version number may include an associated timestamp. In some embodiments, a version number may be associated with one or more version tags that may be used to represent milestones, releases, and/or specific versions deployed to different serverless environments, allowing for tracking and/or identification of specific versions of a serverless application. A serverless code refers to a service provided by a serverless environment to validate that an immutable image and a code used to form the immutable image share the same version number (e.g., to prevent a malicious corruption of either the code or the immutable image). Uploading a new code causes formation of a new immutable image. A serverless code may ensure that the new immutable image and the new code share the same version number. Another element in a serverless code may refer to a code segment in a code for a serverless environment configured to perform one or more tasks, such as version control for one or more software applications, e.g., by monitoring different versions and ensuring compatibility with other resources and/or services in a serverless environment. Additionally or alternatively, another element in a serverless code may refer to the uploaded version of the wrapped mutable code that was uploaded. In some cases, uploading a new code for the same application replaces (e.g., and deletes) the previous serverless code. Monitoring a version number of the new version of the code by another element in the serverless code may involve executing a portion of a serverless code to track, record, and/or audit an identifier for a new version of a code, allowing the at least one processor to receive updates associated with the new version of the code. For example, at least one processor may monitor a version number of a new version of a code to allow comparison of resource utilization and performance parameters for differing versions of a code. Conveying a new version of the code to the configured serverless environment while maintaining the specific address in the serverless environment may involve using a specific address, associated with a first release of a code, to transmit a second (e.g., new) release of the code, such that the same specific address may be used for the first and second releases of the code. For example, the user may access a modified code using the same specific address that the user previously used to access the previous version of the code. In some embodiments, maintaining the specific address in the serverless environment may allow integration of the new version of the code seamlessly, e.g., allowing a user of an old version of an actuated instance of a code for a software application to continue running the software application using the new version without disruption. In some embodiments, an older version and an updated version of a software application may share the same specific address. In some embodiments, updating a software application to a new version causes creation of a new specific address. In such a case, references in the SaaS platform for the old (e.g., prior) specific address may be replaced with references to the new specific address. For instance, at least one processor may check that the immutable image and the code share the same version number, for example, to prevent a malicious change in the immutable image and/or code. As such, when a new code is uploaded, a new image may be generated. In order to operate, the at least one processor may ensure that the new image shares the same version number as the new code.

Byway of a non-limiting example, at least one processor (e.g., processing circuitry 2310 in FIG. 23) associated with developer 310 may convey second electronic file 606 (FIG. 6) containing new version (e.g., wrapped code) 608 of code 602 to configured serverless environment 320 via network 2410, while maintaining the specific address in serverless environment 320 and monitoring a version number 612 of the new version of the code by another element in the serverless code for serverless environment 320. For example, the at least one processor may execute instructions of the element in the serverless code to track differing versions of an actuated instance of a software application.

In some disclosed embodiments, the serverless environment is configured with a scale to zero ability for the actuated instance of the immutable image. In a serverless environment, a scale to zero ability may refer to an automatic reduction or elimination of previously allocated computing resources when there is no active workload or incoming requests. In some embodiments, scale to zero capability may refer to an existence of at least one operational instance at any point in time, even in absence of an occurrence of associated activity. This may avoid a situation where an instance may be initiated from scratch (e.g., from zero, from nothing, or a "cold start"), which may introduce latencies. The specific address may thus direct a user to at least one running instance that is operation. A scale to zero ability may facilitate in reducing costs, and/or improving resource utilization by allocating resources only when needed. A scale to zero ability may eliminate a need to manually manage and/or provision servers based on expected demand, resulting in greater efficiency and cost savings. As new requests and/or events occur, a serverless environment may dynamically scale and allocate resources to handle the increased workload. By contrast, in a traditional server-based architecture (e.g., lacking a scale to zero ability), servers may typically run during periods of inactivity to ensure availability to handle potential incoming requests, resulting in unnecessary costs and resource consumption. A scale to zero ability for an actuated instance of an immutable image may include one or more configuration settings for a serverless environment configured to cause the serverless environment to dynamically scale down and/or deallocate previously allocated resources for an actuated instance of an immutable image for a software application once the actuated instance no longer requires the previously allocated resources. For example, during a first time period associated with a peak demand for a resource of a serverless environment by an actuated instance of an immutable image for a software application, at least one processor of the serverless environment may allocate additional memory for the actuated instance, to handle the peak demand. During a second time period, following the first time period, associated with a reduced demand for the resource, the at least one processor may automatically deallocate the previously allocated additional memory.

Byway of a non-limiting example, in FIG. 3, serverless environment 320 may be configured with a scale to zero ability for an actuated instance of an immutable image for a software application received from developer 310. For example, in FIG. 24, during a first time period associated with a peak demand for memory, at least one processor (e.g., processing circuitry 2310 of FIG. 23) may allocate one gigabyte of memory in repository 2430-1. During a second time period associated with a reduction in demand for memory, and following the first time period, the at least one processor may automatically deallocate the previously allocated one gigabyte of memory in repository 2430-1, e.g., freeing the 1 gigabyte of memory for use by other applications or processes.

Some disclosed embodiments involve an artificial intelligence (AI) functionality configured to scan the wrapped code, wherein the immutable image is generated by an image construction file (i.e., containing code) created by the AI functionality. An AI functionality refers to a capability to access a program or system that utilizes artificial intelligence techniques to perform specific tasks or make decisions. In some embodiments, the AI functionality may be provided by one or more AI agents, which may reside within and/or external to the serverless environment. For example, an AI agent may initiate one or more autonomous, deterministic, and/or non-deterministic actions to resolve one or more uncertainties. An AI agent may use one or more machine learning and/or inference models, including one or more of a classification engine, a data regression model, statistical techniques (e.g., convolutions and/or correlations), a neural network, a genetic algorithm, a random forest, a support vector machine, and/or any other deterministic and/or heuristic model for resolving one or more uncertainties. Scanning a wrapped code may include performing one or more reading, parsing, analyzing, comparing, and/or classification operations on a code (e.g., stored as a text file). An image construction file created by an AI agent refers to stored information and/or instructions generated by the AI agent and which is usable for constructing an image. For example, at least one processor may use an image construction file to generate an immutable image for code (as described and exemplified elsewhere herein). By way of additional example, at least one processor associated with an intermediate platform may invoke an AI engine to scan a code received from a developer and infer and/or learn one or more rules, settings, and/or parameters. The AI engine may apply the one or more inferred and/or learned rules, settings, and/or parameters to generate an image construction file for creating an immutable image.

Byway of a non-limiting example, in FIG. 3, an AI agent configured with intermediate platform 300 may scan wrapped code 608 (see FIG. 6) to create an image construction file for generating an immutable image. At least one processor (e.g., processing circuitry 2310 of FIG. 23) associated with intermediate platform 300 may send the immutable image to serverless environment over network 2410, as described elsewhere herein.

Figure 7:
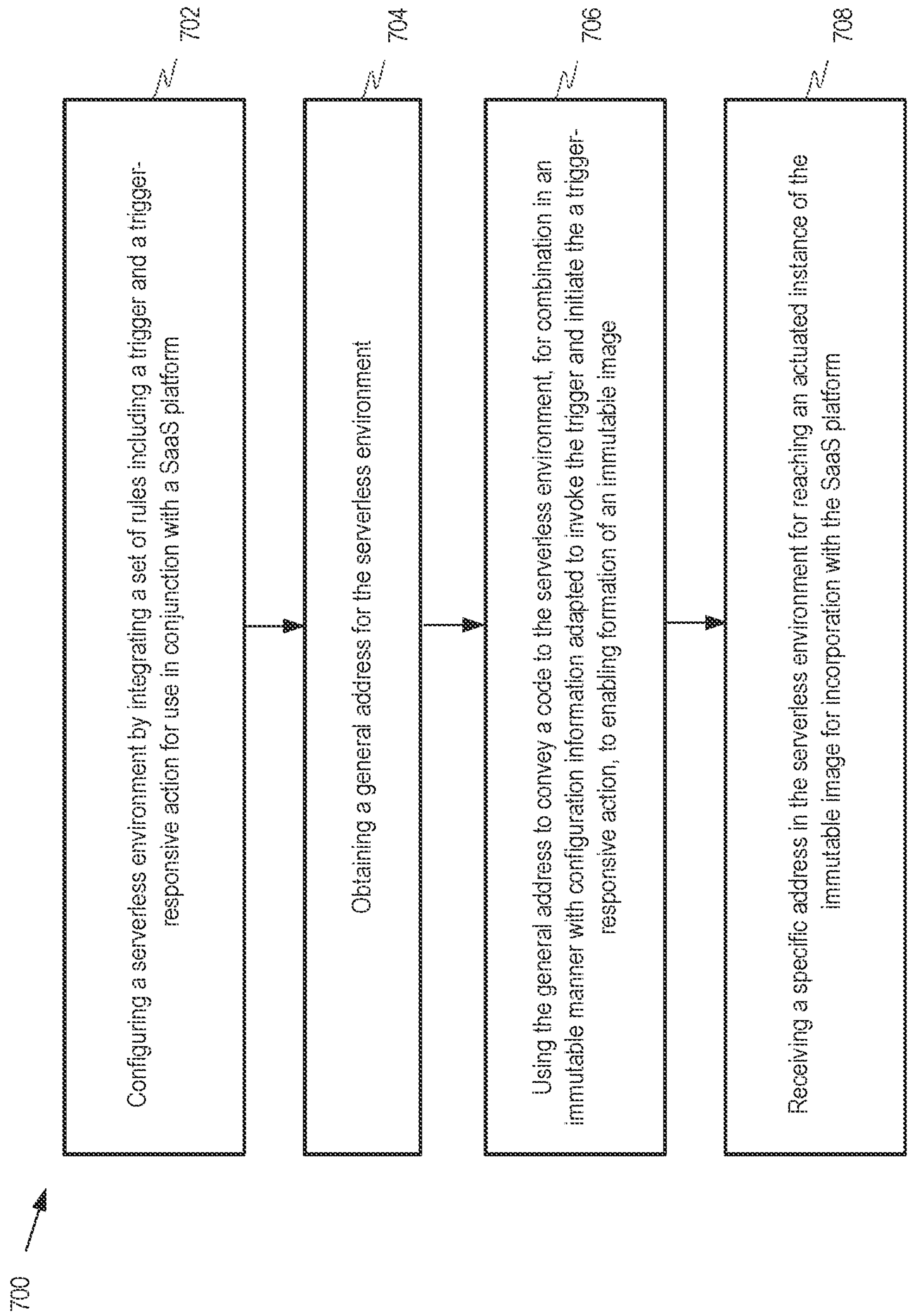
FIG. 7 illustrates a flowchart of example process for enabling applications to run in a serverless environment, consistent with some disclosed embodiments.

FIG. 7 illustrates a flowchart of example process 700 for enabling applications to run in a serverless environment, consistent with embodiments of the present disclosure. In some embodiments, process 700 may be performed by at least one processor (e.g., processing circuitry 2310 shown in FIG. 23) to perform operations or functions described herein. In some embodiments, some aspects of process 700 may be implemented as software (e.g., program codes or instructions) that are stored in a memory (e.g., memory 2320) or a non-transitory computer readable medium. In some embodiments, some aspects of process 700 may be implemented as hardware (e.g., a specific-purpose circuit). In some embodiments, process 700 may be implemented as a combination of software and hardware.

Referring to FIG. 7, process 700 may include a step 702 of configuring a serverless environment by integrating a set of rules into the serverless environment, the set of rules including at least one trigger and at least one trigger-responsive action for use in conjunction with a SaaS platform, as described earlier. By way of a non-limiting example, in FIG. 3, at least one processor (e.g., processing circuitry 2310 of FIG. 23) may configure serverless environment 320 by integrating a set of rules into serverless environment 320. The set of rules may include at least one trigger and at least one trigger-responsive action for use in conjunction with SaaS platform 100. The at least one processor may store the set of rules in memory 2320 and/or in storage 2330 of serverless environment 320.

Process 700 may include a step 704 of obtaining a general address for the serverless environment, as described earlier. By way of a non-limiting example, in FIG. 3, at least one processor (e.g., processing circuitry 2310 of FIG. 23) associated with developer 310 may receive a general address for serverless environment 320 via network 2410 (see FIG. 24) in response to a request submitted using an API.

Process 700 may include a step 706 of using the general address for conveying a code to the configured serverless environment, for combination in an immutable manner with configuration information, thereby enabling formation of an immutable image, wherein the configuration information is adapted to invoke the at least one trigger, thereby initiating the at least one trigger-responsive action, as described earlier. By way of a non-limiting example, in FIG. 3, at least one processor, (e.g., a first instance of processing circuitry 2310 of FIG. 23 associated with developer 310) may use a general address to convey code from developer 310 to serverless environment 320 via network 2410 (see FIG. 24). The at least one processor may convey the code via network 2410 for combining in an immutable manner with configuration information for serverless environment 320. This may enable at least one processor (e.g., a second instance of processing circuitry 2310 of FIG. 23 associated with serverless environment 320) to form an immutable image for the code (e.g., consistent with the configuration information) and store the immutable image in serverless environment 320. The configuration information may be adapted to invoke at least one trigger, thereby initiating the at least one trigger-responsive action.

Process 700 may include a step 708 of receiving a specific address in the serverless environment for reaching an actuated instance of the immutable image for incorporation with the SaaS platform, as described earlier. By way of a non-limiting example, in FIG. 24, user device 2420-1 may receive a specific address (e.g., in storage 2330 of FIG. 23) in serverless environment 320 via network 2410. User device 2420-1 may use the specific address for reaching an actuated instance of an immutable image for incorporation with SaaS platform 100.

Some embodiments involve a system for the steps discussed above. Byway of a non-limiting example, in FIG. 3, at least one processor (e.g., processing circuitry 2310 of FIG. 23) may configure serverless environment 320 by integrating a set of rules into serverless environment 320. The set of rules may include at least one trigger and at least one trigger-responsive action for use in conjunction with SaaS platform 100. The at least one processor may store the set of rules in memory 2320 and/or in storage 2330 of serverless environment 320. At least one processor associated with developer 310 may receive a general address for serverless environment 320 via network 2410 (see FIG. 24) in response to a request submitted using an API. The at least one processor associated with developer 310 may use a general address to convey code from developer 310 to serverless environment 320 via network 2410. The at least one processor may convey the code via network 2410 for combining in an immutable manner with configuration information for serverless environment 320. This may enable at least one processor associated with serverless environment 320 to form an immutable image for the code and store the immutable image in serverless environment 320. The configuration information may be adapted to invoke at least one trigger, thereby initiating the at least one trigger-responsive action. in FIG. 24, user device 2420-1 may receive a specific address (e.g., in storage 2330 of FIG. 23) in serverless environment 320 via network 2410. User device 2420-1 may use the specific address for reaching an actuated instance of an immutable image for incorporation with SaaS platform 100.

Systems, methods, and computer program products are disclosed for running applications in a serverless environment. Running applications in a serverless environment includes configuring a serverless environment by integrating a set of rules into the serverless environment, the set of rules including at least one trigger and at least one trigger-responsive action for use in conjunction with a SaaS platform; obtaining a general address for the serverless environment; using the general address for conveying code to the configured serverless environment, for combination in an immutable manner with configuration information, thereby enabling formation of an immutable image, wherein the configuration information is adapted to invoke the at least one trigger, thereby initiating the at least one trigger-responsive action; and receiving a specific address in the serverless environment for reaching an actuated instance of the immutable image for incorporation with the SaaS platform.

Deploying a software application in a serverless environment for use with a SaaS platform may require configuring the serverless environment for the specific software application. Such configuration may require knowledge of configuration settings in the serverless environment as well as overhead. Disclosed embodiments provide for an intermediate platform for handling configuration of a serverless environment based on one or more personalized configuration settings provided by a developer. The intermediate platform may alleviate the burden of configuring a serverless environment on developers, to thereby facilitate code development and deployment.

Some disclosed embodiments involve performing customized segmentation operations in a serverless environment. Segmentation operations may refer to operations associated with hosting a software application in a serverless environment (as described and exemplified elsewhere herein). Customized segmentation operations may refer to individualized and/or bespoke operations related to hosting a software application, e.g., operations modified to suit a specific application, function, user, use-case, and/or context.

Some disclosed embodiments involve receiving by an intermediate platform at least one signal from an entity requesting application hosting for use with a SaaS platform. A signal refers to digitally encoded information for transmission over a communications channel (e.g., wired and/or wireless). Examples of signals may include a data packet, message, notification, and/or portion of a data stream encoded as an electrical, optical, auditory, and/or radio-frequency signal. Receiving by an intermediate platform (as described and exemplified elsewhere herein) at least one signal refers to obtaining, retrieving, and/or otherwise gaining access to at least one signal by an intermediate platform.

For example, the signal may be received via a communications network in accordance with a communications protocol. An entity refers to a person, transceiver, receiver, transmitter, or any other thing capable of receiving and/or sending data over a communications network. For example, an entity may include a processing device, a process, a virtual machine, an application, an identity, a user (e.g., a code developer and/or a client of a software application), and/or any other identifiable constituent or tenant capable of receiving and/or sending data over a communications network (e.g., to communicate with a serverless platform). Application hosting may involve infrastructure (e.g., hardware and/or software) providing backend services for running software applications. Such backend services may be associated with deploying, storing, maintaining, and/or executing a software application in a serverless environment. Some examples of such backend services may include provisioning of scalable memory allocation (e.g., a storage location address) for storing data associated with a software application, provisioning of scalable computing resources to execute an application, providing access to functions, services, resources (e.g., network capacity, processing power, memory) for executing a software application, and/or implementation of network, privacy, and/or security protocols. Such services may additionally include, for example, implementation of updates to one or more software applications, management of version control, scheduling of upgrades and/or tests, performance of compatibility and/or validity checks regarding other cloud services and/or applications, tracing an execution path, performance of analytics on traced executions, and/or performance of any other operation involved in executing and/or maintaining an application in a serverless environment. Requesting application hosting for use with a SaaS platform (as described and exemplified elsewhere herein) refers to asking, prompting, and/or seeking instruction to gain access to one or more services (e.g., backend services) facilitating hosting of a software application in a serverless environment.

For example, at least one processor associated with an intermediate platform may receive a signal (e.g., a message) from a developer (e.g., an entity) requesting hosting services for an application in conjunction with a SaaS platform. The intermediate platform may perform one or more operations facilitating hosting of the application in a serverless environment on behalf of the developer, obviating performance of such operations by the developer. In this manner, the intermediate platform may facilitate and/or automate at least some operations associated with uploading a software application to a serverless environment for use with a SaaS platform.

In some disclosed embodiments, the at least one signal is configured to convey personalized configuration information and at least one unique identifier. Personalized configuration information refers to configuration information (as described and exemplified elsewhere herein) including one or more customized and/or individualized settings and/or preferences. These may be used, for example, for running an application in a serverless environment. For example, such personalized configuration information may be used to select one or more specific operating systems and/or web browsers or versions thereof, APIs, databases, libraries, rules, and/or any other hardware and/or software infrastructure affecting an execution of a software application in a serverless environment. For example, at least one processor associated with an intermediate platform may use personalized configuration information to select one or more rules for applying during deployment and/or execution of a software application in a serverless environment, e.g., to adjust user preferences, execution behavior, resource allocation and consumption, notifications, privacy settings, and/or account details to suit individual needs. Such customization may enhance usability and/or convenience in digital experiences. In some embodiments, personalized configuration information may include customized definitions for types of trigger events (e.g., HTTP requests, database changes, message queue events) for invoking functions, and/or definitions for compute resources (e.g., CPU power, memory size, and timeout values) affecting performance, scalability, and costs. In some embodiments, personalized configuration information may additionally include customized environmental variables affecting how a function behaves in different deployment environments, network and/or security settings (e.g., defining access controls, network policies, firewall rules, whitelists, blacklists, and/or encryption protocols), definitions associated with concurrency (e.g., limits), scaling (e.g., auto-scaling thresholds, scaling policies), and/or CPU utilization. In some embodiments, personalized configuration information may additionally include customized definitions for logging and/or monitoring events, errors, and/or metrics for capturing and/or triggering alerts, and/or continuous integration/continuous deployment (CI/CD) pipelines. For example, a developer may transmit at least one signal conveying personalized configuration information including a limitation on a number of concurrent instantiations to meet a budget constraint, a first set of entities for denying access to one or more resources (e.g., a blacklist), a second set of entities for granting access to one or more resources (e.g., a whitelist), and/or a request to apply bespoke authentication and security protocols, in addition to standard authentication and security protocols.

A unique identifier refers to a string of characters or a code used to differentiate one thing from another. A unique identifier may include, for example, a string of characters, alphanumeric, or other information singularly associated with a specific entity. For example, the unique identifier may include an exclusive and/or distinctive code (e.g., a byte sequence), a set of letters or numbers, or any other combination of alphanumeric character's that may represent a particular entity. A unique identifier may be used to integrate one or more systems in a serverless environment and/or exchange data with additional systems. A unique identifier may provide a consistent and reliable means for identifying, tracking, and/or mapping one or more entities operating on one or more platforms, e.g., to facilitate data synchronization and interoperability. Recognition of a unique identifier may allow identification of the associated entity, e.g., for communication, tracking, validation, authorization, security, and/or privacy interests. Examples of unique identifiers may include a biometric code, a hash code, a social security number, a passport number, a unique IP address, an email address, a telephone number, a device identifier, an account number, an image, a QR code, a bar code, and/or any other sequence of characters singularly associated with an entity.

Figure 8:
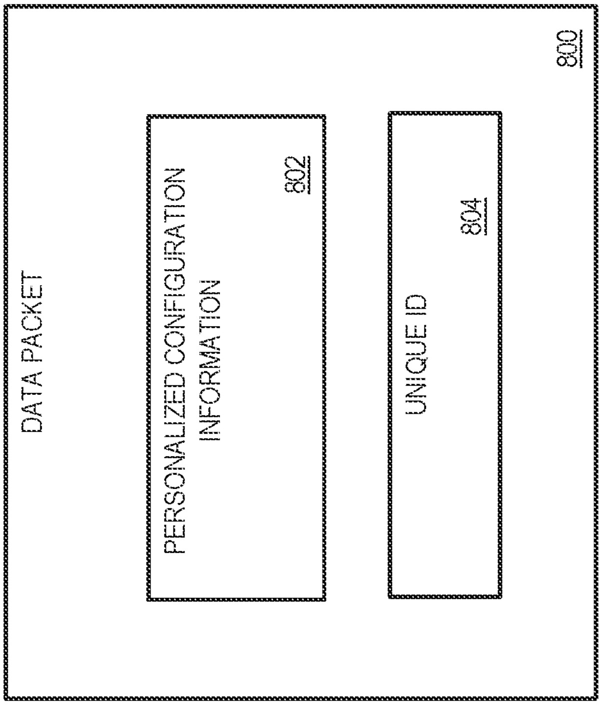
FIG. 8 is an exemplary block diagram representation of a data packet for transmission from an entity requesting application hosting, consistent with some disclosed embodiments.

Byway of a non-limiting example, reference is made to FIG. 8 illustrating an exemplary signal 800 that may be received from an entity requesting application hosting, consistent with some disclosed embodiments. For instance, signal 800 may be a data packet configured for transmission via a wired and/or wireless channel over a network according to a communications protocol. Signal 800 may include personalized configuration information 802 and a unique identifier 804 associated with an entity (e.g., developer 310).

Figure 10:
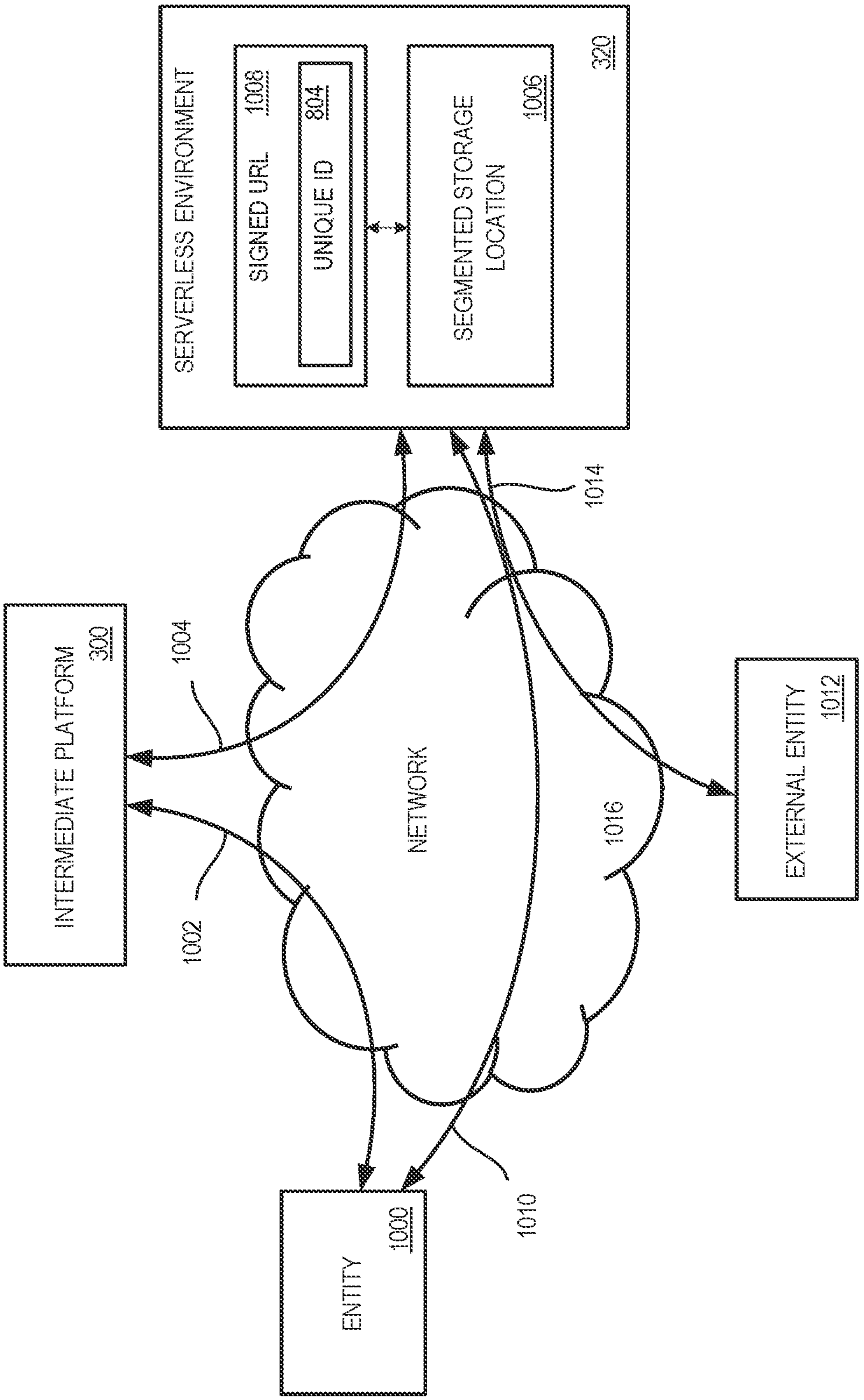
FIG. 10 is an exemplary network flow diagram between an entity requesting application hosting, an intermediate platform, and a serverless environment, consistent with some disclosed embodiments.

By way of another non-limiting example, reference is made to FIG. 10 illustrating an exemplary network flow diagram between an entity 1000 requesting application hosting, intermediate platform 300, and serverless environment 320 via network 1016, consistent with some disclosed embodiments. Entity 1000 may correspond to developer 310. Intermediate platform 300 may receive at least one signal 800 from entity 1000 over a first communication channel 1002 established via network 1016. Signal 800 may request application hosting for use with SaaS platform 100 in serverless environment 320. Signal 800 may convey encoded personalized configuration information 802 (e.g., defined by developer 310), and at least one unique identifier 804 associating developer 310 with the request and with the personalized configuration information.

Some disclosed embodiments involve using the personalized configuration information to construct a metadata configuration file. A metadata configuration file refers to a location for storing, or a collection of, metadata used for configuration, such as setting up or running an application. The file may contain descriptive data about other data. For example, such metadata may include settings, and/or parameters that may be used for running an application in a serverless environment. By way of example, such metadata may include privacy settings, permissions, restrictions, priorities, limits on a number of concurrent instantiations, and/or any other data for running an application in a serverless environment. A metadata configuration file may enable configuring a serverless environment for running a software application without requiring performance of modifications directly to a code for the software application, thereby facilitating deployment and/or execution of a software application. For example, a metadata configuration file may be used to allocate, manage, and/or maintain resources, implement version control and/or compliance with security, privacy, network protocols, indicate one or more rules, indicate one or more triggers and trigger-responsive actions, and/or indicate any other setting facilitating running an application in a serverless environment. A metadata configuration file may enable sharing and/or distributing one or more configuration settings to facilitate consistent and reproducible deployments and/or instantiations of an application in a serverless environment. Using personalized configuration information to construct a metadata configuration file involves utilizing personalized configuration information (as described elsewhere herein) to build the metadata configuration file, as also described elsewhere herein). For example, such construction may involve applying one or more settings included in personalized configuration information to generate a metadata configuration file. For example, at least one processor associated with an intermediate platform may parse personalized configuration information received from a developer to identify one or more personalized settings, insert the one or more personalized settings to fill a configuration template for a serverless environment, and transmit the filled configuration template to at least one processor of the serverless environment. As a non-limiting example, a developer may define events for triggering function calls, functions for responding to the events, and references to one or more libraries and databases for use during a code execution. The developer may transmit a signal conveying this information to at least one processor of an intermediate platform. The at least one processor of the intermediate platform may extract the defined events, functions, and references to the libraries and databases to determine one or more rules for applying in the serverless environment, and store the one or more rules in a metadata configuration file. In some embodiments, the at least one processor may associate the unique identifier received from the entity with the metadata configuration file, e.g., by including the unique identifier in the v.

Figure 9:
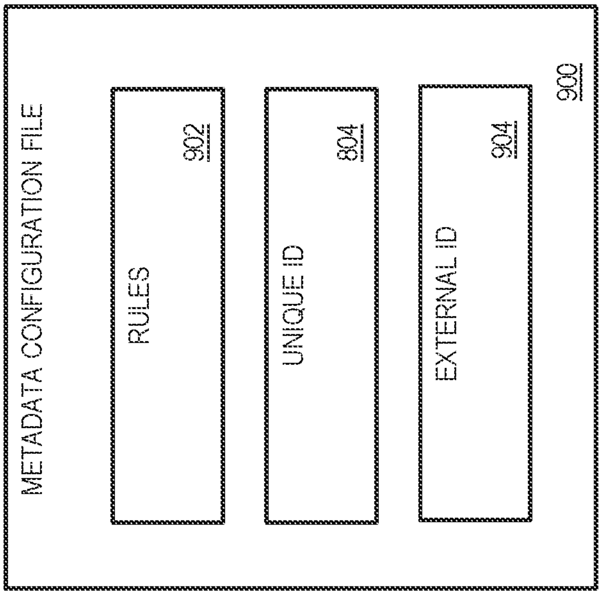
FIG. 9 is an exemplary block diagram representation of a metadata configuration file, consistent with some disclosed embodiments.

Byway of a non-limiting example, reference is made to FIG. 9 illustrating an exemplary metadata configuration file 900, consistent with some disclosed embodiments. Metadata configuration file 900 may be an electronic file storing at least one or more rules 902 based on personalized configuration information 802. At least one processor (e.g., processing circuitry 2310 of FIG. 23) associated with intermediate platform 300 (see FIG. 3) may use personalized configuration information 802 received from developer 310 to determine one or more rules for applying during deployment and/or execution of a software application in serverless environment 320 for use with SaaS platform 100. In some embodiments, the at least one processor may store the determined one or more rules in the metadata configuration file 900. In some embodiments, the at least one processor may include unique identifier 804 received from developer 310 in metadata configuration file 900. For example, personalized configuration information 802 may define specific APIs to invoke in response to particular events, designate certain libraries for accessing during a code execution, indicate a format for presenting an output of a code execution to an end-user, and/or designate a function for handling errors and exceptions. The at least one processor may associate the personalized configuration information 802 received from entity 1000, with one or more rules 902 and include the one or more rules 902 inside metadata configuration file 900.

Some disclosed embodiments involve transmitting to the serverless environment a request for a segmented storage location and a request for a related signed URL containing permission for writing data to the segmented storage location. Transmitting a request refers to sending a request. For example, a request may be sent over a network. A segmented storage location (e.g., a segment) in a serverless environment refers to a storage area distinct from one or more other areas. It may involve a logical and/or physical allocation of resources. For example, a segmented storage location may include a compartmentalized area of memory that may enable organized usage of a plurality of entities in an application while ensuring that each storage may only be used by the entity controlling it. In some embodiments, a segmented storage may be an allocated portion in the memory (a segment thereof) dedicated to a specific developer. For instance, the developer may have already performed configuration actions for the segmented storage. As an example, the developer may already have a map (e.g., a specific URL) and a key (e.g., a unique identifier) for the segmented storage. A request for a segmented storage location refers to a message or signal that seeks a segmented storage location. It may involve, for example, an instruction for an allocation of a segmented storage location in a serverless environment. In some embodiments, a request for a segmented storage location may utilize a service provided by a serverless environment (e.g., a software development kit or SDK, and/or an API). Transmitting to a serverless environment may involve sending one or more signals as data packets and/or a data stream to the serverless environment (e.g., via a wired and/or wireless communications network). For example, data may be sent according to one or more communication, security, privacy, and/or networking protocols defined during configuration of the serverless environment (e.g., a Transmission Control Protocol/Internet Protocol, or TCP/IP, a packet-oriented protocol such as User Datagram Protocol or UDP). Data may be transmitted to a serverless environment in response to a PUSH or PULL API request. A signed URL (e.g. a pre-authenticated or pre-signed URL) refers to a URL containing authentication information in the respective URL query string. For example, such authentication information may allow an entity to perform restricted actions and/or access restricted resources without requiring presentation of an authenticating credential. A signed URL may be time-limited, granting access to restricted resources until an expiration timestamp is reached. A request for a related signed URL refers to asking, seeking, prompting and/or submitting an instruction for a signed URL associated with a requested segmented storage location, the request may be for data that may be read from, and/or written to the segmented storage location using the signed URL (e.g., without requiring presentation of an authorizing credential). Writing data may include editing, modifying, adding, deleting, and/or otherwise changing data (e.g., stored in a memory location). Permission for writing data to a segmented storage location may include authorization to add, edit, delete, and/or otherwise modify data stored in a segmented storage location. Permission for writing data may be specific to a memory location, a type of data, a specific device, a specific communications channel, a context, a use-case, and/or any other criterion that may be used to permit and/or restrict writing of data.

For example, the at least one processor associated with the intermediate platform may transmit to the serverless environment a first request for a segmented storage location (e.g., in a first data packet). In addition, the at least one processor associated with the intermediate platform may transmit to the serverless environment a second request for a signed URL related to the segmented storage location (e.g., in a second data packet) for permitting writing of data thereto using the signed URL, e.g., without requiring additional authentication. In some embodiments, the first and second requests may be included in the same data packet. In some embodiments, the first request and/or the second requests may include the unique identifier received from the entity requesting application hosting. In response to the first request, the serverless environment may allocate a segmented storage location in a data repository of serverless environment (e.g., by directing the first request to a database management system governing a data repository). In response to the second request, the serverless environment may provide the intermediate platform with the signed URL permitting writing of data to the allocated segmented storage location (e.g., by directing the second request to the database management system governing the data repository).

By way of a non-limiting example, in FIG. 10, at least one processor (e.g., processing circuitry 2310 of FIG. 23) of intermediate platform 300 may transmit to serverless environment 320 over a second communications channel 1004 in network 1016, a request for a segmented storage location 1006 and a request for a related signed URL 1008 containing permission for writing data to segmented storage location 1006. For example, at least one processor of serverless environment 320 may direct the request to DBMS 2435-1, which may allocate segmented storage location 1006 in repository 2430-1. At least one processor associated with serverless environment 320 may provide related signed URL 1008 to intermediate platform 300 using second communications channel 1004 in network 1016. In some embodiments, all communication between developer 310 and entity 1000 may occur via the intermediate platform 300. In some embodiments, at least some communication between developer 310 and entity 1000 may bypass intermediate platform 300.

Some disclosed embodiments involve sending the metadata configuration file to the segmented storage location. Sending the metadata configuration file to the segmented storage location refers to transmitting the metadata configuration file to the segmented storage location. This may occur, for example, over a communications network, e.g., using the signed URL received from the serverless environment. In some embodiments, at least one processor of the intermediate platform may provide the metadata configuration file to the serverless environment along with a request to create a signed URL for subsequent transmission of the code therewith. The server may configure the segmented space based on the information in the metadata configuration file (e.g., a different metadata configuration file may produce a different configuration for a segmented storage location). Following configuration of the segmented storage location, at least one processor of the serverless environment may provide the signed URL to the developer, permitting the developer to subsequently use the signed URL to send the code to the segmented storage. In some instances, at least one processor of the serverless environment may transmit the signed URL to the intermediate platform and the intermediate platform may forward the signed URL to the developer. In some instances, at least one processor of the serverless environment may transmit the signed URL to the developer directly (e.g., bypassing the intermediate platform).

By way of a non-limiting example, in FIG. 10, the at least one processor of intermediate platform 300 may send metadata configuration file 900 (e.g., including rules 902 and unique identifier 804) to segmented storage location 1006 over second communications channel 1004, e.g., using signed URL 1008. The at least one processor of serverless environment 320 may store metadata configuration file 900 at the segmented storage location in repository 2430-1 via DBMS 2435-1. For instance, the at least one processor of serverless environment 320 may use signed URL 1008 to write rules 902 to the segmented storage location in repository 2430-1 associated with invoking the specific APIs in response to the particular events, accessing the designated libraries during code execution, presenting an output of a code execution to a user according to the indicated format, and/or handling errors and exceptions using the designated function, as defined in personal configuration information 802.

Some disclosed embodiments involve providing the signed URL to the entity requesting application hosting for enabling secure code transmission to the segmented storage location directly by the entity requesting application hosting. Secure code transmission refers to a process of sending or receiving computer code (such as software, scripts, or configurations) over a network or communication channel in a manner that ensures confidentiality, integrity, and/or authenticity. Such protocols may include network, security, and/or privacy protocols, encoding and/or encryption schemes, validation and/or authentication schemes (e.g., use of a one-time-password, biometric token, hash code), and/or any other technique ensuring delivery of a code to a destination securely, for example, in an uncorrupted manner, and preventing data leakage and/or unauthorized copying of the code. Providing a signed URL to the entity requesting application hosting refers to transmitting a data packet including a payload storing the signed URL and/or streaming the signed URL to the requesting entity (e.g., as a PUSH operation), and/or sending the requesting entity a reference for accessing the signed URL from a repository (e.g., as a PULL operation). Enabling secure code transmission to the segmented storage location directly by the entity requesting application hosting refers to implementing measures and practices to ensure that computer code (such as software, scripts, or configurations) is transmitted over a network or communication channel in a secure and protected manner. This transmission occurs from the entity to the segmented storage location. For example, the requesting entity may send a code to the segmented storage location using a dedicated communications link established solely between the entity and the serverless environment, and that avoids interruption and/or diversion by a third party (e.g., an intermediate platform). The dedicated communications link may be protected from corruption and data leakage using one or more secure transmission protocols.

Figure 11:
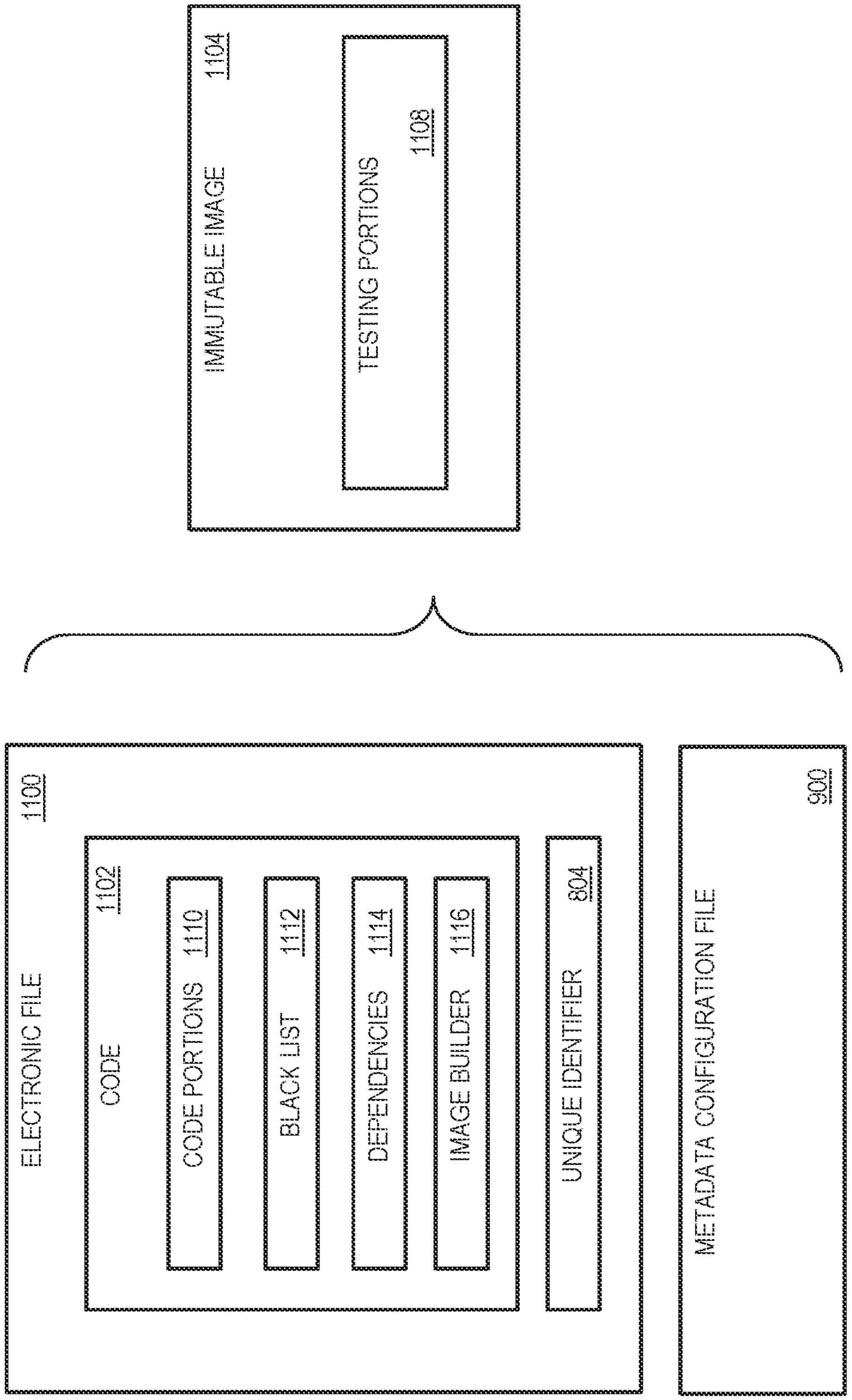
FIG. 11 is an exemplary block diagram for file storing an application code for hosting in a serverless environment, consistent with some disclosed embodiments.

By way of a non-limiting example, reference is made to FIG. 11 illustrating an exemplary electronic file 1100 storing an application code 1102 for hosting in serverless environment 320, consistent with some disclosed embodiments.

By way of another non-limiting example, in FIG. 10, the at least one processor of intermediate platform 300 may provide signed URL 1008 to entity 1000 requesting application hosting via first communications channel 1002 of network 1016. For example, intermediate platform 300 may transmit signed URL 1008 to entity 1000 inside a payload of a data packet, and/or send a link allowing entity 1000 to retrieve signed URL 1008. Signed URL 1008 may enable secure code transmission of code 1102 to segmented storage location 1006 directly by entity 1000. For example, entity 1000 may use signed URL 1008 to transmit electronic file 1100 containing code 1102 directly to segmented storage location 1006 via a third communications channel 1010 of network 1016 that bypasses intermediate platform 300. In some embodiments, one or more security protocols may be implemented on third communications channel 1010 to prevent data leakage and/or corruption during code transmission.

In some disclosed embodiments, the code is configured such that following receipt via the signed URL, the serverless environment is enabled to establish an immutable image from the code and the metadata configuration file. An immutable image may be understood as described and exemplified elsewhere herein. Following receipt via the signed URL refers to after, or subsequent to receiving the signed URL. Upon receiving the code from the entity by way of the signed URL, at least one processor of the serverless environment may store the code in the segmented storage location. In some embodiments, after the code is received, the signed URL may no longer be usable to access the segmented storage location. For example, the signed URL may grant permission to one or more individuals, such as the developer, to write the code in the segmented storage location, allowing the code to be available for use by the platform. Establishing an immutable image from a code and a metadata configuration file refers to forming an immutable image (as described and exemplified elsewhere herein) based on the code received directly from the entity, and the metadata configuration file received from the intermediate platform. For instance, any information required to form the immutable image may be included in the code received from the entity and/or in the metadata configuration file received from the intermediate platform. For example, at least one processor of the serverless environment may apply one or more rules in the metadata configuration file to establish an immutable image that configures the serverless environment according to the personalized configuration information provided to the intermediate platform by the entity requesting application hosting. Consequently, instantiations of the immutable image may cause code executions that comply with the personalized configuration settings.

By way of another example, at least one processor of a serverless environment may receive a metadata configuration file from an intermediate platform via a first communications channel connecting the intermediate platform with the serverless environment. In some embodiments, the intermediate platform may transmit the metadata configuration file to the serverless environment using the signed URL, enabling at least one processor of the serverless environment to write the metadata configuration file at the segmented storage location. The metadata configuration file may include rules based on the personalized configuration information provided by the entity requesting application hosting to the intermediate platform. For instance, some of the rules may define particular trigger events (e.g., user inputs) and corresponding trigger-responsive actions (e.g., read and write operations) on a specific database using a particular set of APIs. In addition, the at least one processor of the serverless environment may receive a code with a request for application hosting from an entity (e.g., a developer) via a second, direct communications channel using the signed URL to connect the entity directly with the serverless environment, and bypassing the intermediate platform. The at least one processor of the serverless environment may store the code at the segmented storage location using the related signed URL. Upon receiving the metadata configuration information from the intermediate platform (e.g., via the first communications channel), and the code from the entity (e.g., via the second communications channel), the at least one processor of the serverless environment may create an immutable image therefrom. The at least one processor of the serverless environment may store the immutable image at the segmented storage location (e.g., using the related signed URL), such that subsequent instantiations of the immutable image cause code executions to comply with the personalized configuration information. In some embodiments, the immutable image may be stored in a location other than the segmented storage location. For example, subsequent actuated instantiations of the immutable image may respond to the particular trigger events (e.g., user inputs) by performing the corresponding trigger-responsive actions (e.g., read and write operations) on the specific database using the particular set of APIs, according to the personalized configuration information provided by the entity to the intermediate platform.

By way of a non-limiting example, in FIG. 10, following receipt of metadata configuration file 900 from intermediate platform 300 over first communications channel 1002 of network 2410, and following receipt of a code from developer 310 using signed URL 1008 using third communications channel 1010 of network 2410, at least one processor (e.g., processing circuitry 2310) of serverless environment 320 may establish immutable image 1104 (see FIG. 11) from code 1102 (see FIG. 11) and metadata configuration file 900. Immutable image 1104 (see FIG. 11) may be formed such that subsequent instantiations may implement personalized configuration information 802. For example, an actuated instance of the immutable image may invoke the specific APIs in response to the particular events, access the designated libraries, present an output to a user according to the specified format, and/or invoke the designated function to handle errors and exceptions.

Figure 12:
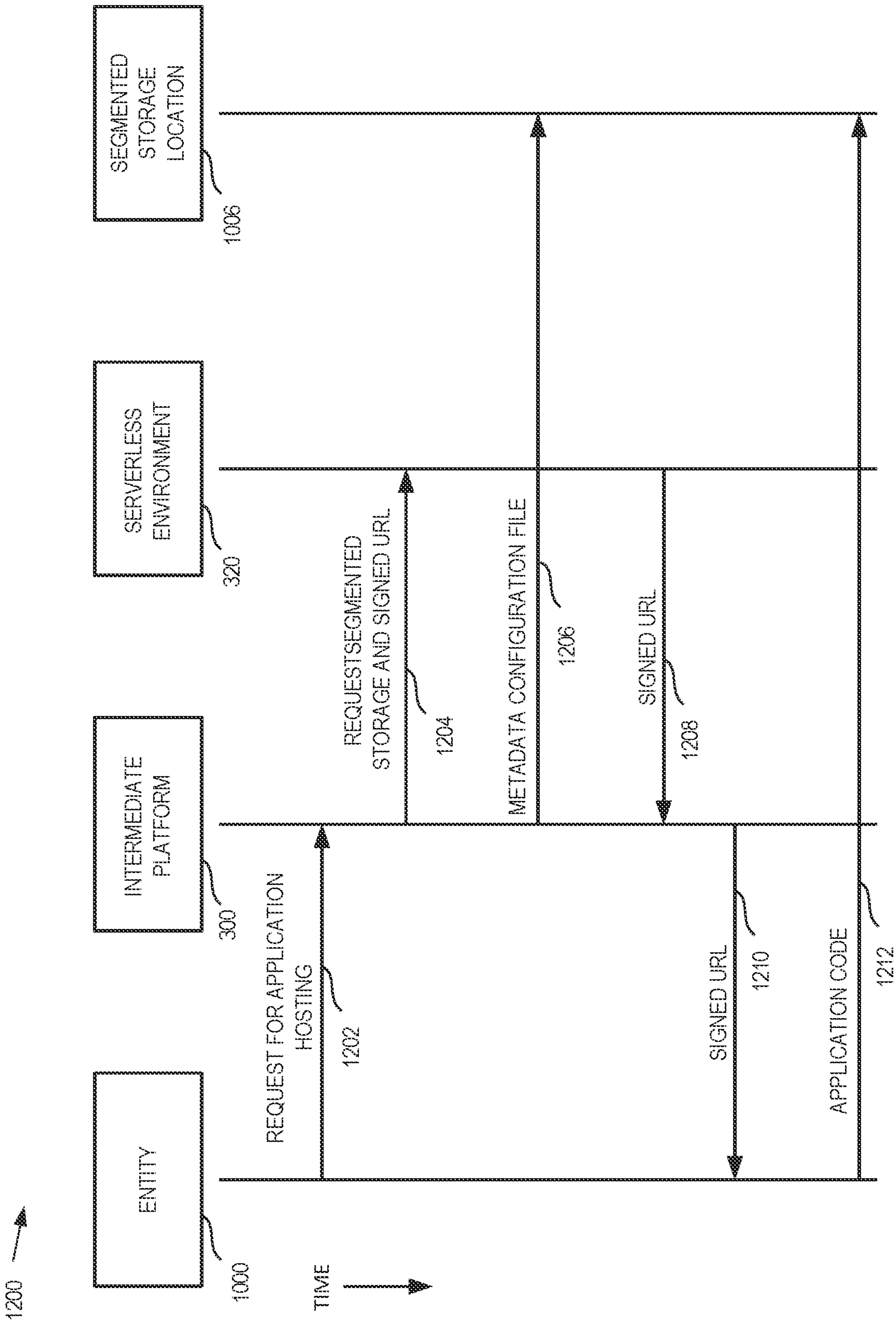
FIG. 12 is an exemplary multi-party communication flow diagram illustration communication between an entity requesting application hosting, an intermediate platform, a serverless environment, and a segmented storage location provided by the serverless environment, consistent with some disclosed embodiments.

By way of an additional non-limiting example, reference is made to FIG. 12 illustrating an exemplary multi-party communication flow 1200 between entity 1000 requesting application hosting (e.g., corresponding to developer 310), intermediate platform 300, serverless environment 320, and segmented storage location 1006 provided by serverless environment 320, consistent with some disclosed embodiments. Multi-party communication flow 1200 may be implemented over network 2410.

In a first communication 1202, intermediate platform 300 may receive from entity 1000, a signal (e.g., data packet 800) requesting application hosting for use with SaaS platform 100. Entity 1000 may send first communication 1202 to intermediate platform 300 using first communications channel 1002 of network 2410 (see FIG. 10) connecting entity 1000 to intermediate platform 300. The signal (e.g., data packet 800 of FIG. 8) may convey personalized configuration information 802 and unique identifier 804. The at least one processor (e.g., processing circuitry 2310 of FIG. 23) associated with intermediate platform 300 may use personalized configuration information 802, and optionally unique identifier 804, to construct metadata configuration file 900 (see FIG. 9).

In a second communication 1204, intermediate platform 300 may transmit to serverless environment 320 a request for segmented storage location 1006 and a request for related signed URL 1008 containing permission for writing data to segmented storage location 1006. Intermediate platform 300 may transmit second communication 1204 using second communications channel 1004 of a network (such as network 1016), connecting intermediate platform 300 with serverless environment 320.

In a third communication 1206, the at least one processor of intermediate platform 300 may send metadata configuration file 900 to segmented storage location 1006. For example, at least one processor of intermediate platform 300 may send metadata configuration file 900 to serverless environment 320 prior to generation of signed URL 1008 in serverless environment 320. In some implementations, at least one processor of serverless environment 320 may use metadata configuration file 900 to configure segmented storage location 1006. Subsequent to the configuration of segmented storage location 1006, at least one processor of serverless environment 320 may generate signed URL 1008 granting permission to access segmented storage location 1006. In some embodiments, at least one processor of intermediate platform 300 may send metadata configuration file 900 to segmented storage location 1006 in association with unique identifier 804 received from developer 310.

In some embodiments, a request for segmented storage location 1006 and a request for related signed URL 1008 containing permission for writing data to segmented storage location may be sent to serverless environment with metadata configuration file 900. For instance, second communication 1204 and third communication 1206 may be combined into a single communication.

In a fourth communication 1208, upon allocation of segmented storage location 1006 and generation of related signed URL 1008 (e.g., by enlisting DBMS 2435-1), serverless environment 320 may transmit signed URL 1008 to intermediate platform 300. Serverless environment 320 may transmit signed URL 1008 to intermediate platform 300 via second communications channel 1004 of a network (such as network 1016).

In a fifth communication 1210, upon receiving signed URL 1008 from serverless environment 320 intermediate platform 300 may provide signed URL 1008 to entity 1000 (e.g., developer 310), e.g., via first communications channel 1002.

In a sixth communication 1212, entity 1000 may use signed URL 1008 to transmit electronic file 1100 containing code 1102 to segmented storage location 1006 directly, e.g., using third communication channel 1010 that bypasses intermediate platform 300 by connecting entity 1000 directly to segmented storage location 1006 of serverless environment 320. Third communications channel 1010 may be configured for secure communications, e.g., via implementation of one or more privacy and/or security protocols.

In some embodiments, the immutable image includes testing portions such that after the immutable image is established and an actuated instance thereof is deployed, the testing portions provide information on runtime factors and compatibility of the code. Testing may involve performance of one or more of experimenting, analyzing, measuring, and/or assessing operations to determine compliance with one or more criterion. Testing portions included in an immutable image refers to one or more executable instructions associated with an actuated or actuatable instance of an immutable image, that when executed by at least one processor, causes the at least one processor to perform one or more tests. An actuated instance of an immutable image may be understood as described and exemplified elsewhere herein. After an immutable image is established and an actuated instance thereof is deployed refers to a time following or subsequent to the formation of an immutable image (e.g., using a code received from an entity and a metadata configuration file received from an intermediate platform), and instantiation of the immutable image in the serverless environment. Information on runtime factors refer to data associated with an execution of a code (e.g., in preparation for, during, and following termination of an execution). Some examples of such information may include data associated with function invocations (e.g., a timestamp, a duration, a request identifier, associated metadata), execution behavior and/or performance metrics (e.g. execution time, CPU usage, RAM memory consumption, network traffic and latencies, and/or memory storage utilization during runtime), and/or log and console events (e.g., outputted recordings of runtime data for debugging, troubleshooting, and/or auditing purposes). Additional examples of information on runtime factors may include traces for errors, exceptions, and/or failures encountered during function execution, incoming requests and outgoing responses (e.g., including headers, parameters, and message body), and/or distributed traces for tracking end-to-end execution flow including interactions with additional (e.g., concurrent) processes, services and/or components (e.g., to identify latency or bottlenecks). Compatibility of a code refers to interoperability and/or compliance of a code, e.g., with additional processes, applications, protocols, services, and/or functions of a serverless environment. For instance, upon establishing the immutable image and deploying an actuated instance thereof in the serverless environment, at least one processor may execute the testing portions of the actuated instance to output runtime information (e.g., memory and CPU usage, latencies, logs tracking communication with services provided by the serverless environment). The at least one processor may provide the runtime information to the entity requesting application hosting, the intermediate platform, and/or to an administrator of the serverless environment.

By way of a non-limiting example, in FIG. 11, immutable image 1104 includes testing portions 1108 such that after the immutable image 1104 is established. and an actuated instance thereof is deployed (e.g., in serverless environment 320), testing portions 1108 provide information on runtime factors and compatibility of code 1102 (e.g., with additional services, processes, and/or functions associated with executing code 1102 in serverless environment 320). For example, executing testing portions 1108 may produce an account of tracked communications, utilized resources, and latencies for trouble shooting purposes.

In some disclosed embodiments, the received code is scanned at the serverless environment in accordance with a set of rules included in the metadata configuration file. Scanning (e.g., a code) includes one or more of reading, parsing, analyzing, and/or testing a code and/or a portion thereof. Scanning a code may reveal one or more (e.g., coding) errors, vulnerabilities, and/or lack of compatibility with a serverless environment. Code scanning may occur according to a schedule and/or in response to an event (e.g., a PUSH event associated with uploading a code to a serverless environment, and/or a request for a scan). In some embodiments, a serverless environment may provide a service (e.g., an API) for scanning a code. A set of rules refers to a collection or system of guidelines, principles, or instructions that govern or regulate specific actions, behaviors, procedures, or interactions, as described and exemplified elsewhere in this disclosure. A set of rules included in the metadata configuration file refers to one or more rules stored, indicated, and/or designated in the metadata configuration file for application in the serverless environment. For example, an intermediate platform may determine a set of rules based on the personalized configuration information received from an entity requesting application hosting, as described elsewhere herein. The intermediate platform may include the set of rules in the metadata configuration file and provide the metadata configuration file with the set of rules to the serverless environment. At least one processor of the serverless environment may apply the set of rules to configure the serverless environment according to the personalized configuration information, thereby alleviating the entity requesting application hosting from having to determine the set of rules, and facilitating deployment of the software application. The intermediate platform may thus interface between the entity (e.g., a code developer) and the serverless environment and ensure compatibility and operability of the code in the serverless environment while maintaining compliance with the personalized configuration information. Scanning at a serverless environment in accordance with a set of rules may involve enlisting at least one processor of a serverless environment to apply the set of rules while reading, parsing, analyzing, and/or testing a code (e.g., and/or sections thereof). For example, applying the set rules may identify one or more errors, vulnerabilities, malware, incompatibilities, performance criterion, and/or any other issue affecting an execution of a software application in the serverless environment. The at least one processor of the serverless environment may apply the set of rules to a text for a code (e.g., to validate syntax), to a simulation of a code, and/or to an execution of a code (e.g. using a sandbox), and/or to portions thereof. In response to determining non-compliance of the code with the set of rules, the at least one processor may issue an alert and/or modify the code to cause compliance therewith.

By way of a non-limiting example, in FIG. 10, serverless environment 320 may scan received code 1102 at the serverless environment 320 in accordance with rules 902 included in metadata configuration file 900. For instant, based on the scanning, the at least one processor of serverless environment 320 may include one more libraries referenced in metadata configuration information 900 in immutable image 1104.

Some disclosed embodiments involve providing predefined code portions that are not scanned at the serverless environment. Predefined code portions refers to sections of a code indicated, selected, and/or otherwise stipulated in advance (e.g., prior to transmitting the code to the serverless environment). Not scanned at the serverless environment refers to sections of code included in an immutable image that were omitted from scanning. For example, at least one processor of an intermediate platform may include one or more rules in a metadata configuration file to indicate sections of code to be omitted from scanning, and transmit the metadata configuration file to the serverless environment (e.g., in association with the signed URL). Upon receiving a code from an entity requesting application hosting using the signed URL, the at least one processor of the serverless environment may scan the received code according to the set of rules included in the metadata configuration file, and omit the scanning of the indicated sections. For example, non-scanned portions of the code may be associated with activation of rules for the generation of the immutable image, and/or association with internal resources, as disclosed elsewhere herein.

By way of a non-limiting example, in FIG. 10, entity 1000 may provide predefined code portions 1110 (see FIG. 11) that may not be scanned at serverless environment 320. For instance, code 1102 (see FIG. 11) may include instructions blocking at least one processor of serverless environment 320 from scanning code portions 1110.

In some disclosed embodiments, scanning the received code includes finding blacklisted elements, validating dependencies, and verifying that an image builder portion is intact prior to being turned into the immutable image. A blacklist refers to a disallow list and/or a deny list. It may include one or more identities for which access to one or more resources, services, and/or functions of a serverless environment may be denied, or otherwise restricted. Such identities may include, for example, email addresses, identifiers associated with a user, a device, and/or an account, passwords, credentials, URLs, IP addresses, domain names, file hashes, and/or any other identifier for an identity in a serverless environment. A blacklisted element refers to a piece of code that is prohibited or restricted within a particular context or environment. A blacklisted element may be identified based on known vulnerabilities, non-compliant coding practices, and/or non-compatibility. Maintaining a code blacklist may prevent use of code elements posing security risks and/or violating coding standards. Examples of blacklisted elements may include malicious code, blocked communication paths, and/or usage of an insecure function. Finding blacklisted elements refers to identifying prohibited and/or restricted portions of a code. For example, at least one processor may scan a code and compare scanned portions to a blacklist to determine a match. As another example, at least one processor may enlist an AI agent to identify one or more blacklisted elements in a code. Dependencies (in a serverless environment) refer to one or more external resources and/or services utilized by an application running in a serverless environment. Such dependencies may include, for example, software and/or hardware components necessary for code execution, third-party libraries, and/or packages (e.g., frameworks, SDKs or Software Development Kits, and/or additional installed modules) referenced by a code, and/or databases and/or storage services used by a code in a serverless environment. Additional examples of dependencies may include authentication and/or authorization Services (e.g., OAuth providers, Single Sign-On or SSO services, and/or custom authentication systems), messaging and event handlers, external APIs and web services (e.g., to integrate third-party services, such as payment or billing, social media accounts, geolocation services, and/or any other third-party service), and/or infrastructure services (e.g., Domain Name System or DNS services and/or content delivery networks or CDNs). Dependencies for a code running in a serverless environment may be declared in a (e.g., metadata) configuration file associated with the code. Validating dependencies (in a serverless environment) refers to performing one or more of testing, simulating, and/or execution operations on a code (or portions thereof) to ensure compatibility and/or interoperability with deployed and/or executed dependencies. For example, at least one processor may validate an API configured to access a search engine such that during a code execution, invocation of the search engine via the API terminates successfully by returning a relevant search result. An image builder (in a serverless environment) refers to a tool and/or service configured to generate an image for a serverless application. An image builder may simplify the process of building, packaging, and/or deploying containerized applications in a serverless environment. An image builder may receive application source code and/or associated configuration files (e.g., referencing one or more libraries, frameworks, and/or third party assets), fetch any required libraries, packages, and/or modules (e.g., using Node.js, pip for Python, and/or Maven for Java), to create a container image. In some embodiments, an image builder may use a base image as a template for a runtime environment, compile an application code, and/or install one or more dependencies referenced in an associated metadata configuration file to create an immutable image. In some embodiments, an image builder may optimize a code, e.g., by only rebuilding revised portions of a code to reduce deployment time and use of compute resources. In some embodiments, an image builder may automatically push an immutable image to a container registry or repository for deployment in a serverless platform. An intact image builder refers to a portion in a code dedicated to building an image, that is comprehensive, complete, and/or exhaustive, for building an executable image. For example, invoking an intact image builder produces an image that may be repeatedly and successfully instantiated in a serverless environment. Verifying that an image builder portion is intact prior to being turned into the immutable image may involve analyzing and/or testing an image builder to ensure comprehensive and/or complete recognition and handling of any libraries, APIs, and/or other third party assets referenced by a code. In some embodiments, an image builder portion may include a portion of code utilized by an AI agent and/or a third party software application to determine how to generate a new image building file.

By way of a non-limiting example, in FIG. 11, at least one processor of serverless environment 320 may scan received code 1102 and find blacklisted elements 1112, validate dependencies 1114, and verify that an image builder portion 1116 is intact prior to being turned into immutable image 1104. During subsequent actuated instances of immutable image 1104, the at least one processor of serverless environment 320 may deny requests originating from any identity in blacklisted elements 1112.

In some disclosed embodiments, the signed URL and the metadata configuration file include an ID unique to the request. An ID unique to a request (for application hosting) refers to a unique identifier, as described and exemplified elsewhere herein, that is associated with a request for application hosting in a serverless environment. In some embodiments, an ID unique to the request may associate the sender of a code (e.g., a developer) with the segmented storage location, (e.g., instead of opening a new segmented storage location whenever a developer transmits a new and/or updated code). An ID unique to a request may be associated with one or more of a timestamp when the request was issued, and/or an identifier associated with a device, a user, an account, a virtual machine, a process, and/or any other identity capable of issuing the request. In some embodiments, the ID unique to the request is the unique identifier conveyed by the signal received from the entity requesting application hosting. In some embodiments, at least one processor of an intermediate platform may generate an ID unique to the request using the unique identifier requesting application hosting. The at least one processor may include the ID unique to the request when constructing the metadata configuration file. At least one processor of the serverless environment may extract the ID unique to the request from the metadata configuration file for inclusion in the signed URL, to thereby associate the signed URL with the entity requesting application hosting. In some embodiments, at least one processor may utilize the ID unique to the request for tracing and/or tracking of an application deployed to a serverless environment, e.g., for validation, authentication, and/or trouble-shooting purposes.

By way of a non-limiting example, in FIG. 10, signed URL 1008 and metadata configuration file 900 may include unique identifier 804, which may be unique to the request for application hosting.

In some disclosed embodiments, secure code transmission is only allowed if the ID of the signed URL and the ID of the metadata configuration file match. A match between an ID of a signed URL and an ID of a metadata configuration file refers to determining consistency, similarity, and/or identicalness between the ID of the signed URL and the ID of the metadata configuration file. For example, at least one processor may subtract a numericized ID of the signed URL from a numericized ID of the metadata configuration file (or the reverse) and determine a match based on a zero output value. Additionally or alternatively, the at least one processor may determine a vector distance between a numericized ID of the signed URL from a numericized ID of the metadata configuration file and compare the determined vector distance to a predetermined threshold vector distance to determine whether the numericized ID of the signed URL matches the numericized ID of the metadata configuration file. In some embodiments, the at least one processor may compute one or more other mathematical and/or statistical quantities using the numericized ID of the signed URL and the numericized ID of the metadata configuration file and compare the determined mathematical and/or statistical quantities with the corresponding threshold to determine whether the numericized ID of the signed URL matches the numericized ID of the metadata configuration file. A match between an ID of a signed URL and an ID of a metadata configuration file may indicated absence of another (e.g., intervening) entity, different from the entity requesting application hosting, requesting access to the segmented storage location, and may thwart corruption in a development pipeline for an application.

Byway of a non-limiting example, in FIGS. 8 to 11, at least one processor (e.g., processing circuitry 2310 of FIG. 23) of intermediate platform 300 may include unique identifier 804 in metadata configuration file 900 transmitted to segmented storage location 1006 (e.g., inside third communication 1206 via second communications channel 1004). Upon receiving code 1102 from entity 1000 using signed URL 1008 (e.g., inside sixth communication 1212 via third communications channel 1010), the at least one processor of serverless environment 320 may only allow deployment of code 1102 at segmented storage location 1006 on condition that unique identifier 804 of signed URL 1008 (e.g., received from entity 1000 in sixth communication 512) matches unique identifier 804 in metadata configuration file 900 (e.g., received from intermediate platform 300 in third communication 1206).

In some disclosed embodiments, when a request for a new version of the code to be transmitted to the segmented storage location is generated, the signed URL provided by the serverless environment is maintained. A request for a new version of a code to be transmitted to a segmented storage location refers to an instruction and/or call to upload a revised and/or modified release of a code to a segmented storage location (as described and exemplified elsewhere in this disclosure). Maintaining a signed URL provided by a serverless environment refers to preserving the signed URL. For example, maintaining the signed URL used to access a segmented storage location for a first version of a code may be preserved and used to access the segmented storage location for a second (e.g., updated) version of the code. For example, a developer may use the same signed URL to upload multiple releases of a code to the same segmented storage location in a serverless environment.

By way of a non-limiting example, in FIG. 10, upon receiving a request to transmit a new version of code 1102 (see FIG. 11) to segmented storage location 1006, the at least one processor (e.g., processing circuitry 2310 of FIG. 23) of serverless environment 320 may maintain signed URL 1008 provided to entity 1000 (e.g., developer 310). For example, this may allow entity 1000 to deploy a new version of code 1102 at segmented storage location 1006.

In some disclosed embodiments, when the signed URL is provided to the entity requesting code hosting, a connection is established between the segmented storage location and the entity requesting application hosting without passing through the intermediate platform. A connection refers to a communication channel linking two different communicating parties or devices via a network. Establishing a connection between a segmented storage location and an entity requesting code hosting without passing through an intermediate platform refers to using a communications network to create a communications channel between the entity and the segmented storage location in the serverless environment such that information flowing between the entity and the segmented storage location bypasses and/or circumvents the intermediate platform. For example, the entity may use such a connection to transmit a code for an application to a serverless environment using a signed URL that bypasses the intermediate platform.

By way of a non-limiting example, in FIG. 10, intermediate platform 300 may provide signed URL 1008 to entity 1000 requesting application hosting (e.g., developer 310)). Entity 1000 may use signed URL 1008 to establish a connection (e.g., third communications channel 1010) directly with segmented storage location 1006, without passing through intermediate platform 300. For instance, third communications channel 1010 may connect entity 1000 directly with segmented storage location 1006 in serverless environment 320, and bypass intermediate platform 300. Consequently, developer 310 may transmit code 1102 directly to segmented storage location 1006 without code 1102 passing through intermediate platform 300.

Some disclosed embodiments involve providing the signed URL to at least one external entity. An external entity refers to an entity other than the requesting entity and/or the intermediate platform. Providing a signed URL to an external entity refers to determining an address for an external entity, establishing a communications link to an address for an external entity, and/or transmitting a signed URL to the external entity using a communications link (e.g., as a data packet or data stream). For example, an external entity may be associated with performance of one or more services for application hosting in a serverless environment. Such services may be associated with, for example, security, malware detection, privacy, authentication, billing, compliance, performance, troubleshooting, data analytics, and/or any other service that facilitate application hosting in a serverless environment.

In some disclosed embodiments an identifier of the at least one external entity is included in the metadata configuration file. An identifier of an external entity refers to a name, code, variable, or label that serves as a refers to the at least one external entity. The identifier may be a unique identifier (described and exemplified elsewhere herein) associated with the external entity. Including an identifier of an external entity in a metadata configuration file may involve writing, storing, and/or containing the identifier for the external entity or a reference thereto in the metadata configuration file.

By way of a non-limiting example, in FIG. 10, serverless environment 320 may provide signed URL 1008 to at least one external entity 1012, e.g., over a fourth communications channel 1014 in network 2410. For example, external entity 1012 may be configured to perform trouble-shooting for actuated instances of immutable image 1104. In some embodiments, metadata configuration file 900 (see FIG. 9) may include an identifier 904 of external entity 1012.

Some disclosed embodiments involve receiving by the intermediate platform at least one additional signal from the entity requesting application hosting for use with a SaaS platform, wherein the at least one additional signal is configured to convey updated personalized configuration information and at least one additional unique identifier. An additional signal refers to at least one other signal. For example, an additional signal may include a second signal transmitted at different time (e.g., after) the signal requesting application hosting. The additional or second signal may have characteristics and/or functions similar to those described above for a signal. Updated personalized configuration information may include one or more changes and/or adjustments to the personalized configuration information conveyed in the earlier (e.g., original) signal. The updated personalized configuration information may include additional and/or fewer settings and/or preferences, and/or changed settings and/or preferences. For example, the updated personalized configuration information may define new user inputs as triggers and a new set of corresponding trigger-responsive actions. Some disclosed embodiments involve using the updated personalized configuration information to construct an updated metadata configuration file. Using the updated personalized configuration information to construct the updated metadata configuration file may be performed in a manner similar to that described elsewhere in this disclosure. For example, the at least one processor of the intermediate platform may determine a new set of rules based on the updated personalized configuration information and include the new set of rules in an updated metadata configuration file. Some disclosed embodiments involve sending the updated metadata configuration file to the segmented storage location. Sending the updated metadata configuration file to the segmented storage location may be performed in a manner similar to that described elsewhere in this disclosure. For example, the at least one processor of the intermediate platform may send the updated metadata configuration file using the same communications channel used to send the (e.g., first) metadata configuration file, (e.g., using the signed URL). Some disclosed embodiments involve providing the signed URL to the entity requesting application hosting for enabling a secure additional code transmission to the segmented storage location directly by the entity requesting application hosting, which may be performed in a manner similar to that described elsewhere in the disclosure. In some embodiments, the additional code is configured such that following receipt via the signed URL, the serverless environment is enabled to establish an updated immutable image from the additional code and the updated metadata configuration file, which may be performed in a manner similar to that described elsewhere in this disclosure.

Byway of a non-limiting example, in FIGS. 8 to 10, intermediate platform 300 may receive at least one additional signal from entity 1000 requesting application hosting for use with SaaS platform 100, e.g., over first communications channel 1002. The at least one additional signal may be configured to convey an updated version of personalized configuration information 802 and at least one additional unique identifier. At least one processor (e.g., processing circuitry 2310 of FIG. 23) of intermediate platform 300 may use the updated version of personalized configuration information 802 to construct an updated version of metadata configuration file 900. The at least one processor of intermediate platform 300 may send the updated version of metadata configuration file 900 to segmented storage location 1006. The at least one processor of serverless environment 320 may provide an updated version of signed URL 1008 to entity 1000. For instance, a time period for using signed URL 1008 (e.g., provided to entity 1000 in fifth communication 1210 may have expired, and the updated version of signed URL 1008 may be usable for a current time period. The updated version of signed URL 1008 may enable an additional secure code transmission (e.g., to send a revised version of code 1102) to segmented storage location 1006 directly by entity 1000. The additional code may be configured such that following receipt of the addition code via signed URL 1008, serverless environment 320 may establish an updated version of immutable image 1104 from the additional code and the updated version of metadata configuration file 900.

Some disclosed embodiments involve verifying that the at least one additional unique identifier is identical to the at least one unique identifier to guarantee an identity of the entity requesting application hosting for use with a SaaS platform. Verifying refers to checking, validating, and/or confirming. Verifying that at least one additional unique identifier is identical to the at least one unique identifier refers to comparing the additional unique identifier with the at least one unique identifier to determine a match or an association. This may be accomplished, for example, by performing a subtraction operation and determining a zero value output, by determining a vector distance and comparing to a predetermined threshold, and/or determining any other mathematical or statistical quantity and comparing the determined quantity to a predetermined threshold. A guarantee of an identity refers to an assurance, certification, authentication, or validation of the identity. It may involve certifying and/or authenticating that the entity associated with the additional signal conveying the updated personalized configuration information matches the entity associated with the (e.g., first) signal conveying the (e.g., original) personalized configuration information. For example, the serverless environment may authenticate subsequent requests by a software developer to deploy revised (e.g., updated) versions of a software application for hosting in serverless environment for use with the SaaS platform. In some disclosed embodiments, the additional code is an updated version of the code. The updated versions may include, for instance, added features, revised code portions to fix errors, references to additional libraries and/or resources, updated white lists and/or black lists, and/or any other change to a code for a software application. In some disclosed embodiments, the updated personalized configuration information and the updated metadata configuration file are identical to the personalized configuration information and the metadata configuration file. For example, a developer may maintain the personalized configuration information for multiple deployments of revised versions of code for a software application.

Byway of a non-limiting example, in FIGS. 8-12, at least one processor of intermediate platform 300 may verify that at least one additional unique identifier (e.g., received with the additional signal from entity 1000) is identical to unique identifier 804. The verification may be performed to guarantee the identity of entity 1000 requesting application hosting for use with SaaS platform 100. The additional code may be an updated version of code 1102. In some embodiments, the updated version of personalized configuration information 802 and the updated version of metadata configuration file 900 are identical to personalized configuration information 802 and metadata configuration file 900, respectively. For example, the multi-party communication flow 1200 illustrated in FIG. 12 between entity 1000, intermediate platform 300, serverless environment 320, and segmented storage location 1006 may be repeated multiple times, each time using an updated signed URL 1008 corresponding to a current time period, and an updated version of code 1102. In some embodiments, personalized configuration information 802 and metadata configuration file 900 may be identical for two or more repetition of multi-party communication flow 1200. In some embodiments, personalized configuration information 802 and/or metadata configuration file 900 may differ for two or more repetition of multi-party communication flow 1200.

Figure 13:
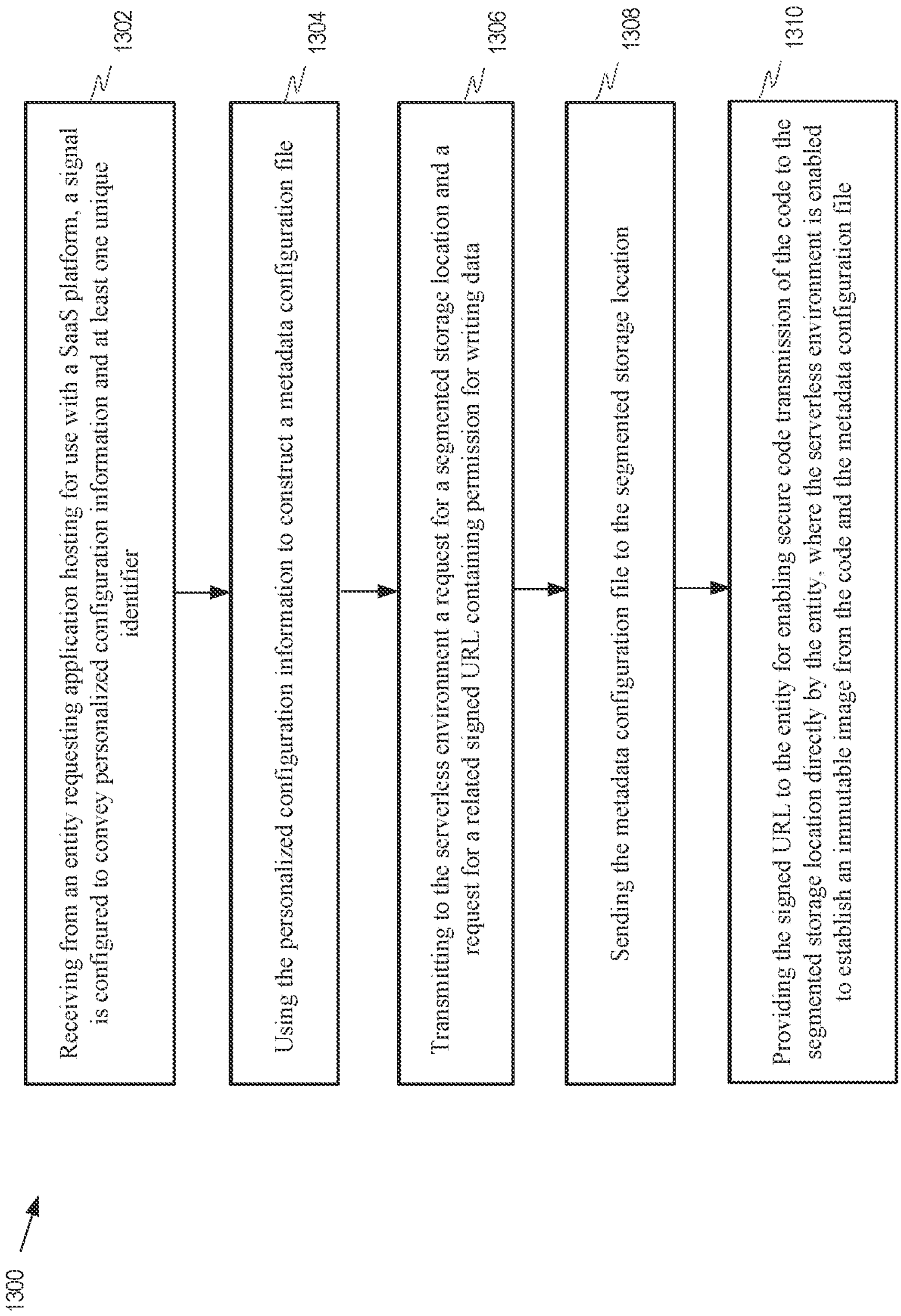
FIG. 13 is a flowchart of an example process for enabling applications to run in a serverless environment, consistent with some disclosed embodiments.

FIG. 13 illustrates a flowchart of example process 1300 for enabling customized segmentation in a serverless environment, consistent with embodiments of the present disclosure. In some embodiments, process 1300 may be performed by at least one processor (e.g., processing circuitry 2310 shown in FIG. 23) to perform operations or functions described herein. In some embodiments, some aspects of process 1300 may be implemented as software (e.g., program codes or instructions) that are stored in a memory (e.g., memory 2320) or a non-transitory computer readable medium. In some embodiments, some aspects of process 1300 may be implemented as hardware (e.g., a specific-purpose circuit). In some embodiments, process 1300 may be implemented as a combination of software and hardware.

Referring to FIG. 13, process 1300 may include a step 1302 of receiving by an intermediate platform at least one signal from an entity requesting application hosting for use with a SaaS platform, wherein the at least one signal is configured to convey personalized configuration information and at least one unique identifier. By way of a non-limiting example, in FIGS. 8 to 12, intermediate platform 300 may receive at least one signal (e.g., data packet 800) from entity 1000 (e.g., developer 310) requesting application hosting for use with SaaS platform 100 (e.g., using serverless environment 320) via first communications channel 1002 of a network (such as network 1016). The at least one signal may convey personalized configuration information 802 and unique identifier 804. For instance, entity 1000 may transmit the at least one signal as first communication 1202 of multi-party communication flow 1200.

Process 1300 may include a step 1304 of using the personalized configuration information to construct a metadata configuration file. By way of a non-limiting example, in FIGS. 8-10, intermediate platform 300 may use personalized configuration information 802 to construct metadata configuration file 900.

Process 1300 may include a step 1306 of transmitting to the serverless environment a request for a segmented storage location and a request for a related signed URL containing permission for writing data to the segmented storage location. By way of a non-limiting example, in FIG. 10, intermediate platform 300 may transmit to serverless environment 320 a request for segmented storage location 1006 and a request for related signed URL 1008 containing permission for writing data to segmented storage location 1006 via second communications channel 1004 of a network (such as network 1016). For instance, in FIG. 12, intermediate platform 300 may transmit the request for segmented storage location 1006 and a request for related signed URL 1008 as second communication 1204 of multi-party communication flow 1200.

Process 1300 may include a step 1308 of sending the metadata configuration file to the segmented storage location. By way of a non-limiting example, in FIGS. 9, 10, intermediate platform 300 may send metadata configuration file 900 to segmented storage location 1006 via second communications channel 1004 of a network (such as network 1016). For instance, in FIG. 12, intermediate platform 300 may transmit metadata configuration file 900 as third communication 1206 of multi-party communication flow 1200.

Process 1300 may include a step 1310 of providing the signed URL to the entity requesting application hosting for enabling secure transmission of a code to the segmented storage location directly by the entity requesting application hosting. The code may be configured such that following receipt via the signed URL, the serverless environment is enabled to establish an immutable image from the code and the metadata configuration file. By way of a non-limiting example, in FIGS. 10 to 12, intermediate platform 300 may provide signed URL 1008 to entity 1000 requesting application hosting (e.g., developer 310). Signed URL 1008 may enable secure transmission of code 1102 to segmented storage location 1006, directly by entity 1000 requesting application hosting. Entity 1000 may use signed URL 1008 to transmit code 1102 to segmented storage location 1006 directly (e.g., via third communications channel 1010 that bypasses intermediate platform 300). For instance, in FIG. 12, intermediate platform 300 may receive signed URL 1008 from serverless environment 320 as fourth communication 1208, and intermediate platform 300 may provide signed URL 1008 to entity 1000 as fifth communication 1210. Entity 1000 may transmit code 1102 to segmented storage location 1006 as sixth communication 1212. Code 1102 may be configured such that following receipt at segmented storage location 1006 via signed URL 1008, serverless environment 320 is enabled to establish immutable image 1104 from code 1102 and metadata configuration file 900.

Some embodiments involve a system for enabling applications to run in a serverless environment. By way of a non-limiting example, in FIG. 10, intermediate platform 300 may receive at least one signal (e.g., data packet 800) from entity 1000 (e.g., developer 310) requesting application hosting for use with SaaS platform 100 (e.g., using serverless environment 320) via first communications channel 1002 of a network (such as network 1016). The at least one signal may convey personalized configuration information 802 and unique identifier 804. In FIGS. 8-10, intermediate platform 300 may use personalized configuration information 802 to construct metadata configuration file 900. Intermediate platform 300 may transmit to serverless environment 320 a request for segmented storage location 1006 and a request for related signed URL 1008 containing permission for writing data to segmented storage location 1006 via second communications channel 1004 of a network (such as network 1016). Intermediate platform 300 may send metadata configuration file 900 to segmented storage location 1006 via second communications channel 1004 of a network (such as network 1016). Intermediate platform 300 may provide signed URL 1008 to entity 1000 requesting application hosting (e.g., developer 310). Signed URL 1008 may enable secure transmission of code 1102 (see FIG. 11) to segmented storage location 1006, directly by entity 1000 requesting application hosting. Entity 1000 may use signed URL 1008 to transmit code 1102 to segmented storage location 1006 directly (e.g., via third communications channel 1010 that bypasses intermediate platform 300). Code 1102 may be configured such that following receipt at segmented storage location 1006 via signed URL 1008, serverless environment 320 is enabled to establish immutable image 1104 from code 1102 and metadata configuration file 900.

For instance, in FIG. 12, entity 1000 may transmit the at least one signal as first communication 1202 of multi-party communication flow 1200. Intermediate platform 300 may transmit the request for segmented storage location 1006 and a request for related signed URL 1008 as second communication 1204. Intermediate platform 300 may transmit metadata configuration file 900 as third communication 1206. Intermediate platform 300 may receive signed URL 1008 from serverless environment 320 as fourth communication 1208, and intermediate platform 300 may provide signed URL 1008 to entity 1000 as fifth communication 1210. Entity 1000 may transmit code 1102 to segmented storage location 1006 as sixth communication 1212.

Systems, methods, and computer program products are disclosed for performing customized segmentation operations in a serverless environment. Performing customized segmentation operations in a serverless environment may involve receiving by an intermediary platform a signal from an entity requesting application hosting for use with a SaaS platform, where the signal conveys personalized configuration information and a unique identifier; using the personalized configuration information to construct a metadata configuration file; transmitting to the serverless environment a request for a segmented storage location and for a related signed URL permitting writing of data; sending the metadata configuration file to the segmented storage location; providing the signed URL to the entity for enabling direct secure transmission of a code to the segmented storage location directly; and wherein the code is configured such that following receipt via the signed URL, the serverless environment establishes an immutable image from the code and the metadata configuration file.

Multi-tenant SaaS applications may allow a plurality of tenants to use a shared set of resources, such as databases, services, and/or functions. For example, an application for a public transportation service may allow a plurality of users (e.g., tenants) to plan a trip concurrently by performing multiple concurrent queries to a common or shared database.

While some data used by a running instance of a multi-tenant SaaS application may be shared with a plurality of tenants, each tenant may be associated with tenant-specific data, that may not be shared with any other tenant (e.g., for reasons of privacy). Disclosed embodiments are provided to maintain isolation of tenant-specific data while enabling a running instance multi-tenant SaaS application access thereto by using tenant-specific tokens with requests for tenant-specific data.

Some disclosed embodiments involve performance of data access operations in association with at least one running instance of a multi-tenant SaaS application within a Multi-tenant SaaS Platform. Data access operations refers to any process of retrieving, updating, viewing, and/or manipulating stored information. For instance, a data access operation may enable reading and/or writing of data from memory. A running instance in a serverless environment refers to a running occurrence, realization, and/or copy of an executable code. The executable code may be located a region in memory where serverless functions and/or applications may be executed. In some cases, an instance may be created automatically by a cloud provider in response to one or more events and/or triggers. In such cases, each instance may be ephemeral and may exist only for a duration of an event handled by the instance. In some cases, an instance may be created and maintained independent of occurrence of a trigger (e.g., scale to zero instances as described elsewhere herein). Instances may scale dynamically for efficient utilization of resources. Instances may be duplicated when a number of uses exceeds a predetermined threshold. In some embodiments, instances may correspond to isolated containers for executing serverless functions. A tenant refer to a user, a client, and/or any other entity capable of interacting with a serverless environment. A multi-tenant SaaS platform refers to a software architecture or system that serves multiple, independent users, entities, clients, or tenants, while providing them with the illusion of operating in a dedicated and isolated environment. For example, a multi-tenant SaaS platform may be configured to host one or more multi-tenant software application. In some embodiments, a SaaS platform may be a specific type of SaaS application capable of hosting additional SaaS applications for a plurality users, each of which may use one or more instances of the additional SaaS applications. A multi-tenant SaaS application refers to a software application that is hosted by the SaaS platform and is configured to serve multiple tenants of the SaaS platform concurrently, while maintaining segregation between private data of each of the multiple tenants. A multi-tenant SaaS application may enable a one or more shared instances of the application to run on infrastructure of a service provider to concurrently serve multiple different clients (e.g., identities and/or tenants). A running instance of a multi-tenant SaaS application refers to an actuated instance of a code for which resources are utilized to execute one or more instructions associated with a multi-tenant SaaS application. Such resources may include, for example, memory (e.g., RAM, cache, buffers, stacks, and/or queues, long-term memory), CPU time, ports, bus line capacity (e.g., for data, address, and/or control buses), network bandwidth, external resources (e.g., libraries, APIs, and/or additional services), and/or any other resource associated with executing a code. A running instance of a multi-tenant SaaS application may perform computations (e.g., including reading and/or writing from memory) for a plurality of tenants concurrently.

Some non-limiting examples of multi-tenant SaaS applications may include a trip planning application allowing multiple users to concurrently access a schedule for a public transportation service and plan different trips, a weather application allowing multiple users (e.g., located in differing regions) to concurrently access a weather database storing weather updates and forecasts for multiple regions, and/or an editor allowing multiple users to read and/or write to the same (e.g., shared) document. For example, each multi-tenant SaaS application may be provided with private data for each tenant in the SaaS platform, and/or may be configured to embed private data processed by the multi-tenant SaaS application into a tenant account in the SaaS platform). A multi-tenant SaaS platform may allow multiple entities (e.g., tenants) to utilize the same underlying software code, databases, and/or resources while maintaining a logical separation and/or isolation for specific data and/or configuration settings associated with each individual tenant, e.g., by running each instance in a separate container. Multi-tenant SaaS applications may reduce costs, simplify administration, enable rapid deployment, and/or facilitate collaboration among tenants. A multi-tenant SaaS platform may require performance of operations to ensure data isolation, security, privacy, and/or an above-threshold performance for each tenant.

Some disclosed embodiments involve providing access to a software development kit to enable a developer to write code for a multi-tenant SaaS application for use with a SaaS platform. A software development kit (e.g., an SDK) refers to a package that includes a set of tools, libraries, and/or documentation for developing software. An SDK may be designed to assist developers in creating software applications for specific platforms, frameworks, or technologies. By providing pre-built functionalities, APIs, and development tools, SDKs may simplify and accelerate an application development process. Providing access to a software development kit may involve granting permission to use one or more resources (e.g., tools, libraries, and/or documentation) provisioned by an SDK. Such permission may be based on, for example, an authenticating credential, an identity (e.g., associated with an account). In some instances, an SDK may be available to the public (e.g., open source SDK). In some instances, access to an SDK may require validation for a human user (e.g., using a CAPTCHA code and/or image recognition). A developer refers to an entity that writes or otherwise provides code for execution by at least one processor. The entity may include a human and/or at least one processor. For example, at least one processor may execute a code causing automated code generation (e.g., based on one or more specifications). In some embodiments, a developer may include an AI engine configured to generate a code. Writing code for a multi-tenant SaaS application for use with a SaaS platform may involve recording instructions on a computer-readable medium, that when executed by at least one processor of a SaaS platform, actuate an instance of a multi-tenant SaaS application. Such instructions may cause allocation of resources (e.g., memory, CPU times, ports, bus capacity, network bandwidth) for running the application, and performance of one or more computational tasks, e.g., involving at least reading from and/or writing to memory.

In some disclosed embodiments, providing access to the software development kit includes providing a link to download the software development kit. A link to download a software development kit includes a reference or connection for receiving an SDK via a network. A link may include an address for accessing a code associated with installing a software development kit. Some exemplary links for downloading a software development kit may include direct download links, anchor tags (e.g., Hypertext Markup Language, or HTML), button links, QR (Quick Response) codes, platform-specific application links, email attachments, cloud storage links, and/or links for peer-to-peer file sharing. A direct download link may include a URL (e.g., or a shortened URL) pointing to downloadable content such that clicking on the link initiates a download process. An HTML anchor tag may be used to create a download link on a web page (e.g., href="https://example.com/downloads/SDK.exe" download). A button link may include a clickable graphic element displayed on a web page and configured with an HTML anchor tag, such that clicking on the button link initiates a download process. A QR code may be linked to downloadable content and displayed, allowing a developer to scan the QR code using a camera of a computing device to initiate downloading of content. A platform-specific application link may redirect a developer to an appropriate repository (e.g., app store) to download content for a specific platform (e.g., iOS® and/or Android®). An email attachment may involve including a code for an SDK as an attachment to an email, allowing a developer receiving the email to download the SDK by clicking on the attachment. A cloud storage link may allow accessing content stored on a cloud storage platform (e.g., Dropbox®, Google Drive®, or OneDrive®). A file sharing protocol may provide a magnet link (e.g., a BitTorrent® magnet link) for distributing content.

In some disclosed embodiments, providing access to the software development kit includes providing access via an API. An Application Programming Interface (e.g., API) refers to an interface between different software applications. An API may allow a first software application to communicate with a second software application using a consistent format and/or protocol. Providing access to an SDK via an API may involve providing a developer with an API, allowing the developer to make an HTTP request (e.g., a GET request) to an endpoint of the API providing downloadable content including the SDK. The endpoint may process the request and respond with the content (e.g., SDK) as an HTTP response. In some embodiments, providing access via an API includes providing an API authentication key for inclusion with the HTTP request. For instance, a developer may send an intermediate platform an HTTP GET request to an API requesting an SDK (e.g., response=requests.get(api_url, Authorization': 'Bearer'+ api_key).

In some disclosed embodiments, the software development kit enables the developer to insert a call to a token into the code for the multi-tenant SaaS application, the token being associated with retrieving tenant-specific data from storage. A token refers a piece of data or a unique identifier that represents the authorization or access rights of a user or system to perform certain actions or access specific resources. A token may include unstructured data associated with a specific user, tenant, and/or entity within a system and/or network. A token may be used as an identifier, e.g., to grant access to one or more resources and/or services. In some embodiments, a token may be an alphanumeric string (e.g., a sequence of characters). In some embodiments, an appearance, structure, and/or format of a token may vary based on a specific implementation, protocols used, and/or system and/or network requirements. Tokens that are currently valid, in use, and/or capable of performing intended identification functionality within a given system and/or context may be referred as to "active tokens." In some embodiments, a token may be valid for a specific time-period, and after the time-period lapses, a new token must be issued to grant access. A token may include information that may be passed with a request to access a serverless function and/or service (e.g., an API) to authenticate, authorize, and/or validate the identity of the entity making the request. Tokens may be used in combination with one or more authentication mechanisms (e.g., OAuth, JSON Web Tokens or JWT, and/or API keys). Inserting a call to a token into a code refers to adding an executable instruction to a code for calling a token. Inserting a call to a token may involve adding one or more instructions to a code for a software application that when executed by at least one processor, cause a request for a token to be sent (e.g., to an authorization server). The authorizing server may issue the token, e.g., conditional on validating, authenticating, and confirming authorization of the request for the token. For example, a call to a token may include one or more authenticating and/or authorization credentials. A software development kit enabling a developer to insert a call to a token into a code for a multi-tenant SaaS application may include one or more tools (e.g., functions, services, and/or APIs), libraries, and/or documentation provided by the SDK that may facilitate inclusion of a call requesting a token in a code for a multi-tenant SaaS application. For example, an SDK may include documentation for inserting a call to a token into a code manually (e.g., by including an API format and/or an API key), and/or a tool that when invoked, automatically inserts a call to a token into a code.

Tenant-specific data refers to data associated with a specific identity (e.g., a tenant) and unassociated with any other identity. Tenant-specific data may include, for example, data relating to a specific tenant, state data associated with a state of an instance of a multi-tenant SaaS application serving a specific tenant, and/or any other data enabling a multi-tenant SaaS application to serve a specific tenant and unassociated with any other tenant. Some examples of data relating to a specific tenant may include data relating to a specific account and/or device, identifying and/or authentication information and/or credentials, specific tenant preferences, specific tenant inputs, location data, a tenant history, permissions, restrictions, priorities, and/or any other data associated with a specific tenant. In some embodiments, a single container for an instance of a multi-tenant software application may store data for multiple different tenants. The tenant-specific data may be stored in a way that isolates tenant-specific data for each tenant from access by the other tenants. Some exemplary techniques to isolate data for differing tenants may include a database with a shared schema, a database with separate schema, a database per tenant, partitioned tables, shared-nothing architecture, and/or file systems or object storage. A database with a shared schema may involve using a shared schema for multiple tenants, and associating each record of the tenant-specific data with a unique identifier (e.g., a "tenant ID"), allowing access to tenant-specific data by querying the databased using an associated tenant ID. A database with separate schemas may involve using an isolated schema for each tenant within a common database system. A database per tenant may establish a dedicated database for each tenant. A partitioned table may involve a shared database and schema for multiple tenants, with partitions in specific tables to separate the data by tenant (e.g., each partition may contain data for a specific tenant). Shared-nothing architecture may be associated with a distributed system, where each node may be assigned to handle data for specific tenants and data may not be shared between nodes (e.g., offering scalability and isolation). File system or object storage may store tenant-specific data as files in a shared file system or object storage, e.g., with appropriate access controls to ensure data separation.

Retrieving tenant-specific data from storage involves obtaining and/or acquiring tenant-specific data, e.g., by reading data from storage. For example, retrieving tenant-specific data may include determining a location where data is stored for a specific tenant, acquiring authorization, authentication, and/or validation to access a location where data is stored for a specific tenant, and/or reading data from storage. For example, the tenant-specific data may be retrieved using a tenant ID, e.g., as a filter to extract a specific record and/or table of a database shared by multiple tenants, to select a tenant-specific schema for querying a shared database, to select a partition of a table in a database, to connect to a database dedicated to an associated tenant, to connect to a tenant-specific node of a distributed system, and/or to locate a file in a shared file system and/or object storage.

A token associated with retrieving tenant-specific data from storage refers to a token granting access to a location storing tenant-specific data. For instance, a token may include information that may be used to determine a location where tenant-specific data is stored, and/or to authenticate, validate, and/or authorize a request to access tenant-specific data. As an example, a token may include a tenant ID for querying a database, for connecting to a dedicated database for a specific tenant, for determining a location of a dedicated partition of a table, for determining an address of a dedicated node in a distributed system, and/or to query for a file path to access a file in a shared file system. Additionally or alternatively, a token may include a credential to authorize, authenticate, and/or validate access to a storage location associated with a tenant.

For instance, at least one processor may use a token to retrieve location data for a user querying a weather application. As another example, at least one processor may use a token to retrieve a set of restrictions and/or permissions for a tenant editing a document shared with other tenants. As a further example, at least one processor may use a token to retrieve a history for a client requesting a schedule from a public transportation application.

By way of a non-limiting example, in FIG. 3, at least one processor (e.g., processing circuitry 2310 of FIG. 23) of intermediate platform 300 may provide developer 310 with access to an SDK over a network (such as network 1016 or network 2410 of FIG. 24). SDK may enable developer 310 to write code for a multi-tenant SaaS application for use with SaaS platform 100. The SDK may enable developer 310 to insert a call to a token into a code for the multi-tenant SaaS application, the token being associated with retrieving tenant-specific data from storage. In some embodiments, the at least one processor of intermediate platform 300 may provide access to the SDK by providing access via an API. For example, intermediate platform 300 may provide developer 310 with documentation for using the API and an API key for the API. In some embodiments, the at least one processor of intermediate platform 300 may provide access to the SDK by providing a link to download the SDK using network YY. For example, the at least one processor may send the link to developer 310 in a notification (e.g., a PUSH notification) via network YY.

Figure 14:
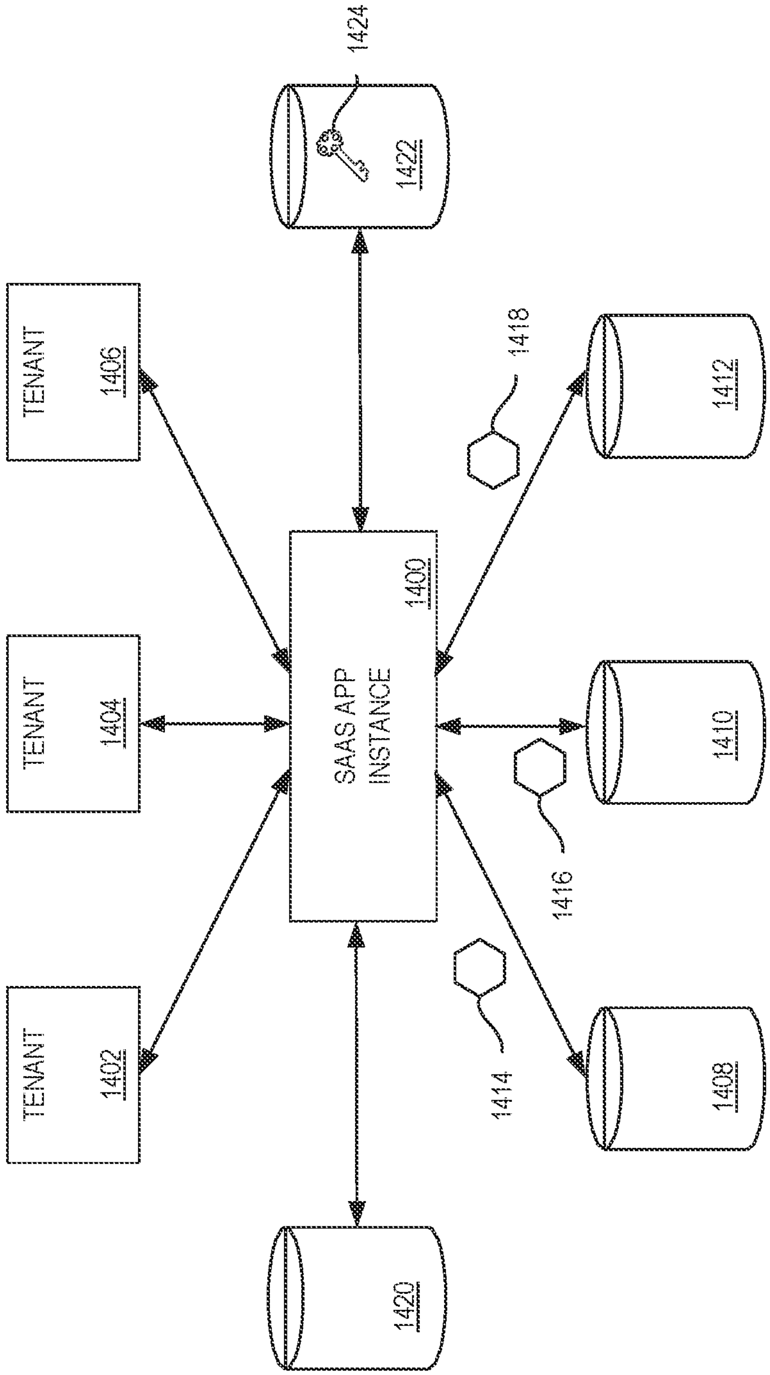
FIG. 14 is an exemplary block diagram representation of a running instance of a multi-tenant SaaS application for use with a SaaS platform, consistent with some disclosed embodiments.

By way of a non-limiting example, reference is made to FIG. 14, which is an exemplary block diagram representation of a running instance 1400 of a multi-tenant SaaS application for use with SaaS platform 100, consistent with some disclosed embodiments. At least one processor (e.g., processing circuitry 2310 of FIG. 23) of SaaS platform 100 may perform data access operations in association with the running instance 1400 of a multi-tenant SaaS application. Running instance 1400 of multi-tenant SaaS application may serve a first tenant 1402, a second tenant 1404, and a third tenant 1406. First tenant 1402 may be associated with a first storage location 1408 (e.g., first storage location 1408 may be allocated to store data for first tenant 1402), second tenant 1404 may be associated with a second storage location 1410 (e.g., second storage location 1410 may be allocated to store data for second tenant 1404), and third tenant 1406 may be associated with a third storage location 1412 (e.g., third storage location 1412 may be allocated to store data for third tenant 1406). First storage location 1408, second storage location 1410, and third storage location 1412 may be isolated from each other. First storage location 1408 may store tenant-specific data associated with first tenant 1402. Second storage location 1410 may store tenant-specific data associated with second tenant 1404. Third storage location 1412 may store tenant-specific data associated with third tenant 1406.

A code for the running instance 1400 of multi-tenant SaaS application may include one or more calls to one or more tokens associated with retrieving tenant-specific data from storage. For example, when first tenant 1402 logs on to the running instance 1400 of the multi-tenant application, at least one processor (e.g., processing circuitry 2310 of FIG. 23) associated with SaaS platform 100 may execute a first call to a token, causing first token 1414 associated with first storage location 1408 to be generated for retrieving tenant-specific data associated with the first tenant 1402. First token 1414 may be provided to running instance 1400 of the multi-tenant SaaS application, e.g., for use with a request to retrieve tenant-specific data associated with first tenant 1402. When second tenant 1404 logs on to the running instance 1400 of the multi-tenant application, at least one processor may execute a second call to a token, causing second token 1416 associated with second storage location 1410 to be generated for retrieving tenant-specific data associated with the second tenant 1404. Second token 1416 may be provided to running instance 1400 of the multi-tenant SaaS application, e.g., for use with a request to retrieve tenant-specific data associated with second tenant 1404. Similarly, when third tenant 1406 logs on to running instance 1400 of the multi-tenant application, at least one processor may execute a third call to a token, causing third token 1418 associated with third storage location 1412 to be generated for retrieving tenant-specific data associated with the third tenant 1406. Third token 1418 may be provided to running instance 1400 of the multi-tenant SaaS application, e.g., for use with a request to retrieve tenant-specific data associated with third tenant 1406.

In some disclosed embodiments, the at least one running instance of the multi-tenant SaaS application includes a plurality of different running instances of the multi-tenant SaaS application. A plurality of different running instances of a multi-tenant SaaS application refers to multiple instances of a multi-tenant SaaS application executed concurrently. Each instance may service a single tenant or a plurality of tenants. In some embodiments, each running instance may be associated with a separate container in a serverless environment. For example, a collaborative software application such as a group chat platform (e.g., Slack®, WhatsApp®, and/or Microsoft Teams®) may provide a plurality of running instances of a multi-tenant SaaS application. Each running instance of the group messaging platform may serve a plurality of tenants (e.g., the users belonging to a particular chat group). Each running instance may store data shared by the plurality of associated tenants (e.g., a record of messages and content shared inside the chat group). In addition, each running instance may access tenant-specific data for each associated tenant (e.g., account information, authenticating information, location data, user preferences, and/or any other information for enabling the associated tenant to participate in the particular chat group).

For example, multiple instances of a document sharing application may run concurrently, allowing multiple groups of tenants to shared multiple sets of documents concurrently. As another example, multiple instances of a weather application may run concurrently, allowing tenants residing in different regions to query a weather database concurrently. As a further example, multiple instances of a public transportation application may run concurrently allowing to scale up the number of clients that may query a transportation database concurrently.

Figure 17:
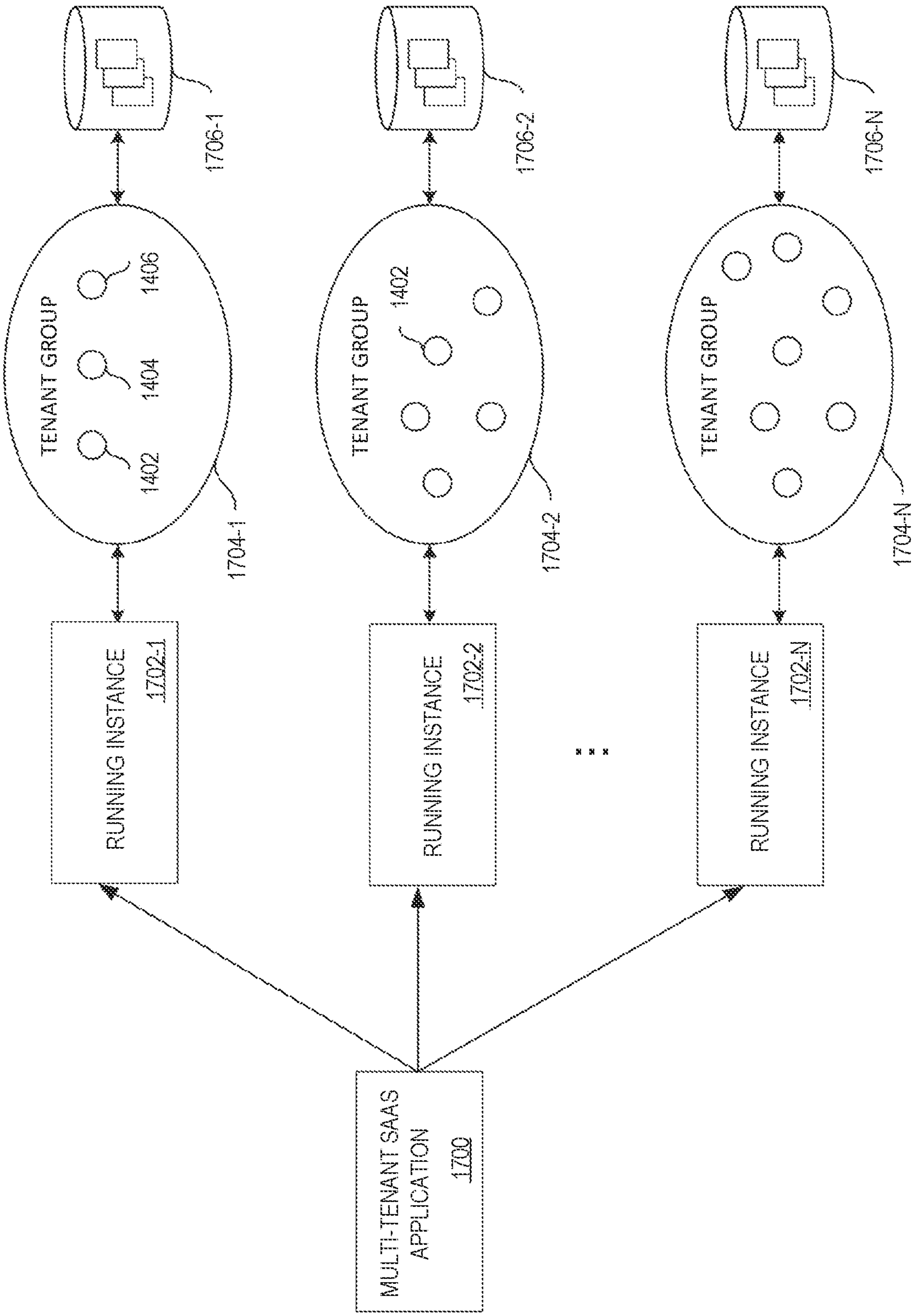
FIG. 17 is an exemplary block diagram representation of a plurality of different running instances of a multi-tenant SaaS application, consistent with some disclosed embodiments.

By way of a non-limiting example, reference is made to FIG. 17 which is an exemplary block diagram representation of a plurality of different running instances 1702-1, 1702-2 to 1702-N of a multi-tenant SaaS application 1700. Each of running instances 1702-1, 1702-2 to 1702-N may be associated with a different group of tenants 1704-1, 1704-2 to 1704-N, respectively. For instance, multi-tenant SaaS application 1700 may be a collaborative document editor (e.g., DropBox® or GoogleDocs®), allowing different groups of tenants to collaboratively share one or more documents. Each of running instances 1702-1, 1702-2 to 1702-N may be associated with a different collection of documents 1706-1, 1706-2 to 1706-N to enable collaborative sharing with each tenant included in each associated group of tenants 1704-1, 1704-2 to 1704-N, respectively. Each tenant of each group of tenants 1704-1, 1704-2 to 1704-N may be associated with tenant-specific data and an associated storage location. For example, running instance 1702-1 may correspond to running instance 1400 of the multi-tenant SaaS application and group of tenants 1704-1 may include first tenant 1402, second tenant 1404, and third tenant 1406, associated with storage locations 1408, 1410, and 1412, respectively. Each tenant of each group of tenants 1704-1, 1704-2 to 1704-N may be associated with one or more permissions and/or restrictions (e.g., tenant-specific data) for editing collection of documents 1706-1, 1706-2 to 1706-N. Each tenant of each group of tenants 1704-1, 1704-2 to 1704-N may be associated with a token for accessing the associated permissions and/or restrictions. In some embodiments, a tenant may belong to two different tenant groups served by two different running instances of multi-tenant SaaS application 1700. For example, tenant 1402 may belong to tenant group 1704-1 served by running instance 1702-1. Concurrently, tenant 1402 may belong to tenant group 1704-2 served by running instance 1702-2. Tenant 1402 may be associated with a first storage location storing tenant-specific data for running instance 1702-1, and concurrently associated with a different storage location storing tenant-specific data for running instance 1702-2.

In some embodiments a running instance of a multi-tenant SaaS application may send different requests associated with different tenants. For example, a first tenant may request train scheduling application to plan a first trip leaving from a first location at a first time, and a second tenant may request the train scheduling application to plan a second trip leaving from a second location at a second time. To allow distinguishing between multiple differing requests, a request from a running instance of a multi-tenant SaaS application for data access may use a token, e.g., to identify the tenant associated with the request.

Some disclosed embodiments involve receiving a request from at least one running instance of the multi-tenant SaaS application for data access using a token. Receiving a request from a running instance of a multi-tenant SaaS application for data access involves obtaining a notification from a running instance of a multi-tenant SaaS application asking for data. In some embodiments, the notification may be registered as an event which may trigger a responsive action (e.g., to respond to the request). A request for data access using a token involves including and/or otherwise referencing a token in a request for data. For example, a token, or a portion thereof may be included as a header in a request (e.g., Authorization: Bearer <token>), inside a cookie created when a tenant logs into the running instance, inside a URL and/or as a query parameter in a URL and/or a database query. As another example, a pointer to a token may be included in a request for data access.

In some situations, at least one processor of a SaaS platform may receive a plurality of requests for data access using a plurality of associated tokens. For example, to update a record of a group chat for a plurality of participating tenants, at least one processor may require location data for each participating tenant. For reasons of privacy, the location data for each participating tenant may be stored in an isolated storage location, access to which may require a token.

Some disclosed embodiments involve receiving a first request from at least one running instance of the multi-tenant SaaS application for data access using a first token and receiving a second request from at least one running instance of the multi-tenant SaaS application for data access using a second token. Receiving a second request from a running instance to data using a second token may be performed in a matter similar to that described earlier for receiving a first request. For example, the first request may include a first URL with a first token including a first tenant ID (e.g., https://token1.example.com) and the second request may include a second URL with a second token including a second tenant ID (e.g., https://token2.example.com). As another example, the first request may include a first path segment with a first token including a first tenant ID (e.g., https://example.com/token1) and the second request may include a second path segment with a second token including a second tenant ID (e.g., https://example.com/token2). As a further example, a request header for the first request may include a first token and a request header for the second request may include a second token. As an additional example, the first request may include the first token as a query parameter in a first URL (e.g., https://example.com/api/data?token=token1) and the second request may include the second token as a query parameter in a second URL (e.g., https://example.com/api/data?token=token2). As one other example, a first token may be included in a first cookie created when the first tenant logs on, and the first cookie may be included in the first request for data, and a second token may be included in a second cookie created when the second tenant logs on, and the second cookie may be included in the second request for data.

In some embodiments, a multi-tenant application may store data for different tenants in different (e.g., isolated) storage locations, such that responding to multiple requests to access data for multiple differing tenants may require information for determining multiple associated storage locations. In some situations, a running instance of a multi-tenant SaaS application may lack information for determining one or more associated storage locations for one or more tenants. In such a case, a token associated with storage location associated with a tenant may be used for each request.

In some disclosed embodiments, the token is associated with a storage location associated with a tenant, the request lacking an identification of the storage location. Lacking identification of a storage location refers to an absence of an address or position where data is stored. A request lacking an identification of a storage location therefore refers to a notification asking for data, but missing information for finding where the data is stored. The absent identification may be an absence of an address (e.g., a URL and/or a file path in a file system, and/or a portion thereof), a pointer and/or index for a specific record, table, and/or partition of a database storing tenant-specific data, a pointer and/or index to a dedicated database, an (e.g., IP) address for a node of a distributed system, and/or any other information enabling determination of a storage location. A storage location associated with a tenant refers to an area of memory where data for a tenant is stored. Reading data from an area of memory associated with and/or referenced by such a storage location may enable accessing tenant-specific data (e.g., subject overcoming one or more validation, authentication, and/or authorization restrictions). A token associated with a storage location associated with a tenant includes information enabling discovery and/or determination of a storage location associated with a tenant. For example, a token may include a tenant ID, an identifier for a storage device, an identifier for a database, a table, and/or a partition thereof, an address for stored data within a storage device, and/or information that may be used to determine an address, pointer, and/or index to a storage location associated with a tenant (e.g., as a query term). Additionally or alternatively, a token may include one or more credentials for authenticating, validating, and/or authorizing access to a storage location associated with a tenant.

In some embodiments, the first token is associated with a first storage location associated with a first tenant, the first request lacking an identification of the first storage location, and the second token is associated with a second storage location associated with a second tenant, the second request lacking an identification of the second storage location. A second token associated with a second storage location associated with a second tenant may be understood as described above for a token associated with a storage location. For example, the first request for first data access may lack sufficient information for accessing the first storage location. Similarly the second request for second data access may lack sufficient information for accessing the second storage location. A first token used with the first request may include information needed to access the first storage location, and a second token used with the second request may include information needed to access the second storage location.

For example, at least one processor may receive a request from a user for a weather forecast using a token associated with the user's location data. As another example, at least one processor may receive a request from a tenant to edit a document using a token associated with the tenant's editing permissions and/or restrictions. As a further example, at least one processor may receive a request from a client for a train schedule using a token associated with the client's trip history.

In some disclosed embodiments, the at least one running instance of the multi-tenant SaaS application uses a regular storage location common for each of the first tenant and the second tenant for at least one of usage data, infrastructure, in-memory data storage, or a combination thereof. A regular storage location common for each of the first tenant and the second tenant includes an area of memory for storing data for multiple tenants. For instance, a regular storage location may be a non-isolated storage location allocated to store data for multiple different tenants, e.g., absent one or more access restrictions. In some embodiments, a regular storage location common to a plurality of tenants may be accessed absent one or more associated tokens. Usage data refer to information and/or statistics collected from user interactions, behaviors, and activities. Usage data may reflect interactions by tenants with an application, e.g., how and when a tenant interacts with a multi-tenant SaaS application. Some examples of usage data may include a number of pageviews, navigations paths to a website, a trace of activities on a website, a type of device connecting to a website, a time period for navigating a website, and/or any other data indicative of how a multi-tenant SaaS application may be used. Infrastructure refers to software and/or hardware computing resources. Infrastructure may include software and/or hardware resources for serving a plurality of tenants of a multi-tenant SaaS application. In-memory data storage refers one or more locations where information is maintained. For example, in-memory data storage may include random access memory (e.g., RAM). In-memory data storage, for example, may allow reading and/or writing data in a manner that incurs a minimal response time (e.g., by avoiding storing data to disk). For example, the at least one processor may use a regular storage location common to all tenants to store data associated with gauging performance of a multi-tenant software application, troubleshooting, performance of data analytics, and/or any other function to monitoring a running instance of a multi-tenant software application.

By way of a non-limiting example, in FIG. 14, at least one processor (e.g., processing circuitry 2310 of FIG. 23) of SaaS platform 100 may receive a first request from a running instance 1400 of the multi-tenant SaaS application for first data access using a first token 1414. First token 1414 may be associated with first storage location 1408 associated with first tenant 1402. The first request may lack an identification of first storage location 1408. However, first token 1414 may include information for determining the identification of first storage location 1408. For example, first tenant 1402 may request an updated record of messages for a chat group including first tenant 1402, second tenant 1404, and third tenant 1406. First storage location 1408 may store user preferences for first tenant 1402. The at least one processor may require the user preferences for first tenant 1402 to respond to the first request. However the first request may lack information for identifying first storage location 1408.

The at least one processor may receive a second request from the running instance of multi-tenant SaaS application 1400 for second data access using a second token 1416. Second token 1416 may be associated with second storage location 1410 associated with second tenant 1404. The second request may lack an identification of second storage location 1410. However, second token 1416 may include information for determining the identification of second storage location 1410. For example, second tenant 1404 may request an updated record of messages for a chat group including first tenant 1402, second tenant 1404, and third tenant 1406. Second storage location 1410 may store user preferences for second tenant 1404. The at least one processor may require the user preferences for second tenant 1404 to respond to the first request. However, the second request may lack information for identifying first storage location 1410.

In some embodiments, the running instance 1400 of the multi-tenant SaaS application may use a regular storage location 1420 common for each of first tenant 1402, second tenant 1404, and third tenant 1406 for at least one of usage data, infrastructure, in-memory data storage, or a combination thereof.

In some embodiments, a multi-tenant SaaS application for use with a SaaS platform may access a map enabling to generate mappings between tokens (e.g., received with requests for data access) and associated storage locations. Such mappings may facilitate maintaining data isolation for different tenants of the multi-tenant SaaS application, while enabling the multi-tenant SaaS application to access storage locations associated with differing tenants, conditional on acquiring associated tokens.

Some disclosed embodiments involve mapping the token to the storage location associated with the tenant. Mapping refers to linking and/or establishing a connection between at least two elements. Mapping a token to a storage location associated with the tenant may involve using the token to establish a connection with the storage location associated with the tenant. For example, a tenant ID included in a token may be used to query for an address, pointer, and/or index to a storage location associated with a tenant. Additionally or alternatively, a token may include one or more credentials to authorize, validate, and/or authenticate a request to access a storage location associated with a tenant.

Some disclosed embodiments involve mapping the first token to the first storage location associated with the first tenant and mapping the second token to the second storage location associated with the second tenant. Mapping a first and second token to a first and second storage location associated with a first and second tenant may be performed in a manner similar to that described earlier for mapping a token to a storage location associated with a tenant. For example, at least one processor associated with a SaaS platform may use information included in the first token to establish a first connection to the first storage location associated with the first tenant. In addition, the at least one processor may use information included in the second token to establish a second connection to the second storage location associated with the second tenant. The at least one processor may use the first connection to access the first storage location, and use the second connection to access the second storage location. In this manner, acquiring the tokens may enable the at least one processor to respond to requests for tenant-specific data while preserving data isolation for each tenant.

For example, at least one processor may map a token to a memory storing location data for a user querying a weather application. As another example, at least one processor may map a token to a memory storing permissions and/or restrictions for a tenant editing a document shared with other tenants. As a further example, at least one processor may map a token to a memory storing a trip history for a client querying a public transportation application.

In some disclosed embodiments, mapping the first token and the second token to respective associated storage locations includes maintaining a secure database storing the mapping of the first token and second token to associated respective secure storage locations. A secure database refers to a guarded and/or protected location of a data structure. A secure database may be associated with one or more rules and/or protocols restricting access thereto. For example, access to a secure database may require one or more authorizing, validating, and/or authenticating credentials, and/or implementation of one or more authorizing, validating, and/or authenticating protocols associated therewith. Such protocols may apply one or more data obstruction techniques (e.g., encryption, redaction, censoring, and/or any other technique for obscuring data) to protect data stored therein. A secure storage location refers to an area in memory that is protected and/or guarded. For example, access to a secure storage location may be restricted. Storing a mapping of a first token and a second token to associated respective secure storage locations in a secure database involves maintaining a map that may include information for establishing connections between the first and second token and the associated respective secure storage locations in a database to which access is restricted. For example, this may prevent access to the respective storage locations by an unauthorized, non-validated, and/or non-authenticated entity. In some embodiments, maintaining a secure database storing the mapping may require one or more additional credentials to access the first and second storage locations, in addition to the first and second token.

In some disclosed embodiments, mapping the first token and the second token to respective associated storage locations includes performing a lookup in the secure database to find the respective secure storage locations associated with the first token and the second token. Performing a lookup in a secure database to find the respective secure storage locations associated with the first token and the second token may involve querying a secure databased for protected storage locations associated with the first and second tokens. For example, preforming a lookup may involve querying the secure database using the first token and the second token as query terms. In response to querying, an engine associated with the secure database may return connections with the first secure storage location and the second secure storage locations. In some embodiments, at least one processor may submit a separate query for each token (e.g., by submitting a first query using the first token to retrieve a connection to the first secure storage location, and a second query using the second token to retrieve a connection to the second secure storage location). In some embodiments, the at least one processor may submit multiple tokens in the same query, to retrieve connections to multiple secure storage locations in a single query result. In some embodiments, performing a lookup in a secure database may involve presenting a credential to gain access to the secure database, e.g., prior to submitting one or more queries. In some embodiments, the first and second tokens may be used to gain access to a secure database. In some embodiments, one or more additional credentials, different than the first and second tokens, may be required to gain access to the secure database for querying using the first and second tokens.

Figure 15:
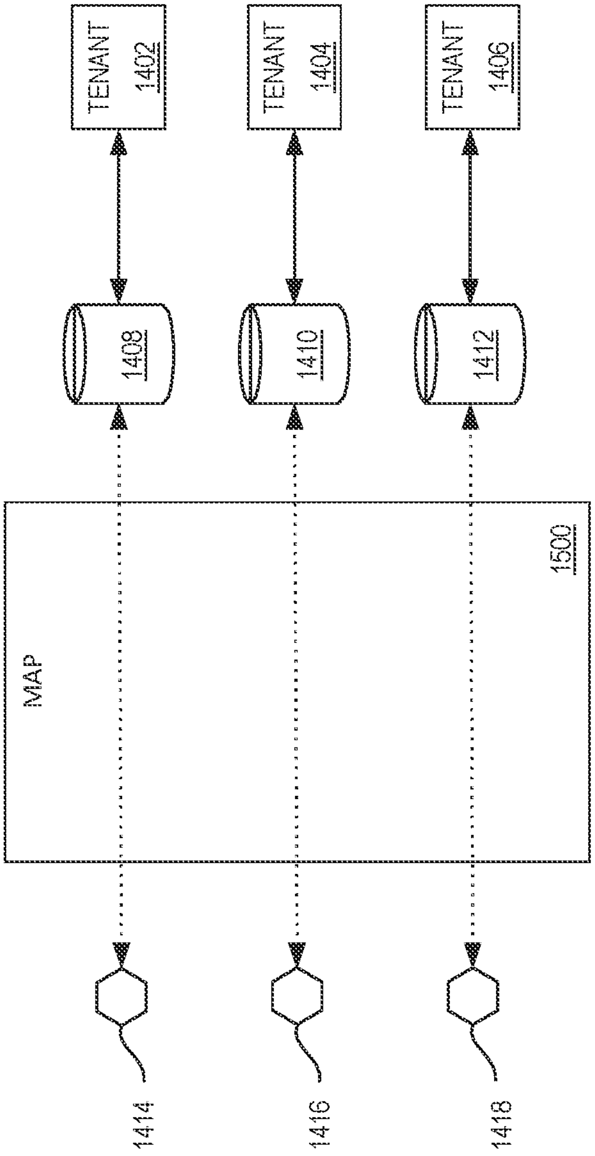
FIG. 15 is an exemplary block diagram representation of a mapping between a plurality of tokens and a plurality of storage locations associated with a plurality of tenants, consistent with some disclosed embodiments.

By way of a non-limiting example, reference is made to FIG. 15 which is an exemplary block diagram representation of a map 1500 between plurality of tokens 1414, 1416, and 1418 to plurality of storage locations 1408, 1410, and 1412 associated with plurality of tenants 1402, 1404, 1406, consistent with some disclosed embodiments. At least one processor (e.g., processing circuitry 2310 of FIG. 23) associated with running instance 1400 of the multi-tenant SaaS application may use map 1500 to map first token 1414 to first storage location 1408 associated with first tenant 1402, map second token 1416 to second storage location 1410 associated with second tenant 1404, and map third token 1418 to third storage location 1412 associated with third tenant 1406.

In some embodiments, the at least one processor may maintain a secure database 1422 (see FIG. 14) storing map 1500 mapping first token 1414, second token 1416, and third token 1418 to associated respective secure storage locations 1408, 1410, and 1412. For example, access to secure database 1422 may require use of a credential 1424. In some embodiments, the at least one processor may perform a lookup in secure database 1422 to find secure storage locations 1408, 1410, and 1412 associated with first token 1414, second token 1416, and third token 1418. For instance, map 1500 may be organized as an index, and the at least one processor may use information included in first token 1414, second token 1416, and third token 1418 to query map 1500 for storage locations 1408, 1410, and 1412.

In some embodiments, a multi-tenant SaaS application for use with a SaaS platform may require retrieval of tenant-specific data from a plurality of storage locations associated with a plurality of different tenants. To preserve data isolation for each tenant, a multi-tenant SaaS application may condition access to tenant-specific data on possession of an associated token. Requests for tenant-specific data lacking an associated token may be denied, whereas requests for tenant-specific data using an associated token may be fulfilled.

Some disclosed embodiments involve retrieving from the storage location at least some of the tenant-specific data associated with the tenant. Retrieving from the storage location at least some of the tenant-specific data associated with the tenant may involve reading at least some of the tenant-specific data stored in the storage location associated with the tenant. For example, the data may be retrieved using the connection established using the token via the mapping. In some embodiments, at least one processor may write the tenant-specific data (e.g., read from the storage location associated with the tenant) to a different memory location accessible to a running instance of the multi-tenant SaaS application.

Some disclosed embodiments involve retrieving from the first storage location at least some of the tenant-specific data associated with the first tenant, and retrieving from the second storage location at least some of the tenant-specific data associated with the second tenant. Retrieving from the second location at least some tenant-specific data associated with the second tenant may be performed in similar manner to that described above for retrieving tenant-specific data from a storage location. For example, to respond to a first request for a first planned trip by a first tenant using a first token, at least one processor associated with a train scheduling application may use the first token to retrieve a first history associated with the first tenant from a first associated storage location. Similarly, to respond to a second request for a second planned trip by a second tenant using a second token, the at least one processor associated with the train scheduling application may use the second token to retrieve a second history associated with the second tenant from a second associated storage location.

For example, at least one processor may retrieve location data from a storage location for a user querying a weather application. As another example, at least one processor may retrieve permissions and/or restrictions from a storage location for a tenant editing a shared document. As a further example, at least one processor may retrieve a trip history from a storage location for a client querying a public transportation application.

Some disclosed embodiments involve retrieving for each additional distinct tenant the at least some of the distinct tenant-specific data from an associated additional distinct storage location.

In some disclosed embodiments, the first storage location and the second storage location are included in the SaaS platform. For example, the SaaS platform may be provisioned with memory for storing tenant-specific data for a plurality of tenants using a multi-tenant SaaS application. In some embodiments, the SaaS platform may include a container for storing tenant-specific data for a plurality of tenants for a multi-tenant SaaS application. In some disclosed embodiments, the first storage location and the second storage location are included in an external serverless environment. An external serverless environment (as described and exemplified elsewhere herein) refers to a serverless environment separate from the SaaS platform, such that communication between the serverless environment and the SaaS platform may require establishing a communications link over a network. In some disclosed embodiments, retrieving at least some of the tenant-specific data associated with the first tenant or the second tenant includes using a distinct signed URL to access the first storage location or the second storage location included in the external serverless environment. Using a distinct signed URL (as described and exemplified elsewhere herein) refers to including a distinct signed URL in a request to access a storage location. Using a distinct signed URL may involve receiving a signed URL (e.g., from an external serverless environment) and gaining access to the first storage location and the second storage location by submitting the signed URL to the serverless environment (e.g., as a credential granting access thereto). For example, at least one processor of the multi-tenant SaaS platform may request a signed URL from a serverless environment (e.g., using an intermediate platform), as described and exemplified elsewhere herein.

By way of a non-limiting example, in FIG. 14, the at least one processor may retrieve from first storage location 1408 at least some of the tenant-specific data associated with first tenant 1402, retrieve from second storage location 1410 at least some of the tenant-specific data associated with second tenant 1404, and retrieve from third storage location 1412 at least some of the tenant-specific data associated with third tenant 1406. For example, the at least one processor may use the first connection established with first storage location 1408 using first token 1414 to retrieve user preferences for first tenant 1402 from first storage location 1408. Similarly, the at least one processor may use the second connection established with second storage location 1410 using second token 1416 to retrieve user preferences for second tenant 1404 from second storage location 1410.

In some embodiments, first storage location 1408, second storage location 1410, and third storage location 1412 are included in SaaS platform 100. In some embodiments, first storage location 1408, second storage location 1410, and third storage location 1412 are included in an external serverless environment (e.g., a serverless environment similar to, but different from serverless environment 320). In such a case, the at least one processor may use network 1016 of FIG. 10 (or network 2410 of FIG. 24) to connect to the external serverless environment. In some embodiments, the at least one processor may use a distinct signed URL to access first storage location 1408, second storage location 1410, and/or third storage location 1412 included in the external serverless environment. For example, the at least one processor may acquire one or more distinct signed URLs using intermediate platform 300, as described and exemplified elsewhere herein.

In some embodiments, a multi-tenant SaaS application for use with a SaaS platform may provide a running instance of a multi-tenant SaaS application tenant-specific data for a plurality of tenants, concurrently, in response to a plurality of requests, each using an associated token. This may permit the multi-tenant SaaS application to access tenant-specific data on an as-needed basis while maintaining data security and privacy through isolation of the tenant-specific data.

In some disclosed embodiments, at least some of tenant-specific data associated with the first tenant and the second tenant includes all associated data from the first storage location and the second storage location. All associated data from a storage location include to all the relevant data relating to the first tenant stored in a storage location. For example, the first storage location may only store tenant-specific data associated with the first tenant, and the second storage location may only store tenant-specific data associated with the second tenant. Retrieving all associated data from the first storage location and the second storage location may cause retrieval only of tenant-specific data associated with the first tenant and the second tenant. In some embodiments, all the tenant-specific data associated with the first tenant may be stored at the first storage location, and all the tenant-specific data associated with the second tenant may be stored at the second storage location. In some embodiments, at least some tenant-specific associated with the first tenant and/or second tenant may be stored at one or more storage locations other than the first storage location and/or second storage location.

Some disclosed embodiments involve providing to the at least one running instance of the multi-tenant SaaS application the at least some of the tenant-specific data associated with the first tenant. Providing to the at least one running instance of the multi-tenant SaaS application the at least some of the tenant-specific data associated with the tenant involves sending at least some of the retrieved data to the at least one running instance. For example, the at least one processor may store the retrieved data in a memory accessible to the at least one running instance and send a link thereto, send the tenant-specific data and/or a reference thereto as an argument returned in a function call, and/or send a notification including the tenant-specific data and/or a reference thereto to the running instance of the multi-tenant SaaS application.

Some disclosed embodiments involve providing to the at least one running instance of the multi-tenant SaaS application the at least some of the tenant-specific data associated with the first tenant and providing to the at least one running instance of the multi-tenant SaaS application the at least some of the tenant-specific data associated with the second tenant. Providing data associated with the first and second tenant may be performed in a manner similar to providing data associated with a tenant, as described earlier. For example, at least one processor associated with the train scheduling application may provide the first history for the first tenant in a notification responsive to the first request and may provide the second history for the second tenant in a notification responsive to the second request. As another example, at least one processor associated with a weather forecast application may provide first location for the first tenant in a notification responsive to the first request and may provide second location data for the second tenant in a notification responsive to the second request. As an additional example, at least one processor associated with a document sharing application may provide a first set of document editing permissions for the first tenant in a notification responsive to the first request, and may provide a second set of document editing permissions for the second tenant in a notification responsive to the second request.

For example, at least one processor may provide the location data for a user to a running instance of a multi-tenant weather application for use in querying a weather database. As another example, at least one processor may provide permissions and/or restrictions for a tenant to a running instance of a document sharing application for use in permitting and/or restricting an editing operation. As a further example, at least one processor may provide a trip history to a running instance of a public transportation application for use in planning a trip.

By way of a non-limiting example, in FIG. 14, the at least one processor may retrieve at least some first tenant-specific data associated with first tenant 1402 from first storage location 1408 using first token 1414. The at least one processor may provide the retrieved first tenant-specific data to the running instance 1400 of the multi-tenant SaaS application. Similarly, the at least one processor may retrieve at least some second tenant-specific data associated with second tenant 1404 from second storage location 1410 using second token 1416. The at least one processor may provide the retrieved second tenant-specific data to the running instance 1400 of the multi-tenant SaaS application. In a similar manner, the at least one processor may retrieve at least some third tenant-specific data associated with third tenant 1406 from third storage location 1412 using third token 1418. The at least one processor may provide the retrieved third tenant-specific data to the running instance 1400 of the multi-tenant SaaS application.

In some embodiments, the tenant-specific data associated with first tenant 1402, second tenant 1404, and third tenant 1406 includes all associated data from first storage location 1408, second storage location 1410, and third storage location 1412. For instance, first storage location 1408, second storage location 1410, and third storage location 1412 may be reserved to only store tenant-specific data for first tenant 1402, second tenant 1404, and third tenant 1406, respectively, and exclude storing non-tenant specific data or any other data.

As an example, the at least one processor may retrieve first user preferences associated with first tenant 1402 from first storage location 1408 using first token 1414. The at least one processor may provide the first user preferences to the running instance 1400 of the multi-tenant SaaS application. The at least one processor may retrieve second user preferences associated with second tenant 1404 from second storage location 1410 using second token 1416. The at least one processor may provide the second user preferences to the running instance 1400 of the multi-tenant SaaS application. The at least one processor may use the first user preferences associated with first tenant 1402 to display an updated record of messages for the chat group (e.g., including first tenant 1402, second tenant 1404, and third tenant 1406) on an associated first device. The at least one processor may use the second user preferences associated with second tenant 1404 to display an updated record of messages for the chat group on an associated first device.

Some disclosed embodiments involve receiving one or more additional requests from the at least one running instance of the multi-tenant SaaS application for data access using one or more additional distinct tokens, each of the one or more additional distinct tokens being associated with an additional distinct storage location associated with an additional distinct tenant, the one or more additional requests lacking an identification of the one or more additional distinct storage location. Receiving one or more additional requests may be performed in the same manner as receiving the first request and the second request, as described earlier.

For example, the multi-tenant SaaS application may allow three or more tenants to concurrently use a running instance thereof. Each of the three or more tenants may be associated with a distinct storage location (e.g., for storing associated tenant-specific data). Requests for data access associated with any of the three or more tenants may lack information necessary for identifying the three or more distinct storage locations. For example, hiding or otherwise obscuring the three or more distinct storage locations may ensure data isolation of tenant-specific data. To access each distinct storage location, the at least one processor may use an associated distinct token that may be included in each request, as described elsewhere herein.

Some disclosed embodiments involve mapping each of the one or more additional distinct tokens to an associated additional distinct storage location and retrieving for each additional distinct tenant the at least some of the distinct tenant-specific data from an associated additional distinct storage location. Mapping each additional distinct token to an associated additional storage location may be performed in a manner similar to that described above for mapping the first and second tokens to the first and second storage locations. For example, the running instance of the multi-tenant SaaS application may maintain a map to map the three or more tokens to the associated three or more distinct storage locations. Upon receiving three or more requests for data access, each request using a distinct token, the at least one processor may use the map to establish a connection between each token and the associated storage location. The at least one processor may use the established connections to retrieve at least some of the tenant-specific data from each associated storage location. Some disclosed embodiments involve providing to the at least one running instance of the multi-tenant SaaS application the retrieved distinct tenant-specific data associated with each of the additional distinct tenants, wherein the one or more additional distinct tokens, the one or more additional distinct associated tenants, and the one or more additional distinct storage locations are respectively different from the first token and the second token, the first tenant and the second tenant, and the first storage location and the second storage location associated with the first tenant and the second tenant. Providing the retrieve data to the running instance may performed in a manner similar to that described earlier for providing the first tenant-specific data and the second tenant specific data to the running instance. For instance, upon retrieving at least some of the tenant-specific data from each of the three or more storage locations, the at least one processor may provide to the running instance of the multi-tenant SaaS application the at least some of the tenant-specific data retrieved from the three or more storage locations.

By way of a non-limiting example, in FIG. 14, the at least one processor may receive three separate requests from running instance 1400 of the multi-tenant SaaS application for data access using distinct tokens 1414, 1416, and 1418. Each of distinct tokens 1414, 1416, and 1418 may be associated with distinct storage location 1408, 1410, and 1412, associated with distinct tenants 1402, 1404, and 1406. Each of the three requests may lacking an identification of the storage location 1408, 1410, and 1412. In FIG. 15, the at least one processor may use map 1500 to create a mapping between each of distinct tokens 1414, 1416, and 1418 to associated distinct storage locations 1408, 1410, and 1412. The at least one processor may retrieve for each distinct tenant 1402, 1404, and 1406 at least some of the distinct tenant-specific data from associated additional distinct storage locations 1408, 1410, and 1412. The at least one processor may provide to running instance 1400 of the multi-tenant SaaS application the retrieved distinct tenant-specific data associated with each of distinct tenants 1402, 1404, and 1406. Distinct third token 1418 is different from first token 1414 and second token 1416, tenant 1406 is different from the first tenant 1402 and second tenant 1404, and third storage location 1412 associated with third tenant 1406 is different from first storage location 1408 and second storage location 1410 associated with first tenant 1402 and the second tenant 1404, respectively.

Some disclosed embodiments involve generating a unique token for each tenant of the multi-tenant SaaS application. A unique token refers to string of characters or a code that distinguishes a token from others. A unique token may be a one-of-a-kind token that may be distinct and/or different from other tokens, such that each tenant is distinguishable by an associated token. Generating a unique token for each tenant of a multi-tenant SaaS application may involve generating a different piece of information (e.g., a different string of characters) for each tenant. For instance, at least one processor may use uniquely identifying information for each tenant to generate each token. Some examples of uniquely identifying information for a tenant may include an account identifier, a device identifier, a biometric token, a social security number, a passport number, a phone number, an email address, and/or any other uniquely identifying information. In some embodiments, at least one processor may use a cryptographic hash function to generate a unique token for each tenant (e.g., using a different seed for each tenant).

By way of a non-limiting example, in FIG. 14, the at least one processor may generate a unique tokens 1414, 1416, and 1418 for each of first tenant 1402, second tenant 1404, and third tenant 1406, respectively. For example, the at least one processor may use a unique tenant ID (e.g., an account identifier) for each of first tenant 1402, second tenant 1404, and third tenant 1406 as seeds to a hash function to generate unique tokens 1414, 1416, and 1418, respectively.

In some disclosed embodiments, the code for the multi-tenant SaaS application includes at least one instruction using the tenant-specific data from a storage location associated with an associated tenant. Code for a multi-tenant SaaS application includes instructions that when executed by at least one processor, implement a multi-tenant SaaS application. For example, a code may cause at least one processor to manipulate data for a multi-tenant SaaS application. A code may be written in a programming language (e.g., Java, JavaScript, Python, Ruby, C#, and/or PUP). A backend code may cause retrieval and/or storage of data in one or more databases of a serverless environment. The at least one processor may execute a single code for a multi-tenant SaaS application to serve a plurality of tenants concurrently, and thereby manipulate data for the plurality of tenants. An instruction refers to an operation or a command. For instance, an instruction may include a call to a function, and/or an API. As another example, an instruction may include a query to a database to retrieve data, and/or to write data to the database. An instruction using tenant-specific data from a storage location associated with an associated tenant refers to a piece of code, that when executed by at least one processor, causes performance of one or more computations based on tenant specific data retrieved from a storage location associated with a tenant. For example, retrieving a history from a storage location associated with a specific tenant may enable a train scheduling application to determine a trip based on previous trips taken by the specific tenant.

For example, at least one processor may execute an instruction in a code for a weather application to use the location data for a tenant to query a weather database. As another example, at least one processor may execute an instruction in a code for a document sharing application to use the permissions and/or restrictions for a tenant to permit and/or restrict a document editing action. As a further example, at least one processor may execute an instruction in a code for a document sharing application to use the trip history for a client to plan a trip.

By way of a non-limiting example, in FIG. 14, the code for running instance 1400 of the multi-tenant SaaS application may include at least one instruction using the tenant-specific data from first storage location 1408 associated with first tenant 1402. For example, running instance 1400 of the multi-tenant SaaS application may be a location-based weather forecast application, and the tenant-specific data may be location data. The at least one processor may execute an instruction in a code for the weather forecast application to use the tenant-specific location data to query a weather database for a location-based weather forecast.

Figure 16:
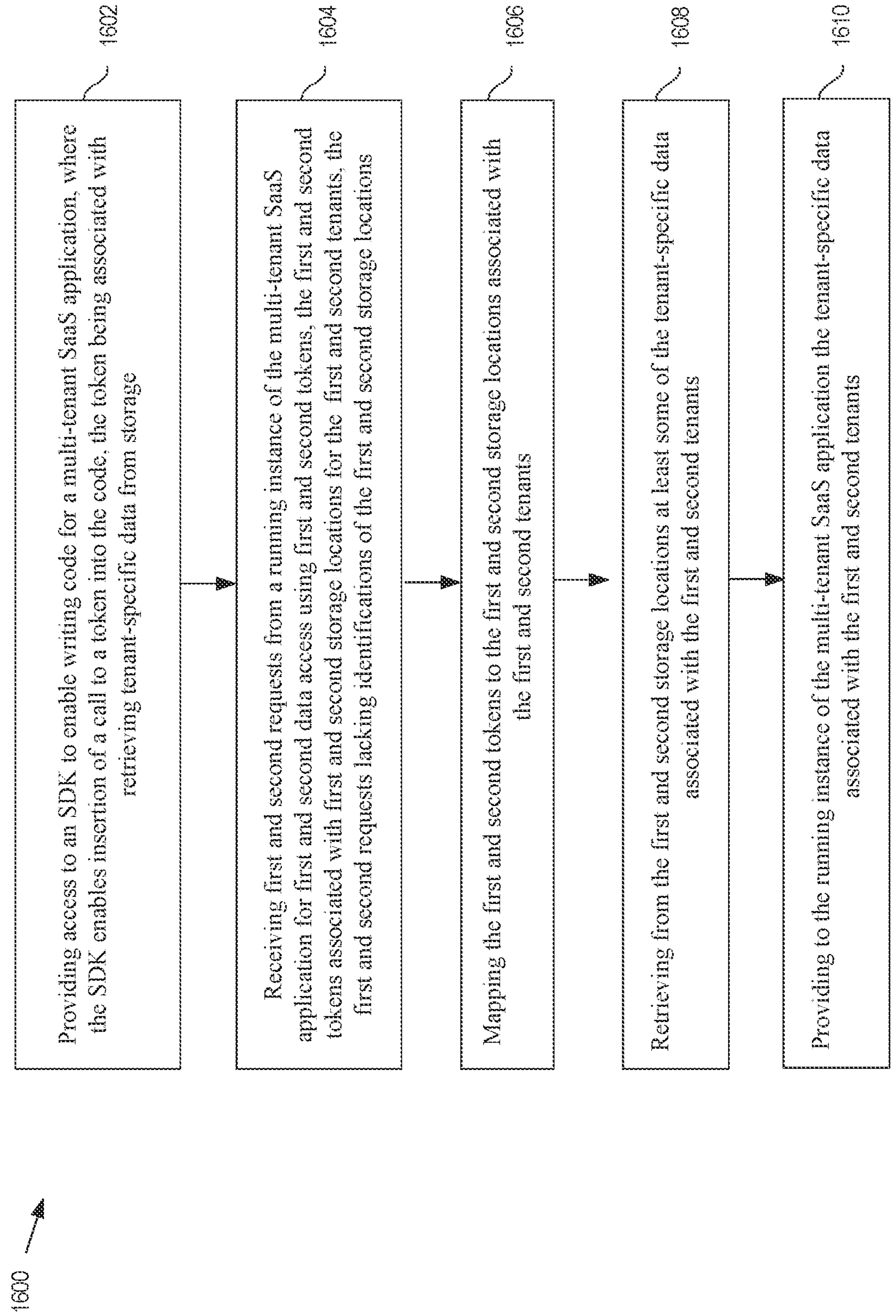
FIG. 16 is a flowchart of an example process for performing data access operations in association with at least running instance of a multi-tenant SaaS platform, consistent with some disclosed embodiments.

FIG. 16 is a flowchart of example process 1600 for enabling customized segmentation in a serverless environment, consistent with embodiments of the present disclosure. In some embodiments, process 1600 may be performed by at least one processor (e.g., processing circuitry 2310 shown in FIG. 23) to perform operations or functions described herein. In some embodiments, some aspects of process 1600 may be implemented as software (e.g., program codes or instructions) that are stored in a memory (e.g., memory 2320) or a non-transitory computer readable medium. In some embodiments, some aspects of process 1600 may be implemented as hardware (e.g., a specific-purpose circuit). In some embodiments, process 1600 may be implemented as a combination of software and hardware.

Referring to FIG. 16, process 1600 may include a step 1602 of providing access to a software development kit to enable a developer to write code for a multi-tenant SaaS application for use with a SaaS platform, wherein the software development kit enables the developer to insert a call to a token into the code for the multi-tenant SaaS application, the token being associated with retrieving tenant-specific data from a storage. By way of a non-limiting example, in FIG. 3, at least one processor (e.g., processing circuitry 2310 of FIG. 23) of intermediate platform 300 may provide access to a software development kit to enable developer 310 to write code for multi-tenant SaaS application 1700 (see FIG. 17) for use with SaaS platform 100.

Process 1600 may include a step 1604 of receiving first and second requests from at least one running instance of the multi-tenant SaaS application for first and second data access using first and second tokens, the first and second tokens being associated with first and second secure storage locations associated with first and second tenants, the first and second requests lacking identifications of the first and second storage locations. By way of a non-limiting example, in FIG. 14, the at least one processor may receive first and second requests from running instance 1400 of the multi-tenant SaaS application for first and second data access using first and second tokens 1414 and 1416, respectively. First and second tokens 1414 and 1416 are associated with first and second secure storage locations 1408 and 1410 associated with first and second tenants 1402 and 1404, respectively. The first and second requests lack identifications of first and second storage locations 1408 and 1410.

Process 1600 may include a step 1606 of mapping the first and second tokens to the first and second storage locations associated with the first and second tenants. By way of a non-limiting example, in FIG. 15, the at least one processor may map first and second tokens 1414 and 1416 to first and second storage locations 1408 and 1410, associated with first and second tenants 1402 and 1404, respectively.

Process 1600 may include a step 1608 of retrieving from the first and second storage locations at least some of the tenant-specific data associated with the first and second tenants. By way of a non-limiting example, in FIG. 14, the at least one processor may retrieve from first and second storage locations 1408 and 1410 at least some of the tenant-specific data associated with the first and second tenants 1402 and 1404, respectively.

Process 1600 may include a step 1610 of providing to the at least one running instance of the multi-tenant SaaS application the at least some of the tenant-specific data associated with the first and second tenants. By way of a non-limiting example, in FIG. 14, the at least one processor may provide to running instance 1400 of the multi-tenant SaaS application the tenant-specific data associated with the first and second tenants 1402 and 1404.

Some embodiments involve a system for the steps discussed above. By way of a non-limiting example, in FIG. 14, the at least one processor may receive first and second requests from running instance 1400 of the multi-tenant SaaS application for first and second data access using first and second tokens 1414 and 1416, respectively. First and second tokens 1414 and 1416 are associated with first and second secure storage locations 1408 and 1410 associated with first and second tenants 1402 and 1404, respectively. The first and second requests lack identifications of first and second storage locations 1408 and 1410. In FIG. 15, the at least one processor may map first and second tokens 1414 and 1416 to first and second storage locations 1408 and 1410, associated with first and second tenants 1402 and 1404, respectively. The at least one processor may retrieve from first and second storage locations 1408 and 1410 at least some of the tenant-specific data associated with the first and second tenants 1402 and 1404, respectively. The at least one processor may provide to running instance 1400 of the multi-tenant SaaS application the tenant-specific data associated with the first and second tenants 1402 and 1404.

Systems, methods, and computer program products are disclosed for accessing data for a running instance of a multi-tenant SaaS platform. Accessing data for a running instance of a multi-tenant SaaS platform includes providing access to an SDK enabling a developer to write code for a multi-tenant SaaS application, the SDK enabling the developer to insert a call to a token for retrieving tenant-specific data from storage; receiving first and second requests from the running instance for first and second data access using first and second tokens associated with first and second storage locations for first and second tenants, the first and second requests lacking identifications of the first and second storage locations; mapping the first and second tokens to the first and second storage locations; retrieving from the first and second storage locations the tenant-specific data for the first and second tenants; providing to the running instance the tenant-specific data.

Some disclosed embodiments involve usage of shared software resources between multiple applications. Shared software resources refers to resources made available to more than one entity, process, or application. For example, shared software resources may refer to any computing components and services that may be accessible and capable of being utilized by multiple applications or processes simultaneously. Other examples of shared software resources may include central processing unit (CPU) load, memory storage, network bandwidth, database space, libraries/frameworks, peripheral applications, and any other types of resources that may be utilized by at least one processor or application. Shared software resources may refer to software libraries and frameworks providing common functionalities and features to multiple applications or developers, thereby eliminating the need to reinvent the wheel for each new application. These resources may be managed and controlled to ensure fair and secure access. Shared software resources may promote resource efficiency, collaboration, and the reuse of functionalities in computing systems.

Some disclosed embodiments involve receiving a first application, for use with a platform, and to be run as a first image, the first application including a first code and first metadata information for configuring the first application, the first metadata information including a first set of functionalities associated with the first application, and first specific settings for at least one of the first set of functionalities. An application (e.g., a software application) refers to a computer program or portion thereof (e.g., executable computer code instructions) designed to perform tasks for providing functionality. An image (as described and exemplified elsewhere in this disclosure) refers to a digital representation of a state or file containing data. Code for an application may include executable instructions for carrying out specific functions of an application. In some embodiments, metadata information (as described elsewhere herein) refers to a section of configuration information containing descriptive information or data that provides context, attributes, or characteristics about data or resources. For example, metadata may include descriptive information about a resource, information relating to data structures and containers, information facilitating administration of resources (e.g., resource types, permissions, and data of creation), statistical information (e.g., analytics), information about a data owner and/or a data controller, and/or any other descriptive information associated with data. In some embodiments, metadata information may include metadata associated with a user, as described elsewhere. In some embodiments, metadata information may include one or more sets of functionalities associated with the application. A functionality refers to a specific feature, capability, or task that a software application or program can perform. A set of functionalities includes one or more functionalities. For example, functionalities may include organization and description; search and retrieval; utilization and preservation; information creation, multi-versioning, and reuse; facilitation of interoperability; management and administration; and other task-based operations. In some embodiments, specific settings for one or more sets of functionalities refers to options or configurations associated with one or more of the set of functionalities. The options or configurations may, for example, permit the functionalities to be achieved. In some embodiments, the first code and the first metadata information associated with the first application may be separate. In some embodiments, the first metadata information may be included in the first code. That is, the code may contain entries that correspond to the metadata information for retrieving information about the application, but these entries may not be executed by the code itself. A first code and first metadata information for configuring the first application refers to information needed by the platform to execute the first application.

In some embodiments, a first application for use with a platform refers to an application that is executed using a SaaS platform (e.g., a multi-tenant SaaS platform), as described elsewhere herein. For instance, a SaaS platform may host one or more multi-tenant software application concurrently, each of which may serve multiple tenants while maintaining segregation between private data for each of the multiple tenants. In some embodiments, such a platform may include a serverless environment. A serverless environment (as described and exemplified elsewhere in this disclosure) refers to a cloud computing model where developers can build and run applications without the need to manage the underlying infrastructure, servers, or hardware resources directly. A serverless environment may, for example, include a plurality of connected computing devices (e.g., each including at least one processor) and one or more memories accessible via a communication network for providing a plurality of users with cloud computing resources. The plurality of connected computing devices may be configured to execute software to manage cloud infrastructure for running a software application. As such, the first application may be deployed inside a container, causing the plurality of connected computing devices to automatically allocate cloud resources for launching a plurality of instances of the first software application on demand.

In some embodiments, a platform refers to a system that consists of a hardware device and an operating system for running one or more applications. A serverless environment may be an example platform. As such, the first application to be run as a first image refers to launching computer code in a serverless environment, as described elsewhere in this disclosure. The code may be launched, for example, by at least one processor performing one or more of the operations described herein.

Figure 21:
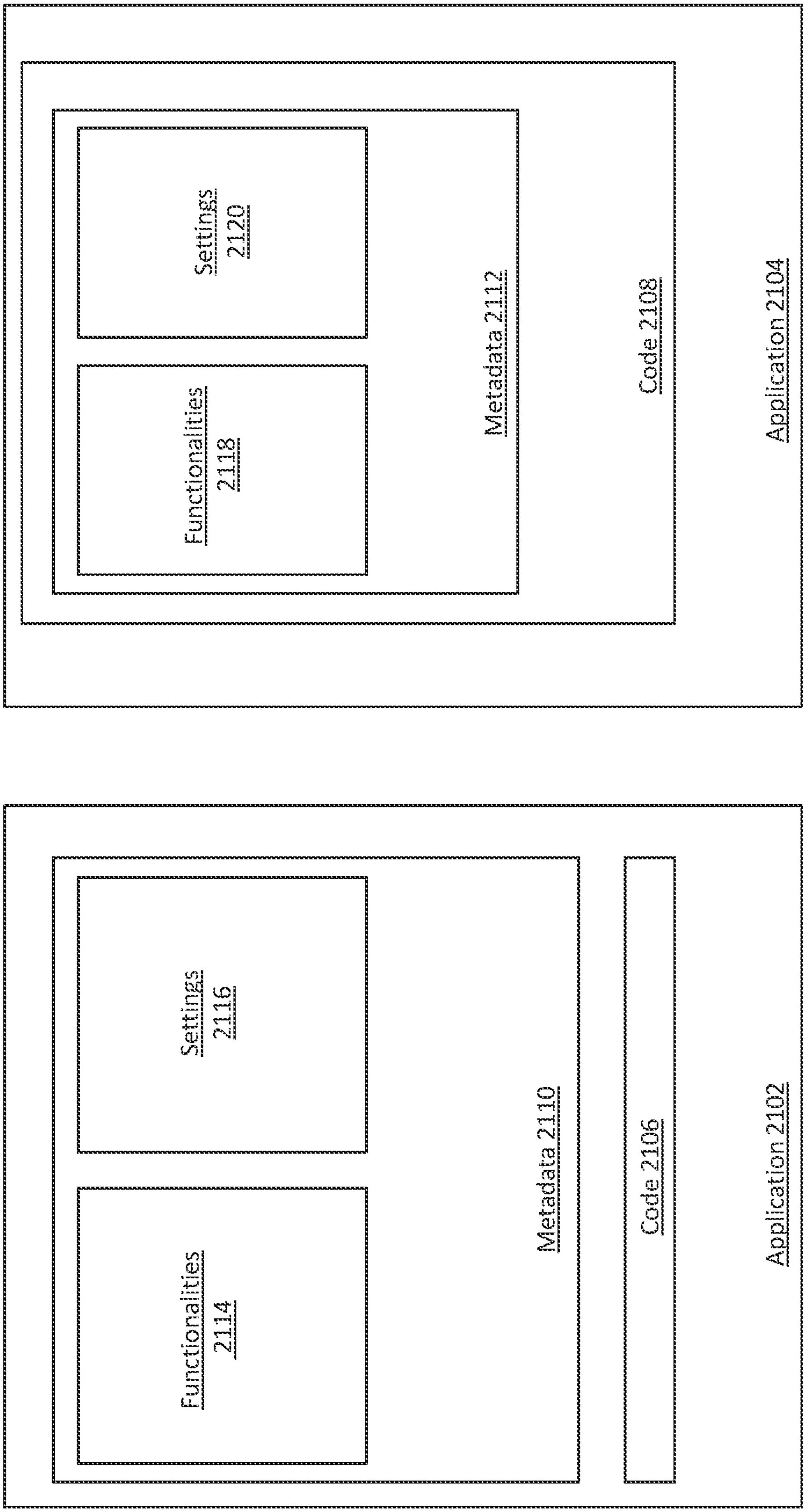
FIG. 21 is a diagram of exemplary application structures, consistent with some disclosed embodiments.

As a non-limiting example, FIG. 21 illustrates two examples of how an application may be structured. For example, application 2102 contains metadata information 2110 and code 2106, which may be separated within the application 2102. The metadata information 2110 may include a set of functionalities 2114 and a specific set of settings 2116. Both the set of functionalities 2114 and set of specific settings 2116 may be specific to the application 2102. The metadata information 2110 and the code 2106 may be used by the platform to configure the application 2102. In another example, application 2104 contains metadata information 2112 which is contained within the code 2108. The metadata information 2112 contains the set of functionalities 2118 and the specific set of settings 2120, which may be specific to the application 2104. The metadata information 2112 and the code 2108 may configure the application 2104.

Some disclosed embodiments involve generating a first mapping between the first set of functionalities and a first list of shared software resources associated with the first set of functionalities. A mapping refers to information that may identify a correspondence or correlation between two items (e.g., a set of functionalities and a list of shared software resources.) A mapping may provide a high-level overview of software architecture. For example, a mapping may illustrate dependencies, such as which libraries and frameworks an application may utilize. Generating a mapping may include creating a link or association between two items and storing that link or association in a file, memory, or database. Generating a mapping may also include allocating resources to perform specific tasks defined in a set of functionalities. For example, a set of functionalities may require a framework, communication manager, storage manager, and memory to operate. By generating a mapping, a file may be created that indicates that a specific framework, communication manager, storage manager, and memory within a shared software resource library is associated with the set of functionalities. For example, the mapping may be implemented as a lookup table. A lookup table may store values that are accessible with a key value. A list of shared software resources may be stored in the lookup table, and a set of functionalities may be the key value that is inputted to the lookup table to retrieve the list of shared software resources. Additionally or alternatively, the mapping may be implemented as a tree map. For example, a set of functionalities and a list of shared software resources may be sorted as key-value pairs in a binary search tree. The set of functionalities may be the key value that is sorted within the tree and the list of shared software resources may be the value retrieved with the key value. Additionally or alternatively, the mapping may be implemented as double linked list. A double linked list is a compilation of nodes containing data that can be stored and accessed. Nodes in the list may be organized according to the time of insertion in the double linked list. A node in a doubly-linked list may include a key-value pair and point to one or more other nodes within the list. For example, the key value of a node may be a set of functionalities and a list of shared software resources may be the value. One or more mappings may be inserted as nodes within the double linked list.

Figure 22:
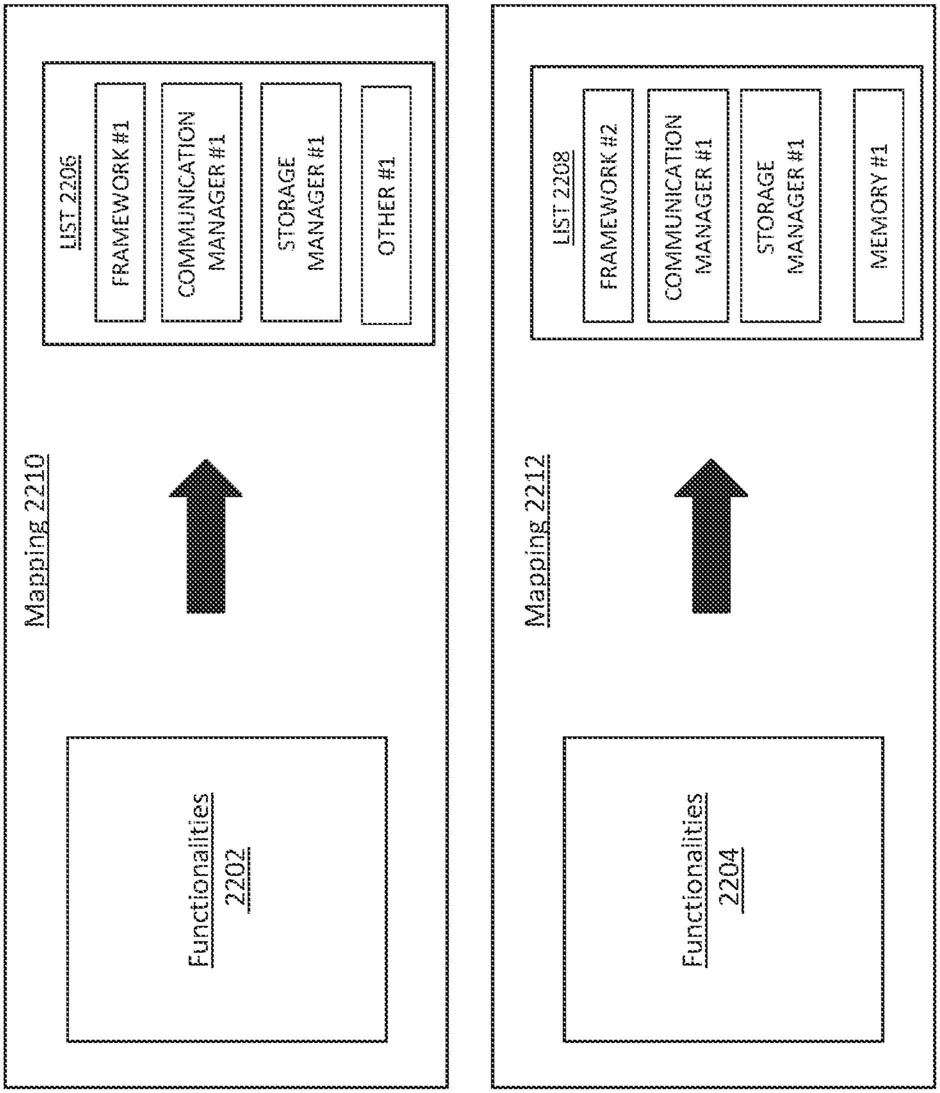
FIG. 22 is a diagram of exemplary mappings of functionalities to shared resources, consistent with some disclosed embodiments.

As a non-limiting example, FIG. 22 illustrates a mapping 2210 that associates a set of functionalities 2202 with a list of shared software resources 2206. The list of shared software resources 2206 is comprised of the resources needed to execute the tasks described in the set of functionalities 2202. The mapping 2210 may be implemented as a file that contains a lookup table.

Some disclosed embodiments involve incorporating the first mapping into the first image to thereby enable the first application to accomplish the first set of functionalities. As discussed previously, the first mapping may be information that generates a correspondence between shared software resources and the first set of functionalities. Incorporating the first mapping into the first image refers to a process of including this correspondence information into the first image file data. In some embodiments, incorporating the first mapping into the first image may occur during the creation of the first image. For example, the first mapping may be saved at an address in the first code and during incorporation the first mapping may change addresses in the first code. By incorporating the first mapping into the first image the first application may be able to accomplish the first set of functionalities. Additionally or alternatively, the first code may contain instructions to access the first set of functionalities, such as when the developer uses an SDK.

Figure 20:
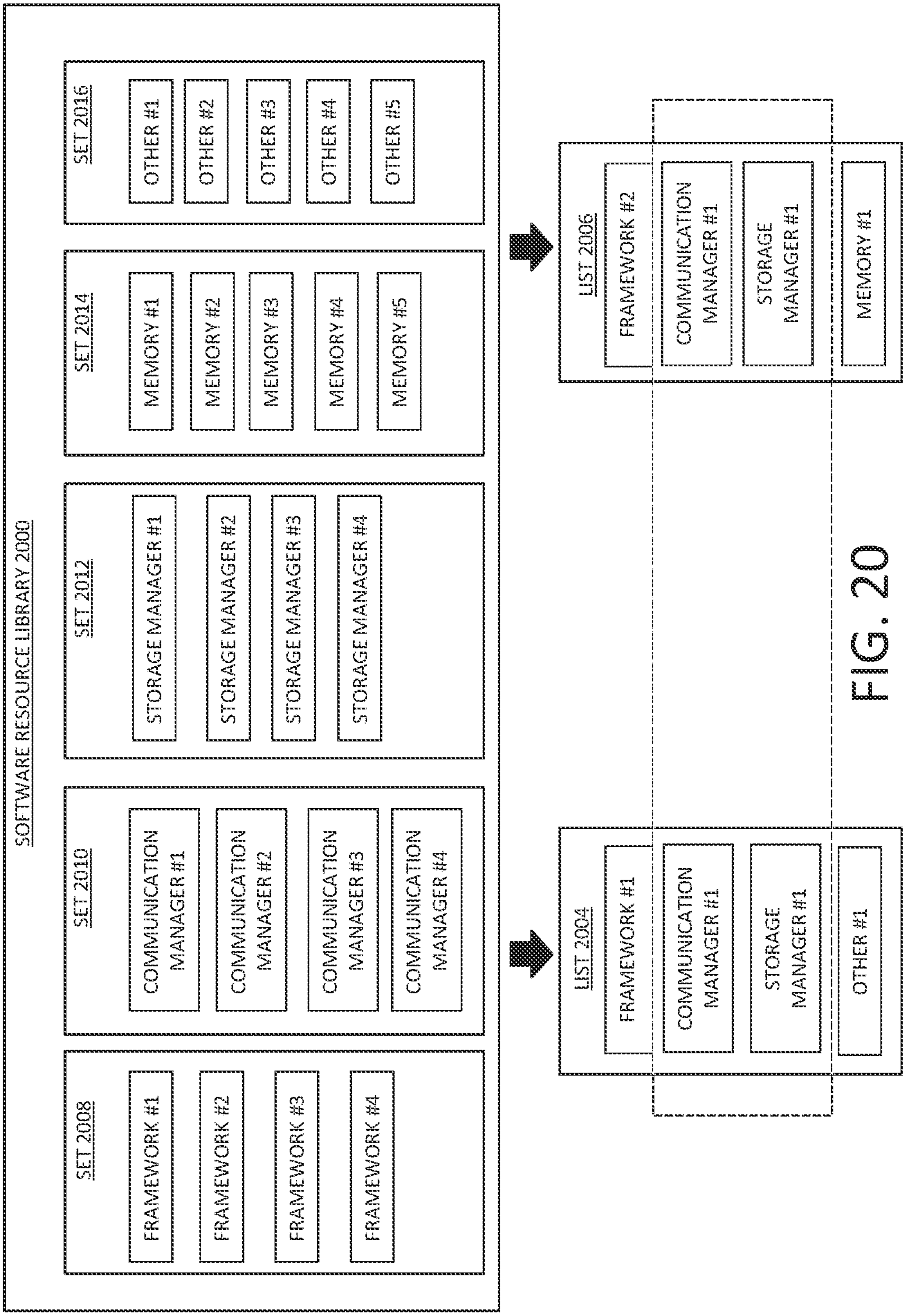
FIG. 20 is a block diagram of an exemplary software resource library, consistent with some disclosed embodiments.

As a non-limiting example, software resource library 2000 illustrated in FIG. 20 may be an example of a library of available shared software resources associated with the platform. For example, software resource library 2000 may include one or more software resources that may be allocated for running an application and/or for performing a desired functionality therefor. In some cases, the one or more software resources may be specifically adapted to be used with the platform (e.g., in case of a shelf application, one or more special settings and/or wrapping may be provided by the platform]. In some embodiments, the software resource library 2000 may include multiple software resources of the same type. For example, as shown in FIG. 20 the software resource library 2000 may include four types of frameworks. Multiple resources of the same type may be grouped into a set within the software resource library 2000. For example, software resource library 2000 may include a set of frameworks 2008, a set of communication managers 2010, a set of storage managers 2012, a set of memory 2014, and a set of other resources 2016, which represents additional software resources that are not described herein but may be included in the software resource library 2000. The resources listed in list 2004 may be necessary for executing the first application, including the first functionalities. The at least one processor may create a file or information that indicates a correspondence between these shared software resources on list 2004 and the first set of functionalities.

In some embodiments, a functionality may include a hardware-based functionality. For example, the first functionality may include management of memory, storage, network, and/or computation resources. By way of a non-limiting example, in FIG. 23, by incorporating the first mapping (e.g., mapping 2210 of FIG. 22) into the first image (e.g., see immutable image 1104 of FIG. 11), processing circuitry 2310 may enable the first application (e.g., application 2102 of FIG. 21) to accomplish a set of hardware-based functionalities, e.g., including management and/or allocation of one or more of memory 2320, storage 2330, network device 2340, and/or processing time associated with processing circuitry 2310. In some embodiments, a functionality may include a software-based functionality, such as an application of a firewall, a translation module, and/or any other software-based functionality, e.g., as described elsewhere herein. By incorporating the first mapping into the first image, processing circuitry 2310 may enable the first application to accomplish a set of software-based functionalities. In some embodiments, a functionality may include software and hardware-based functionalities. By incorporating the first mapping into the first image, processing circuitry 2310 may enable the first application to accomplish a set of software and hardware-based functionalities.

Some disclosed embodiments involve receiving a second application, for use with the platform, and to be run as a second image, the second application including a second code and second metadata information for configuring the second application, the second metadata information including a second set of functionalities associated with the second application, and second specific settings for at least one of the second set of functionalities. The second application, second image, second code, second metadata information, and second specific settings, and second set of functionalities may be similar to the first application, first image, first code, first metadata information, first specific settings, and first set of functionalities, respectively, as disclosed and exemplified above. By way of example, second metadata information may include descriptive information about a resource as well as one or more sets of functionalities associated with the second application. In some disclosed embodiments, the first metadata information for configuring the first application and the second metadata information for configuring the second application are included respectively in the first code and the second code. That is, the code may contain entries that correspond to the metadata information for retrieving information about the application. By way of example, such entries may not be executed by the code itself. Additionally or alternatively, the second code and the second metadata information for the second application may be separate. In some disclosed embodiments, the first specific settings and the second specific settings respectively include a first whitelist and a second whitelist for use by the communication manager. A whitelist in this context refers to a collection of approved entities or resources that are authorized to communicate via a communication manager. A whitelist may act as an access control mechanism, allowing only the listed entities to establish communications. By comparing incoming requests against the whitelist, the communication manager may block or reject communication attempts from unauthorized or malicious sources. A whitelist may include approved attributes, which if included in a request will allow the request to be granted. In some embodiments, a whitelist may be configured based on criteria such as IP addresses or domain names. For example, a read request that contains an IP address that is included on the whitelist may be allowed to retrieve data about the application executed on the platform, while a read request that contains an IP address that is not included on the whitelist may be denied. As another example, the platform may receive a request to write data to the application executed on the platform. If the write request contains whitelisted attributes (e.g., an IP address), the write request may be granted while a write request that does not contain a whitelist attribute may be denied. As such, a whitelist may enhance security and ensure that only trusted entities can access sensitive data or resources. The specific settings may implement a whitelist as a file or data structure that contains a list of approved attributes. Examples of attributes may include a file name, file path, file size, digital signature, or cryptographic hash. For example, the specific settings may include a file with a list of approved file-paths. As requests are received by the application, the file-path in the request may be compared against each approved file-path listed in the file associated with the specific settings. If the request file-path matches a file-path on the list, the request may be granted. A communication manager refers to any software component or system responsible for handling, monitoring, and/or coordinating communication between different entities or components within a computer network or distributed system. A communication manager may facilitate the exchange of data, messages, or requests between various components, such as applications, services, devices, or processes and guarantee reliable, secure, and efficient communication by managing protocols, data formats, routing, and synchronization.

As a non-limiting example, FIG. 21 illustrates two examples of how the second application may be structured. For example, application 2102 contains metadata information 2110 and code 2106, which may be separated within the application 2102. The metadata information 2110 may include a set of functionalities 2114 and a specific set of settings 2116. Both the set of functionalities 2114 and set of specific settings 2116 may be specific to the application 2102. The metadata information 2110 and the code 2106 may be used by the platform to configure the application 2102. In another example, application 2104 contains metadata information 2112 which is contained within the code 2108. The metadata information 2112 contains the set of functionalities 2118 and the specific set of settings 2120, which may be specific to the application 2104. The metadata information 2112 and the code 2108 may configure the application 2104. In some embodiments, the first and second applications may have the same configuration. In other embodiments, the first and second applications may have different configurations.

Some disclosed embodiments involve generating the first list of shared software resources and the second list of shared software resources. A list refers to a collection. For example, a list may include a sequence of ordered values. As described previously, shared software resources may include central processing unit (CPU) load, memory storage, network bandwidth, database space, libraries/frameworks, peripheral applications, and any other types of resources that may be utilized by at least one processor or application. As such, as list of shared software resources may refer to a container of software resources. For example, a list of shared software resources may be implemented as a linked list. Each shared software resource may be represented as a value (e.g., integer or string) in a node. Each node may point to another node, thus linking the shared software resources together as a list. The first list of shared software resources may include the resources for performing the first set of functionalities, and the second list of shared software resources may include the resources for performing the second set of functionalities. As described previously, a functionality may refer to a category of operation or task performed by the application. Therefore, resources for performing the first and second set of functionalities refers to the resources necessary to execute the tasks associated with an application.

In some disclosed embodiments, generating the first list of shared software resources and the second list of shared software resources includes analyzing the first metadata information and the second metadata information. Analyzing metadata refers to examining and interpreting the descriptive information about data to gain insights, draw conclusions, or make informed decisions. Metadata is the "data about data," providing context, structure, and additional details about the data. For example, the first metadata information and the second metadata information may contain information about the structure, organization, and properties of code files or other digital assets, which may include files names, author information, versions, creation and modification dates, and dependencies. Dependencies may include libraries and external resources such as shared software resources. Analyzing the first metadata and the second metadata may refer to a process of extracting some or all of this information. Extracting may occur, for example, before the first code or second code is analyzed or executed.

In some embodiments, the platform may provide one or more specific resources for incorporating and/or otherwise associating with the image to fulfill the respective functionality. For example, if a developer has indicated inclusion of a whitelist communication rule (e.g., either by including such an indication in the code and/or with the metadata information), then the platform may provide an appropriate communication manager for associating with the code. For instance, at least one processor associated with the platform may introduce a new code, and/or one or more links to associated resources. To achieve this, the at least one processor may compile and/or otherwise obtain a list of resources for associating and/or incorporating into the image according to the mapping during generation of the image.

In some disclosed embodiments, generating the first list of shared software resources and the second list of shared software resources includes analyzing the first code and the second code. Analyzing the first code and the second code refers to examining of the code to determine the logic, syntax, algorithms, and/or implementation of the code. In some embodiments, analyzing the first code and the second code may include performing a function graph. Analyzing the first code and the second code may occur without executing the first code and/or the second code. Additionally or alternatively, analyzing the first code or second code may occur during execution of the first code or the second code. In some embodiments, at least one processor may function as an analysis module, which may analyze the first and second metadata and/or the first and second code. For example, the analysis module may analyze the first metadata by decoding the first list of shared software resources from dependencies included in the first metadata, and the analysis module may analyze the second metadata by decoding the second list of shared software resources from dependencies included in the second metadata. The analysis module may analyze the first code and the second code by performing a comprehensive examination of the first code and the second code. In some embodiments, analyzing the first code and the second code includes using Artificial Intelligence to scan the first code and the second code. Scanning code using Artificial Intelligence refers to the use of AI techniques to analyze and understand the content of software code automatically. For example, AI-powered code scanning tools can process source code, identify patterns, and extract meaningful information from the codebase without the need for human intervention. In some embodiments, the first and second list of shared software resources may be generated concurrently. In other embodiments, the first and second list of shared software resources may be generated separately.

In some embodiments, the first list of shared software resources and the second list of shared resources are selected from a library of available shared software resources associated with the platform. A library of shared software resources refers to a collection of pre-written code and/or functions that are available for use by more than one entity, application, or process. Such entities, applications, or processes may access the library through a platform. A platform refers to an environment or infrastructure that serves as a foundation for software applications, services, or other technologies to operate and interact with hardware and other software components. In some embodiments, a library may be a collection of computing code, software services, and tools to be utilized by applications and processes. In some disclosed embodiments, the library of available shared software resources associated with the platform may be included in an SDK associated with the platform. As discussed previously, an SDK may refer to a package that includes a set of tools, libraries, and documentation. Selecting the first list of shared software resources and the second list of shared software resources refers to the process of assigning a resource to a specific application. For example, the library of available shared software resources may include frameworks, communication managers, storage managers, memory, and other resources that are available on a SaaS for executing an application. As an example, an application may require a specific resource, such as a fixed amount of memory, to be run. While generating the first list of shared software resources may identify the amount of memory required to run the first application, selecting the first list of shared software resources may involve reserving specific blocks of memory (i.e., memory addresses) for executing the application. In some embodiments, resources in the library of available shared software resources may be utilized by multiple applications. For example, multiple applications may utilize the same framework. As such, resources within the library of available shared software resources may be assigned to more than one application.

As a non-limiting example, as shown in FIG. 20, software resource library 2000 may be associated with an SDK associated with the SaaS platform 100. Software resource library 2000 may include the software resources that are available for running the first application. For example, shared software resources may refer to any computing components and services that may be accessible and capable of being utilized by multiple applications or processes simultaneously. Other examples of shared software resources may include central processing unit (CPU) load, memory storage, network bandwidth, database space, libraries/frameworks, peripheral applications, and any other types of resources that may be utilized by at least one processor or application. Shared software resources may refer to software libraries and frameworks providing common functionalities and features to multiple applications or developers, thereby eliminating the need to reinvent the wheel for each new application. FIG. 20 also illustrates a list 2004 that may be an example of the first list of shared software resources selected by the at least one processor. For example, list 2004 may include a framework selected from the set of frameworks 2008, a communication manager selected from the set of communication managers 2010, a storage manager selected from the set of storage managers 2012, and a resource selected from the set of other resources 2016. As described previously, the set of other resources 2016 may refer to additional software shared resources that are not disclosed herein but may be included in the software resource library 2000. Accordingly, the shared software resources included in list 2004 may be associated with the first application.

Figure 19:
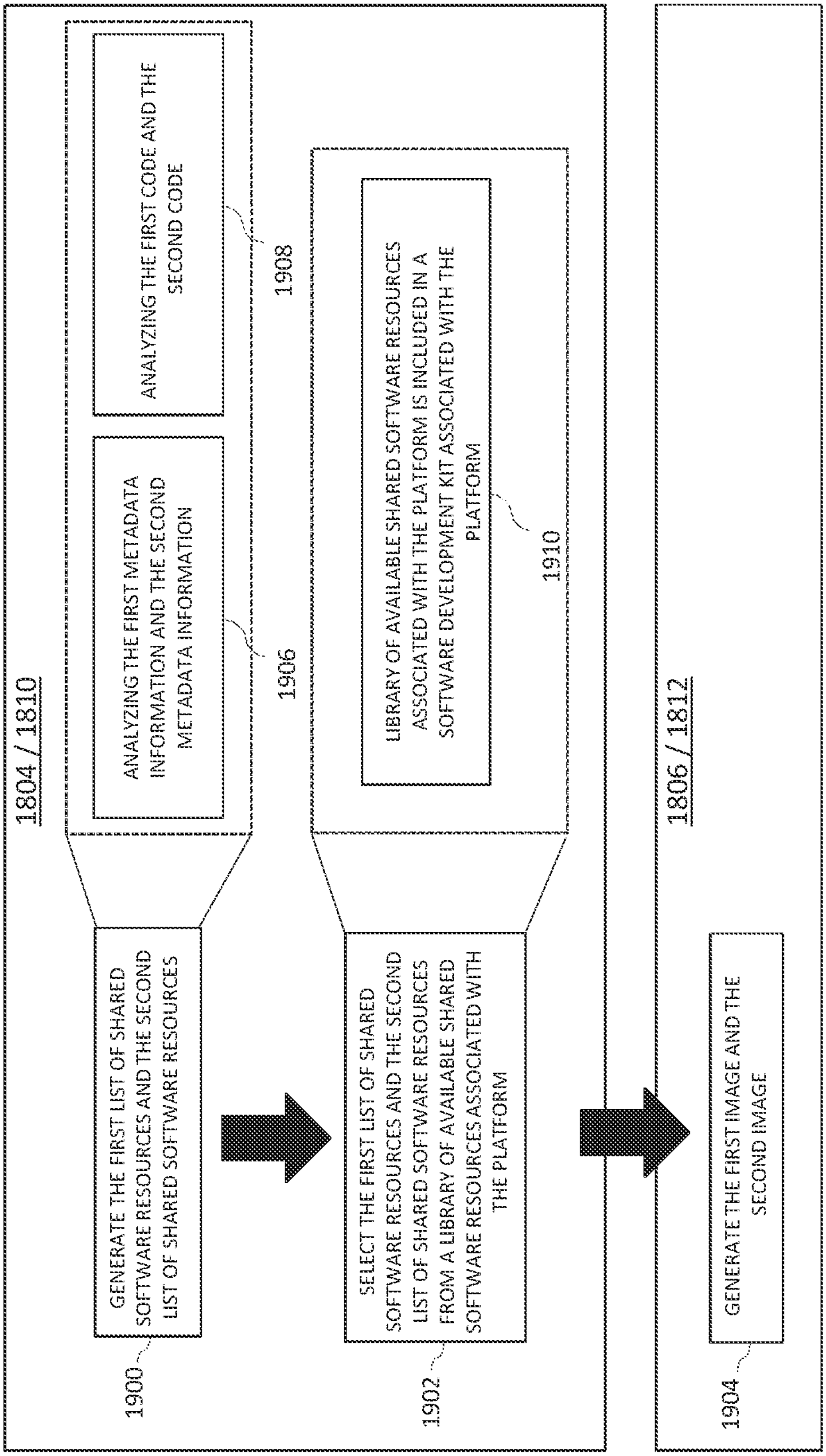
FIG. 19 is a flowchart of another exemplary process for sharing software resources between multiple applications, consistent with some disclosed embodiments.

As described previously, software resource library 2000 in FIG. 20 may be an example of the library described in substep 1910 of FIG. 19. The list 2006 shown in FIG. 20 may be an example of the second list of shared software resources selected by the at least one processor. For example, list 2006 may include a framework selected from the set of frameworks 2008, a communication manager selected from the set of communication managers 2010, a storage manager selected from the set of storage managers 2012, and memory selected from the set of memories 2014. Accordingly, the shared software resources included in list 2006 may be associated with the second application.

Some disclosed embodiments involve generating a second mapping between the second set of functionalities and the second list of shared software resources associated with the second set of functionalities. Generating the second mapping may be performed in a manner similar to generating the first mapping, as described above. For example, a mapping may refer to information generated to identify a correspondence or correlation between a set of functionalities and a list of shared software resources. The mapping process may include allocating resources to perform specific tasks defined in a set of functionalities. For example, a linked list, double linked list, search tree, or lookup table may each be an example of a mapping that associates the second set of resources with the second set of functionalities so that the second set of functionalities may be able to use the second set of resources.

As a non-limiting example, FIG. 22 illustrates a mapping 2212 that associates a set of functionalities 2204 with a list of shared software resources 2208. The list of shared software resources 2208 is comprised of the resources needed to execute the tasks described in the set of functionalities 2204. The mapping 2212 may be implemented as a file that contains a lookup table. In some embodiments, mapping 2210 may be an example of the first mapping associated with the first application and the mapping 2212 may be an example of the second mapping associated with the second application.

Some disclosed embodiments involve generating the first image and the second image. An image (as described and exemplified elsewhere in this disclosure) may be a digital representation of a state or file containing data. For example, a container image may correspond to a combination of the code and set of instructions for running the code in an isolated area of a serverless environment. As such, generating the first image and second image refers to the process of creating files that contain the necessary source code, libraries, dependencies, and other tools for running an application from the code included in an application. In some embodiments, the first image and the second image may be a read-only file type. In other embodiments the first image and the second image may be a read-write file type.

Some disclosed embodiments involve incorporating the second mapping into the second image to thereby enable the second application to accomplish the second set of functionalities. Incorporating the second mapping into the second image may be performed in a manner similar to incorporating the first mapping into the first image, as described above. Incorporating the second mapping into the second image refers to the process of including the correspondence information that associates the second set of functionalities with the second list of shared software resources into the second image file data. In some embodiments, incorporating the second mapping into the second image may occur during the creation of the second image. By incorporating the second mapping into the second image the second application may be able to accomplish a set of functionalities. Additionally or alternatively, the second code may contain instructions to reach the set of second functionalities, such as when the developer uses an SDK.

In some embodiments, a functionality may include a hardware-based functionality. For example, the second functionality may include management of memory, storage, network, and/or computation resources. By way of a non-limiting example, in FIG. 23, by incorporating the second mapping (e.g., mapping 2212 of FIG. 22) into the second image (e.g., see immutable image 1104 of FIG. 11), processing circuitry 2310 may enable the second application (e.g., application 2104 of FIG. 21) to accomplish a set of hardware-based functionalities, e.g., including management and/or allocation of one or more of memory 2320, storage 2330, network device 2340, and/or processing time associated with processing circuitry 2310. In some embodiments, a functionality may include a software-based functionality, such as an application of a firewall, a translation module, and/or any other software-based functionality, e.g., as described elsewhere herein. By incorporating the second mapping into the second image, processing circuitry 2310 may enable the second application) to accomplish a set of software-based functionalities. In some embodiments, a functionality may include software and hardware-based functionalities. By incorporating the second mapping into the second image, processing circuitry 2310 may enable the second application to accomplish a set of software and hardware-based functionalities.

In some disclosed embodiments, incorporating the first mapping into the first image and the second mapping into the second image includes generating an updated first image and an updated second image, wherein the first updated image and the second updated image are immutable. An updated image refers to a state or file that contains code, runtime environments, libraries, dependencies, and other application specific resources that differ at least in part from the resources contained in the original image. For example, an image file may be a read-only file type, and generating an updated first image refers to the process of creating a new file rather than modifying an existing image file. An updated image may be a representation of an environment at a different point in time than the original image. Immutable (as described and exemplified elsewhere in this disclosure) refers to an unchanging, invariable, fixed, and/or enduring state or characteristic. An immutable image may include any information (e.g., dependencies, libraries, and/or configurations) required to run serverless functions and/or services, and that may remain unmodified during a lifecycle of an image, avoiding changes due to, e.g., updates, patches, and/or configuration changes. After creating a new version with the update, the new image may also be a read-only file that is immutable so that it will not change while it exists in the serverless environment.

In some disclosed embodiments, the first list of shared software resources and the second list of shared software resources have at least one shared resource in common. A shared resource in common refers to the same resource being identified on both the first list and the second list. In some embodiments, a single resource in the library may be associated with more than one application to be used by both when required. For example, two different applications may utilize the same framework. As such, a software resource may be shared between applications. In some disclosed embodiments, the at least one shared software resource in common includes a communication manager or a storage manager. A communications manager refers to a component, module, or piece of code for managing communication and/or interaction between different parts of a software system or between the software system and external entities. A storage manager refers to a software component responsible for managing data storage in a software application, system or database. A storage manager may organize, store, retrieve, and maintain data on storage devices. Some functions of a storage manager may include data organization, storage allocation, data retrieval, file system management, data access control, backup and recovery, performance optimization, and ensuring data integrity. An example of a communication manager may include a firewall. A firewall may associate different groups of blocked links for different tenants. Even though the structure of an application may be similar for all tenants, the information processed by the application for each tenant may be different. An example for a storage manager may include Google Drive® which may be a single framework for multi tenants usage.

As a non-limiting example, in FIG. 20 the list 2004 of resources, which is associated with the first application, and the list of resources 2006, which is associated with the second application, may share at least one resource in common. For example, FIG. 20 illustrates how the list 2004 and the list 2006 may share a storage manager. Additionally or alternatively, FIG. 20 illustrates how the list 2004 and the list 2006 may share a communication manager.

Figure 18:
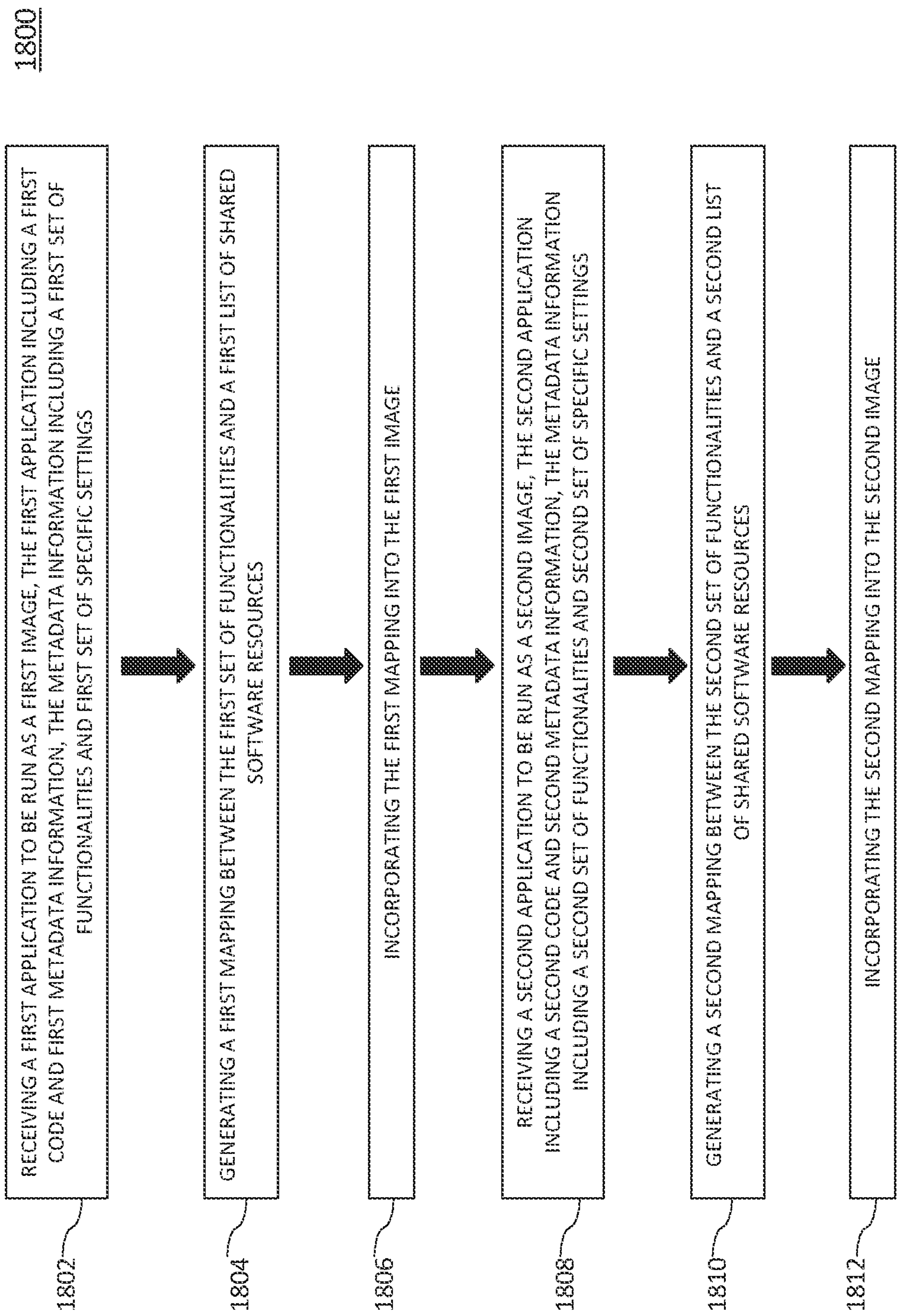
FIG. 18 is a flowchart of an exemplary process for sharing software resources between multiple applications, consistent with some disclosed embodiments.

FIG. 18 illustrates a flowchart of example process 1800 allowing usage of shared software resources between multiple applications, consistent with embodiments of the present disclosure. In some embodiments, process 1800 may be performed by at least one processor (e.g., processing circuitry 2310 shown in FIG. 23) to perform operations or functions described herein. In some embodiments, some aspects of process 1800 may be implemented as software (e.g., program codes or instructions) that are stored in a memory (e.g., memory 2320) or a non-transitory computer readable medium. In some embodiments, some aspects of process 1800 may be implemented as hardware (e.g., a specific-purpose circuit). In some embodiments, process 1800 may be implemented as a combination of software and hardware.

Process 1800 may include a step 1802 of receiving a first application, for use with a platform, and to be run as a first image, the first application including a first code and first metadata information for configuring the first application, the first metadata information including a first set of functionalities associated with the first application, and first specific settings for at least one of the first set of functionalities. For example, the first application may be used with the SaaS platform 100 (discussed in FIG. 1). As discussed previously, the SaaS platform may be a cloud-based software delivery model where service providers host software applications and make them accessible to users over the Internet. The first application may be developed as described previously in step 206 of flowchart 200 (discussed in FIG. 2). As previously discussed in FIG. 3, the application may run in serverless environment 320 although it may appear to the developer 310 to be running directly on the SaaS platform 100.

At step 1804, the at least one processor may generate a first mapping between the first set of functionalities and a first list of shared software resources associated with the first set of functionalities. Generating a mapping may include creating a link or association between two items and storing that link or association in a file, memory, or database. Generating a mapping may also include allocating resources to perform specific tasks defined in a set of functionalities. For example, a set of functionalities may require a framework, communication manager, storage manager, and memory to operate. By generating a mapping, a file may be created that indicates that a specific framework, communication manager, storage manager, and memory within a shared software resource library is associated with the set of functionalities.

At step 1806, the at least one processor may incorporate the first mapping into the first image to thereby enable the first application to accomplish the first set of functionalities. For example, the mapping associated with list 2004, which may be an example of the first mapping, may be incorporated into an image. Incorporating the first mapping into the first image refers to the process of including this correspondence information into the first image file data. In some embodiments, incorporating the first mapping into the first image may occur during the creation of the first image. For example, the first mapping may be saved at an address in the first code and during incorporation the first mapping may change addresses in the first code. By incorporating the first mapping into the first image the first application may be able to accomplish the first set of functionalities. Additionally or alternatively, the first code may contain instructions to access the first set of functionalities, such as when the developer uses an SDK.

At step 1808, the at least one processor may receive a second application, for use with the platform, and to be run as a second image, the second application including a second code and second metadata information for configuring the second application, the second metadata information including a second set of functionalities associated with the second application, and second specific settings for at least one of the second set of functionalities. Receiving the second application may be similar to receiving the first application, as described above in reference to step 1802. For example, the second application may be used with the SaaS platform 100 and the second application may be developed as described previously in step 206 of flowchart 200 (discussed in FIG. 2).

At step 1810 the at least one processor may generate a second mapping between the second set of functionalities and a second list of shared software resources associated with the second set of functionalities. For example, the shared software resources in list 2006, which may be an example of the second list of shared software resources, may be mapped to functionalities associated with the second application. As such, the at least one processor may create a file or information that indicates a correspondence between these shared software resources and the second set of functionalities.

At step 1812, the at least one processor may incorporate the second mapping into the second image to thereby enable the second application to accomplish the second set of functionalities. In some embodiments, the first list of shared software resources and the second list of shared software resources have at least one shared resource in common.

FIG. 19 illustrates a flowchart of generating the first and second mapping in accordance with steps 1804 and 1810 of FIG. 18 and incorporating the first and second mapping into the first and second image in accordance with steps 1806 and 1812 of FIG. 18. For example, generating the first mapping at step 1804 and generating the second mapping at 1810 may involve generating the first list of shared software resources and the second list of shared software resources at substep 1900 and selecting the first list of shared software resources and the second list of shared software resources from a library of available shared software resources associated with the platform at substep 1902.

At step 1900, the least one processor may generate the first list of shared software resources and the second list of shared software resources. At substep 1906, the at least one processor may generate the first list of shared software resources and the second list of shared software resources by analyzing the first metadata information and the second metadata information. Additionally or alternatively, at substep 1908, the at least one processor may generate the first list of shared software resources and the second list of shared software resources by analyzing the first code and the second code.

At step 1904 of FIG. 19, the at least one processor may generate the first image and the second image after generating the first and second list of shared software resources and selecting the shared software resources from the library of shared software resources. In some embodiments, generating the first image at step 1904 of FIG. 19 may occur concurrently with incorporating the first mapping into the first image at step 1806 of FIG. 18. Additionally or alternatively, generating the second image at step 1904 of FIG. 19 may occur concurrently with incorporating the second mapping into the second image at step 1812 of FIG. 18. In step 1806, the at least one processor may incorporate the first mapping into the first image to thereby enable the first application to accomplish the first set of functionalities. In step 1812, the at least one processor may incorporate the second mapping into the second image to thereby enable the second application to accomplish the second set of functionalities. In some embodiments, incorporating the first and second mapping may occur during the creation of the first image from the first code and the second image from the second code. For example, the first image and the second image may change addresses in the first code and second code respectively. Additionally or alternatively, the first code and second code may contain instructions to reach the respective first and second functionalities, such as when the developer uses an SDK.

Figure 23:
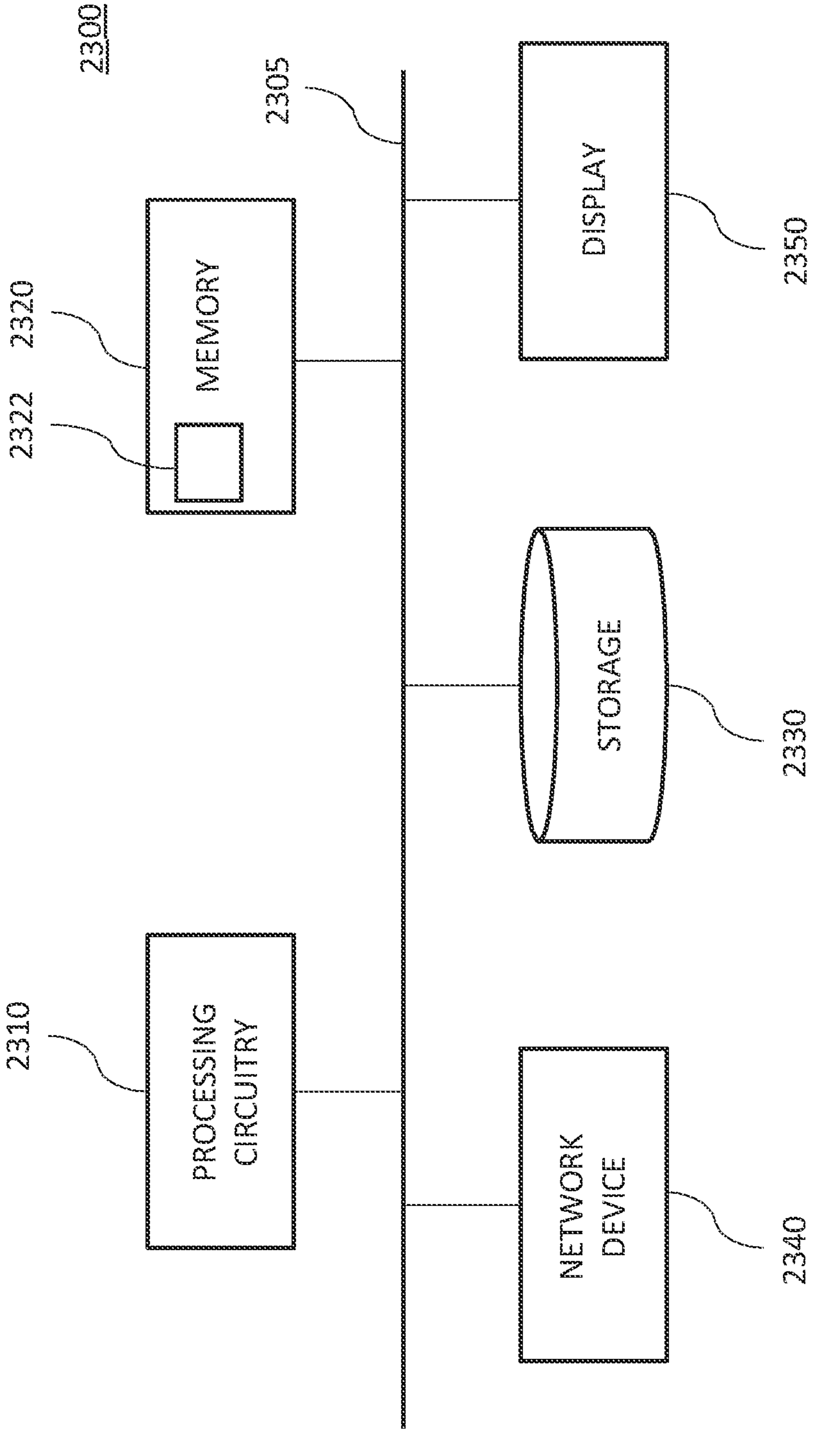
FIG. 23 is a block diagram of an exemplary computing device or system which may be employed in connection with some embodiments of the present disclosure.

Systems, methods, and computer program products are disclosed for allowing usage of shared software resources between multiple applications. Allowing usage of shared software resources between multiple applications includes receiving first and second applications for use with a platform, to be run as first and second images, where the first and second applications include first and second codes, first and second metadata information for configuring the first and second applications and including first and second associated functionalities and first and second settings, respectively; generating first and second mappings between the first and second functionalities and first and second lists of associated shared software resources; incorporating the first and second mappings into the first and second images to thereby enable the first and second applications to accomplish the first and second sets of functionalities; wherein the first and second lists of shared software resources have at least one shared resource in common FIG. 23 is a block diagram of an exemplary computing device 2300 consistent with some embodiments. In some embodiments, computing device 2300 may be similar in type and function to user device YY20, discussed with respect to FIG. 24. As shown in FIG. 12, computing device 2300 may include processing circuitry 2310, such as, for example, a central processing unit (CPU). In some embodiments, the processing circuitry 2310 may include, or may be a component of, a larger processing unit implemented with one or more processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 2310 may be coupled via a bus 2305 to a memory 2320.

The memory 2320 may further include a memory portion 2322 that may contain instructions that when executed by the processing circuitry 2310, may perform the methods described in more detail herein. The memory 2320 may be further used as a working scratch pad for the processing circuitry 2310, a temporary storage, and others, as the case may be. The memory 2320 may be a volatile memory such as, but not limited to, random access memory (RAM), or non-volatile memory (NVM), such as, but not limited to, flash memory. The processing circuitry 2310 may be further connected to a network device 2340, such as a network interface card, for providing connectivity between the computing device 2300 and a network, such as a network 2410, discussed in more detail with respect to FIG. 24 below. The processing circuitry 2310 may be further coupled with a storage device 2330. The storage device 2330 may be used for the purpose of storing single data type column-oriented data structures, data elements associated with the data structures, or any other data structures. While illustrated in FIG. 23 as a single device, it is to be understood that storage device 2330 may include multiple devices either collocated or distributed.

The processing circuitry 2310 and/or the memory 2320 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, computing device 2300 may include one or more input and output devices (not shown in figure). Computing device may also include a display 2350, such as a touchscreen display or other display types discussed herein.

FIG. 24 is a block diagram of computing architecture 2400 that may be used in connection with various disclosed embodiments. The computing device 2300, as described in connection with FIG. 23, may be coupled to network 2410. The network 2410 may enable communication between different elements that may be communicatively coupled with the computing device 1300, as further described below. The network 2410 may include the Internet, the world-wide-web (WWW), a local area network (LAN), a wide area network (WAN), a metro area network (MAN), and other networks capable of enabling communication between the elements of the computing architecture 2400. In some disclosed embodiments, the computing device 2300 may be a server deployed in a cloud computing environment.

One or more user devices 2420-1 through user device 2420-*m*, where 'm' in an integer equal to or greater than 1, referred to individually as user device YY20 and collectively as user devices YY20, may be communicatively coupled with the computing device 2300 via the network 2410. A user device YY20 may be for example, a smartphone, a mobile phone, a laptop, a tablet computer, a wearable computing device, a personal computer (PC), a smart television and the like. A user device YY20 may be configured to send to and receive from the computing device 2300 data and/or metadata associated with a variety of elements associated with single data type column-oriented data structures, such as columns, rows, cells, schemas, and the like.

One or more data repositories 2430-1 through data repository 2430-*n*, where 'n' is an integer equal to or greater than 1, referred to individually as data repository YY30 and collectively as data repository 2430, may be communicatively coupled with the computing device 2300 via the network 2410, or embedded within the computing device 2300. Each data repository YY30 may be communicatively connected to the network 2410 through one or more database management services (DBMS) 2435-1 through DBMS 2435-*n*. The data repository YY30 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network-accessible storage device or a component of the computing device 2300. Furthermore, external third-party application providers such as an AI agent provider 2450 may be communicatively coupled with the computing device 2300 via the network 2410.

The embodiments disclosed herein are exemplary and any other means for performing and facilitating display navigation operations may be consistent with this disclosure.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application-specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from and to transmit data and instructions to, a storage system, at least one input device, and at least one output device.

Although the present disclosure is described with regard to a "computing device", a "computer", or a "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smartwatch or a PDA (personal digital assistant). Any two or more of such devices in communication with each other may optionally include a "network" or a "computer network".

To provide for interaction with a user, the systems and techniques described here can be implemented on a computer having a display device (a LED (light-emitting diode), OLED (organic LED), or LCD (liquid crystal display) monitor/screen) for displaying information to the user and a touch-sensitive layer such as a touchscreen, or keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above-described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above-described embodiments can be implemented by hardware, software (program codes), or a combination of hardware and software. If implemented by software, it can be stored in the above-described computer-readable media. The software, when executed by the processor can perform the disclosed methods. The computing units and other functional units described in the present disclosure can be implemented by hardware, software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as examples only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

Examples of inventive concepts are contained in the following clauses which are an integral part of this disclosure.

Clause 1. A non-transitory computer-readable medium containing instructions that when executed by at least one processor performs operations for running applications in a serverless environment, the operations comprising:

- configuring a serverless environment by integrating a set of rules into the serverless environment, the set of rules including at least one trigger and at least one trigger-responsive action for use in conjunction with a SaaS platform;
- obtaining a general address for the serverless environment;
- using the general address for conveying code to the configured serverless environment, for combination in an immutable manner with configuration information, thereby enabling formation of an immutable image, wherein the configuration information is adapted to invoke the at least one trigger, thereby initiating the at least one trigger-responsive action; and receiving a specific address in the serverless environment for reaching an actuated instance of the immutable image for incorporation with the SaaS platform.

Clause 2. The non-transitory computer-readable medium of clause 1, wherein the operations further comprise receiving the code from a third-party originator of the code, and the code is received in a mutable form.

Clause 3. The non-transitory computer-readable medium of clauses 1 or 2, wherein conveying the code to the configured serverless environment includes transferring the code to an intermediate platform for wrapping the code and sending the wrapped code from the intermediate platform to the serverless environment; or, sending the code directly to the serverless environment in an absence of an intermediate alteration to the code.

Clause 4. The non-transitory computer-readable medium of any of clauses 1 to 3, wherein the intermediate platform is configured to modify the code.

Clause 5. The non-transitory computer-readable medium of any of clauses 1 to 4, wherein the intermediate platform is configured to analyze the code to determine compatibility of the code with the serverless environment.

Clause 6. The non-transitory computer-readable medium of any of clauses 1 to 5, wherein the intermediate platform is configured to validate code modifications.

Clause 7. The non-transitory computer-readable medium of any of clauses 1 to 6, wherein the intermediate platform is configured to estimate computational resources necessary to run the code.

Clause 8. The non-transitory computer-readable medium of any of clauses 1 to 7, wherein the set of rules includes configuring a predetermined infrastructure using the serverless environment computing resources.

Clause 9. The non-transitory computer-readable medium of any of clauses 1 to 8, wherein the set of rules includes monitoring received and sent communications from the actuated instance of the immutable image in the serverless environment.

Clause 10. The non-transitory computer-readable medium of any of clauses 1 to 8, wherein the set of rules includes providing a remote server with indications on the usage of the serverless environment for billing processes.

Clause 11. The non-transitory computer-readable medium of any of clauses 1 to 10, wherein the indications of usage of the serverless environment include indications of time and number of instances operating concurrently on the serverless environment.

Clause 12. The non-transitory computer-readable medium of any of clauses 1 to 11, wherein the at least one trigger includes at least one soft trigger, the corresponding action of which is to signal a violation of a rule, and at least one hard trigger, the corresponding action of which is to terminate an actuated instance.

Clause 13. The non-transitory computer-readable medium of any of clauses 1 to 12, wherein the set of rules includes a plurality of similar rules that provide increasing levels of computing resources.

Clause 14. The non-transitory computer-readable medium of any of clauses 1 to 13, wherein a relevant rule from the plurality of similar rules is determined by a variable associated with a third-party originator of the code.

Clause 15. The non-transitory computer-readable medium of any of clauses 1 to 14, wherein the operations further comprise conveying a new version of the code to the configured serverless environment while maintaining the specific address in the serverless environment and monitoring a version number of the new version of the code by another element in a serverless code.

Clause 16. The non-transitory computer-readable medium of any of clauses 1 to 15, wherein the configuration information includes a metadata portion and wherein the metadata portion includes instructions for other services monitoring access to and from the serverless environment via the specific address.

Clause 17. The non-transitory computer-readable medium of any of clauses 1 to 16, wherein the serverless environment is configured with a scale to zero ability for the actuated instance of the immutable image.

Clause 18. The non-transitory computer-readable medium of any of clauses 1 to 17, wherein the configuration information includes a metadata portion and an image construction portion and wherein the metadata portion includes a predetermined list of entities authorized to access the specific address.

Clause 19. The non-transitory computer-readable medium of any of clauses 1 to 18, further comprising an AI functionality configured to scan the wrapped code, wherein the immutable image is generated by an image construction file created by the AI functionality.

Clause 20. A method for enabling applications to run in a serverless environment, the method comprising:

configuring a serverless environment by integrating a set of rules into the serverless environment, the set of rules including at least one trigger and at least one trigger-responsive action for use in conjunction with a SaaS platform;

obtaining a general address for the serverless environment;

using the general address for conveying a code to the configured serverless environment, for combination in an immutable manner with configuration information, thereby enabling formation of an immutable image, wherein the configuration information is adapted to invoke the at least one trigger, thereby initiating the at least one trigger-responsive action; and receiving a specific address in the serverless environment for reaching an actuated instance of the immutable image for incorporation with the SaaS platform.

Clause 21. A system for enabling applications to run in a serverless environment, the system comprising:

at least one processor adapted to:

configure a serverless environment by integrating a set of rules into the serverless environment, the set of rules including at least one trigger and at least one trigger-responsive action for use in conjunction with a platform;

obtain a general address for the serverless environment;

use the general address for conveying a code to the configured serverless environment, for combination in an immutable manner with configuration information, thereby enabling formation of an immutable image, wherein the configuration information is adapted to invoke the at least one trigger, thereby initiating the at least one trigger-responsive action; and receive a specific address in the serverless environment for reaching an actuated instance of the immutable image for incorporation with the SaaS platform.

Clause 22. A non-transitory computer-readable medium containing instructions that when executed by at least one processor cause the at least one processor to perform customized segmentation operations in a serverless environment, the operations comprising:

receiving by an intermediate platform at least one signal from an entity requesting application hosting for use with a SaaS platform, wherein the at least one signal is configured to convey personalized configuration information and at least one unique identifier;

using the personalized configuration information to construct a metadata configuration file;

transmitting to the serverless environment a request for a segmented storage location and a request for a related signed URL containing permission for writing data to the segmented storage location;

sending the metadata configuration file to the segmented storage location;

providing the signed URL to the entity requesting application hosting for enabling secure transmission of a code to the segmented storage location directly by the entity requesting application hosting; and wherein the code is configured such that following receipt via the signed URL, the serverless environment is enabled to establish an immutable image from the code and the metadata configuration file.

Clause 23. The non-transitory computer-readable medium of any of clauses 1 to 22, wherein the immutable image includes testing portions such that after the immutable image is established and an actuated instance thereof is deployed, the testing portions provide information on runtime factors and compatibility of the code.

Clause 24. The non-transitory computer-readable medium of any of clauses 1 to 23, wherein the received code is scanned at the serverless environment in accordance with a set of rules included in the metadata configuration file.

Clause 25. The non-transitory computer-readable medium of any of clauses 1 to 24, wherein the operations further include providing predefined code portions that are not scanned at the serverless environment.

Clause 26. The non-transitory computer-readable medium of any of clauses 1 to 25, wherein scanning the received code includes finding blacklisted elements, validating dependencies, and verifying that an image builder portion is intact prior to being turned into the immutable image.

Clause 27. The non-transitory computer-readable medium of any of clauses 1 to 26, wherein the signed URL and the metadata configuration file include an ID unique to the request.

Clause 28. The non-transitory computer-readable medium of any of clauses 1 to 27, wherein secure code transmission is only allowed if the ID of the signed URL and the ID of the metadata configuration file match.

Clause 29. The non-transitory computer-readable medium of any of clauses 1 to 28, wherein when a request for a new version of the code to be transmitted to the segmented storage location is generated, the signed URL provided by the serverless environment is maintained.

Clause 30. The non-transitory computer-readable medium of any of clauses 1 to 29, wherein, when the signed URL is provided to the entity requesting code hosting, a connection is established between the segmented storage location and the entity requesting application hosting without passing through the intermediary platform.

Clause 31. The non-transitory computer-readable medium of any of clauses 1 to 30, wherein the operations further comprise providing the signed URL to at least one external entity.

Clause 32. The non-transitory computer-readable medium of any of clauses 1 to 31, wherein an identifier of the at least one external entity is included in the metadata configuration file.

Clause 33. The non-transitory computer-readable medium of any of clauses 1 to 32, wherein the operations further include:

receiving by the intermediate platform at least one additional signal from the entity requesting application hosting for use with a SaaS platform, wherein the at least one additional signal is configured to convey updated personalized configuration information and at least one additional unique identifier;

using the updated personalized configuration information to construct an updated metadata configuration file;

sending the updated metadata configuration file to the segmented storage location;

providing the signed URL to the entity requesting application hosting for enabling a secure additional code transmission to the segmented storage location directly by the entity requesting application hosting; and wherein the additional code is configured such that following receipt via the signed URL, the serverless environment is enabled to establish an updated immutable image from the additional code and the updated metadata configuration file.

Clause 34. The non-transitory computer-readable medium of any of clauses 1 to 33, wherein the operations further include verifying that the at least one additional unique identifier is identical to the at least one unique identifier to guarantee an identity of the entity requesting application hosting for use with a SaaS platform.

Clause 35. The non-transitory computer-readable medium of any of clauses 1 to 34, wherein the updated personalized configuration information and the updated metadata configuration file are identical to the personalized configuration information and the metadata configuration file.

Clause 36. The non-transitory computer-readable medium of any of clauses 1 to 35, wherein the additional code is an updated version of the code.

Clause 37. A method for enabling customized segmentation in a serverless environment, the method comprising:

receiving by an intermediate platform at least one signal from an entity requesting application hosting for use with a SaaS platform, wherein the at least one signal is configured to convey personalized configuration information and at least one unique identifier;

using the personalized configuration information to construct a metadata configuration file;

transmitting to the serverless environment a request for a segmented storage location and a request for a related signed URL containing permission for writing data to the segmented storage location;

sending the metadata configuration file to the segmented storage location;

providing the signed URL to the entity requesting application hosting for enabling secure transmission of a code to the segmented storage location directly by the entity requesting application hosting; and wherein the code is configured such that following receipt via the signed URL, the serverless environment is enabled to establish an immutable image from the code and the metadata configuration file.

Clause 38. The method of any of clauses 1 to 37, wherein the immutable image includes testing portions such that after the immutable image is established and an actuated instance thereof is deployed, the testing portions provide information on runtime factors and compatibility of the code.

Clause 39. The method of any of clauses 1 to 38, wherein the signed URL and the metadata configuration file include an ID unique to the request.

Clause 40. The method of any of clauses 1 to 39, wherein secure code transmission is only allowed if the ID of the signed URL and the ID of the metadata configuration file match.

Clause 41. A system for enabling applications to run in a serverless environment, the system comprising:

at least one processor configured to:

receive by an intermediate platform at least one signal from an entity requesting application hosting for use with a SaaS platform, wherein the at least one signal is configured to convey personalized configuration information and at least one unique identifier;

use the personalized configuration information to construct a metadata configuration file;

transmit to the serverless environment a request for a segmented storage location and a request for a related signed URL containing permission for writing data to the segmented storage location;

send the metadata configuration file to the segmented storage location;

provide the signed URL to the entity requesting application hosting for enabling secure transmission of a code to the segmented storage location directly by the entity requesting application hosting; and wherein the code is configured such that following receipt via the signed URL the serverless environment is enabled to establish an immutable image from the code and the metadata configuration file.

Clause 42. A non-transitory computer-readable medium containing instructions that when executed by at least one processor cause the at least one processor to perform data access operations in association with at least one running instance of a multi-tenant SaaS application within a Multi-tenant SaaS Platform, the operations comprising:

providing access to a software development kit to enable a developer to write code for a multi-tenant SaaS application for use with a SaaS platform, wherein the software development kit enables the developer to insert a call to a token into the code for the multi-tenant SaaS application, the token being associated with retrieving tenant-specific data from storage;

receiving a first request from at least one running instance of the multi-tenant SaaS application for first data access using a first token, the first token being associated with a first storage location associated with a first tenant, the first request lacking an identification of the first storage location;

mapping the first token to the first storage location associated with the first tenant;

retrieving from the first storage location at least some of the tenant-specific data associated with the first tenant;

providing to the at least one running instance of the multi-tenant SaaS application the at least some of the tenant-specific data associated with the first tenant;

receiving a second request from the at least one running instance of the multi-tenant SaaS application for second data access using a second token, the second token being associated with a second storage location associated with a second tenant, the second request lacking an identification of the second storage location;

mapping the second token to the second storage location associated with the second tenant;

retrieving from the second storage location at least some of the tenant-specific data associated with the second tenant; and providing to the at least one running instance of the multi-tenant SaaS application the at least some of the tenant-specific data associated with the second tenant.

Clause 43. The non-transitory computer-readable medium of any of clauses 1 to 42, wherein the operations further include:

receiving one or more additional requests from the at least one running instance of the multi-tenant SaaS application for data access using one or more additional distinct tokens, each of the one or more additional distinct tokens being associated with an additional distinct storage location associated with an additional distinct tenant, the one or more additional requests lacking an identification of the one or more additional distinct storage location;

mapping each of the one or more additional distinct tokens to an associated additional distinct storage location;

retrieving for each additional distinct tenant the at least some of the distinct tenant-specific data from an associated additional distinct storage location; and, providing to the at least one running instance of the multi-tenant SaaS application the retrieved distinct tenant-specific data associated with each of the additional distinct tenants, wherein the one or more additional distinct tokens, the one or more additional distinct associated tenants, and the one or more additional distinct storage locations are respectively different from the first token and the second token, the first tenant and the second tenant, and the first storage location and the second storage location associated with the first tenant and the second tenant.

Clause 44. The non-transitory computer-readable medium of any of clauses 1 to 43, wherein the code for the multi-tenant SaaS application includes at least one instruction using the tenant-specific data from a storage location associated with an associated tenant.

Clause 45. The non-transitory computer-readable medium of any of clauses 1 to 44, wherein the operations further include generating a unique token for each tenant of the multi-tenant SaaS application.

Clause 46. The non-transitory computer-readable medium of any of clauses 1 to 45, wherein mapping the first token and the second token to respective associated storage locations includes maintaining a secure database storing the mapping of the first token and second token to associated respective secure storage locations.

Clause 47. The non-transitory computer-readable medium of any of clauses 1 to 46, wherein mapping the first token and the second token to respective associated storage locations includes performing a lookup in the secure database to find the respective secure storage locations associated with the first token and the second token.

Clause 48. The non-transitory computer-readable medium of any of clauses 1 to 47, wherein providing access to the software development kit includes providing a link to download the software development kit.

Clause 49. The non-transitory computer-readable medium of any of clauses 1 to 48, wherein providing access to the software development kit includes providing access via an API.

Clause 50. The non-transitory computer-readable medium of any of clauses 1 to 49, wherein the first storage location and the second storage location are included in the SaaS platform.

Clause 51. The non-transitory computer-readable medium of any of clauses 1 to 50, wherein the first storage location and the second storage location are included in an external serverless environment.

Clause 52. The non-transitory computer-readable medium of any of clauses 1 to 51, wherein retrieving at least some of the tenant-specific data associated with the first tenant or the second tenant includes using a distinct signed URL to access the first storage location or the second storage location included in the external serverless environment.

Clause 53. The non-transitory computer-readable medium of any of clauses 1 to 52, wherein the at least one running instance of the multi-tenant SaaS application includes a plurality of different running instances of the multi-tenant SaaS application.

Clause 54. The non-transitory computer-readable medium of any of clauses 1 to 53, wherein the at least one running instance of the multi-tenant SaaS application uses a regular storage location common for each of the first tenant and the second tenant for at least one of usage data, infrastructure, in-memory data storage, or a combination thereof.

Clause 55. The non-transitory computer-readable medium of any of clauses 1 to 54, wherein at least some of tenant-specific data associated with the first tenant and the second tenant includes all associated data from the first storage location and the second storage location.

Clause 56. A method for performing data access operations via a token associated with a tenant, the method comprising:

providing access to a software development kit to enable a developer to write code for a multi-tenant SaaS application for use with a SaaS platform, wherein the software development kit enables the developer to insert a call to a token into the code for the multi-tenant SaaS application, the token being associated with retrieving tenant-specific data from a storage;

receiving a first request from at least one running instance of the multi-tenant SaaS application for first data access using a first token, the first token being associated with a first secure storage location associated with a first tenant, the first request lacking an identification of the first storage location;

mapping the first token to the first storage location associated with the first tenant;

retrieving from the first storage location at least some of the tenant-specific data associated with the first tenant;

providing to the at least one running instance of the multi-tenant SaaS application the at least some of the tenant-specific data associated with the first tenant;

receiving a second request from the at least one running instance of the multi-tenant SaaS application for second data access using a second token, the second token being associated with a second storage location associated with a second tenant, the second request lacking an identification of the second storage location;

mapping the second token to the second storage location associated with the second tenant;

retrieving from the second secure location at least some of the tenant-specific data associated with the second tenant; and providing to the at least one running instance of the multi-tenant SaaS application the at least some of the tenant-specific data associated with the second tenant.

Clause 57. The method of any of clauses 1 to 56, further comprising:

receiving one or more additional requests from the at least one running instance of the multi-tenant SaaS application for data access using one or more additional distinct tokens, each of the one or more additional distinct tokens being associated with an additional distinct storage location associated with an additional distinct tenant, the one or more additional requests lacking an identification of the one or more additional distinct storage location;

mapping each of the one or more additional distinct tokens to an associated additional distinct storage location;

retrieving for each additional distinct tenant the at least some of the distinct tenant-specific data from an associated additional distinct storage location; and, providing to the at least one running instance of the multi-tenant SaaS application the retrieved distinct tenant-specific data associated with each of the additional distinct tenants, wherein the one or more additional distinct tokens, the one or more additional distinct associated tenants, and the one or more additional distinct storage locations are respectively different from the first token and the second token, the first tenant and the second tenant, and the first storage location and the second storage location associated with the first tenant and the second tenant.

Clause 58. The method of any of clauses 1 to 57, wherein the code for the multi-tenant SaaS application includes at least one instruction using the tenant-specific data from a storage location associated with an associated tenant.

Clause 59. The method of any of clauses 1 to 58, further comprising generating a unique token for each tenant of the multi-tenant SaaS application.

Clause 60. The method of any of clauses 1 to 59, wherein mapping the first token and the second token to respective associated storage locations includes maintaining a secure database storing the mapping of the first token and second token to associated respective secure storage locations.

Clause 61. A system for performing data access operations via a token associated with a tenant, the system comprising:

at least one processor configured to:

provide access to a software development kit to enable a developer to write code for a multi-tenant SaaS application for use with a SaaS platform, wherein the software development kit enables the developer to insert a call to a token into the code for the multi-tenant SaaS application, the token being associated with retrieving tenant-specific data from a storage;

receive a first request from at least one running instance of the multi-tenant SaaS application for first data access using a first token, the first token being associated with a first storage location associated with a first tenant, the first request lacking an identification of the first storage location;

map the first token to the first storage location associated with the first tenant;

retrieve from the first storage location at least some of the tenant-specific data associated with the first tenant;

provide to the at least one running instance of the multi-tenant SaaS application the at least some of the tenant-specific data associated with the first tenant;

receive a second request from the at least one running instance of the multi-tenant SaaS application for second data access using a second token, the second token being associated with a second storage location associated with a second tenant, the second request lacking an identification of the second storage;

map the second token to the second storage location associated with the second tenant;

retrieve from the second storage location at least some of the tenant-specific data associated with the second tenant; and provide to the at least one running instance of the multi-tenant SaaS application the at least some of the tenant-specific data associated with the second tenant.

Clause 62. A non-transitory computer-readable medium containing instructions that when executed by at least one processor cause the at least one processor to perform operations to allow usage of shared software resources between multiple applications, the operations comprising:

receiving a first application, for use with a platform, and to be run as a first image, the first application including a first code and first metadata information for configuring the first application, the first metadata information including a first set of functionalities associated with the first application, and first specific settings for at least one of the first set of functionalities;

generating a first mapping between the first set of functionalities and a first list of shared software resources associated with the first set of functionalities;

incorporating the first mapping into the first image to thereby enable the first application to accomplish the first set of functionalities;

receiving a second application, for use with the platform, and to be run as a second image, the second application including a second code and second metadata information for configuring the second application, the second metadata information including a second set of functionalities associated with the second application, and second specific settings for at least one of the second set of functionalities;

generating a second mapping between the second set of functionalities and a second list of shared software resources associated with the second set of functionalities;

incorporating the second mapping into the second image to thereby enable the second application to accomplish the second set of functionalities; and wherein the first list of shared software resources and the second list of shared software resources have at least one shared resource in common.

Clause 63. The non-transitory computer-readable medium of any of clauses 1 to 62, wherein the at least one shared software resource in common includes a communication manager.

Clause 64. The non-transitory computer-readable medium of any of clauses 1 to 63, wherein the first specific settings and the second specific settings respectively include a first whitelist and a second whitelist for use by the communication manager.

Clause 65. The non-transitory computer-readable medium of any of clauses 1 to 64, wherein the at least one shared software resource in common includes a storage manager.

Clause 66. The non-transitory computer-readable medium of any of clauses 1 to 65, wherein the first list of shared software resources and the second list of shared software resources are selected from a library of available shared software resources associated with the platform.

Clause 67. The non-transitory computer-readable medium of any of clauses 1 to 66, the library of available shared software resources associated with the platform is included in a software development kit associated with the platform.

Clause 68. The non-transitory computer-readable medium of any of clauses 1 to 67, wherein the operations further include generating the first list of shared software resources and the second list of shared software resources.

Clause 69. The non-transitory computer-readable medium of any of clauses 1 to 68, wherein generating the first list of shared software resources and the second list of shared software resources includes analyzing the first metadata information and the second metadata information.

Clause 70. The non-transitory computer-readable medium of any of clauses 1 to 69, wherein generating the first list of shared software resources and the second list of shared software resources includes analyzing the first code and the second code.

Clause 71. The non-transitory computer-readable medium of any of clauses 1 to 70, wherein analyzing the first code and the second code includes using Artificial Intelligence to scan the first code and the second code.

Clause 72. The non-transitory computer-readable medium of any of clauses 1 to 71, wherein the operations further include generating the first image and the second image.

Clause 73. The non-transitory computer-readable medium of any of clauses 1 to 72, wherein incorporating the first mapping into the first image and the second mapping into the second image includes generating an updated first image and an updated second image, wherein the first updated image and the second updated image are immutable.

Clause 74. The non-transitory computer-readable medium of any of clauses 1 to 73, wherein the first metadata information for configuring the first application and the second metadata information for configuring the second application are included respectively in the first code and in the second code.

Clause 75. A method for allowing usage of shared software resources between multiple applications, the method comprising:

receiving a first application, for use with a platform, and to be run as a first image, the first application including a first code and first metadata information for configuring the first application, the first metadata information including a first set of functionalities associated with the first application, and first specific settings for at least one of the first set of functionalities;

generating a first mapping between the first set of functionalities and a first list of shared software resources associated with the first set of functionalities;

incorporating the first mapping into the first image to thereby enable the first application to accomplish the first set of functionalities;

receiving a second application, for use with the platform, and to be run as a second image, the second application including a second code and second metadata information for configuring the second application, the second metadata information including a second set of functionalities associated with the second application, and second specific settings for at least one of the second set of functionalities;

generating a second mapping between the second set of functionalities and a second list of shared software resources associated with the second set of functionalities;

incorporating the second mapping into the second image to thereby enable the second application to accomplish the second set of functionalities; and wherein the first list of shared software resources and the second list of shared software resources have at least one shared software resource in common.

Clause 76. The method of any of clauses 1 to 75, wherein the at least one shared software resource in common includes a communication manager.

Clause 77. The method of any of clauses 1 to 76, wherein the first specific settings and the second specific settings respectively include a first whitelist and a second whitelist for use by the communication manager.

Clause 78. The method of any of clauses 1 to 77, wherein the at least one shared software resource in common includes a storage manager.

Clause 79. A system for allowing usage of shared software resources between multiple applications, the system comprising:

at least one processor configured to:

receive a first application, for use with a platform, and to be run as a first image, the first application including a first code and first metadata information for configuring the first application, the first metadata information including a first set of functionalities associated with the first application, and first specific settings for at least one of the first set of functionalities.

generate a first mapping between the first set of functionalities and a first list of shared software resources associated with the first set of functionalities;

incorporate the first mapping into the first image to thereby enable the first application to accomplish the first set of functionalities;

receive a second application, for use with the platform, and to be run as a second image, the second application including a second code and second metadata information for configuring the second application, the second metadata information including a second set of functionalities associated with the second application, and second specific settings for at least one of the second set of functionalities;

generate a second mapping between the second set of functionalities and a second list of shared software resources associated with the second set of functionalities;

incorporate the second mapping into the second image to thereby enable the second application to accomplish the second set of functionalities; and wherein the first list of shared software resources and the second list of shared software resources have at least one shared resource in common.

Clause 80. The system of any of clauses 1 to 79, wherein the at least one shared software resource in common includes a communication manager.

Clause 81. The system of any of clauses 1 to 80, wherein the at least one shared software resource in common includes a storage manager.

Disclosed embodiments may include any one of the following bullet-pointed features alone or in combination with one or more other bullet-pointed features, whether implemented as a system and/or method, by at least one processor or circuitry, and/or stored as executable instructions on non-transitory computer readable media or computer readable media.

configuring a serverless environment by integrating a set of rules into the serverless environment.

a set of rules including at least one trigger and at least one trigger-responsive action for use in conjunction with a SaaS platform/ obtaining a general address for the serverless environment.

using the general address for conveying code to the configured serverless environment, for combination in an immutable manner with configuration information.

enabling formation of an immutable image, wherein the configuration information is adapted to invoke the at least one trigger.

initiating the at least one trigger-responsive action.

receiving a specific address in the serverless environment for reaching an actuated instance of the immutable image for incorporation with the SaaS platform.

receiving the code from a third-party originator of the code.

the code is received in a mutable form.

transferring the code to an intermediate platform for wrapping the code and sending the wrapped code from the intermediate platform to the serverless environment.

sending the code directly to the serverless environment in an absence of an intermediate alteration to the code.

the intermediate platform is configured to modify the code.

the intermediate platform is configured to analyze the code to determine compatibility of the code with the serverless environment.

the intermediate platform is configured to validate code modifications.

the intermediate platform is configured to estimate computational resources necessary to run the code.

the set of rules includes configuring a predetermined infrastructure using the serverless environment computing resources.

the set of rules includes monitoring received and sent communications from the actuated instance of the immutable image in the serverless environment.

the set of rules includes providing a remote server with indications on the usage of the serverless environment for billing processes.

the indications of usage of the serverless environment include indications of time and number of instances operating concurrently on the serverless environment.

the at least one trigger includes at least one soft trigger, the corresponding action of which is to signal a violation of a rule, and at least one hard trigger, the corresponding action of which is to terminate an actuated instance.

the set of rules includes a plurality of similar rules that provide increasing levels of computing resources.

a relevant rule from the plurality of similar rules is determined by a variable associated with a third-party originator of the code.

conveying a new version of the code to the configured serverless environment while maintaining the specific address in the serverless environment.

monitoring a version number of the new version of the code by another element in a serverless code.

the configuration information includes a metadata portion.

the metadata portion includes instructions for other services monitoring access to and from the serverless environment via the specific address.

the serverless environment is configured with a scale to zero ability for the actuated instance of the immutable image.

the configuration information includes a metadata portion and an image construction portion.

the metadata portion includes a predetermined list of entities authorized to access the specific address.

an AI functionality configured to scan the wrapped code.

the immutable image is generated by an image construction file created by the AI functionality.

A method for enabling applications to run in a serverless environment.

configuring a serverless environment by integrating a set of rules into the serverless environment.

the set of rules including at least one trigger and at least one trigger-responsive action for use in conjunction with a SaaS platform.

obtaining a general address for the serverless environment.

using the general address for conveying a code to the configured serverless environment, for combination in an immutable manner with configuration information.

enabling formation of an immutable image.

the configuration information is adapted to invoke the at least one trigger.

initiating the at least one trigger-responsive action.

receiving a specific address in the serverless environment for reaching an actuated instance of the immutable image for incorporation with the SaaS platform.

A system for enabling applications to run in a serverless environment.

at least one processor.

configure a serverless environment by integrating a set of rules into the serverless environment.

the set of rules including at least one trigger and at least one trigger-responsive action for use in conjunction with a platform.

obtain a general address for the serverless environment.

use the general address for conveying a code to the configured serverless environment, for combination in an immutable manner with configuration information.

enabling formation of an immutable image.

the configuration information is adapted to invoke the at least one trigger.

initiating the at least one trigger-responsive action.

receive a specific address in the serverless environment for reaching an actuated instance of the immutable image for incorporation with the SaaS platform.

perform customized segmentation operations in a serverless environment.

receiving by an intermediate platform at least one signal from an entity requesting application hosting for use with a SaaS platform.

the at least one signal is configured to convey personalized configuration information and at least one unique identifier.

using the personalized configuration information to construct a metadata configuration file.

transmitting to the serverless environment a request for a segmented storage location and a request for a related signed URL containing permission for writing data to the segmented storage location.

sending the metadata configuration file to the segmented storage location.

providing the signed URL to the entity requesting application hosting for enabling secure transmission of a code to the segmented storage location directly by the entity requesting application hosting.

the code is configured such that following receipt via the signed URL, the serverless environment is enabled to establish an immutable image from the code and the metadata configuration file.

the immutable image includes testing portions such that after the immutable image is established and an actuated instance thereof is deployed, the testing portions provide information on runtime factors and compatibility of the code.

the received code is scanned at the serverless environment in accordance with a set of rules included in the metadata configuration file.

providing predefined code portions that are not scanned at the serverless environment.

scanning the received code includes finding blacklisted elements, validating dependencies, and verifying that an image builder portion is intact prior to being turned into the immutable image.

the signed URL and the metadata configuration file include an ID unique to the request.

secure code transmission is only allowed if the ID of the signed URL and the ID of the metadata configuration file match.

a request for a new version of the code to be transmitted to the segmented storage location is generated, the signed URL provided by the serverless environment is maintained.

the signed URL is provided to the entity requesting code hosting, a connection is established between the segmented storage location and the entity requesting application hosting without passing through the intermediary platform.

providing the signed URL to at least one external entity.

an identifier of the at least one external entity is included in the metadata configuration file.

receiving by the intermediate platform at least one additional signal from the entity requesting application hosting for use with a SaaS platform.

the at least one additional signal is configured to convey updated personalized configuration information and at least one additional unique identifier.

using the updated personalized configuration information to construct an updated metadata configuration file.

sending the updated metadata configuration file to the segmented storage location.

providing the signed URL to the entity requesting application hosting for enabling a secure additional code transmission to the segmented storage location directly by the entity requesting application hosting.

the additional code is configured such that following receipt via the signed URL, the serverless environment is enabled to establish an updated immutable image from the additional code and the updated metadata configuration file.

verifying that the at least one additional unique identifier is identical to the at least one unique identifier to guarantee an identity of the entity requesting application hosting for use with a SaaS platform.

the updated personalized configuration information and the updated metadata configuration file are identical to the personalized configuration information and the metadata configuration file.

the additional code is an updated version of the code.

A method for enabling customized segmentation in a serverless environment.

receiving by an intermediate platform at least one signal from an entity requesting application hosting for use with a SaaS platform.

the at least one signal is configured to convey personalized configuration information and at least one unique identifier.

using the personalized configuration information to construct a metadata configuration file.

transmitting to the serverless environment a request for a segmented storage location and a request for a related signed URL containing permission for writing data to the segmented storage location.

sending the metadata configuration file to the segmented storage location.

providing the signed URL to the entity requesting application hosting for enabling secure transmission of a code to the segmented storage location directly by the entity requesting application hosting.

the code is configured such that following receipt via the signed URL, the serverless environment is enabled to establish an immutable image from the code and the metadata configuration file.

the immutable image includes testing portions such that after the immutable image is established and an actuated instance thereof is deployed, the testing portions provide information on runtime factors and compatibility of the code.

the signed URL and the metadata configuration file include an ID unique to the request.

secure code transmission is only allowed if the ID of the signed URL and the ID of the metadata configuration file match.

A system for enabling applications to run in a serverless environment.

receive by an intermediate platform at least one signal from an entity requesting application hosting for use with a SaaS platform.

the at least one signal is configured to convey personalized configuration information and at least one unique identifier.

use the personalized configuration information to construct a metadata configuration file.

transmit to the serverless environment a request for a segmented storage location and a request for a related signed URL containing permission for writing data to the segmented storage location.

send the metadata configuration file to the segmented storage location.

provide the signed URL to the entity requesting application hosting for enabling secure transmission of a code to the segmented storage location directly by the entity requesting application hosting.

the code is configured such that following receipt via the signed URL the serverless environment is enabled to establish an immutable image from the code and the metadata configuration file.

perform data access operations in association with at least one running instance of a multi-tenant SaaS application within a Multi-tenant SaaS Platform.

providing access to a software development kit to enable a developer to write code for a multi-tenant SaaS application for use with a SaaS platform.

the software development kit enables the developer to insert a call to a token into the code for the multi-tenant SaaS application.

the token being associated with retrieving tenant-specific data from storage.

receiving a first request from at least one running instance of the multi-tenant SaaS application for first data access using a first token.

the first token being associated with a first storage location associated with a first tenant.

the first request lacking an identification of the first storage location.

mapping the first token to the first storage location associated with the first tenant.

retrieving from the first storage location at least some of the tenant-specific data associated with the first tenant.

providing to the at least one running instance of the multi-tenant SaaS application the at least some of the tenant-specific data associated with the first tenant.

receiving a second request from the at least one running instance of the multi-tenant SaaS application for second data access using a second token.

the second token being associated with a second storage location associated with a second tenant.

the second request lacking an identification of the second storage location.

mapping the second token to the second storage location associated with the second tenant.

retrieving from the second storage location at least some of the tenant-specific data associated with the second tenant.

providing to the at least one running instance of the multi-tenant SaaS application the at least some of the tenant-specific data associated with the second tenant.

receiving one or more additional requests from the at least one running instance of the multi-tenant SaaS application for data access using one or more additional distinct tokens.

each of the one or more additional distinct tokens being associated with an additional distinct storage location associated with an additional distinct tenant.

the one or more additional requests lacking an identification of the one or more additional distinct storage location.

mapping each of the one or more additional distinct tokens to an associated additional distinct storage location.

retrieving for each additional distinct tenant the at least some of the distinct tenant-specific data from an associated additional distinct storage location.

providing to the at least one running instance of the multi-tenant SaaS application the retrieved distinct tenant-specific data associated with each of the additional distinct tenants.

wherein the one or more additional distinct tokens, the one or more additional distinct associated tenants, and the one or more additional distinct storage locations are respectively different from the first token and the second token, the first tenant and the second tenant and the first storage location and the second storage location associated with the first tenant and the second tenant.

the code for the multi-tenant SaaS application includes at least one instruction using the tenant-specific data from a storage location associated with an associated tenant.

generating a unique token for each tenant of the multi-tenant SaaS application.

mapping the first token and the second token to respective associated storage locations includes maintaining a secure database storing the mapping of the first token and second token to associated respective secure storage locations.

mapping the first token and the second token to respective associated storage locations includes performing a lookup in the secure database to find the respective secure storage locations associated with the first token and the second token.

providing access to the software development kit includes providing a link to download the software development kit.

providing access to the software development kit includes providing access via an API.

the first storage location and the second storage location are included in the SaaS platform.

the first storage location and the second storage location are included in an external serverless environment.

retrieving at least some of the tenant-specific data associated with the first tenant or the second tenant includes using a distinct signed URL to access the first storage location or the second storage location included in the external serverless environment.

the at least one running instance of the multi-tenant SaaS application includes a plurality of different running instances of the multi-tenant SaaS application.

the at least one running instance of the multi-tenant SaaS application uses a regular storage location common for each of the first tenant and the second tenant for at least one of usage data, infrastructure, in-memory data storage, or a combination thereof.

at least some of tenant-specific data associated with the first tenant and the second tenant includes all associated data from the first storage location and the second storage location.

A method for performing data access operations via a token associated with a tenant.

providing access to a software development kit to enable a developer to write code for a multi-tenant SaaS application for use with a SaaS platform.

the software development kit enables the developer to insert a call to a token into the code for the multi-tenant SaaS application.

the token being associated with retrieving tenant-specific data from a storage.

receiving a first request from at least one running instance of the multi-tenant SaaS application for first data access using a first token.

the first token being associated with a first secure storage location associated with a first tenant.

the first request lacking an identification of the first storage location.

mapping the first token to the first storage location associated with the first tenant.

retrieving from the first storage location at least some of the tenant-specific data associated with the first tenant.

providing to the at least one running instance of the multi-tenant SaaS application the at least some of the tenant-specific data associated with the first tenant.

receiving a second request from the at least one running instance of the multi-tenant SaaS application for second data access using a second token.

the second token being associated with a second storage location associated with a second tenant.

the second request lacking an identification of the second storage location.

mapping the second token to the second storage location associated with the second tenant.

retrieving from the second secure location at least some of the tenant-specific data associated with the second tenant.

providing to the at least one running instance of the multi-tenant SaaS application the at least some of the tenant-specific data associated with the second tenant.

receiving one or more additional requests from the at least one running instance of the multi-tenant SaaS application for data access using one or more additional distinct tokens.

each of the one or more additional distinct tokens being associated with an additional distinct storage location associated with an additional distinct tenant.

the one or more additional requests lacking an identification of the one or more additional distinct storage location.

mapping each of the one or more additional distinct tokens to an associated additional distinct storage location.

retrieving for each additional distinct tenant the at least some of the distinct tenant-specific data from an associated additional distinct storage location.

providing to the at least one running instance of the multi-tenant SaaS application the retrieved distinct tenant-specific data associated with each of the additional distinct tenants.

the one or more additional distinct tokens, the one or more additional distinct associated tenants, and the one or more additional distinct storage locations are respectively different from the first token and the second token, the first tenant and the second tenant, and the first storage location and the second storage location associated with the first tenant and the second tenant.

the code for the multi-tenant SaaS application includes at least one instruction using the tenant-specific data from a storage location associated with an associated tenant.

generating a unique token for each tenant of the multi-tenant SaaS application.

mapping the first token and the second token to respective associated storage locations includes maintaining a secure database storing the mapping of the first token and second token to associated respective secure storage locations.

A system for performing data access operations via a token associated with a tenant.

provide access to a software development kit to enable a developer to write code for a multi-tenant SaaS application for use with a SaaS platform.

the software development kit enables the developer to insert a call to a token into the code for the multi-tenant SaaS application.

the token being associated with retrieving tenant-specific data from a storage.

receive a first request from at least one running instance of the multi-tenant SaaS application for first data access using a first token.

the first token being associated with a first storage location associated with a first tenant.

the first request lacking an identification of the first storage location.

map the first token to the first storage location associated with the first tenant.

retrieve from the first storage location at least some of the tenant-specific data associated with the first tenant.

provide to the at least one running instance of the multi-tenant SaaS application the at least some of the tenant-specific data associated with the first tenant.

receive a second request from the at least one running instance of the multi-tenant SaaS application for second data access using a second token.

the second token being associated with a second storage location associated with a second tenant.

the second request lacking an identification of the second storage.

map the second token to the second storage location associated with the second tenant.

retrieve from the second storage location at least some of the tenant-specific data associated with the second tenant.

provide to the at least one running instance of the multi-tenant SaaS application the at least some of the tenant-specific data associated with the second tenant.

allow usage of shared software resources between multiple applications.

receiving a first application, for use with a platform, and to be run as a first image.

the first application including a first code and first metadata information for configuring the first application.

the first metadata information including a first set of functionalities associated with the first application, and first specific settings for at least one of the first set of functionalities.

generating a first mapping between the first set of functionalities and a first list of shared software resources associated with the first set of functionalities.

incorporating the first mapping into the first image to thereby enable the first application to accomplish the first set of functionalities.

receiving a second application, for use with the platform, and to be run as a second image.

the second application including a second code and second metadata information for configuring the second application.

the second metadata information including a second set of functionalities associated with the second application, and second specific settings for at least one of the second set of functionalities.

generating a second mapping between the second set of functionalities and a second list of shared software resources associated with the second set of functionalities.

incorporating the second mapping into the second image to thereby enable the second application to accomplish the second set of functionalities.

the first list of shared software resources and the second list of shared software resources have at least one shared resource in common.

the at least one shared software resource in common includes a communication manager.

the first specific settings and the second specific settings respectively include a first whitelist and a second whitelist for use by the communication manager.

the at least one shared software resource in common includes a storage manager.

the first list of shared software resources and the second list of shared software resources are selected from a library of available shared software resources associated with the platform.

the library of available shared software resources associated with the platform is included in a software development kit associated with the platform.

generating the first list of shared software resources and the second list of shared software resources.

generating the first list of shared software resources and the second list of shared software resources includes analyzing the first metadata information and the second metadata information.

generating the first list of shared software resources and the second list of shared software resources includes analyzing the first code and the second code.

analyzing the first code and the second code includes using Artificial Intelligence to scan the first code and the second code.

generating the first image and the second image.

incorporating the first mapping into the first image and the second mapping into the second image includes generating an updated first image and an updated second image.

the first updated image and the second updated image are immutable.

the first metadata information for configuring the first application and the second metadata information for configuring the second application are included respectively in the first code and in the second code.

A method for allowing usage of shared software resources between multiple applications.

receiving a first application, for use with a platform, and to be run as a first image.

the first application including a first code and first metadata information for configuring the first application.

the first metadata information including a first set of functionalities associated with the first application, and first specific settings for at least one of the first set of functionalities.

generating a first mapping between the first set of functionalities and a first list of shared software resources associated with the first set of functionalities.

incorporating the first mapping into the first image to thereby enable the first application to accomplish the first set of functionalities.

receiving a second application, for use with the platform, and to be run as a second image.

the second application including a second code and second metadata information for configuring the second application.

the second metadata information including a second set of functionalities associated with the second application, and second specific settings for at least one of the second set of functionalities.

generating a second mapping between the second set of functionalities and a second list of shared software resources associated with the second set of functionalities.

incorporating the second mapping into the second image.

enable the second application to accomplish the second set of functionalities.

the first list of shared software resources and the second list of shared software resources have at least one shared software resource in common.

the at least one shared software resource in common includes a communication manager.

the first specific settings and the second specific settings respectively include a first whitelist and a second whitelist for use by the communication manager.

the at least one shared software resource in common includes a storage manager.

A system for allowing usage of shared software resources between multiple applications.

receive a first application, for use with a platform, and to be run as a first image.

the first application including a first code and first metadata information for configuring the first application.

the first metadata information including a first set of functionalities associated with the first application, and first specific settings for at least one of the first set of functionalities.

generate a first mapping between the first set of functionalities and a first list of shared software resources associated with the first set of functionalities.

incorporate the first mapping into the first image to thereby enable the first application to accomplish the first set of functionalities.

receive a second application, for use with the platform, and to be run as a second image.

the second application including a second code and second metadata information for configuring the second application.

the second metadata information including a second set of functionalities associated with the second application, and second specific settings for at least one of the second set of functionalities.

generate a second mapping between the second set of functionalities and a second list of shared software resources associated with the second set of functionalities.

incorporate the second mapping into the second image to thereby enable the second application to accomplish the second set of functionalities.

the first list of shared software resources and the second list of shared software resources have at least one shared resource in common.

the at least one shared software resource in common includes a communication manager.

the at least one shared software resource in common includes a storage manager.

The invention claimed is:

1. A non-transitory computer-readable storage medium containing instructions that when executed by at least one processor perform operations for running applications in a serverless environment, the operations comprising:

receiving, from a third-party originator, an executable code for wrapping, wherein the executable code is associated with subsequent actuations of a plurality of running instances of a software application by a Software-as-a-Service (SaaS) platform;

configuring a serverless environment by integrating a set of rules into the serverless environment, the set of rules including at least one trigger and at least one trigger-responsive action for use in conjunction with the Software-as-a-Service (Saas) platform;

obtaining a general address for the serverless environment, wherein the general address provides a centralized mechanism to manage and configure cloud resources while omitting requirements to specify specific addresses for specific instantiations of the software application;

conveying the executable code to the configured serverless environment using the general address as a unified entry-point for the executable code, to combine in an immutable manner with configuration information, enabling generation of an immutable image from the executable code to subsequently actuate the plurality of the running instances, wherein the configuration information is configured to invoke the at least one trigger initiating the at least one trigger-responsive action, wherein conveying the executable code to the configured serverless environment includes wrapping the executable code prior to the generation of the immutable image by adding at least one executable instruction to the executable code; and receiving a specific address in the serverless environment to reach one of the actuated plurality of the running instances of the immutable image to incorporate with the SaaS platform.

2. The non-transitory computer-readable storage medium of claim 1, wherein the operations further comprise receiving the executable code from the third-party originator of the executable code, and wherein the executable code is received in a mutable form.

3. The non-transitory computer-readable storage medium of claim 1, wherein conveying the executable code to the configured serverless environment includes transferring the executable code to an intermediate platform for wrapping the executable code and sending the wrapped executable code from the intermediate platform to the serverless environment.

4. The non-transitory computer-readable storage medium of claim 3, wherein the intermediate platform is configured to modify the executable code.

5. The non-transitory computer-readable storage medium of claim 3, wherein the intermediate platform is configured to analyze the executable code to determine compatibility of the executable code with the serverless environment.

6. The non-transitory computer-readable storage medium of claim 3, wherein the intermediate platform is configured to validate code modifications.

7. The non-transitory computer-readable storage medium of claim 3, wherein the intermediate platform is configured to estimate computational resources necessary to run the executable code.

8. The non-transitory computer-readable storage medium of claim 1, wherein the set of rules includes configuring a predetermined infrastructure using serverless environment computing resources.

9. The non-transitory computer-readable storage medium of claim 1, wherein the set of rules includes monitoring received and sent communications from the actuated plurality of the running instances of the immutable image in the serverless environment.

10. The non-transitory computer-readable storage medium of claim 1, wherein the set of rules includes providing a remote server with indications on usage of the serverless environment for billing processes.

11. The non-transitory computer-readable storage medium of claim 10, wherein the indications on the usage of the serverless environment include indications of time and number of instances operating concurrently on the serverless environment.

12. The non-transitory computer-readable storage medium of claim 1, wherein the at least one trigger includes at least one soft trigger, a corresponding action of which is to signal a violation of a rule, and at least one hard trigger, a corresponding action of which is to terminate an actuated instance.

13. The non-transitory computer-readable storage medium of claim 1, wherein the set of rules includes a plurality of similar rules that provide increasing levels of computing resources.

14. The non-transitory computer-readable storage medium of claim 13, wherein a relevant rule from the plurality of similar rules is determined by a variable associated with the third-party originator of the executable code.

15. The non-transitory computer-readable storage medium of claim 1, wherein the operations further comprise conveying a new version of the executable code to the configured serverless environment while maintaining the specific address in the serverless environment and monitoring a version number of the new version of the executable code by another element in a serverless code.

16. The non-transitory computer-readable storage medium of claim 1, wherein the configuration information includes a metadata portion and wherein the metadata portion includes instructions for other services monitoring access to and from the serverless environment via the specific address.

17. The non-transitory computer-readable storage medium of claim 1, wherein the serverless environment is configured with a scale to zero ability for the actuated plurality of the running instances of the immutable image.

18. The non-transitory computer-readable storage medium of claim 1, wherein the configuration information includes a metadata portion and an image construction portion and wherein the metadata portion includes a predetermined list of entities authorized to access the specific address.

19. The non-transitory computer-readable storage medium of claim 3, further comprising an artificial intelligence (AI) functionality configured to scan the wrapped executable code, wherein the immutable image is generated by an image construction file created by the AI functionality.

20. The non-transitory computer-readable storage medium of claim 1, wherein wrapping the executable code includes adding at least one parameter and applying the at least one added parameter to configure the serverless environment for executing the executable code at the serverless environment.

21. The non-transitory computer-readable storage medium of claim 20, wherein applying the least one added parameter to configure the serverless environment includes selecting rules of the set of rules for enforcing when executing the executable code in the serverless environment.

22. The non-transitory computer-readable storage medium of claim 21, wherein the at least one added parameter indicates at least one program for associating with the immutable image for subsequently actuating the plurality of running instances.

23. A method for enabling applications to run in a serverless environment, the method comprising:

receiving, from a third-party originator, an executable code for wrapping, wherein the executable code is associated with subsequent actuations of a plurality of running instances of a software application by a Software-as-a-Service (SaaS) platform;

configuring a serverless environment by integrating a set of rules into the serverless environment, the set of rules including at least one trigger and at least one trigger-responsive action for use in conjunction with the Software-as-a-Service (Saas) platform;

obtaining a general address for the serverless environment, wherein the general address provides a centralized mechanism to manage and configure cloud resources while omitting requirements to specify specific addresses for specific instantiations of the software application;

conveying the executable code to the configured serverless environment using the general address as a unified entry-point for the executable code, to combine in an immutable manner with configuration information, enabling generation of an immutable image from the executable code to subsequently actuate the plurality of the running instances, wherein the configuration information is configured to invoke the at least one trigger initiating the at least one trigger-responsive action, wherein conveying the executable code to the configured serverless environment includes wrapping the executable code prior to the generation of the immutable image by adding at least one executable instruction to the executable code; and receiving a specific address in the serverless environment to reach one of the actuated plurality of the running instances of the immutable image to incorporate with the SaaS platform.

24. A system for enabling applications to run in a serverless environment, the system comprising:

at least one hardware processor configured to:

receive, from a third-party originator, an executable code for wrapping, wherein the executable code is associated with subsequent actuations of a plurality of running instances of a software application by a Software-as-a-Service (SaaS) platform;

configure a serverless environment by integrating a set of rules into the serverless environment, the set of rules including at least one trigger and at least one trigger-responsive action for use in conjunction with the Software-as-a-Service (Saas) platform;

obtain a general address for the serverless environment, wherein the general address provides a centralized mechanism to manage and configure cloud resources while omitting requirements to specify specific addresses for specific instantiations of the software application;

convey the executable code to the configured serverless environment using the general address as a unified entry-point for the executable code, to combine in an immutable manner with configuration information, enabling generation of an immutable image from the executable code to subsequently actuate the plurality of the running instances, wherein the configuration information is configured to invoke the at least one trigger initiating the at least one trigger-responsive action, wherein conveying the executable code to the configured serverless environment includes wrapping the executable code prior to the generation of the immutable image by adding at least one executable instruction to the executable code; and receive a specific address in the serverless environment to reach one of the actuated plurality of the running instances of the immutable image to incorporate with the SaaS platform.

* * * * *